US011580492B2

(12) United States Patent
Shakkour et al.

(10) Patent No.: US 11,580,492 B2
(45) Date of Patent: Feb. 14, 2023

(54) INVENTORY MONITORING SYSTEM AND METHOD

(71) Applicant: Fadi Shakkour, Encino, CA (US)

(72) Inventors: Fadi Shakkour, Encino, CA (US); Manuel Medina, South Gate, CA (US); Roaa Nabeel Nacy, Anaheim, CA (US); Ravikant Dalsaniya, Gujrat (IN); Chetan Santoki, Gujrat (IN); Arpit Shah, Gujrat (IN); Siddharth Kachhia, Gujrat (IN); Wisam Rizk, Avon, OH (US)

(*) Notice: Subject to any disclaimer, the term of this patent is extended or adjusted under 35 U.S.C. 154(b) by 0 days.

(21) Appl. No.: 17/008,863

(22) Filed: Sep. 1, 2020

(65) Prior Publication Data

US 2021/0073723 A1   Mar. 11, 2021

Related U.S. Application Data

(60) Provisional application No. 62/955,496, filed on Dec. 31, 2019, provisional application No. 62/897,175, filed on Sep. 6, 2019.

(51) Int. Cl.
*G06Q 10/08* (2012.01)
*G06Q 10/087* (2023.01)

(52) U.S. Cl.
CPC .................. *G06Q 10/087* (2013.01)

(58) Field of Classification Search
CPC ..................................................... G06Q 10/087
See application file for complete search history.

(56) References Cited

U.S. PATENT DOCUMENTS

| 6,422,422 | B1* | 7/2002 | Forbes ................ B67D 1/0041 |
| | | | 222/144.5 |
| 9,275,361 | B2* | 3/2016 | Meyer .................... G01G 19/42 |
| 9,911,290 | B1* | 3/2018 | Zalewski .............. G06Q 20/12 |
| 10,402,779 | B2* | 9/2019 | Mai ..................... G06Q 30/0633 |
| 10,410,177 | B2* | 9/2019 | Causey ............. G06Q 30/0207 |

(Continued)

FOREIGN PATENT DOCUMENTS

JP      201784020        5/2017

OTHER PUBLICATIONS

M.-H. Lin, M. A. Sarwar, Y.-A. Daraghmi and T.-U. ik, "On-Shelf Load Cell Calibration for Positioning and Weighing Assisted by Activity Detection: Smart Store Scenario," in IEEE Sensors Journal, vol. 22, No. 4, pp. 3455-3463, Feb. 15, 15, 2022. (Year: 2022).*

(Continued)

*Primary Examiner* — Asfand M Sheikh
(74) *Attorney, Agent, or Firm* — Patent Law Agency, LLC; Peter Ganjian

(57) ABSTRACT

The present invention discloses an inventory monitoring system with an intelligent shelf that includes a power and data communications hub having sensory logic of an inventory application, which generates sensory logic data related to inventory items tracked. Further included is a server computing device that includes a working logic of the inventory application, which updates server records using the sensory logic data received from the intelligent shelf. An Internet enabled mobile computing device having an interactive display logic of the inventory application displays updated server records received from the server computing device.

21 Claims, 108 Drawing Sheets

(56) References Cited

U.S. PATENT DOCUMENTS

| | | | | |
|---|---|---|---|---|
| 10,552,791 B2* | 2/2020 | Brooks | | G01G 23/18 |
| 11,017,350 B1* | 5/2021 | De Bonet | | G01G 19/42 |
| 2002/0161652 A1* | 10/2002 | Paullin | | B65D 79/00 |
| | | | | 705/22 |
| 2005/0168345 A1* | 8/2005 | Swafford, Jr. | | A47F 1/126 |
| | | | | 340/686.1 |
| 2007/0035661 A1* | 2/2007 | Resner | | G06F 1/3203 |
| | | | | 348/468 |
| 2008/0052037 A1* | 2/2008 | Bodin | | G06Q 20/203 |
| | | | | 702/173 |
| 2009/0099943 A1* | 4/2009 | Bodin | | G06Q 10/08 |
| | | | | 705/28 |
| 2014/0201041 A1* | 7/2014 | Meyer | | G01G 7/06 |
| | | | | 705/28 |
| 2014/0254115 A1* | 9/2014 | Kioski | | H04Q 1/15 |
| | | | | 361/752 |
| 2015/0145671 A1* | 5/2015 | Cohen | | G08B 13/2445 |
| | | | | 340/539.11 |
| 2016/0048798 A1* | 2/2016 | Meyer | | G01G 19/4144 |
| | | | | 705/28 |
| 2016/0330906 A1* | 11/2016 | Acheson | | A01D 41/127 |
| 2017/0344935 A1* | 11/2017 | Mattingly | | G06K 17/0022 |
| 2018/0270631 A1* | 9/2018 | High | | G01G 19/387 |
| 2019/0078930 A1* | 3/2019 | Ravulapati | | G06F 3/1423 |
| 2019/0122167 A1* | 4/2019 | Bashkin | | B65G 1/02 |
| 2019/0231467 A1* | 8/2019 | Grimsley | | A47B 88/988 |
| 2019/0353421 A1* | 11/2019 | Junge | | G01G 19/414 |
| 2020/0167721 A1* | 5/2020 | Nakdimon | | G06K 7/10425 |
| 2021/0335104 A1* | 10/2021 | Karol | | H04W 4/80 |
| 2022/0215369 A1* | 7/2022 | Murn | | H04N 7/18 |
| 2022/0268620 A1* | 8/2022 | Schiller | | G06Q 10/087 |

OTHER PUBLICATIONS

PCT/US20/48996 International Search Report and Written Opinion; dated: Nov. 24, 2020; related to the U.S. case U.S. Appl. No. 17/008,863, filed Sep. 1, 2020.

Vishay Percision Group; MICR-Measurments; Strain Gages and Instruments; Tech Note TN-502; 8 Pages; Opimizing Strain Gage Exicitation Levels; Document No. 11052 Published: Nov. 1, 2010.

* cited by examiner

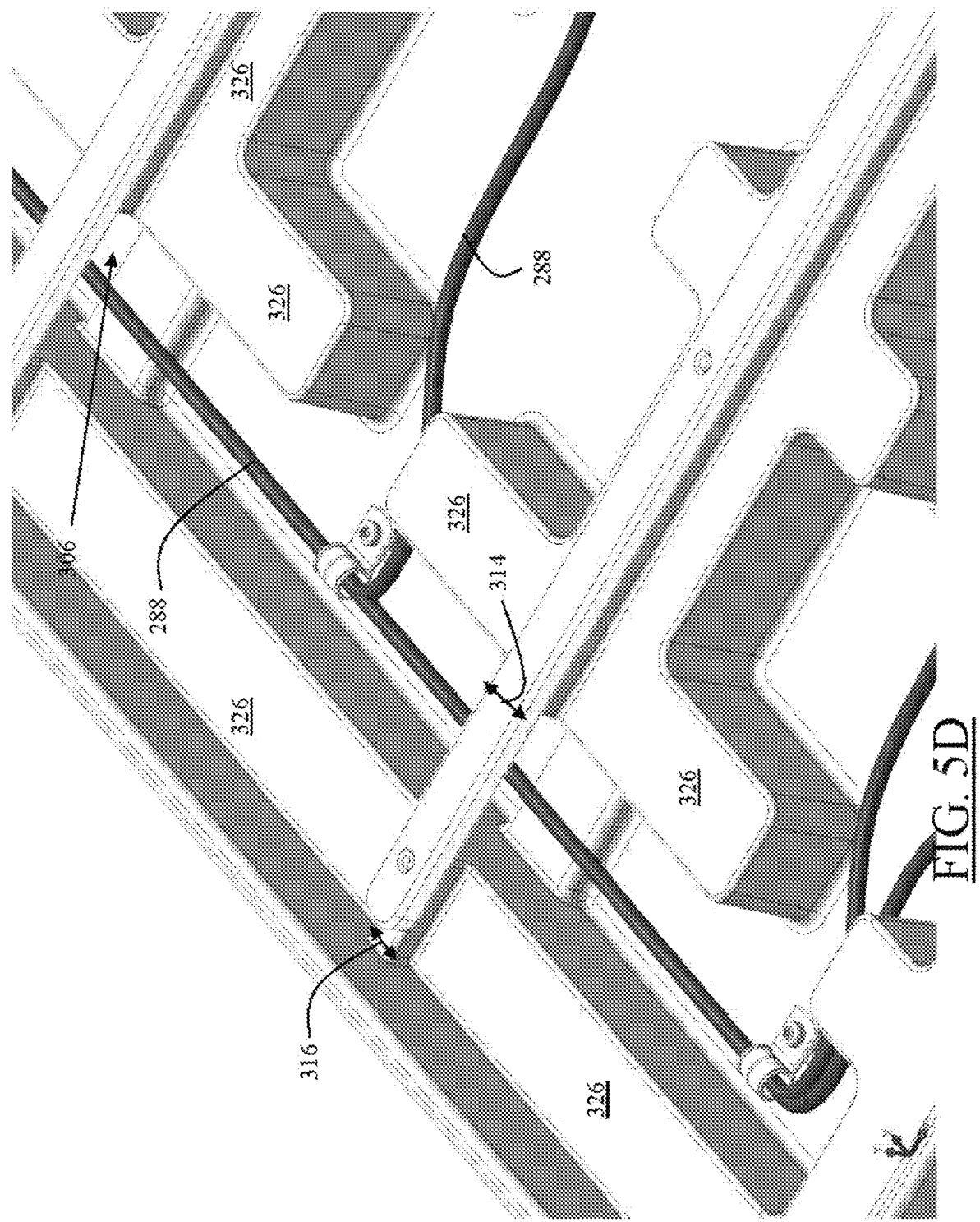

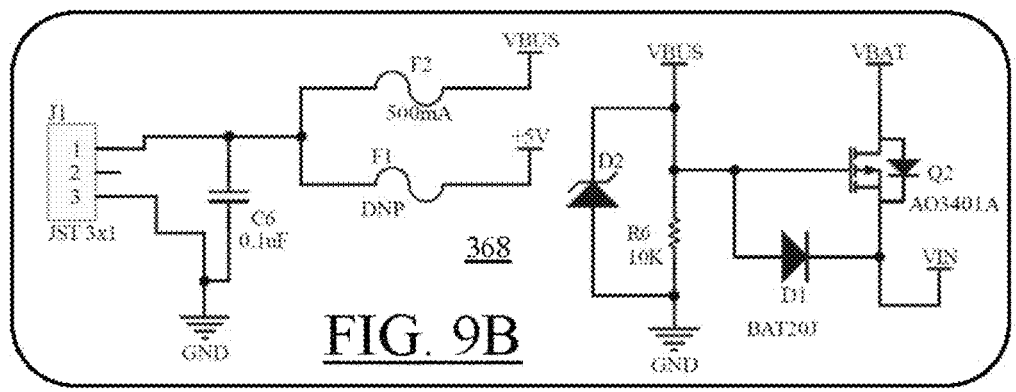
FIG. 9B
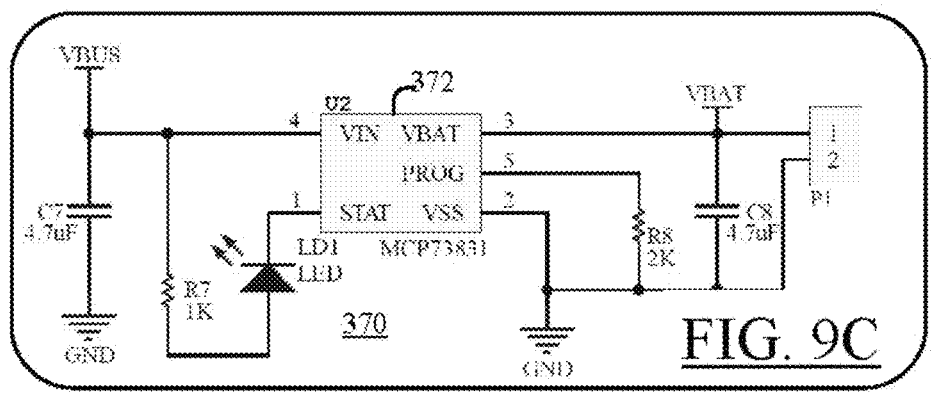
FIG. 9C
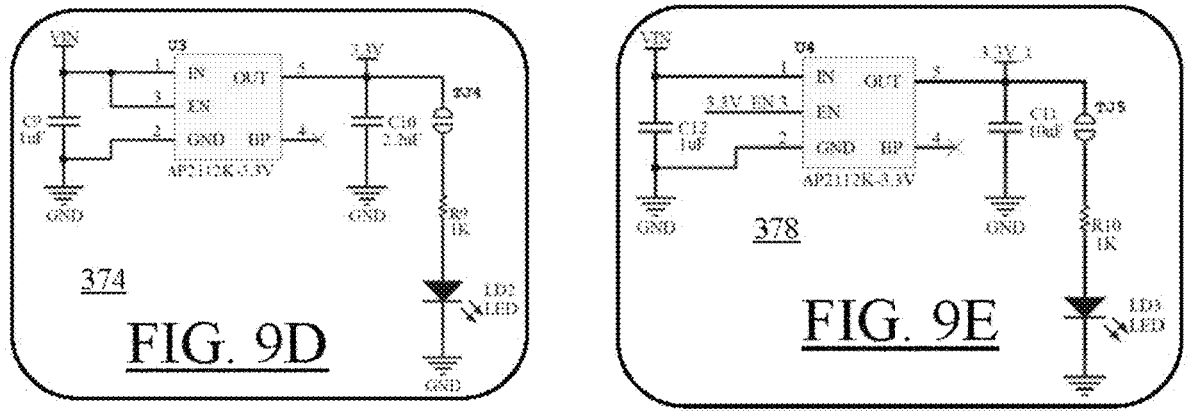
FIG. 9D
FIG. 9E
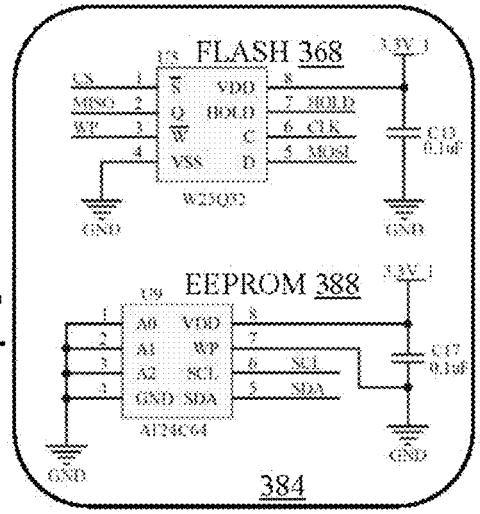
FIG. 9F

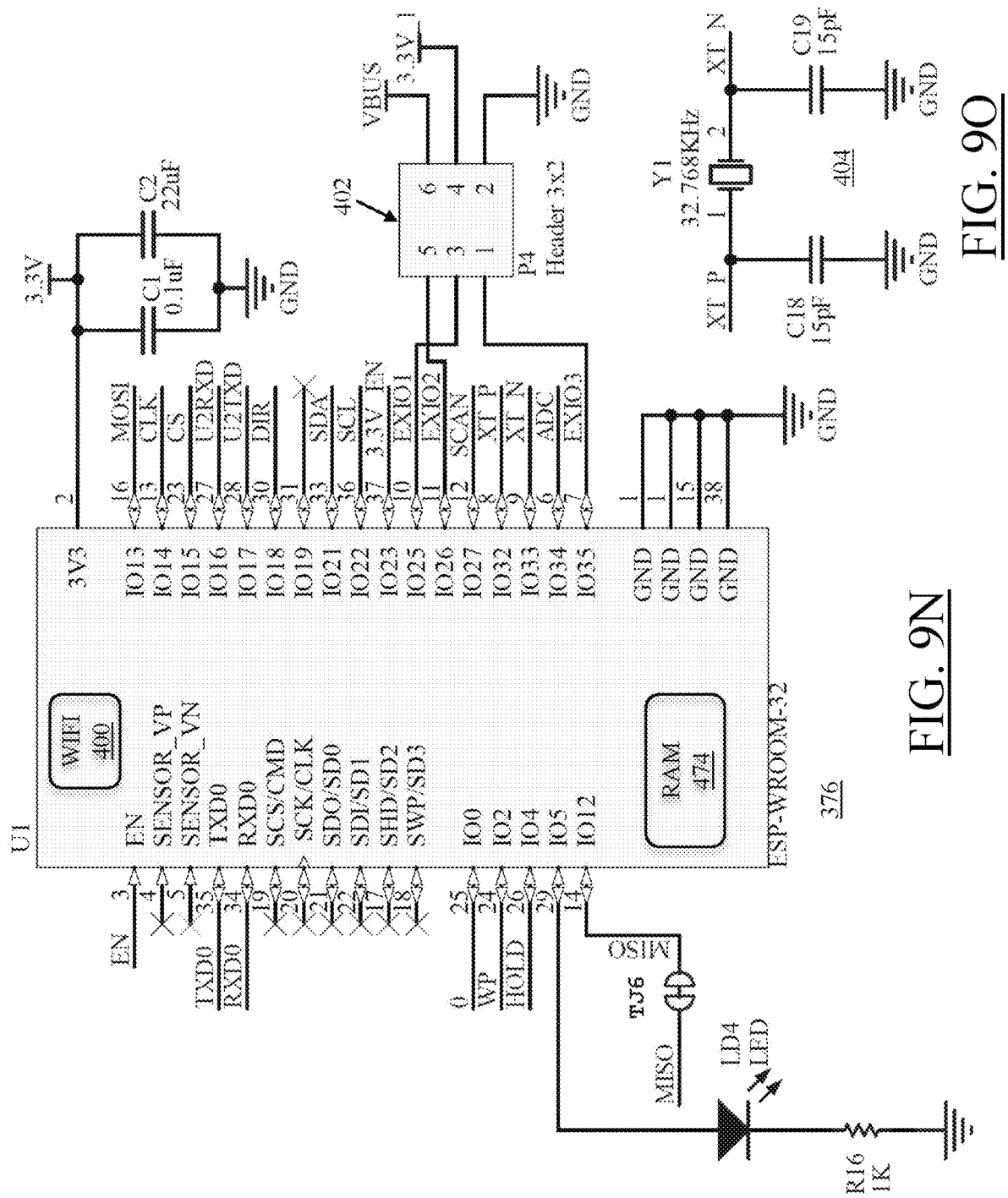

INVENTORY MONITORING SYSTEM AND METHOD

CROSS-REFERENCE TO RELATED APPLICATIONS

This Application claims the benefit of priority of U.S. Utility Provisional Patent Application 62/897,175, filed 6 Sep. 2019 AND U.S. Utility Provisional Patent Application 62/955,496, filed 31 Dec. 2019, the entire disclosures of all of which applications are expressly incorporated by reference in their entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to an Internet-enabled inventory monitoring system.

Description of Related Art

Conventional inventory tracking systems are well known and have been in use for a number of years. Regrettably, most conventional inventory tracking systems require the use of Radio Frequency Identification (RFID) tags to be associated with the items being tracked. Unfortunately, this limits the items that may be tracked to only those that have RFID. Further, RFID technology is not helpful in determining whether an item is depleted. For example, RFID may be used to track a bag of rice, but cannot be used to track or determine the amount of rice present in the bag.

Accordingly, in light of the current state of the art and the drawbacks to current inventory tracking systems and methods thereof mentioned above, a need exists for an inventory monitoring system and method that would track items, with or without RFID.

BRIEF SUMMARY OF THE INVENTION

A non-limiting, exemplary aspect of an embodiment of the present invention provides an inventory monitoring system, comprising:
a server computing device;
an intelligent shelf with one or more removable weight sensor module, with the one or more weight sensor module having one or more weight sensor;
the intelligent shelf further includes a power and data communications hub linked with the one or more weight sensors; and
an Internet enabled mobile computing device that stores a display logic of an inventory application;
wherein: the Internet enabled mobile computing device is communicative associated with the intelligent shelf via the server computing device using the inventory application.

Another non-limiting, exemplary aspect of an embodiment of the present invention provides an inventory monitoring system, comprising:
a server computing device that includes a working logic of an inventory application;
an intelligent shelf with one or more weight sensor module, with the one or more weight sensor module having one or more weight sensor;
the intelligent shelf further includes a power and data communications hub linked with the one or more weight sensor;
the intelligent shelf further includes a sensory logic of the inventory application; and
an Internet enabled mobile computing device that includes an interactive display logic of the inventory application;
the Internet enabled mobile computing device is communicatively associated with the intelligent shelf via the server computing device using the inventory application;
a display of the Internet enabled mobile computing device displays server records updated by the working logic;
the server records are displayed by the interactive display logic of the Internet enabled mobile computing device; and
the working logic updates server records by sensory logic data from the power and data communications hub of the intelligent shelf;
the sensory logic data of the intelligent shelf is updated by data from the weight sensor modules.

Still another non-limiting, exemplary aspect of an embodiment of the present invention provides an inventory monitoring system, comprising:
an intelligent shelf having one or more weight sensor module, with the one or more weight sensor module having one or more weight sensor;
the intelligent shelf includes a power and data communications hub linked with the one or more weight sensor, and a sensory logic a an inventory application;
a server computing device that includes a working logic of the inventory application, which updates server records using sensory logic data received from intelligent shelf;
an Internet enabled mobile computing device having an interactive display logic of the inventory application, displays updated server records.

Yet another non-limiting, exemplary aspect of an embodiment of the present invention provides an inventory monitoring system, comprising:
an intelligent shelf having one or more weight sensor module, with the one or more weight sensor module having one or more weight sensor;
the intelligent shelf includes a power and data communications hub linked with the one or more weight sensor;
the intelligent shelf further includes a sensory logic of an inventory application, which updates sensory logic data from the one or more weight sensors;
a server computing device that includes a working logic of the inventory application, which updates server records using updated sensory logic data received from intelligent shelf;
an Internet enabled mobile computing device having an interactive display logic of the inventory application, displays updated server records.

A further non-limiting, exemplary aspect of an embodiment of the present invention provides an inventory monitoring system, comprising:

an intelligent shelf that includes a power and data communications hub having sensory logic of an inventory application, which generates sensory logic data related to inventory items tracked;

a server computing device that includes a working logic of the inventory application, which updates server records using the sensory logic data received from the intelligent shelf;

an Internet enabled mobile computing device having an interactive display logic of the inventory application, which displays updated server records received from the server computing device.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 5A to 5E are non-limiting, exemplary illustrations of the various views of the housing shown in FIGS. 1A to 4G with weight sensor module groupings completely remove (with the exception of FIG. 5E) for simplicity and discussion purposes in accordance with one or more embodiments of the present invention;

FIG. 12A-1 to 12F-2 are non-limiting exemplary illustrations of respective interactive display logic and sensory logic for a process of updating and communications of server records of server computing devices by intelligent shelf and Internet enabled mobile computing device in accordance with one or more embodiments of the present invention;

DETAILED DESCRIPTION OF THE INVENTION

Figure 1A:
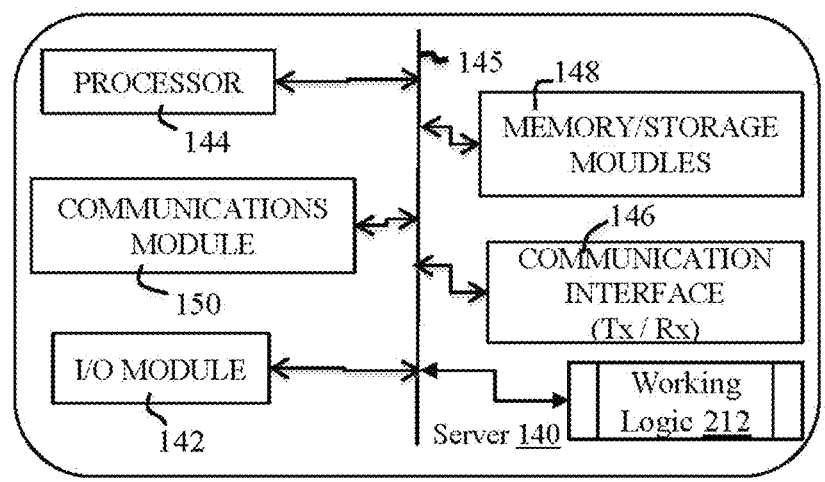
FIG. 1A is an exemplary illustration of a computing machine as server device hardware.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart (if a flowchart is used) may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

The present invention defines an intelligent shelf as a surface for the storage or display of objects or items, with the intelligent shelf having electronics that are programmable. That is, the intelligent shelf is a programmable Internet enabled apparatus that may be communicatively linked to Internet-enabled computing devices, server computing devices, or to other intelligent shelves. Throughout the disclosure, references to an intelligent shelf are meant to be illustrative, for convenience of example, and for discussion purposes only.

Throughout the present invention, the term "user" or "end user" may refer to one or more entities that forward data, one or more entities that receive data, or both.

One or more embodiments of the present invention may use the phrase form factor as the physical size and or shape of various members of the one or more embodiments of the present invention.

A client device may be defined as an Internet enabled computing device that is capable of communicating with server computing devices. Non-limiting and non-exhaustive listing of examples of Internet-enabled computing devices may include, for example, the intelligent shelf of the present invention, or Internet-enabled mobile computing devices such as smartphones, laptops, etc.

Present invention uses the well-known and ordinary meaning of a load cell, which is a force transducer.

The below-described computer hardware and software are presented for purposes of illustrating the basic underlying client device and server computer components that may be employed for implementing the present invention. For purposes of discussion, the following description will present examples in which it will be assumed that there exists one or more "server" (e.g., database server and/or application server) that communicates with one or more client-devices (e.g., personal computers, mobile devices, or others). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below. Therefore, for example, while the present invention may operate within a single computing machine (server or client device) or operate directly between client devices (e.g., peer-to-peer) without the use of servers, the present invention is preferably embodied in computer systems, such as a client-server system. Client-server environments, database and/or application servers, and networks are very well documented in technical, trade, and patent literature.

One or more embodiments of the system and method of the present invention provide a user interface that is understandable by human intellect and human senses for interaction. A non-limiting example of a user interface may include a graphic user interface (GUI) to allow a visual way of interacting with the various elements of the present invention.

The disclosed user interface provided throughout the disclosure is meant to be illustrative and for convenience of example only and should not be limiting. Therefore, various embodiments of the present invention are not limited to any particular GUI configuration and may be implemented in a variety of different types of user interfaces.

Furthermore, all GUI representations of any concepts, aspects, functions, operations, or features may be varied, and therefore, none should be limiting. The non-limiting and non-exhaustive illustrations of the GUI used throughout the disclosure are provided only for a framework for discussion. For example, the mere act or function of "selection" (e.g., selecting an item) may be accomplished by numerous GUI configurations or representations of the concept of "selection" that are too numerous to mention individually; non-exhaustive and non-limiting examples of which may include the use of GUI radio-buttons, GUI pull-down menus, individual GUI icons that are tapped or selected, which may direct users to other types of "selection" GUI, a simple list of links that may be tapped or selected, etc. Accordingly, a completely different set of GUI representations (i.e., configurations, shapes, colors, etc.) for any concepts, aspects, functions, operations, or features may be used (different from those shown in the present application) without limitations and without departing from the spirit and scope of the invention.

Figure 1B:
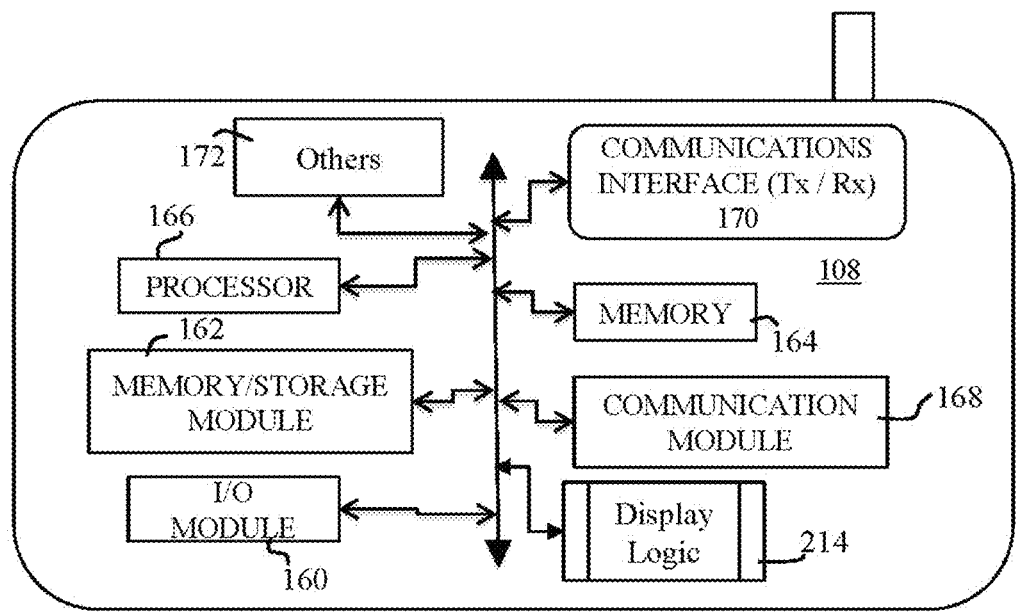
FIG. 1B is an exemplary illustration of a computing machine as an Internet-enabled mobile computing device.

The present invention may be implemented on conventional computing machines that may include servers and or client devices. FIG. 1A is an exemplary illustration of a well-known, conventional computing machine as server device hardware, and FIG. 1B is an exemplary illustration of a well-known, conventional computing machine as an Internet-enabled mobile computing device.

As illustrated in FIG. 1A, the computing machines for implementing the inventory monitoring system and method of the present invention may include one or more well-known conventional server computing devices (hereinafter referred to simply as "server" or "servers") in one or more locations.

The exemplary illustrated server 140 is an example representing a typical conventional server that is comprised of an input and output (I/O) module 142 for receiving information and or data from various devices, including, but not limited to, Cloud Computing Systems and services, client devices, other servers, and so on, including any external computers connected to server 140, a network and or Internet connection, or any computer readable medium such as a floppy disk, Compact Disk (CD), a Digital Versatile Disk/Digital Video Disk (DVD), flash drive, etc.

The I/O module 142 may also be configured for receiving user input from another input device such as a keyboard, a mouse, or any other input device (e.g., touch screen). Note that the I/O module 142 may include multiple "ports" for receiving/transmitting data and user input, and may also be configured to receive/transmit information from remote databases or computers or servers using wired or wireless connections, including other external systems.

The I/O module 142 is connected with the processor 144 via a bus system 145 for providing output to other devices or other programs, (e.g. to other software modules or Cloud Computing Systems) and services for use therein, or possibly serving as a wired or wireless gateway to external databases or other processing devices such as client devices.

Further associated with server computing device 140 is communication interface 146, which may include a wireless or wired transceiver Tx/Rx for implementing desired communications protocols.

Processor 144 is coupled with a memory/storage module 148 (e.g., Random Access Memory, Read Only Memory, hard drive, Cloud Computing Systems, etc.) to permit working logic software 212 of inventory application 110 to be manipulated by commands of the processor 144. The memory/storage module 148 may also include other storage solutions for storage of data (e.g. removal CD, DVD, flash drive, etc.) and/or persistent storage, Cloud Computing Systems and services storage, etc.

As stated above, FIG. 1B is an exemplary illustration of a well-known, conventional computing machine such as an Internet-enabled mobile computing device 108 that may be used to implement the inventory monitoring system and method of the present invention.

As illustrated, Internet-enabled mobile computing device 108 may be any well-known conventional computing machine, non-limiting examples of which may include netbooks, notebooks, laptops, mobile devices such as mobile phones, or any other devices that are Network and or Internet enabled.

Internet-enabled mobile computing device 108 includes typical, conventional components such as an I/O module 160 (e.g., a keyboard or touch screen display, etc.), a storage module 162 for storing information (may use Cloud Computing Systems and services), a memory 164 used by a processor 166 to execute programs, a communication module 168 for implementing desired communication protocol, a communications interface (e.g., transceiver module) 170 for transmitting and receiving data, and may or may not include other components 172 such as an image/video/sound capture device (such as a camera), voice recording microphone, stylus, etc. Internet enabled mobile computing device 108 further includes an interactive display logic 214 of inventory application 110.

Figure 1C:
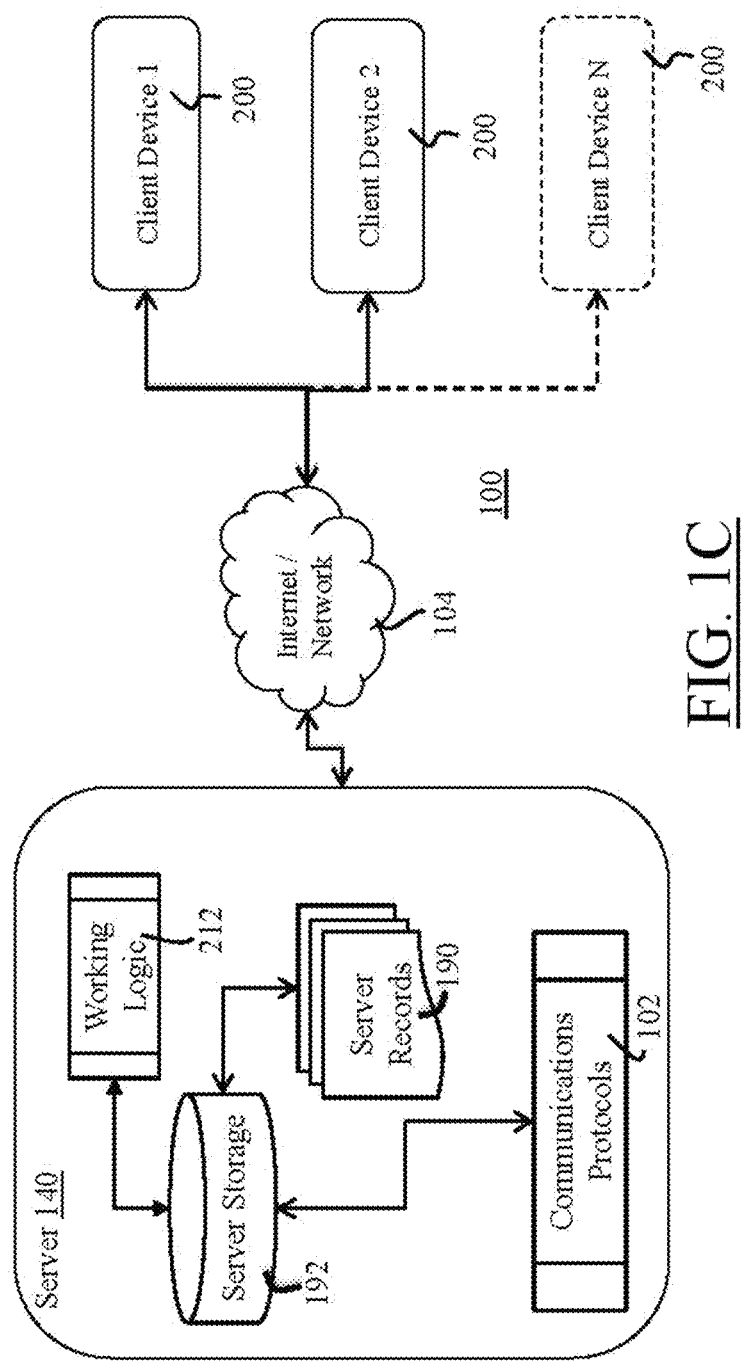
FIG. 1C illustrates the general overview of a client-server system suitable for implementing one or more embodiments of the present invention.

FIG. 1C illustrates the general overview of a client-server system 100 suitable for implementing one or more embodiments of the present invention. As shown, client-server system 100 comprises one or more client-devices 200 connected to one or more server computing devices 140 via Internet/Network 104.

Client-devices 200 comprise one or more standalone client-devices (e.g., intelligent shelves 202 (FIG. 2)) and Internet-enabled mobile computing devices 108 (such as mobile phones, laptops, etc.) connected to one or more server computing devices 140 via network/Internet 104 using conventional communications protocols.

In FIG. 1C, other aspects of one or more server computing devices 140 are also schematically illustrated, which are not shown in FIG. 1A. Non-limiting examples of other aspects of one or more server computing devices 140 may include well-known conventional communication protocols 102 that may be used to communicate with other servers or client devices. Others may include, for example, a server storage 192 that may store server records 190, with the server records 190 implemented using well-known relational database systems.

Network/Internet 104 may be any one of a number of conventional, well-known network systems that includes functionality for packaging client-device communications in the well-known Structured Query Language (SQL) together with any parameter (or attributes) information into a format (of one or more packets or data-packets) suitable for communications between server computing devices 140 and client-devices 200.

As further detailed below in relation to FIG. 2, one or more embodiments of the present invention relate to inventory monitoring of one or more items primarily based on the weight of items 106, but also partially based on consumption rate (detailed below).

Data related to items 106 may be transmitted to one or more computing server devices 140 where the data is saved as server records 190 in storage 192. Saved data may then be accessible for viewing and for editing via display logic 214 of inventory application 110.

Effectively, this invention provides methods of monitoring the weight of one or more items 106 and a method for input of the consumption rate of an item for the purpose of monitoring the availability of "quantity," "weight," "count," or other parameters or attributes of the items as further detailed below.

Figure 2:
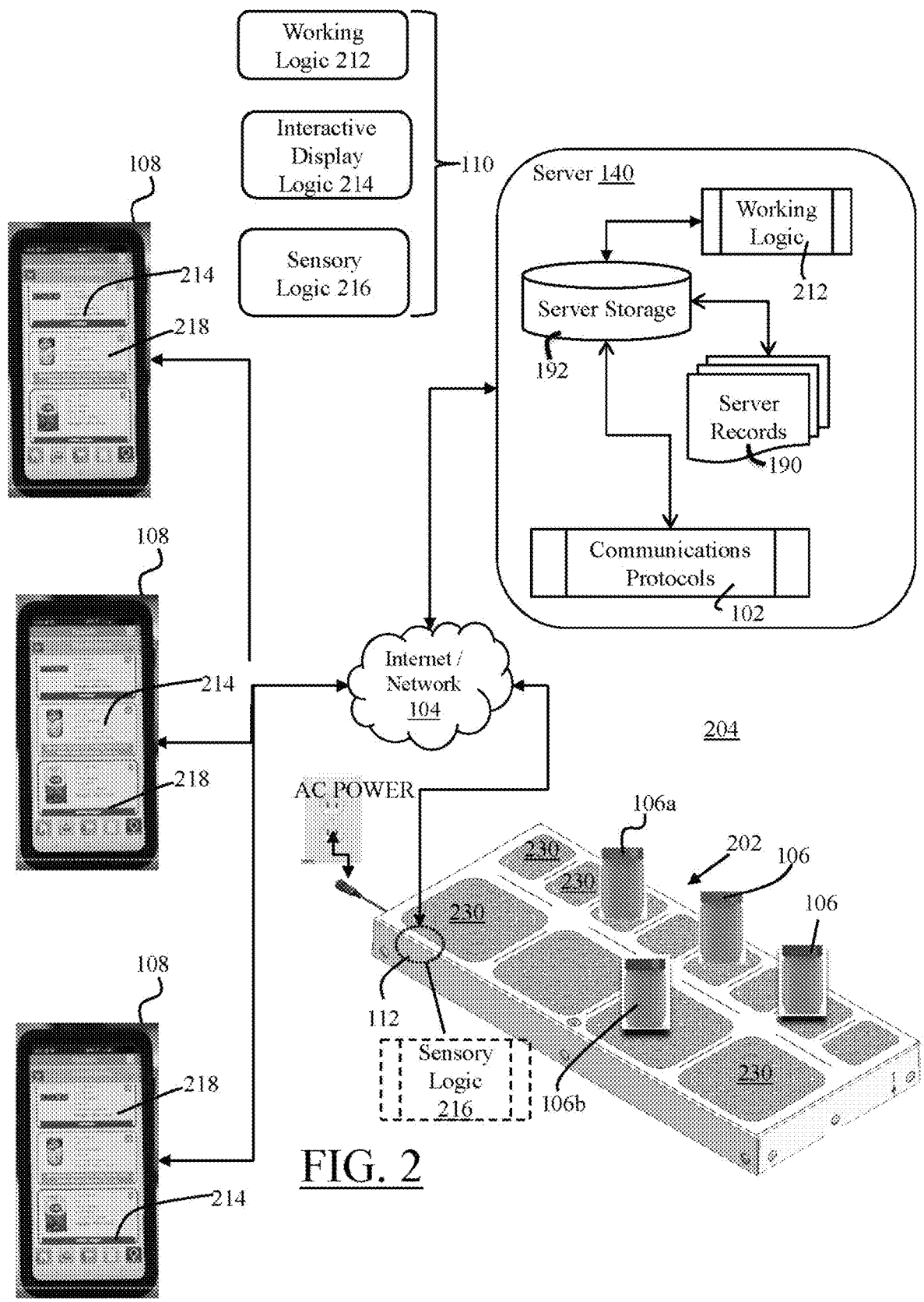
FIG. 2 is a non-limiting, exemplary illustrations of the general overview of an inventory monitoring system implemented as a client-server system in accordance with one or more embodiments of the present invention.

FIG. 2 is a non-limiting, exemplary illustrations of the general overview of an inventory monitoring system implemented as a client-server system in accordance with one or more embodiments of the present invention.

Figure 9A:
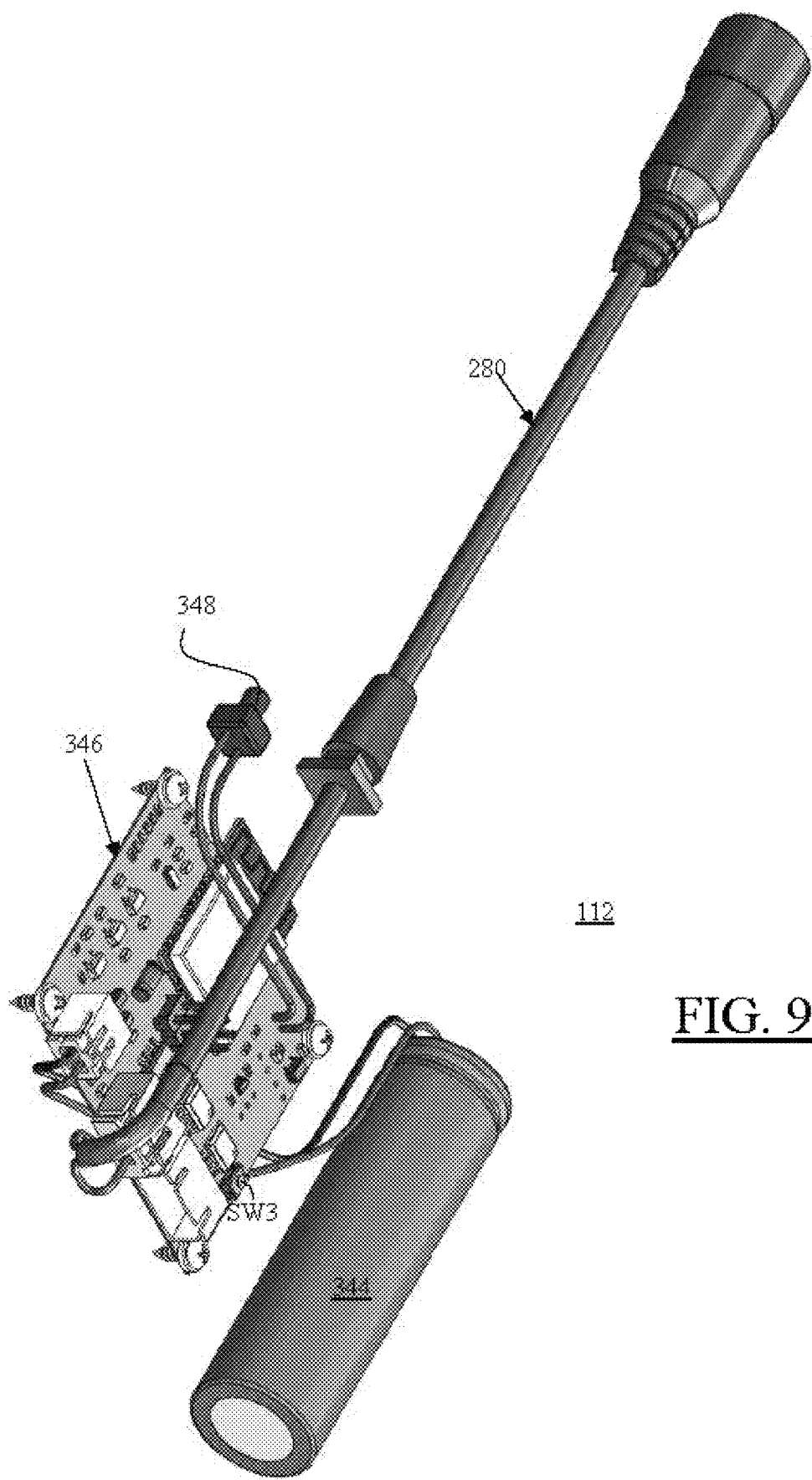
FIGS. 9A to 9O are non-limiting, exemplary illustrations of the detailed circuitry of the power and communications hub of the intelligent shelf shown in FIGS. 1A to 8F in accordance with one or more embodiments of the present invention.
Figure 9G:
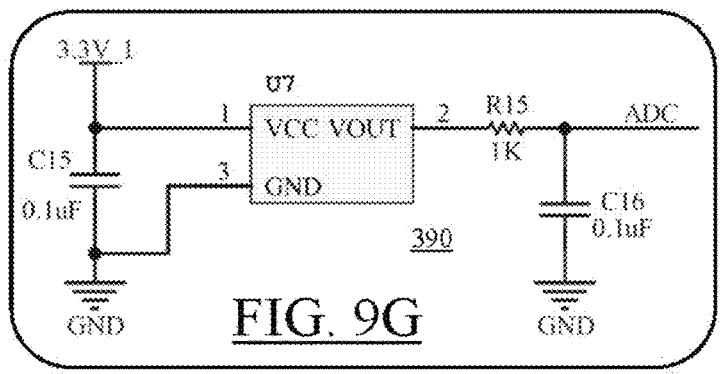
FIGS. 9P to 9T are non-limiting, exemplary illustrations of the detailed of the weight sensor module electronics shown in FIGS. 1A to 9O in accordance with one or more embodiments of the present invention.
Figure 9H:
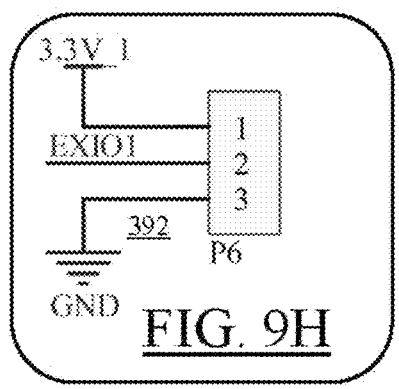
Figure 9I:
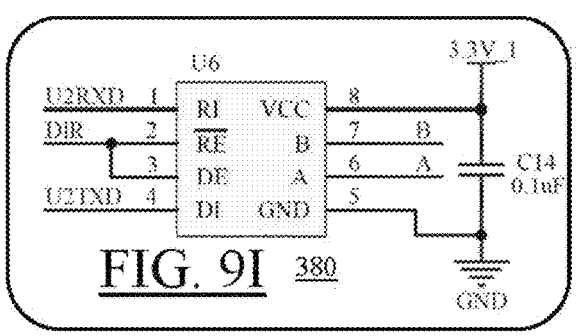
Figure 9J:
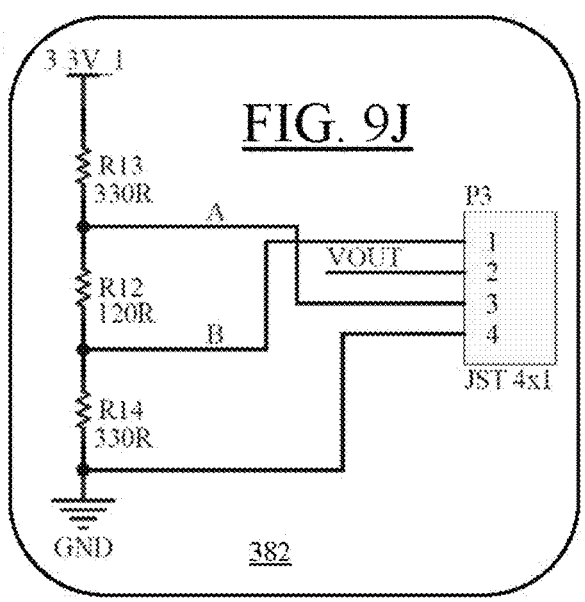
Figure 9K:
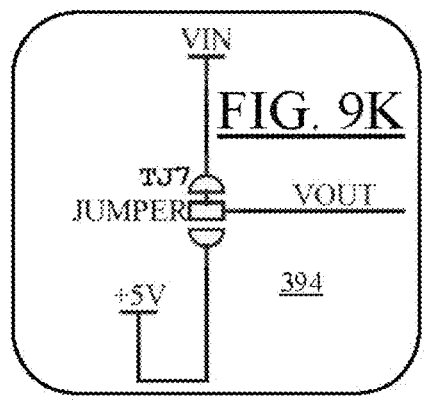
Figure 9L:
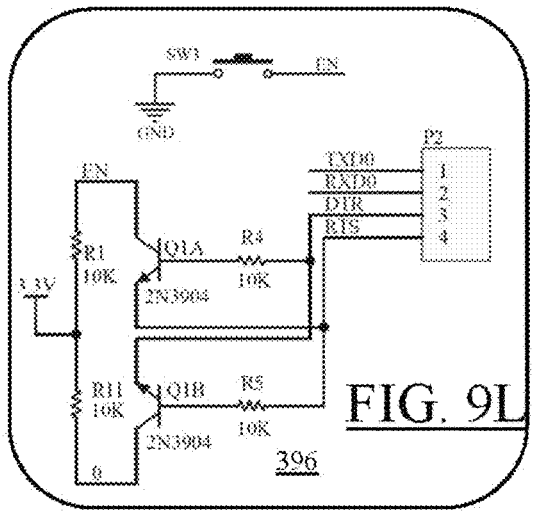
Figure 9M:
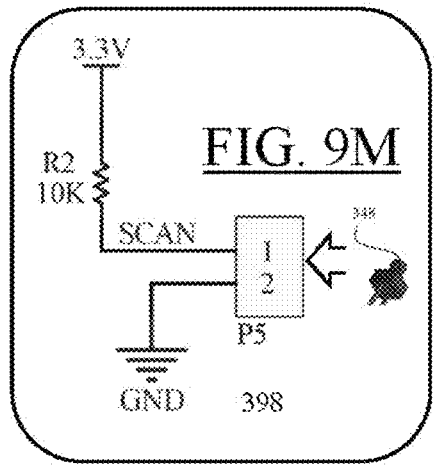
Figure 9P:
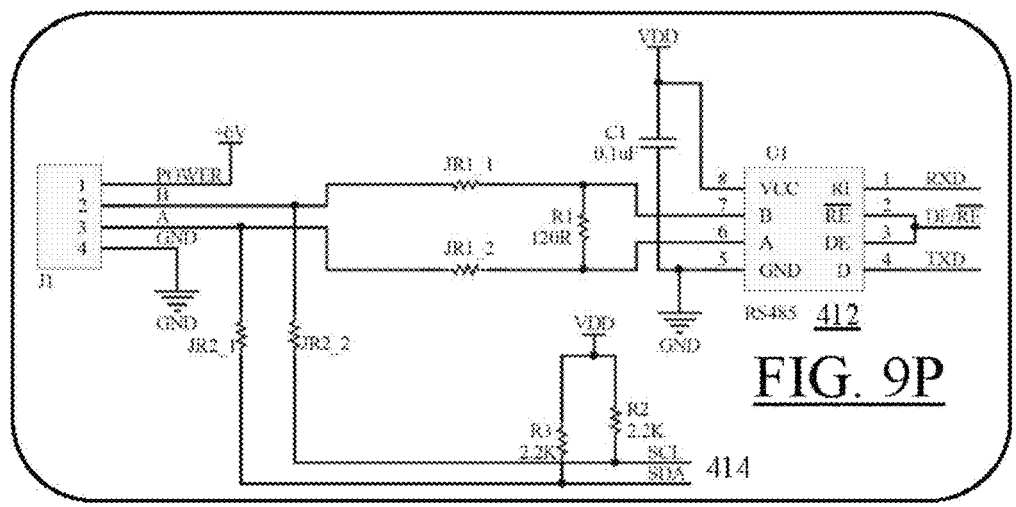
Figure 9Q:
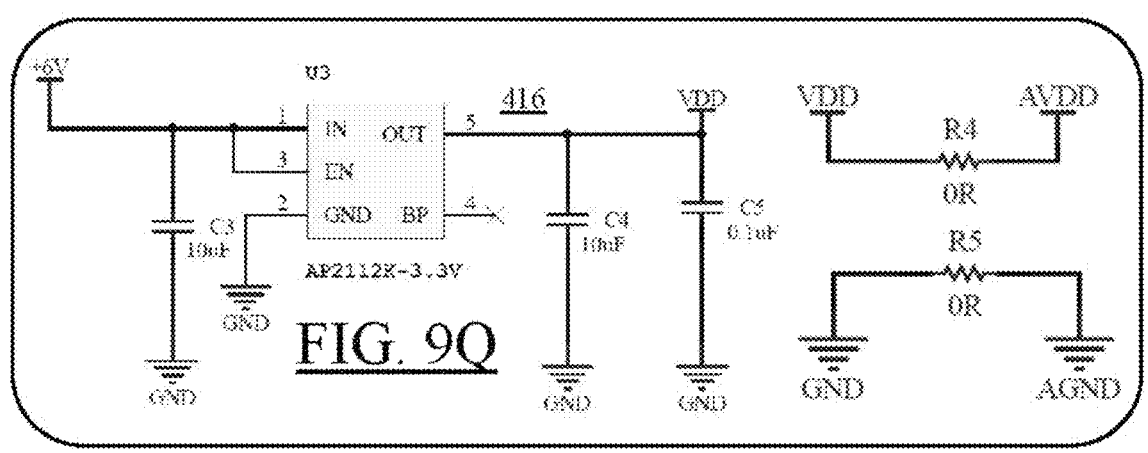
Figure 9R:
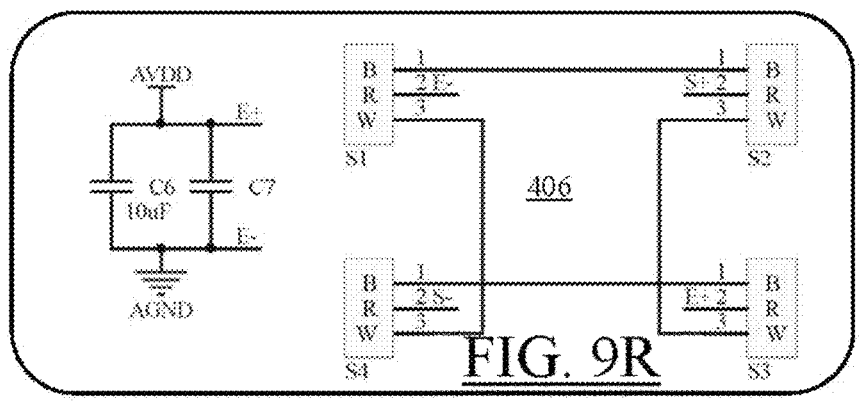
Figure 9S:
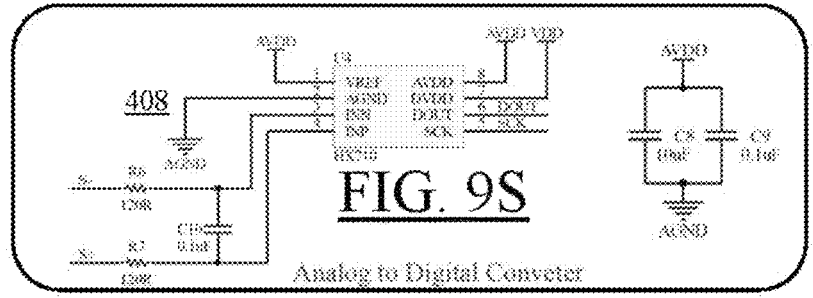

As illustrated and further detailed below, inventory monitoring system 204 is comprised of one or more server computing device 140 and one or more intelligent shelf 202 having one or more weight sensor module 230, with the one or more weight sensor module 230 having one or more weight sensor 406 (FIG. 9R).

Intelligent shelf 202 further includes a power and data communications hub 112 linked with the one or more weight sensor modules 230. In this non-limiting, exemplary instance, intelligent shelf 202 includes a set of twelve (12) weight sensor modules 230. Inventory monitoring system 204 further includes one or more Internet-enabled mobile computing device 108 that stores a display logic 214 of inventory application 110.

Server computing device 140 includes a working (or "business") logic 212 of an inventory application 110, intelligent shelf 202 includes a sensory logic 216 of the inventory application 110, and Internet enabled mobile computing device 108 includes an interactive display logic 214 of the inventory application 110.

A display 218 of Internet enabled mobile computing device 108 displays server records 190 updated by working logic 212, with server records 190 displayed by the interactive display logic 214 of Internet enabled mobile computing device 108.

Working logic 212 updates server records 190 by updated data received from sensory logic 216 from the power and data communications hub 112 of the intelligent shelf 202, with sensory logic data of intelligent shelf 202 updated by data from weight sensor modules 230.

In normal usage, Internet-enabled mobile computing device 108 is communicatively associated with power and data communications hub 112 of intelligent shelf 202 via one or more server computing device 140 using inventory application 110 through Internet/Network 104. Stated in other words, intelligent shelf 202 is communicatively linked through Internet/Network 104 with one or more Internet-enabled mobile computing device 108 via one or more server computing device 140.

As further detailed below, in this non-limiting, exemplary instance, intelligent shelf 202 is illustrated to store different types of items 106 (food, cleansing solutions, hygiene items, etc.) on top. Items 106 (detected by weight sensors) may be monitored by inventory application 110 stored within and executed by Internet-enabled mobile computing device 108 via server computing device 140.

Server records 190 stored in server storage 192 include data related to items 106 placed on intelligent shelf 202, which is displayed by interactive display logic 214 of inventory application 110 of Internet-enabled mobile computing device 108. Interactive display logic 214 may be thought of as a display mechanism for end users, which displays information instructed from server computing device 140.

Server records 190 may be updated by using data communicated from power and data communications hub 112 of intelligent shelf 202 via Internet/Network 104, with updated server records 190 transmitted via Internet/Network 104 and displayed in an intuitive and easy to understand GUI by interactive display logic 214 of inventory application 110 of Internet enabled mobile computing device 108. Server records 190 may also be updated or modified directly via interactive display logic 214 of inventory application 110 using Internet-enabled mobile computing device 108.

As an overview example of a monitoring of a food item 106 with details provided further below, if a food item 106a is determined to be depleted by sensor logic 216, power and data communications hub 112 of intelligent shelf 202 may transmit the updated sensory logic data related to the depleted status of food item 106a to server computing device 140. Working logic 212 then updates server records 190 accordingly. Intelligent shelf 202 may use a weight of item 106a to determine if it has been depleted.

The status of food item 106a in server records 190 as being depleted is transmitted to Internet-enabled mobile computing device 108 via Internet/Network 104 and is displayed by interactive display logic 214 as an intuitive GUI, representing the depleted status of the item. In practice, server computing device 140 instructs interactive display logic 214 of Internet-enabled mobile computing device 108 to select the display GUI that represents the depleted status of item 106a.

In this non-limiting, exemplary instance, a GUI box that contains all information related to food item 106a may change color and/or shape as instructed by the server computing device 140 (further detailed below), representing a depleted status of food item 106a on display 218 of Internet-enabled mobile computing device 108, displayed by interactive display logic 214. As an example of direct server records 190 manipulation, interactive display logic 214 of inventory application 110 may be used by Internet-enabled mobile computing device 108 to completely remove item 106a from server records 190.

As another example, if a food item 106b is determined to be replenished by the sensory logic 216, power and data communications hub 112 of intelligent shelf 202 may transmit data related to the replenished status of food item 106b to server computing device 140, with working logic 212 updating server records 190 accordingly. Intelligent shelf 202 may use a weight of item 106b to determine if it has been replenished.

The status of food item 106b in server records 190 as being replenished is transmitted to Internet-enabled mobile computing device 108 via Internet/Network 104 and is displayed by interactive logic display 214 as an intuitive GUI, representing the replenished status of the item. In this non-limiting, exemplary instance, a GUI box that contains all of the information related to food item 106b may change color and/or shape, representing the replenished status of food item 106b within inventory application 110 as instructed by server computing device 140.

Accordingly, one or more embodiments of the present invention provide an inventory monitoring system and method that monitors and keeps track of items, providing users with real-time information related to the inventoried items. Non-limiting, non-exhaustive listing of real-time information provided may include, for example, quantity of a particular item remaining, item price, preferred merchant for purchase of the item, etc.

Figures 1, 11A:
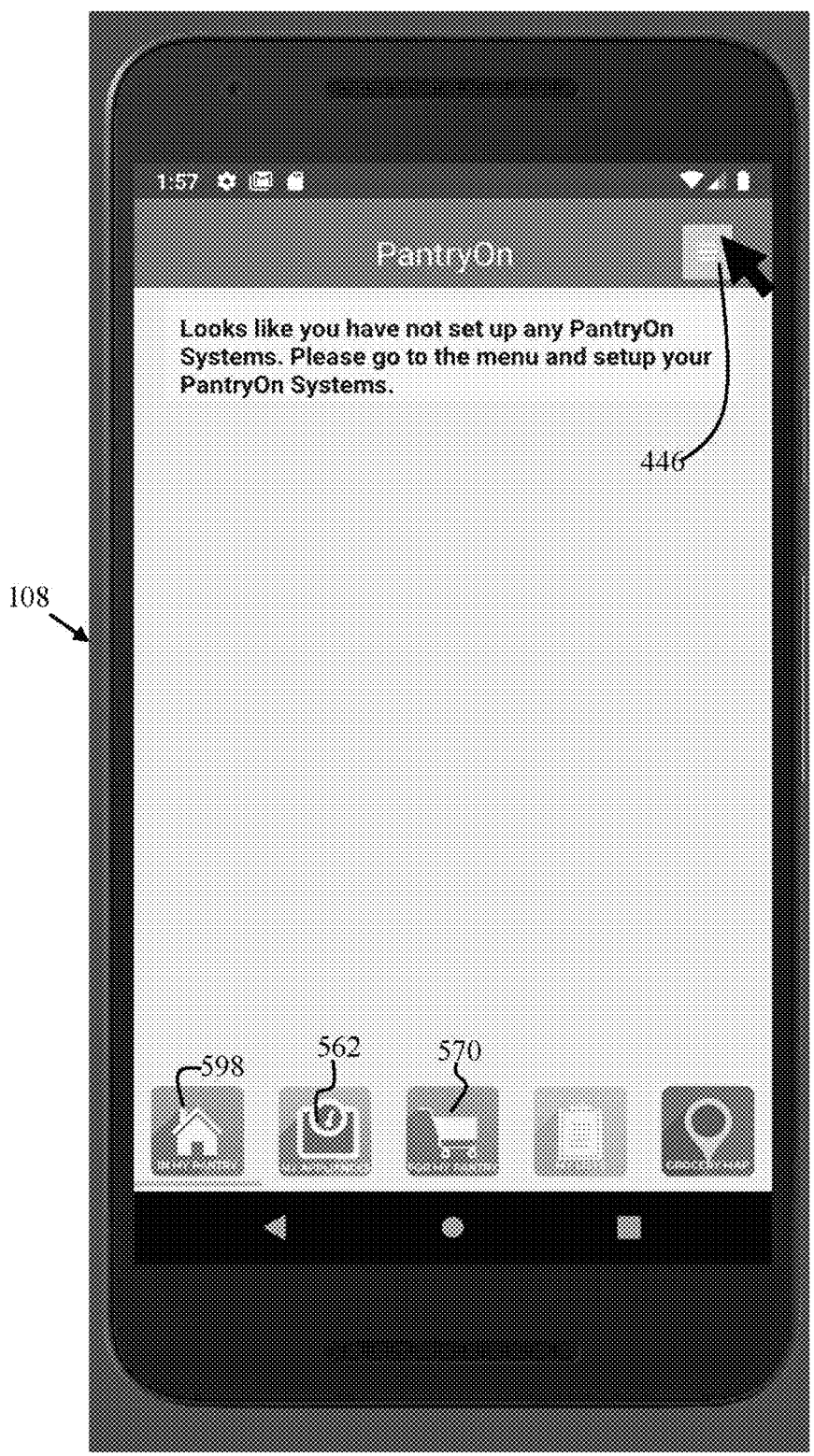
FIGS. 11A-1 to 11I are non-limiting, exemplary illustrations of a setup process of inventory monitoring system, ultimately enabling intelligent shelf to communicate with server computing device via Internet/Network in accordance with one or more embodiments of the present invention.
Figures 2, 11A:
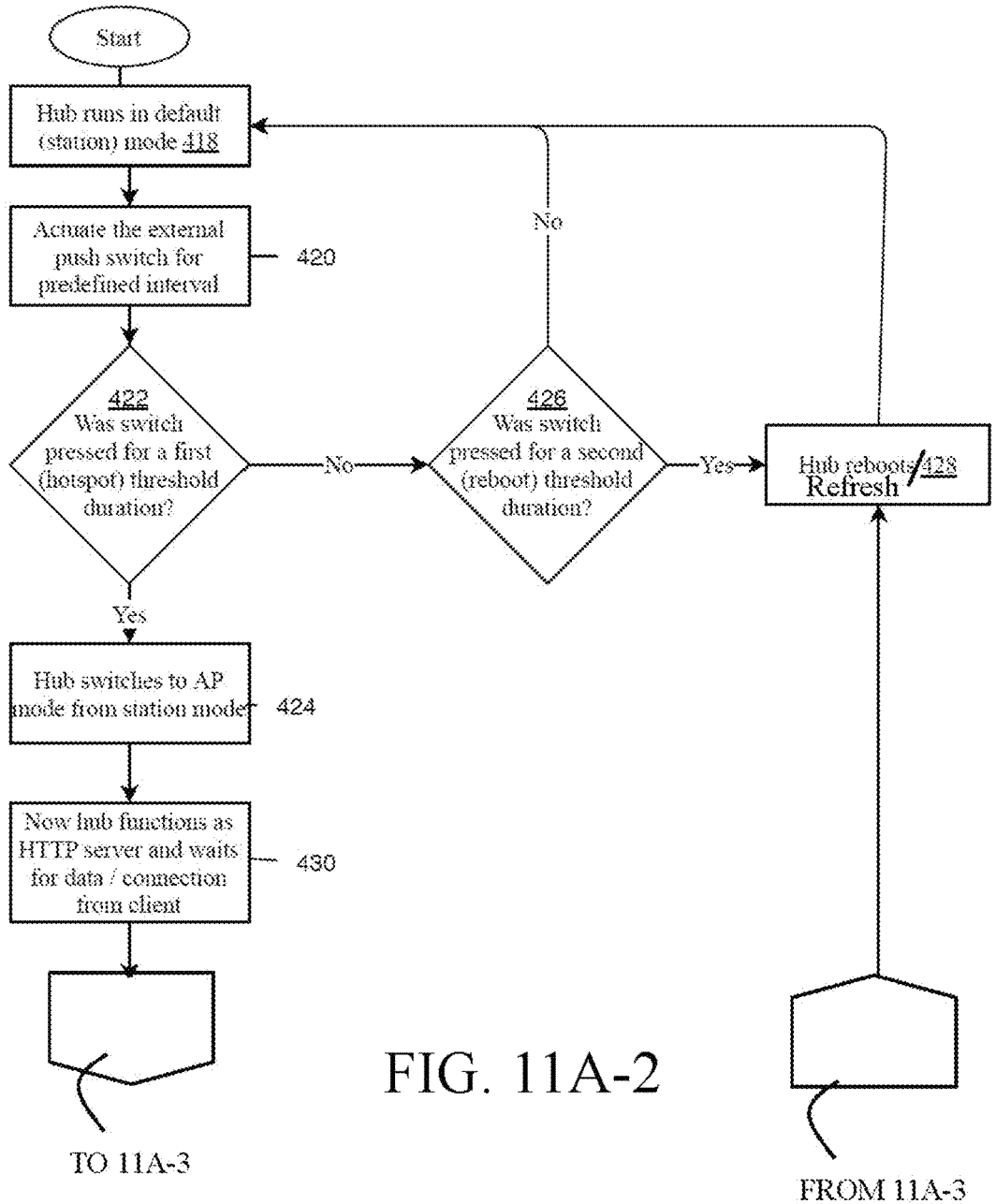

FIGS. 3A to 3F are non-limiting, exemplary illustrations of the various views of the intelligent shelf 202 shown in FIGS. 1A to 2, in accordance with one or more embodiments of the present invention. As illustrated in FIGS. 1A to 3F and indicated above, inventory monitoring system 204 is comprised of server computing device 140 and intelligent shelf 202 with one or more removable weight sensor modules 230. The one or more weight sensor modules 230 have one or more weight sensors 406.

Furthermore, intelligent shelf 202 further includes power and data communications hub 112 linked with one or more weight sensor modules 230. Additionally, inventory monitoring system 204 also requires the use of an Internet-enabled mobile computing device 108 that stores display logic 214 of inventory application 110, wherein the Internet-enabled mobile computing device 108 is communicatively associated with the intelligent shelf 202 via server computing device 140 using inventory application 110.

Figure 3A:
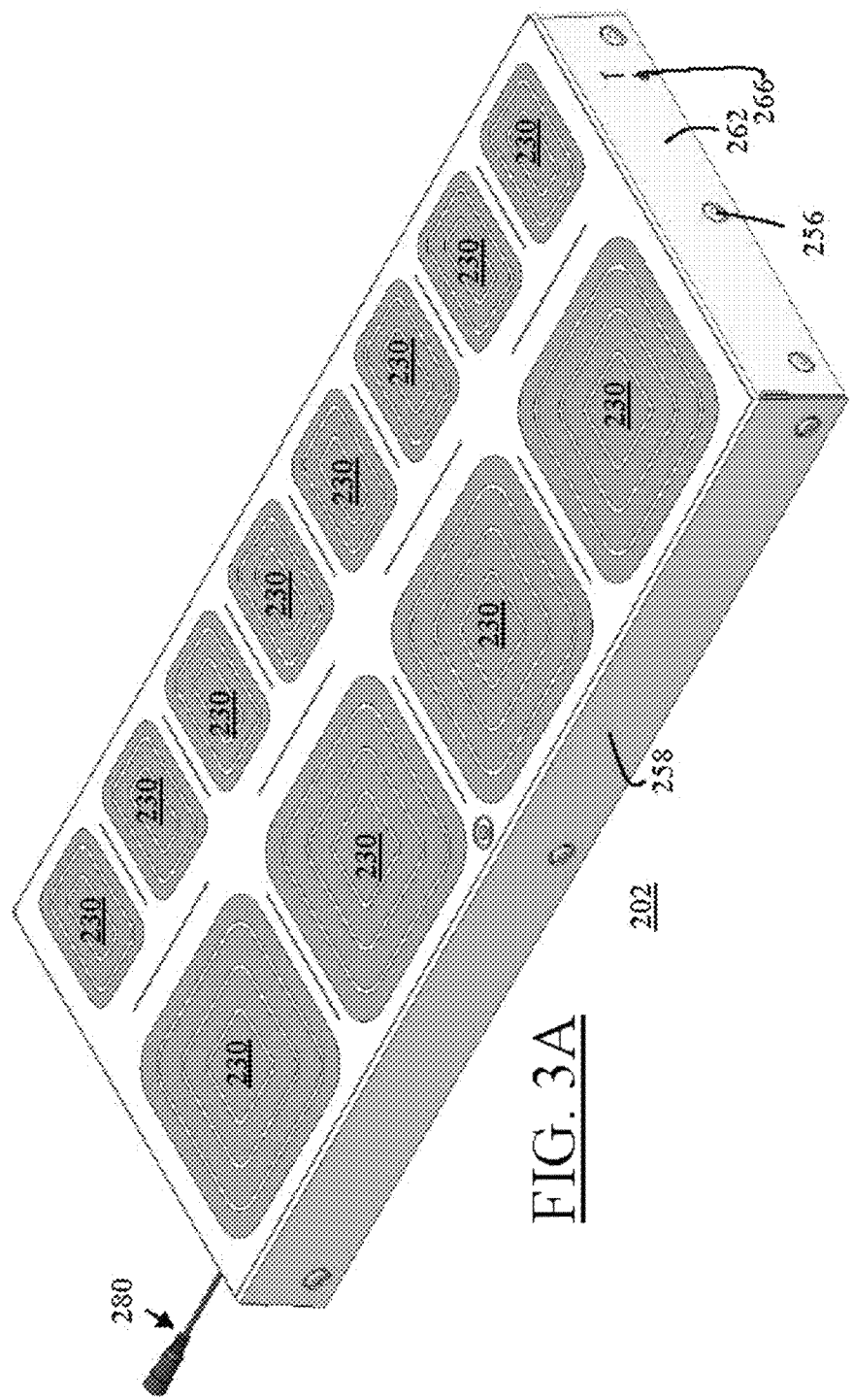
FIGS. 3A to 3F are non-limiting, exemplary illustrations of the various views of the intelligent shelf shown in FIGS. 1A to 2, in accordance with one or more embodiments of the present invention.
Figure 3B:
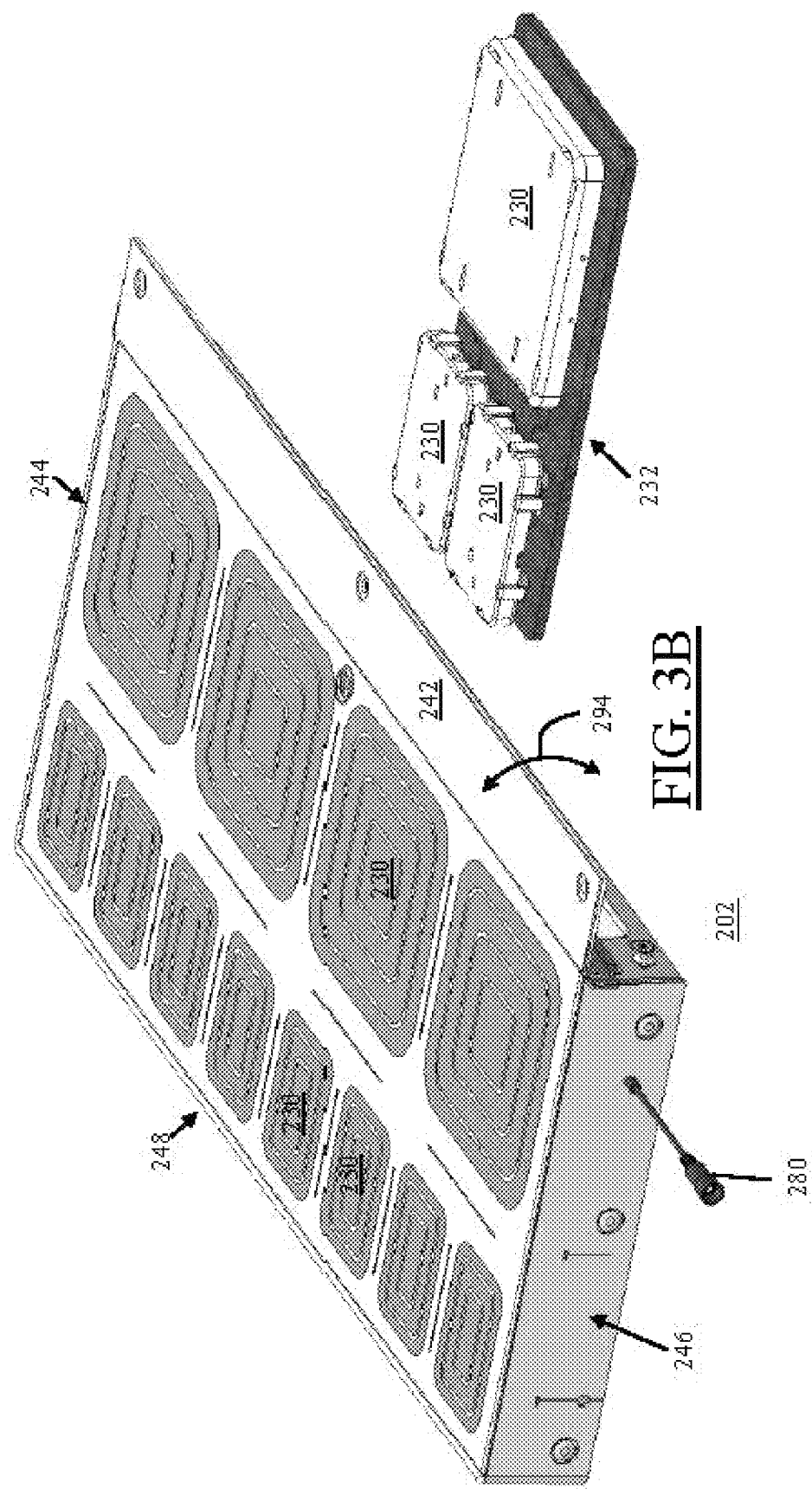
Figure 3C:
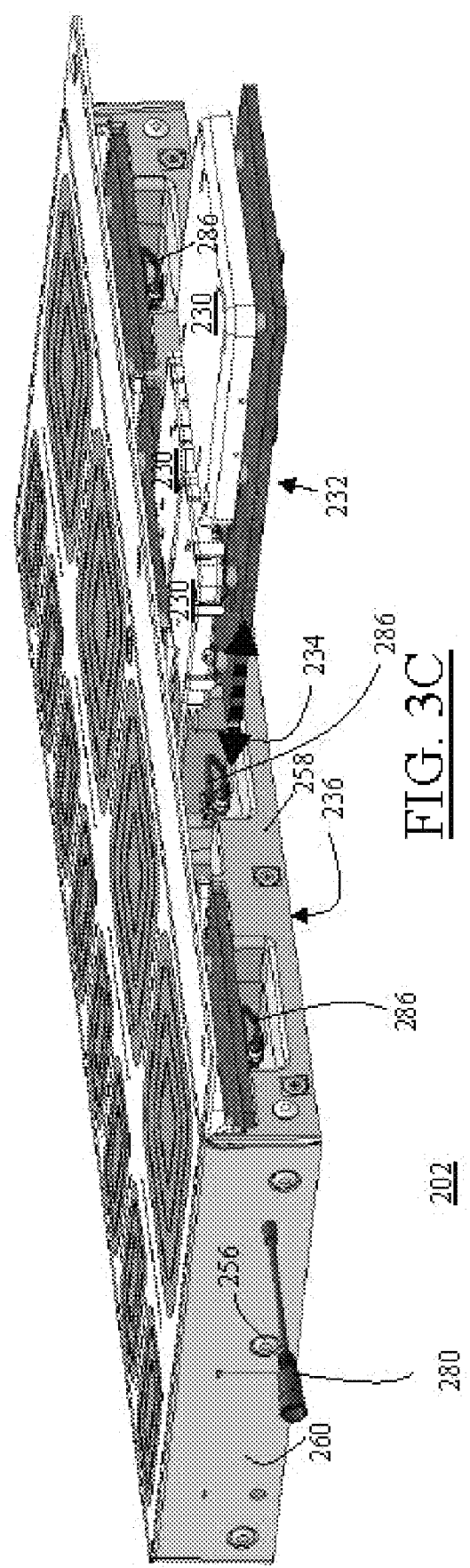

FIG. 3A to 3C is a non-limiting, exemplary enlarged illustrations of the various views of intelligent shelf 202 shown in FIG. 2, but with no inventory items 106 on top in accordance with one or more embodiments of the present invention. FIGS. 3B and 3C are non-limiting, exemplary illustrations of the same, but with one of the weight sensor module grouping 232 removed.

It should be noted that the overall configuration of the intelligent shelf 202 may be varied and need not be configured as a cuboid as shown. Further, the size of intelligent shelf 202 and the size and number of weight sensor modules 230 may be varied.

The size of intelligent shelf 202 is configured to best fit most average sized pantries or other existing storage solutions. In the non-limiting, exemplary instance, the intelligent shelf 202 includes four-(4) larger sized weight sensor modules 230 and eight-(8) smaller sized weight sensor modules 230.

The combinations and permutations of the size and number of weight sensor modules 230, weight sensor module groupings 232 (FIG. 3B), and the size and number of weight sensor modules 230 in a group 232 including their arrangements (e.g., their position housed within intelligent shelf 202 and their orientation in relation to one another) may be easily varied.

In this non-limiting, exemplary instance, weight sensor module grouping 232 (best shown in FIGS. 3B and 3C) includes two smaller sized weight sensor modules 230 and a single larger size weight sensor module 230.

The critical and advantageous reason for enabling weight sensor module grouping 232 to be removed is that it may be easily replaced in case of failure without having to replace the entire intelligent shelf 202 and as importantly, without having to remove all items 106. Only items 106 located on top of the failed weight sensor module grouping 232 that requires replacement may be removed. As best illustrated by arrow 234 shown in FIG. 3C, weight sensor module grouping 232 may easily slide in or out of a housing 236 (further detailed below) of intelligent shelf 202.

Figure 3D:
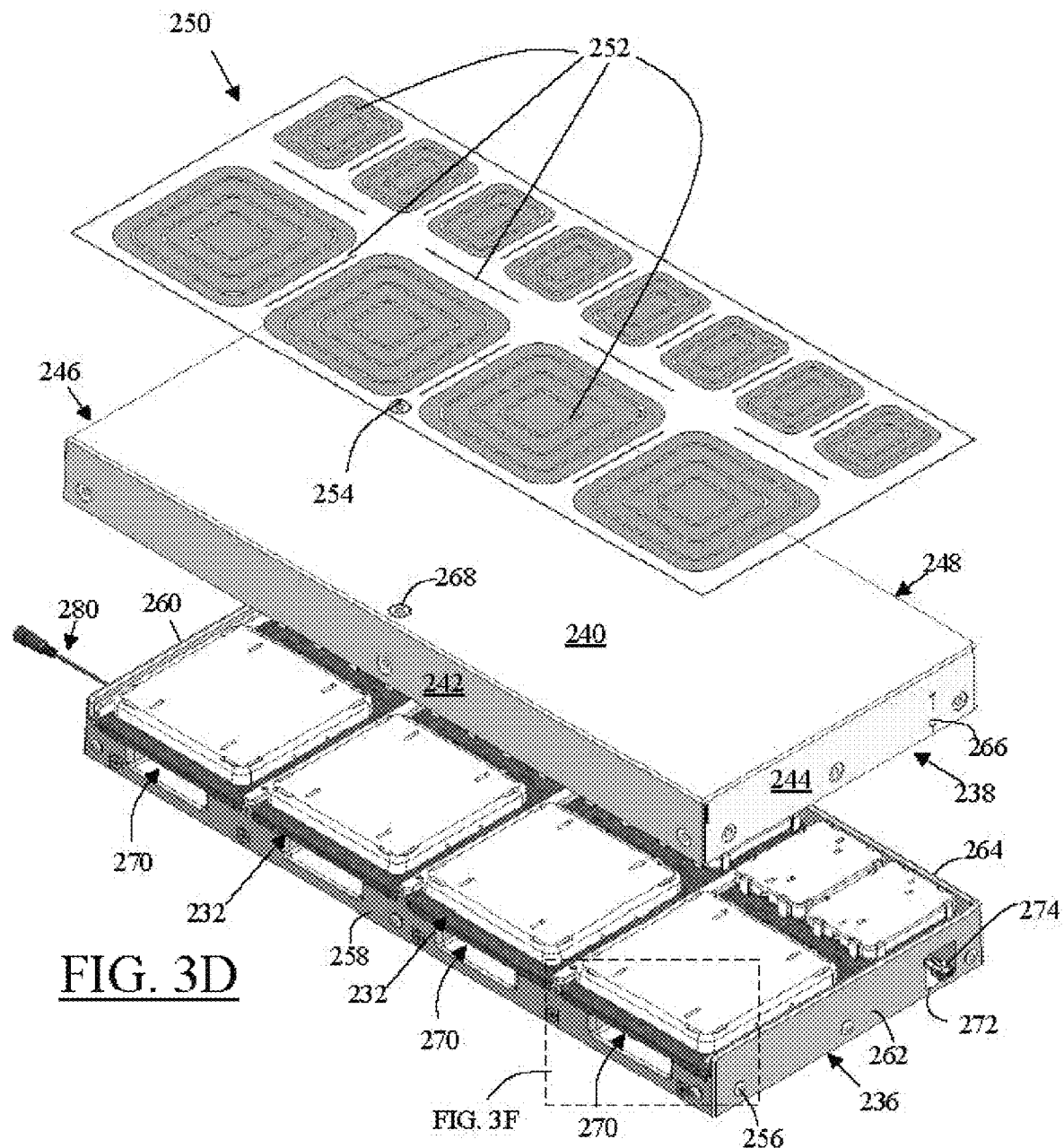
Figure 3E:
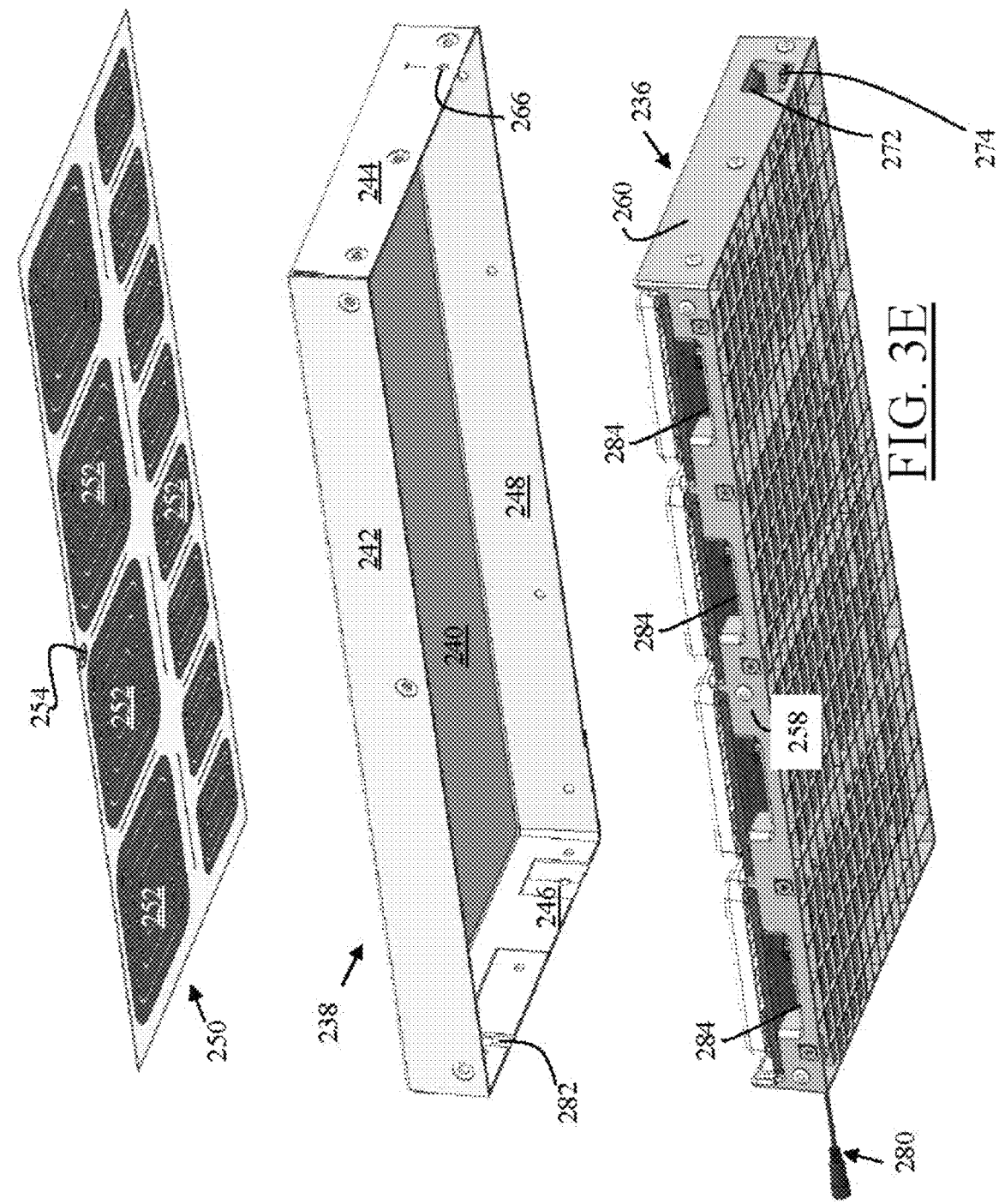
Figure 3F:
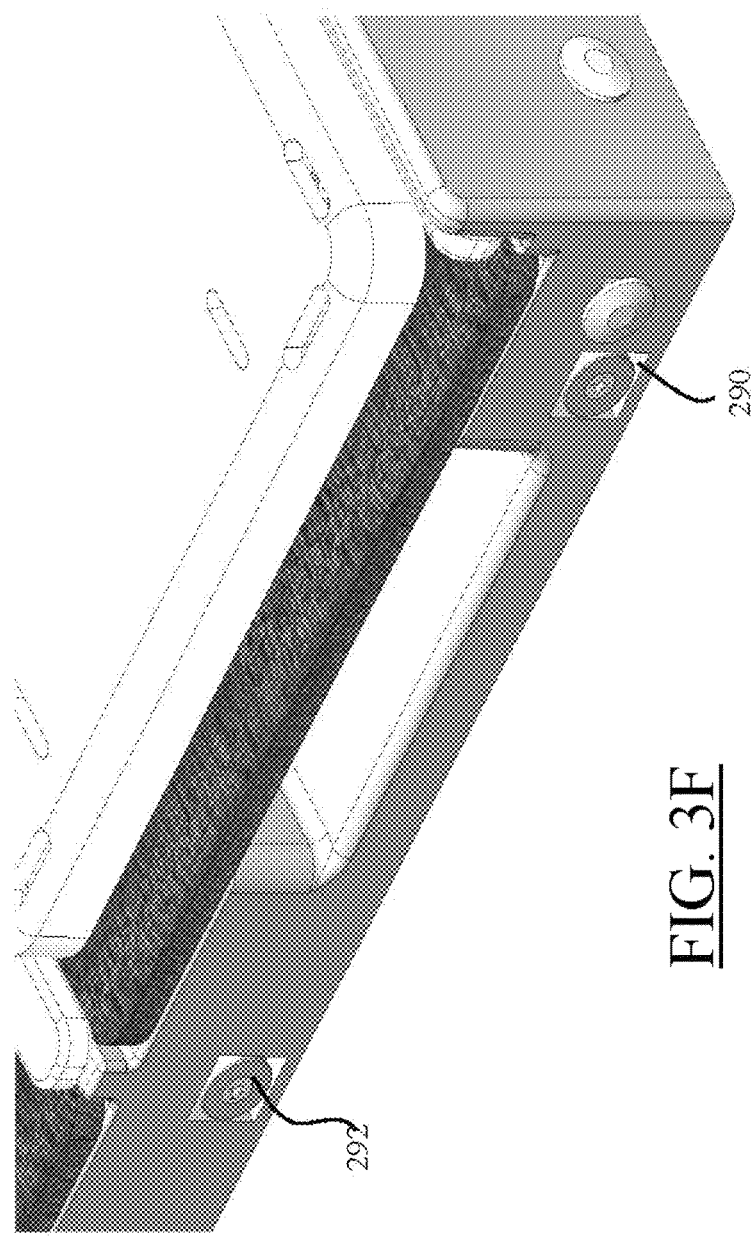

FIGS. 3D and 3E are non-limiting exemplary exploded view illustrations of the major components of the intelligent shelf shown in FIGS. 1A to 3C in accordance with one or more embodiments of the present invention. The exploded views shown in FIGS. 3D and 3E illustrate disassembled, separated components that show the cooperative working relationship, orientation, positioning, and exemplary manner of assembly of the various components of the intelligent shelf in accordance with one or more embodiments of the present invention, with each component detailed below.

As shown in FIGS. 3D and 3E, inventory monitoring system 204 includes intelligent shelf 202 having a housing 236, and at least a protective cover 238. Protective cover 238 is to prevent food or liquid from penetrating into housing 236.

Protective cover 238 may comprise of a combination of soft, flexible and or resilient top surface 240 in combination with soft or rigid sides 242, 244, 246, and 248. In this non-limiting, exemplary instance sides 242, 244, 246, and 248 are rigid. Since intelligent shelf 202 will be holding food, it must be washable to be cleansed, and hence, protective cover 238 is washable. Protective cover 238 may include markers (intuitive patterns) for placement and positioning of items.

In addition to protective cover 238, optionally, intelligent shelf 202 may further include an indexed (flexible) liner 250 placed on top 240 of protective cover 238, with indexed liner 250 having guide markers (intuitive printed patterns) 252 for facilitating proper placement and positioning of items 106 (best shown in FIG. 2).

In this non-limiting, exemplary instance, indexed liner 250 may further include an alignment marker 254 that when aligned with marker 268 on protective cover 238 enables proper placement and positioning of indexed liner 250 properly oriented on top 240 of protective cover 238. This way, guide marks 252 will be positioned directly on top of weight sensor modules 230. It should be noted that although protective cover 238 may be washed (sprayed and wiped), indexed liner 250 is made to be easily removable for washing purposes, such as under running water.

One or more lateral sides 244, 246, and 248 of protective cover 238 may mechanically be fixed (using fasteners such as rivets 256) with one or more periphery walls 260, 262, and 264 of housing 236, with front side 242 of protective cover 238 detachably coupled with a periphery wall 258 of housing 236 to thereby provide access to the one or more weight sensor modules grouping 232 to enable removal thereof.

Figure 4A:
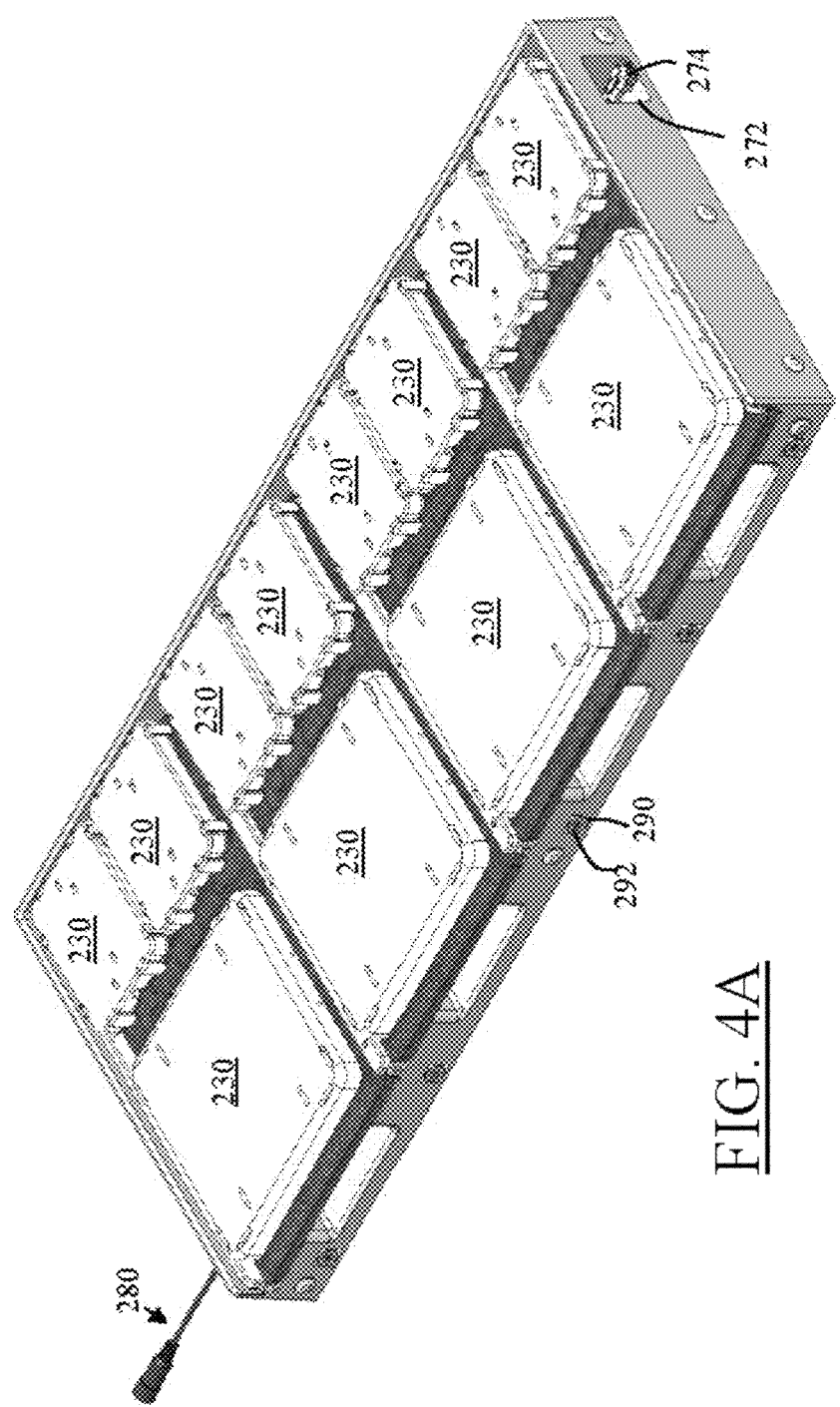
FIG. 4A to 4G are non-limiting, exemplary illustrations of a housing of the intelligent shelf shown in FIGS. 1A to 3F with protective cover completely remove, progressively illustrating a non-limiting, exemplary method of removing a weight sensor module grouping in accordance with one or more embodiments of the present invention.
Figure 4B:
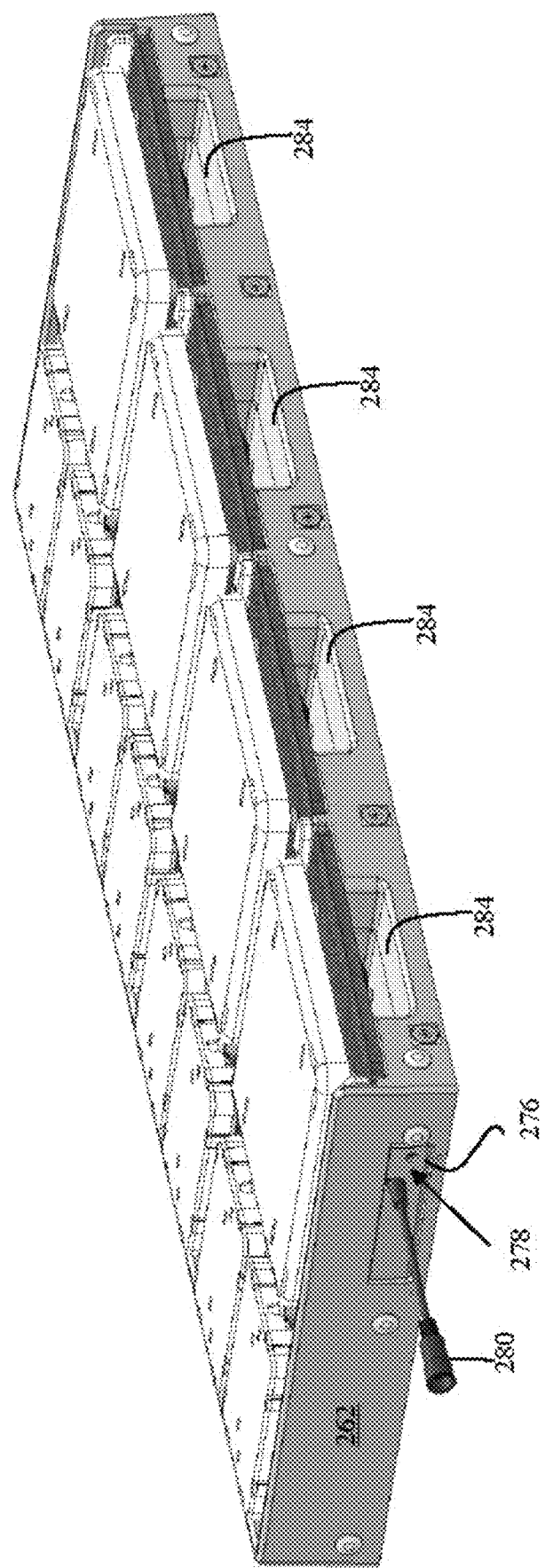
Figure 4C:
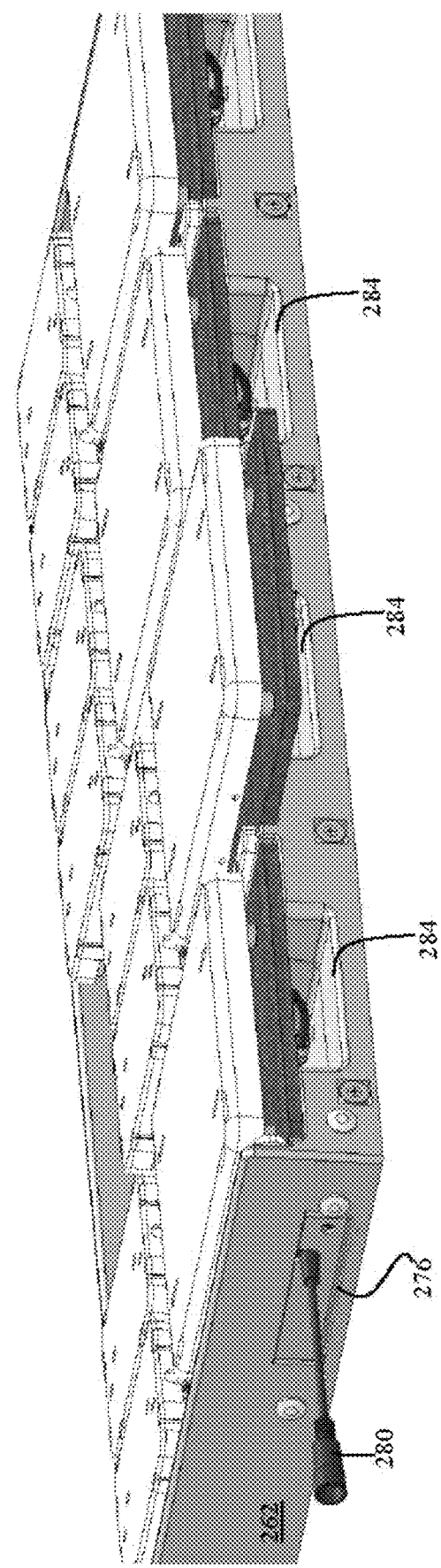

Lateral sides 244 and 246 of protective cover 238 may include respective extender opening 266 and plug opening 282 that are generally commensurate with first opening (or expansion port) 272 and second opening 276 (FIG. 4B) of housing 236 (further detailed below).

As further detailed below, housing 236 includes one or more compartments 270 that removably house a corresponding number of one or more weight sensor modules grouping 232.

Housing 236 includes a first lateral periphery wall 260, a second lateral periphery wall 262, a rear periphery wall 264, and a front periphery wall 258. The first lateral periphery wall 260 includes first opening or expansion port 272 for accessing an extension connector 274 (further detailed below). An extender opening 266 of lateral side 244 of protective cover 238 aligns with first opening or expansion port 272 of housing 236 to enable full access to extension connector 274.

Second lateral periphery wall 262 of housing 236, positioned generally opposite first lateral periphery wall 260 of housing 236, includes a second opening 276 (FIG. 4B) for removably housing a hub housing 278 (which houses power and data communications hub 112).

A power cord 280 extending from the hub housing 278 that may be connected to a power adapter for plugging in the intelligent shelf 202 to an AC outlet socket (shown in FIG. 2). A plug opening 282 (FIG. 3E) of lateral side 246 of protective cover 238 enables power cord 280 to extend out of protective cover 238.

Front periphery wall 258 of housing 236 further includes one or more third openings 290 (FIG. 3F) that house a magnet 292 that is aligned with corresponding number of magnets (not shown) within front side 242 of protective cover 238. Use of magnets are non-limiting, exemplary means of detachably securing front side 242 to front periphery wall 258. Front side 242 protective cover 238 is detachably coupled with the front periphery wall 258 of housing 236 using magnets to thereby provide access to the one or more weight sensor module groupings 232 to enable removal thereof. That is, front side 242 may be moved in the direction shown by arrow 294 (FIG. 3B) from a closed position (FIG. 3A) to an open position (FIGS. 3B and 3C). This feature enables the replacement of a weight sensor module grouping 232 without having to completely rip-off protective cover 238.

Front periphery wall 258 of housing 236 includes one or more fourth openings 284 that function as cable-reliefs for allowing passage of cables and connectors when weight sensor module grouping 232 is removed (detailed further below).

FIG. 4A to 4G are non-limiting, exemplary illustrations of a housing of the intelligent shelf shown in FIGS. 1A to 3F with protective cover completely remove, progressively illustrating a non-limiting, exemplary method of removing a weight sensor module grouping 232 in accordance with one or more embodiments of the present invention. It should be noted that protective cover 238 is removed for simplicity and discussion purposes.

Figure 4D:
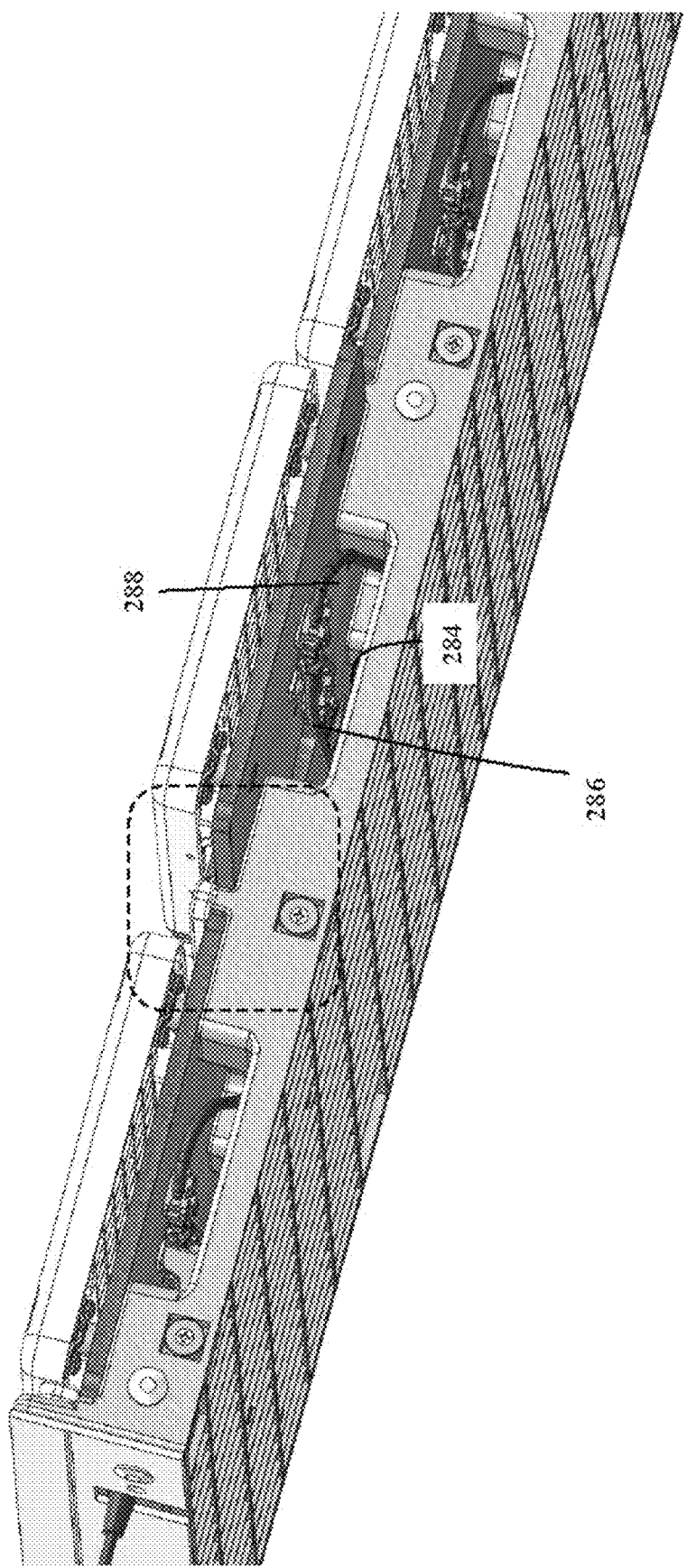
Figure 4E:
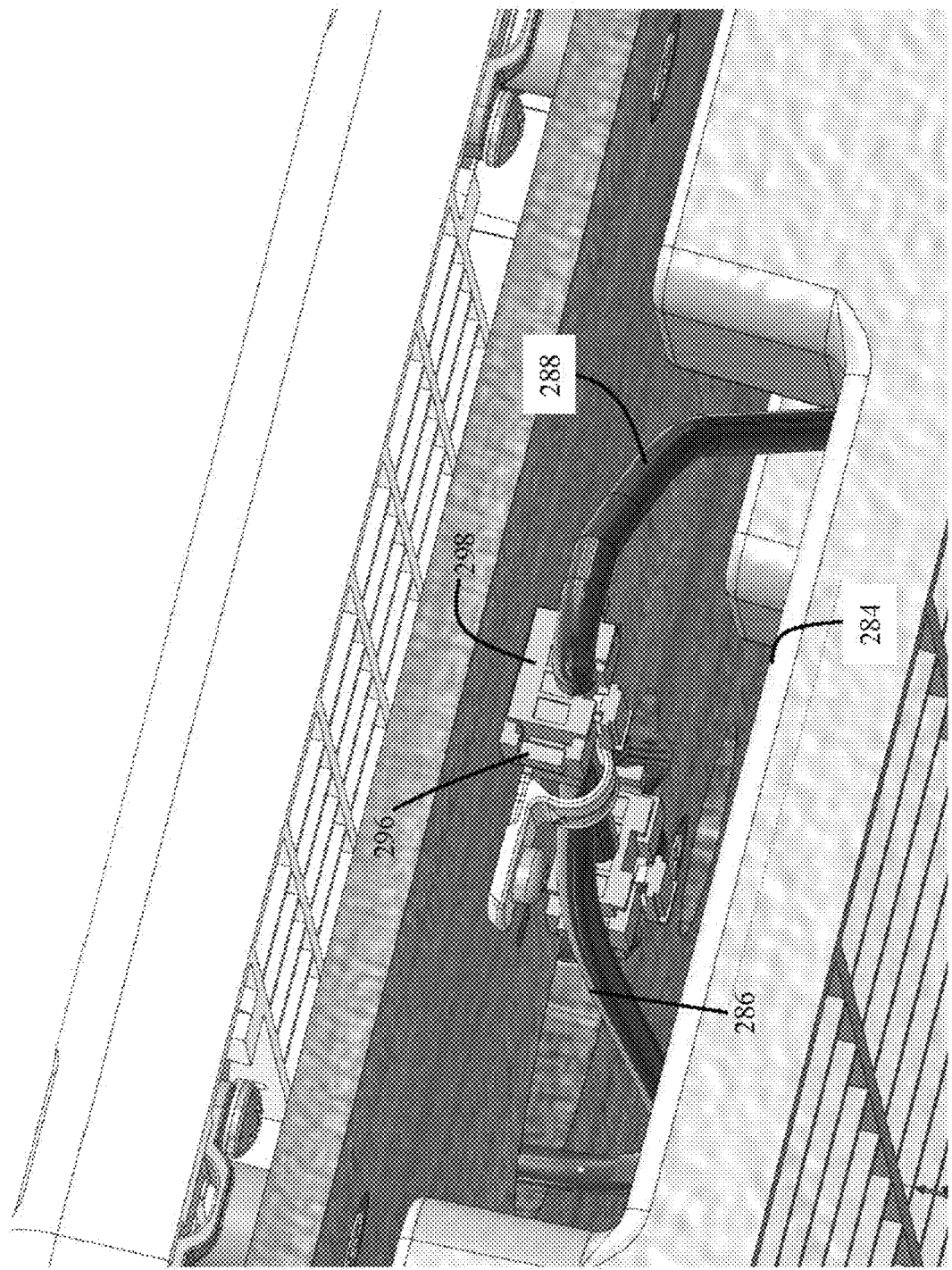
Figure 4F:
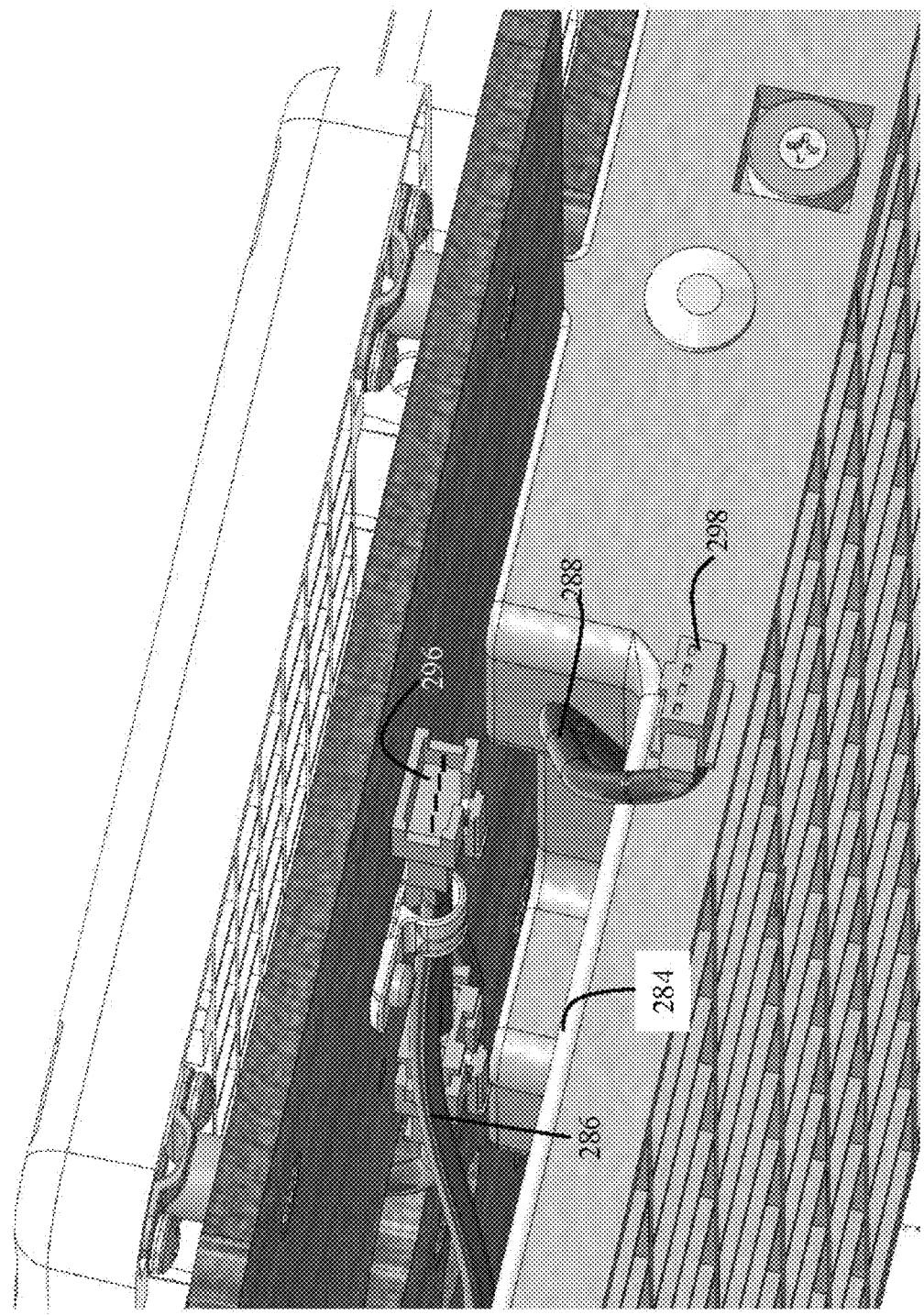
Figure 4G:
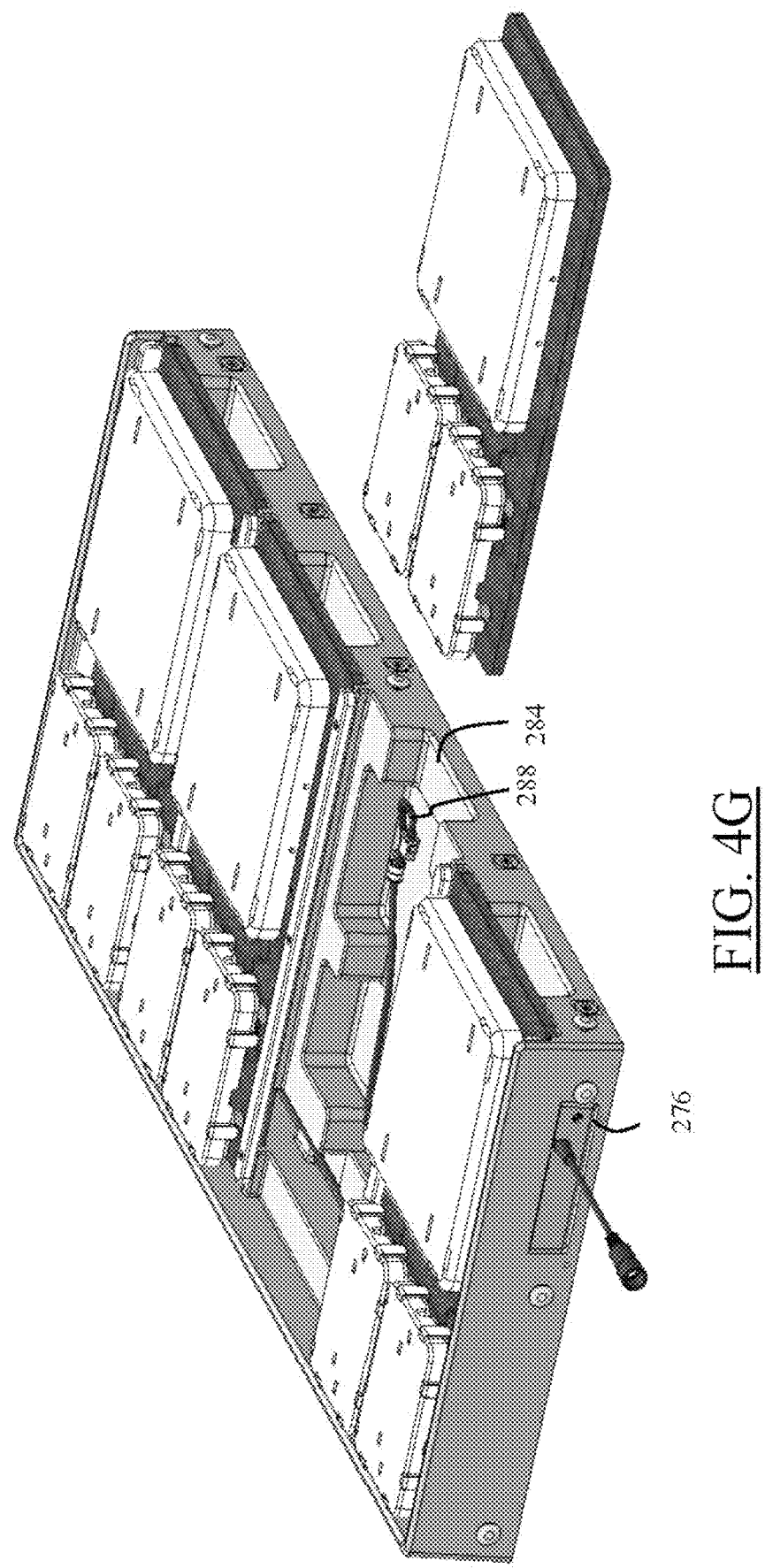

As best shown in FIGS. 4D, 4E, and 4F, weight sensor module grouping cable 286 is connected to a hub harness 288, and hence, when weight sensor module grouping 232 is pulled out of its compartment, weight sensor module grouping cable 286 is moved with it, passing fourth opening 284 (e.g., cable relief) to allow users access or clearance to disconnect the weight sensor module grouping cable connector 296 (best shown in FIG. 4F) from the hub harness connector 298.

The weight sensor module grouping 232 being removed must be pulled a sufficient distance to enable weight sensor module grouping connectors 296 and hub harness connector 298 to be accessible by a user via fourth openings 284 to be disconnected and completely removed.

FIGS. 5A to 5E are non-limiting, exemplary illustrations of the various views of the housing shown in FIGS. 1A to 4G with weight sensor module groupings completely remove (with the exception of FIG. 5E) for simplicity and discussion purposes in accordance with one or more embodiments of the present invention. As illustrated in FIGS. 1A to 5E, housing 236 includes one or more open compartments 270 with passageways 306.

Compartments 270 are defined by dividers 300 that extend longitudinally parallel a transverse axis 302 of housing 236. Dividers 300 include vertically extending projections 318. Housing 236 further includes a member 304 securely positioned on a top surface 306 of projections 318 of dividers 300. It should be noted that as illustrated projections 318 are not continuous and hence, there is a smaller, backend projection 308, with its top surface 310 upon which rear distal end 312 of member 304 is secured. Member 304 has width 314 (FIGS. 5C and 5D) that is wider than widths 316 of projections 318 and 308.

Figure 5A:
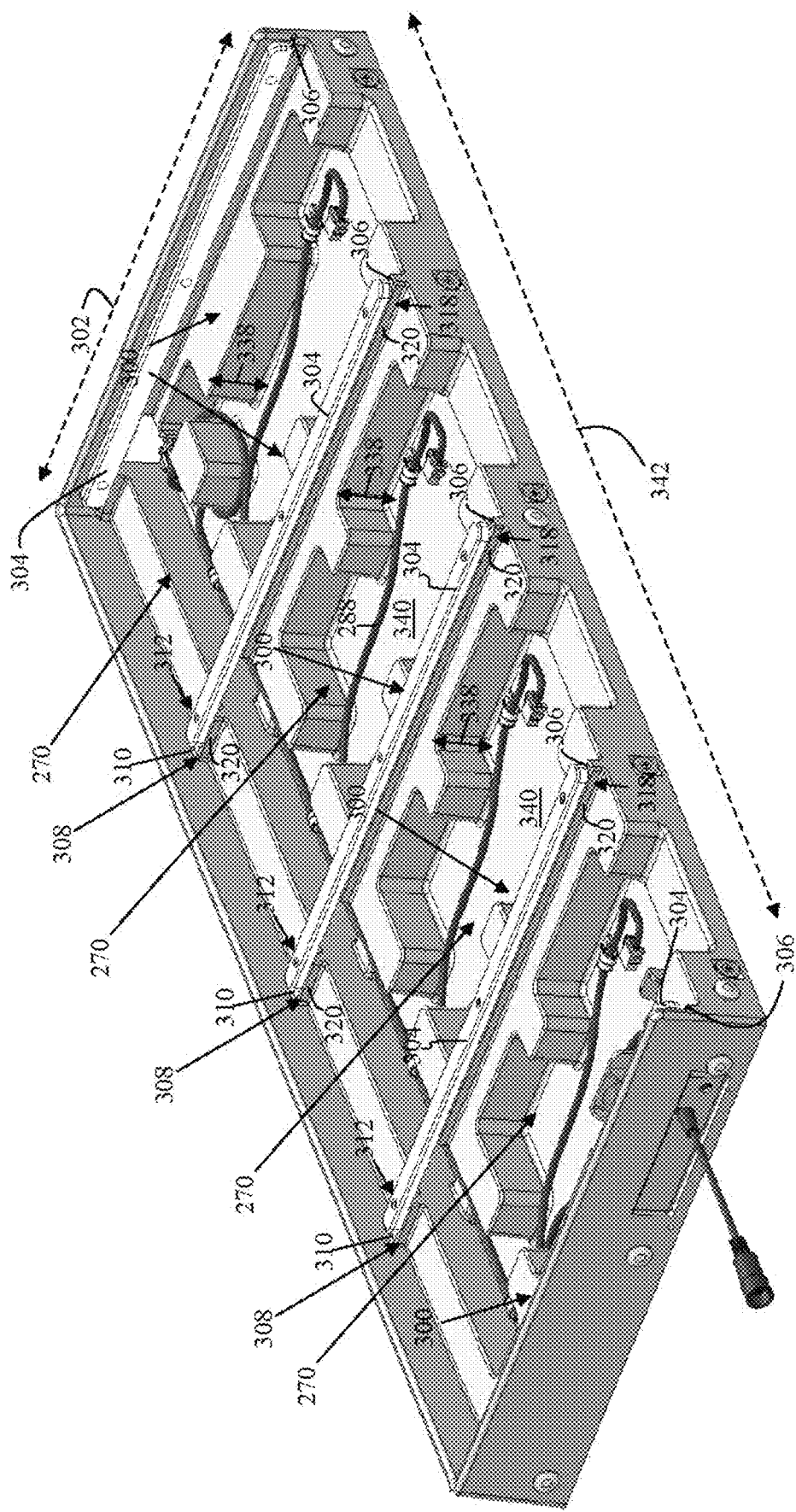
Figure 5B:
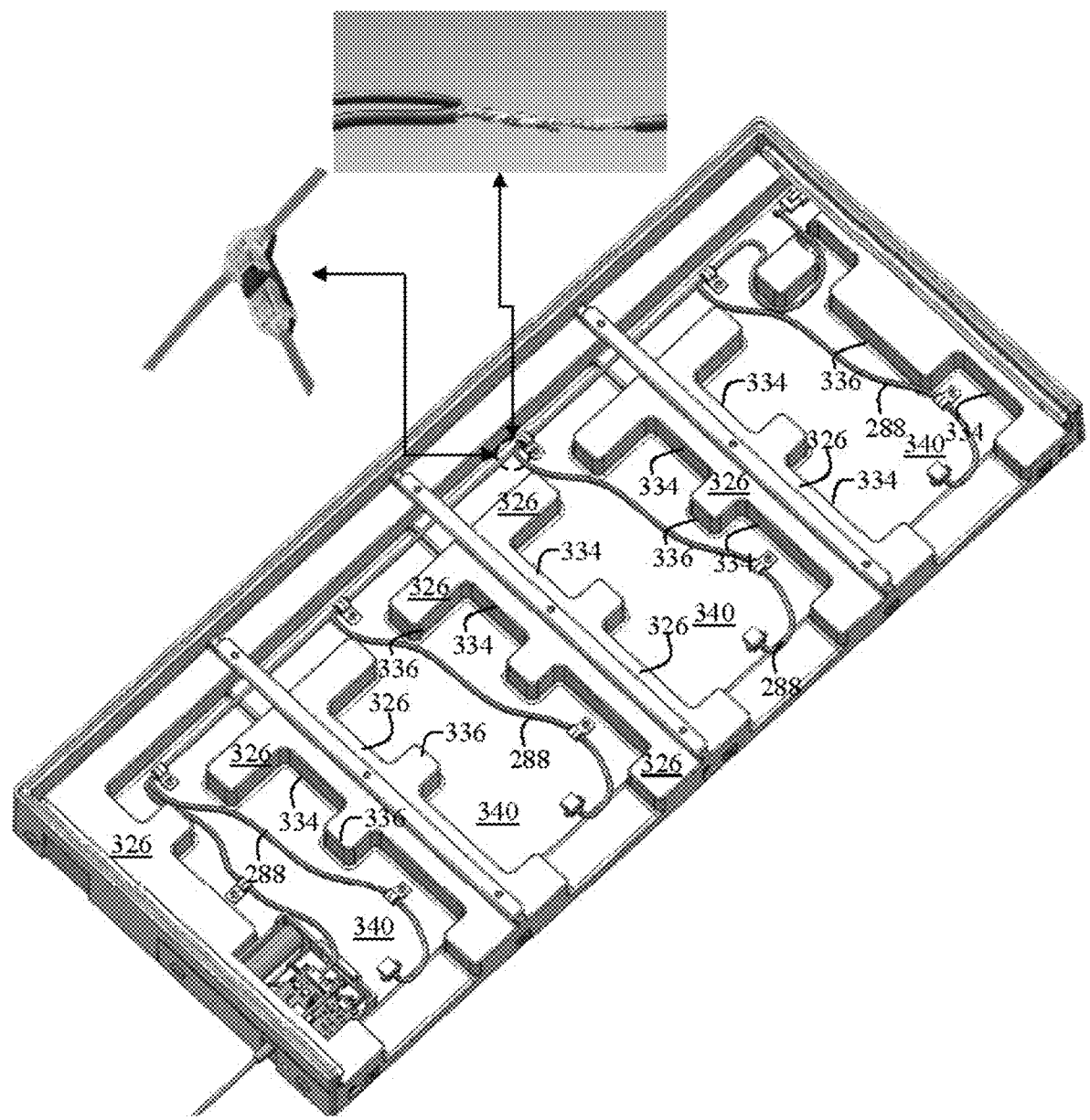
Figure 5C:
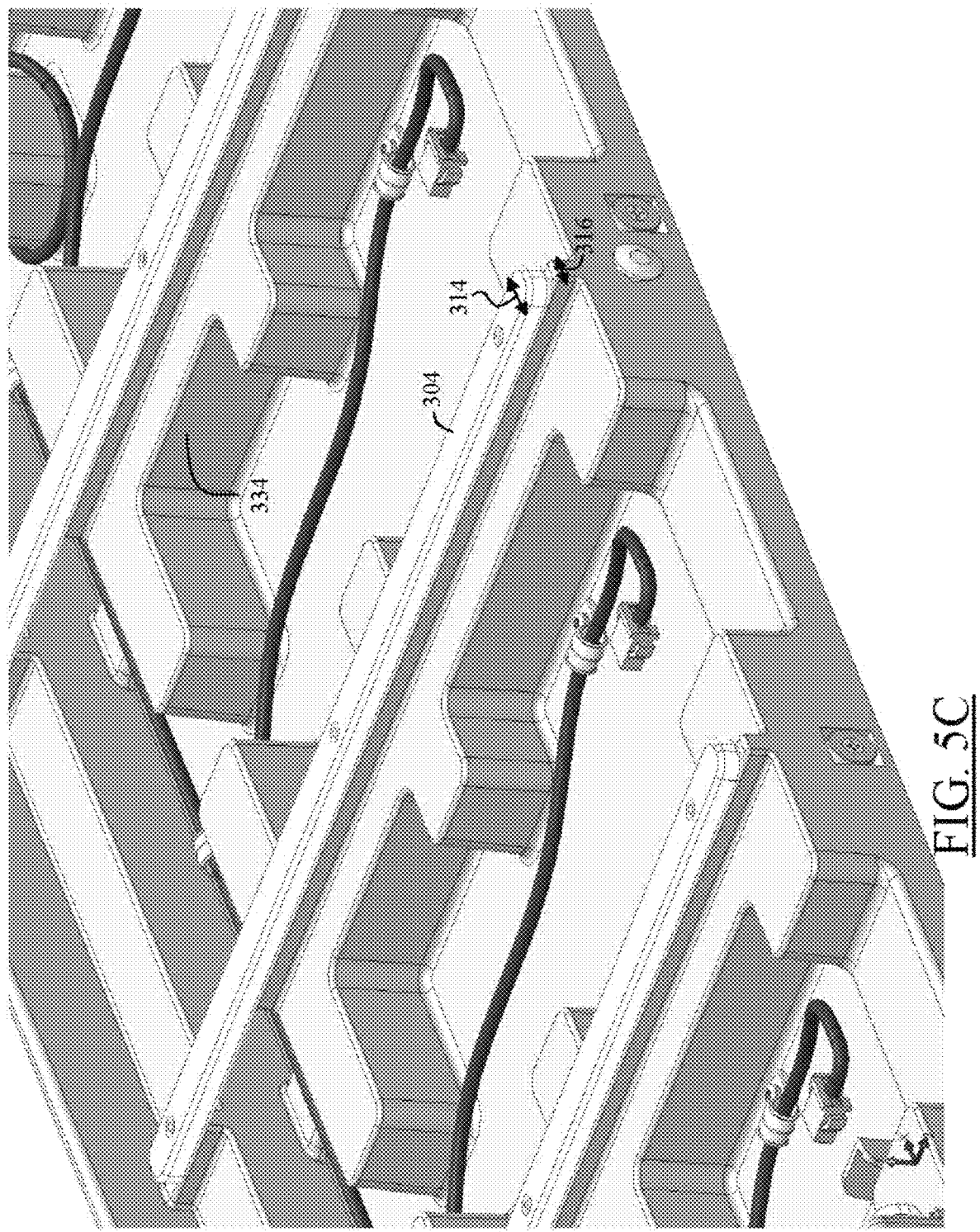
Figure 5E:
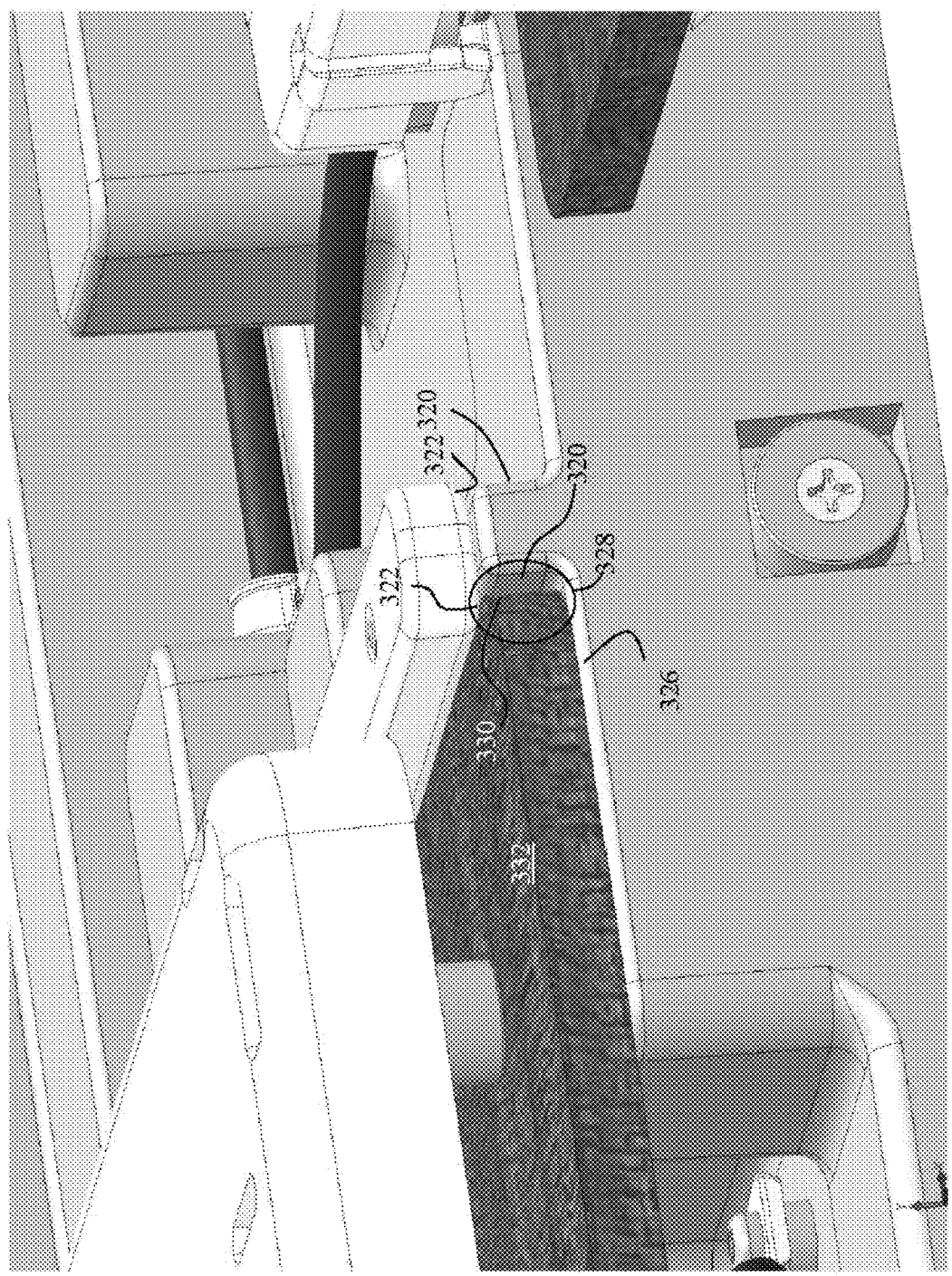

As best illustrated in FIG. 5E (with one of the weight sensor module groups 232 not removed), lateral Sides 320 of projections 318 and 308, extended (or free) underside 322 of member 306 that extends passed the projections 318 and 308, and support surfaces 326 form an elongated slot 328 that define a groove or channel that extends parallel transverse axis 302 of housing 236. Lateral periphery edges 330 of a support-base 332 of the weight sensor module grouping 232 form a ridge that is inserted into and slides along slot 328 to thereby enable the weight sensor module grouping to slide into and out of housing 236.

As further shown, dividers 300 within compartments 270 have recessed portions 334 and non-recessed portions 336 that extended into compartment 270. The recesses 334 allow room (function as reliefs) for movement of hub harness 288 as a weight sensor module grouping 232 is removed or replaced.

The non-recessed portions (projected parts) 236 of dividers 300 provide additional support surface 326 for support-base 332 of weight sensor module grouping 232. In other words, all support-surface surfaces 326 provide stable support for support-base 332 of weight sensor module grouping 232 resting thereon.

Support base 332 of weight sensor module grouping 332 rests on support surfaces 326 at an offset height 338 above a base 340 of compartment 270. Height 338 has a sufficient span to accommodate all hub harnesses 288, weight sensor harnesses 286, and connectors 296 and 298.

Divider 300 extends partially along transverse axis 302 of housing 236, allowing for a passageway (or wire harness runway) 306 (best shown in FIG. 5D) at rear end of housing 236 for extending (or running) hub harness 288 from a compartment to a next compartment.

Support surface 326 at rear section of housing 236 extends longitudinally along a longitudinal axis 342 of housing 236, functioning as a rear support surface for the rear portion of support-base 332 of weight sensor module grouping 232.

As further shown in FIGS. 5A to 5E, hub harness 288 is loosely tied down to base 340 of compartment 270 to allow movement of hub harness 288 when replacing weight sensor module grouping 232, but without interfering with the movement of the weight sensor module grouping 232.

The wires may be spliced (FIG. 5B) to form a daisy chain harness for the RS 485 connectors. Hub harness 288 may comprise of well-known multi drop serial communication harnesses, which may be implemented using a well-known, reliable terminated, multi drop, daisy chain bus. In other words, hub harness is designed as a reliable "terminated, multi drop, daisy chain bus," a well-known method of designing multi drop serial communication harnesses. However, the drawings show a simplified schematic harness for simplicity.

Figure 6A:
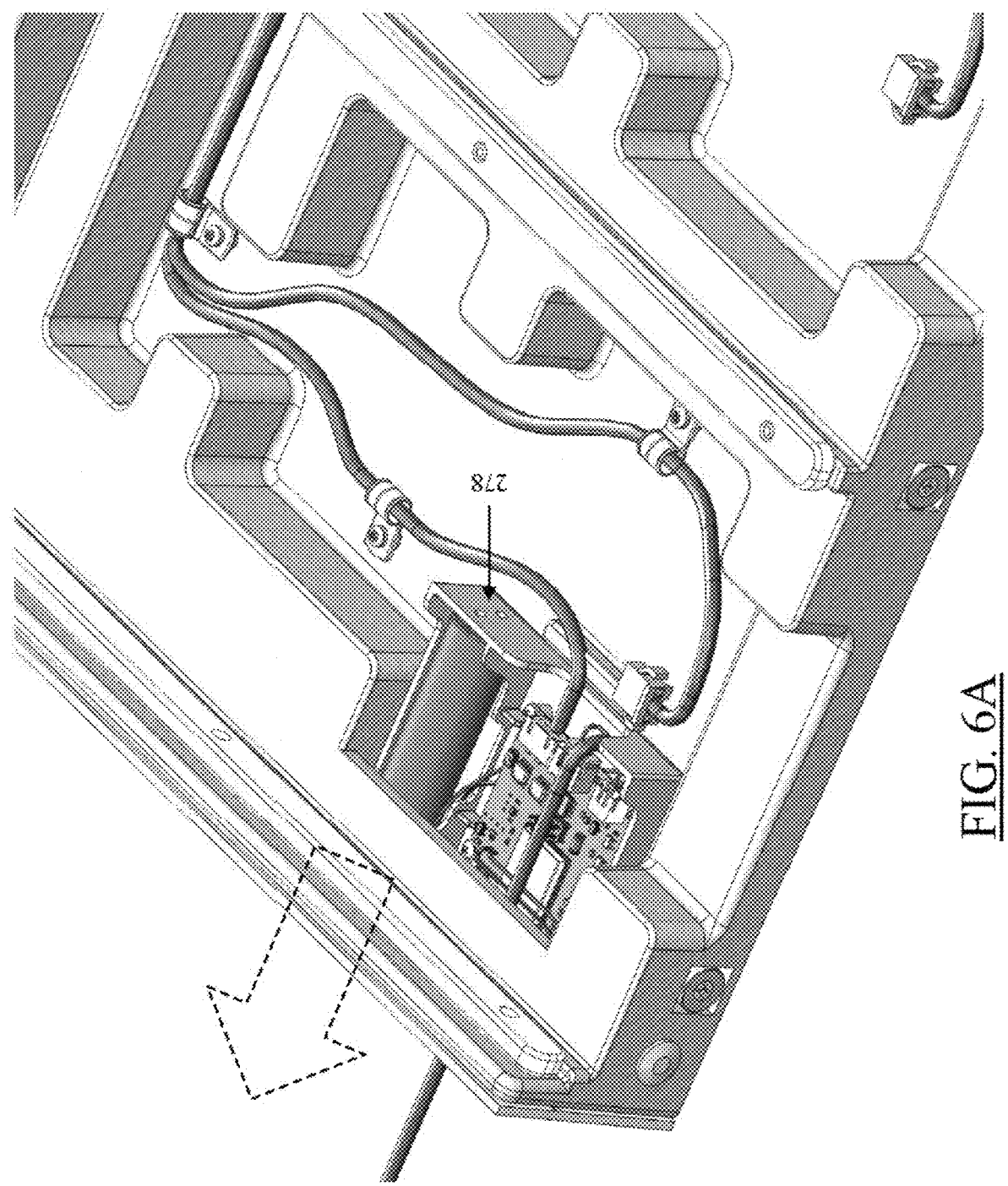
FIGS. 6A to 6D are non-limiting, exemplary illustrations of hub housing of the intelligent shelf shown in FIGS. 1A to 5E, progressively illustrating a non-limiting, exemplary method of removal and disconnection thereof from the housing of intelligent shelf in accordance with one or more embodiments of the present invention.
Figure 6B:
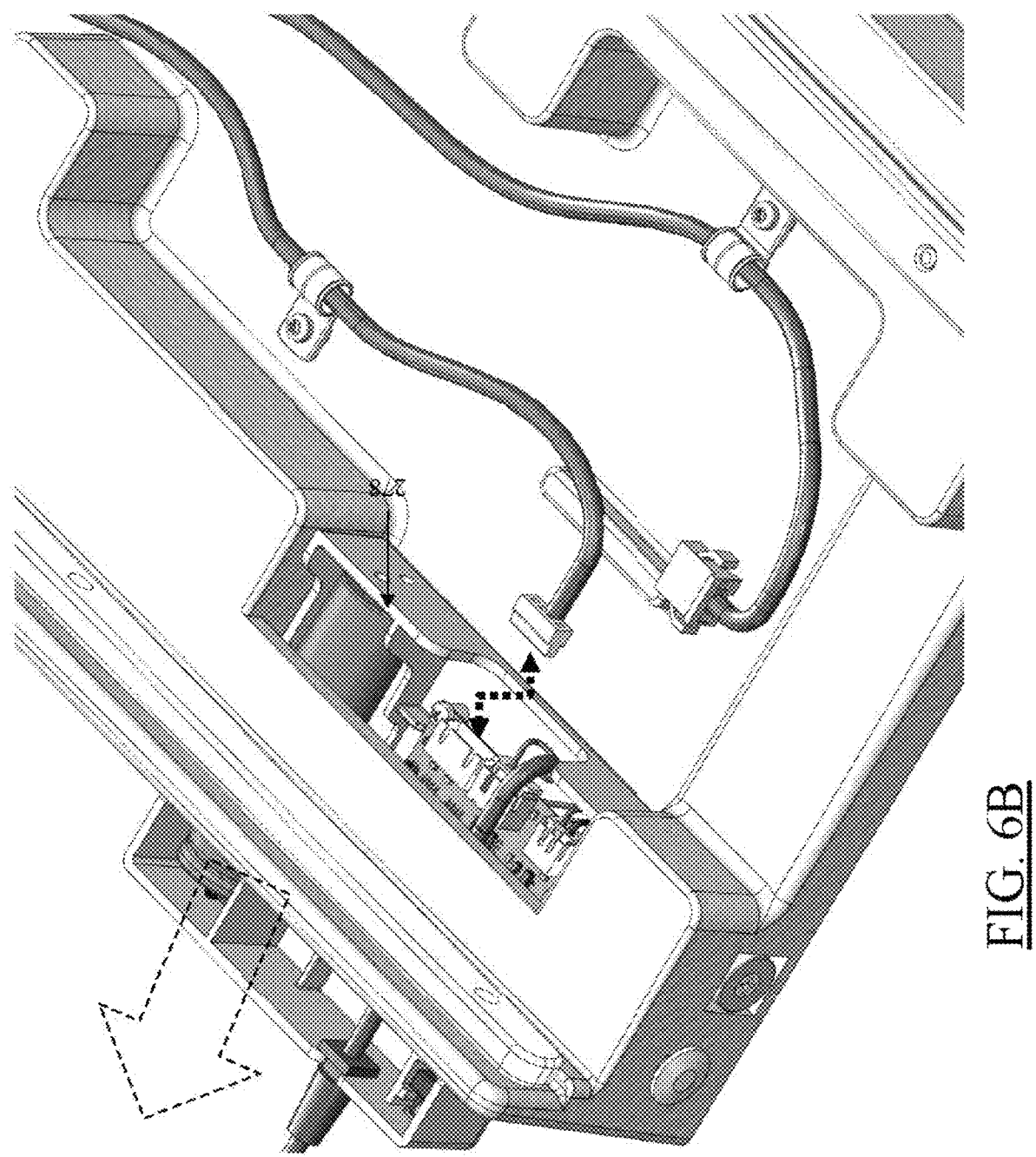
Figure 6C:
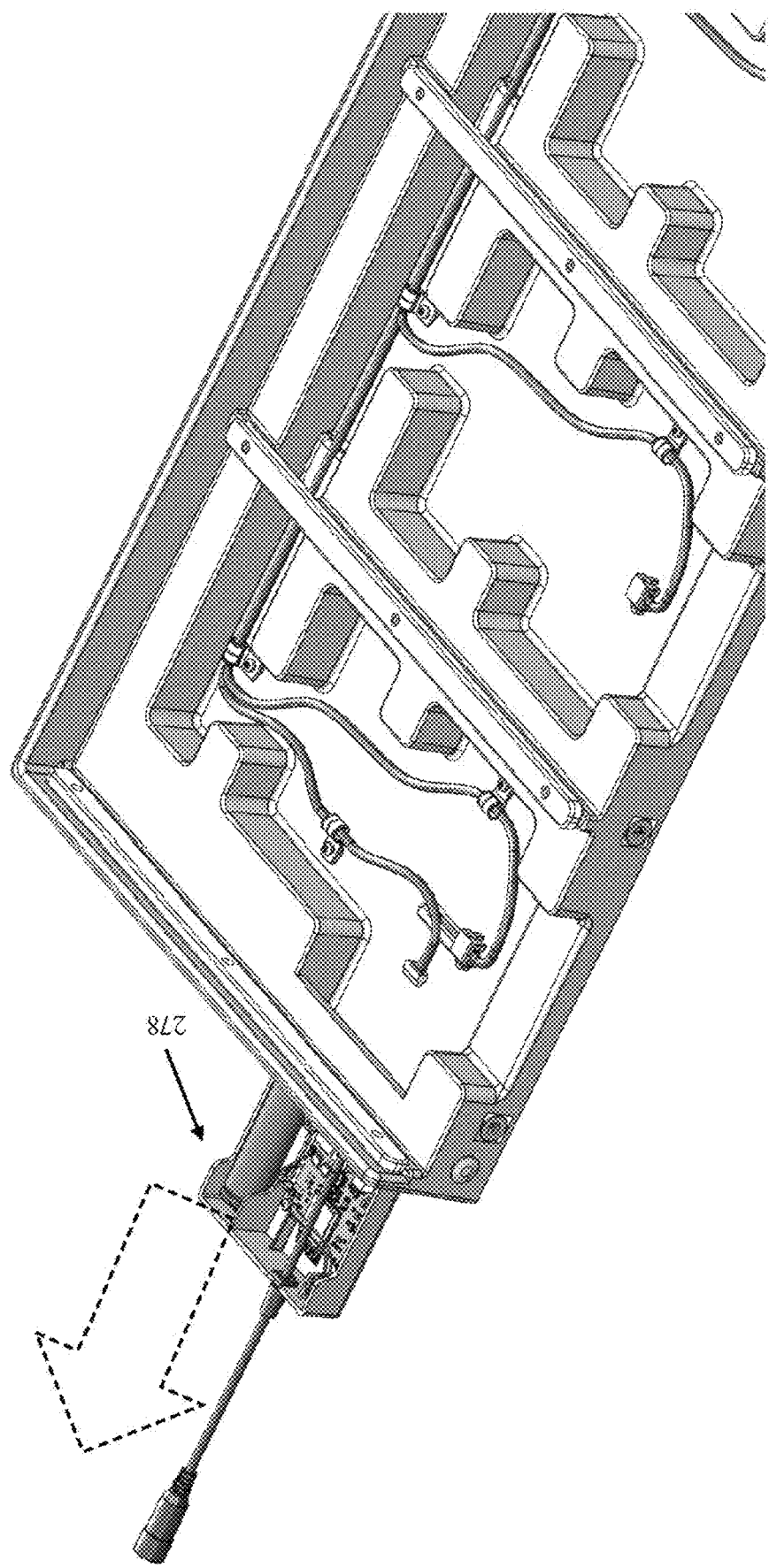
Figure 6D:
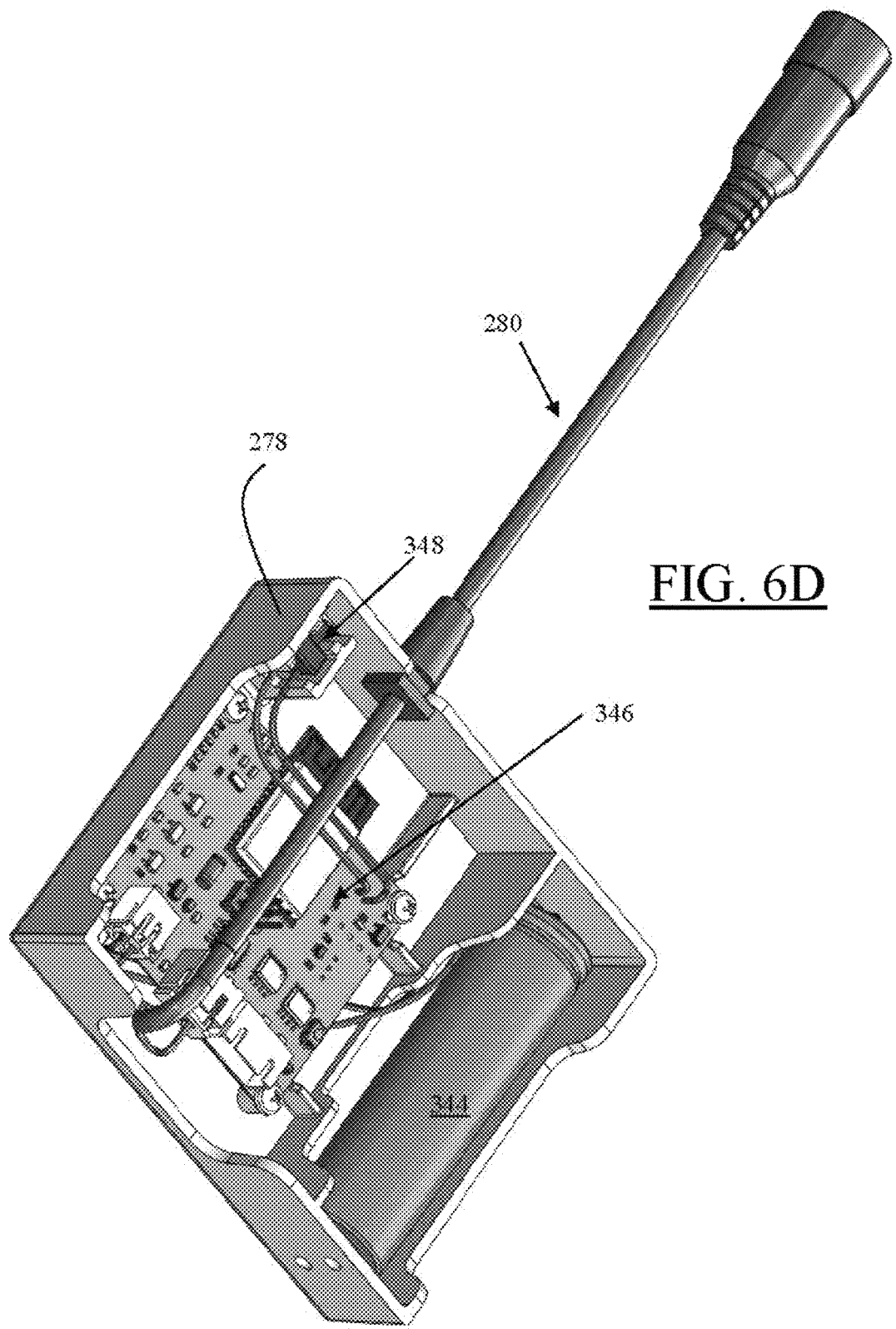

FIGS. 6A to 6D are non-limiting, exemplary illustrations of hub housing of the intelligent shelf shown in FIGS. 1A to 5E, progressively illustrating a non-limiting, exemplary method of removal and disconnection thereof from the housing of intelligent shelf in accordance with one or more embodiments of the present invention. FIGS. 6D and 6E are non-limiting, exemplary illustrations of the hub housing of the intelligent shelf shown in FIGS. 1A to 6C, fully removed and detached from the housing of the intelligent shelf in accordance with one or more embodiments of the present invention.

As progressively illustrated (in FIGS. 6A to 6C), hub housing 278 may be removed (slide out) from housing 236 via second opening 276 of housing 236. Power and data communications hub 112 therefore is comprised of electronics module that is housed in a removable hub housing 278 that functions as a drawer in relation to housing 236 of intelligent shelf 202. The removable hub housing 278 makes it easier to replace the power and data communications hub 112 in case of failure thereof without having to replace the entire housing 236 of the intelligent shelf 202 (as the weight sensor modules 230 are already replaceable).

As best shown in FIG. 6D, hub housing 278 includes individual compartments for securing the electronics of power and data communications hub 112 such as an auxiliary power source (e.g., a battery) 344, electronics 346, reset/program switch 348, etc. Details of power and data communications hub 112 is provided below in relation to electronic circuit discussions.

FIGS. 7A to 7G are non-limiting, exemplary illustrations of weight sensor module grouping, weight sensor modules, and weight sensors in accordance with one or more embodiments of the present invention. As indicated above, the one or more weight sensor modules 230 detect presence or absence of an item on intelligent shelf 202 based on a detected threshold weight 464 (FIG. 11G-2).

Figure 7A:
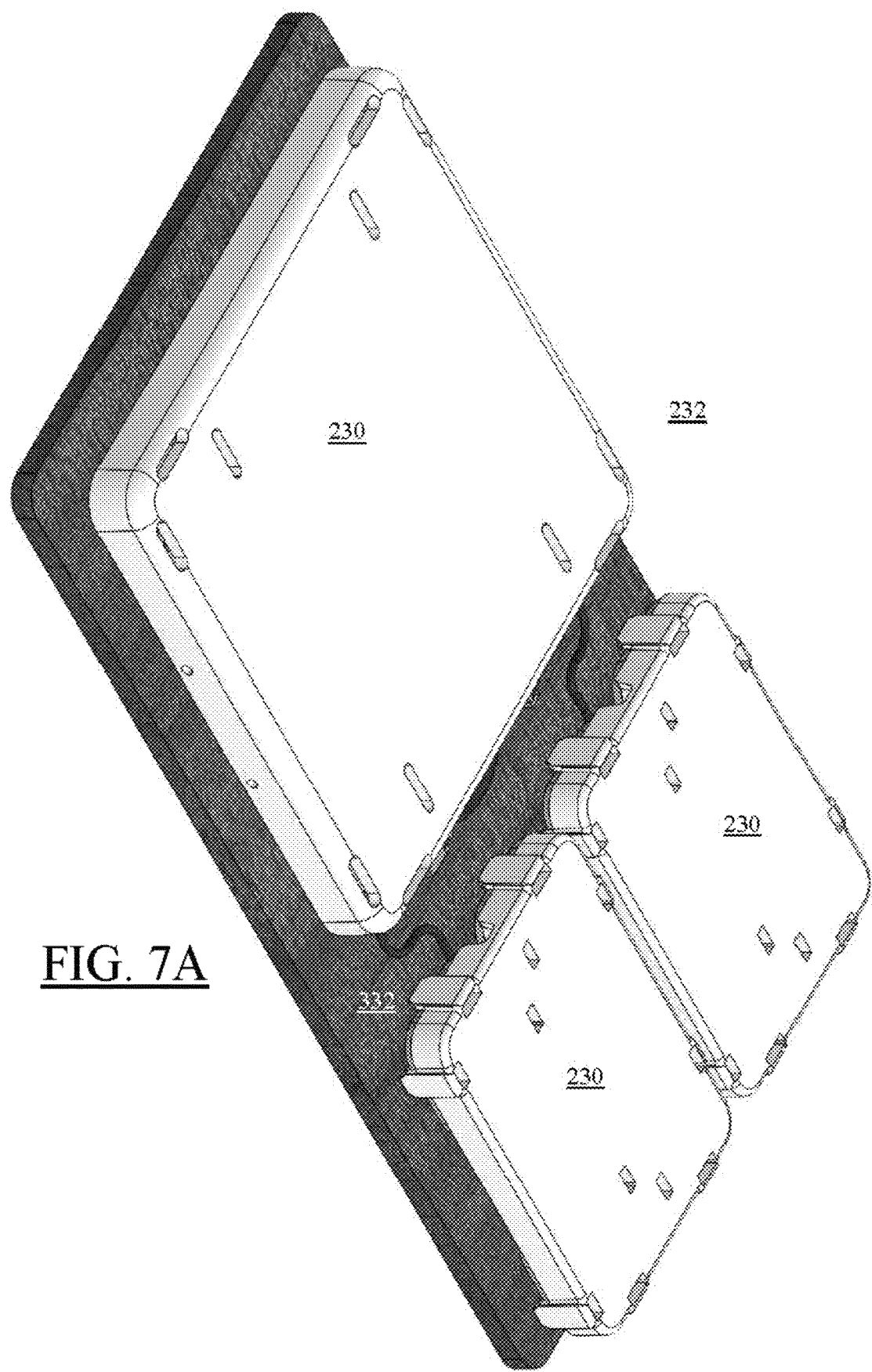
FIGS. 7A to 7G are non-limiting, exemplary illustrations of weight sensor module grouping, weight sensor modules, and weight sensors in accordance with one or more embodiments of the present invention.
Figure 7B:
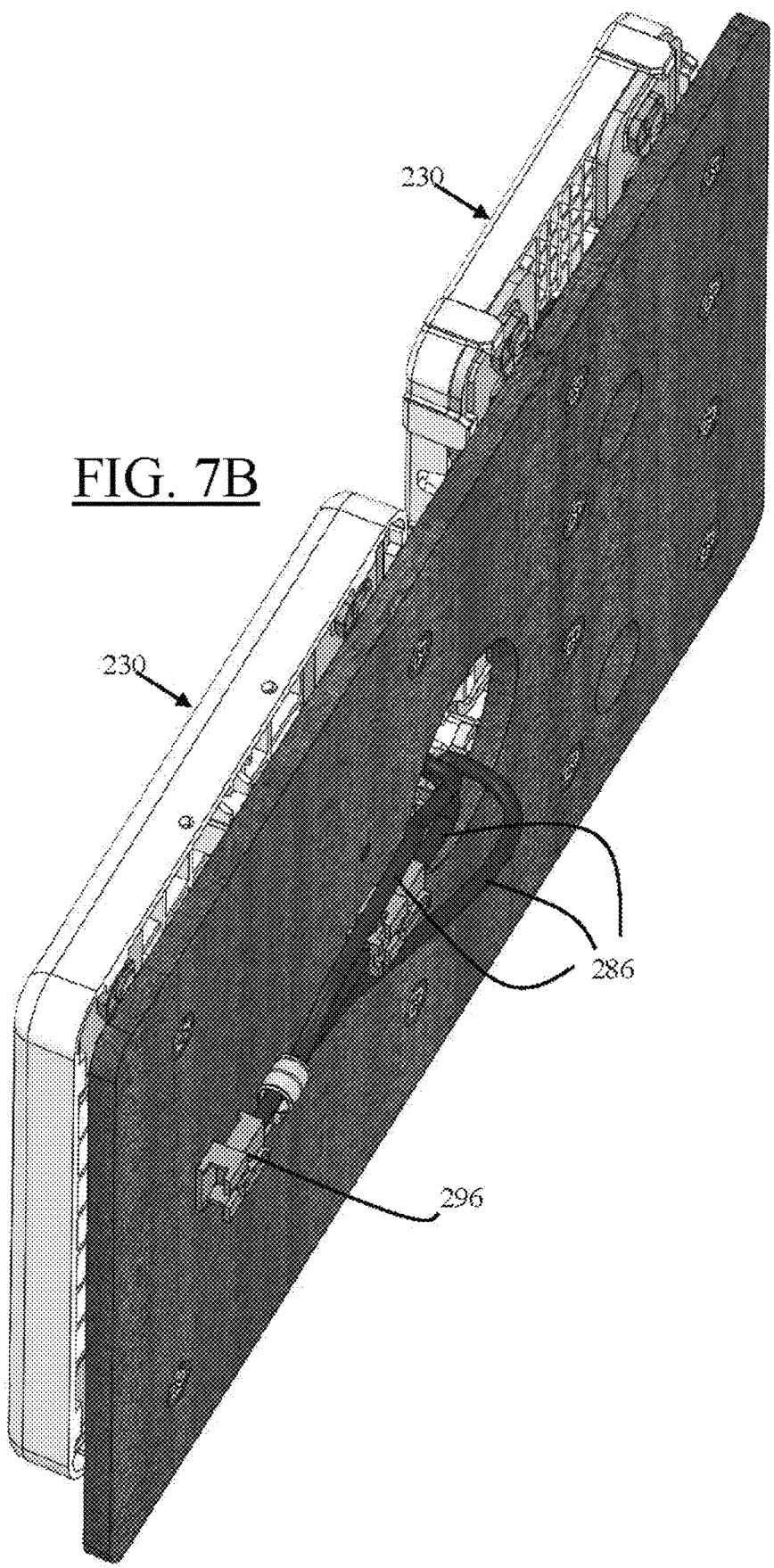
Figure 7C:
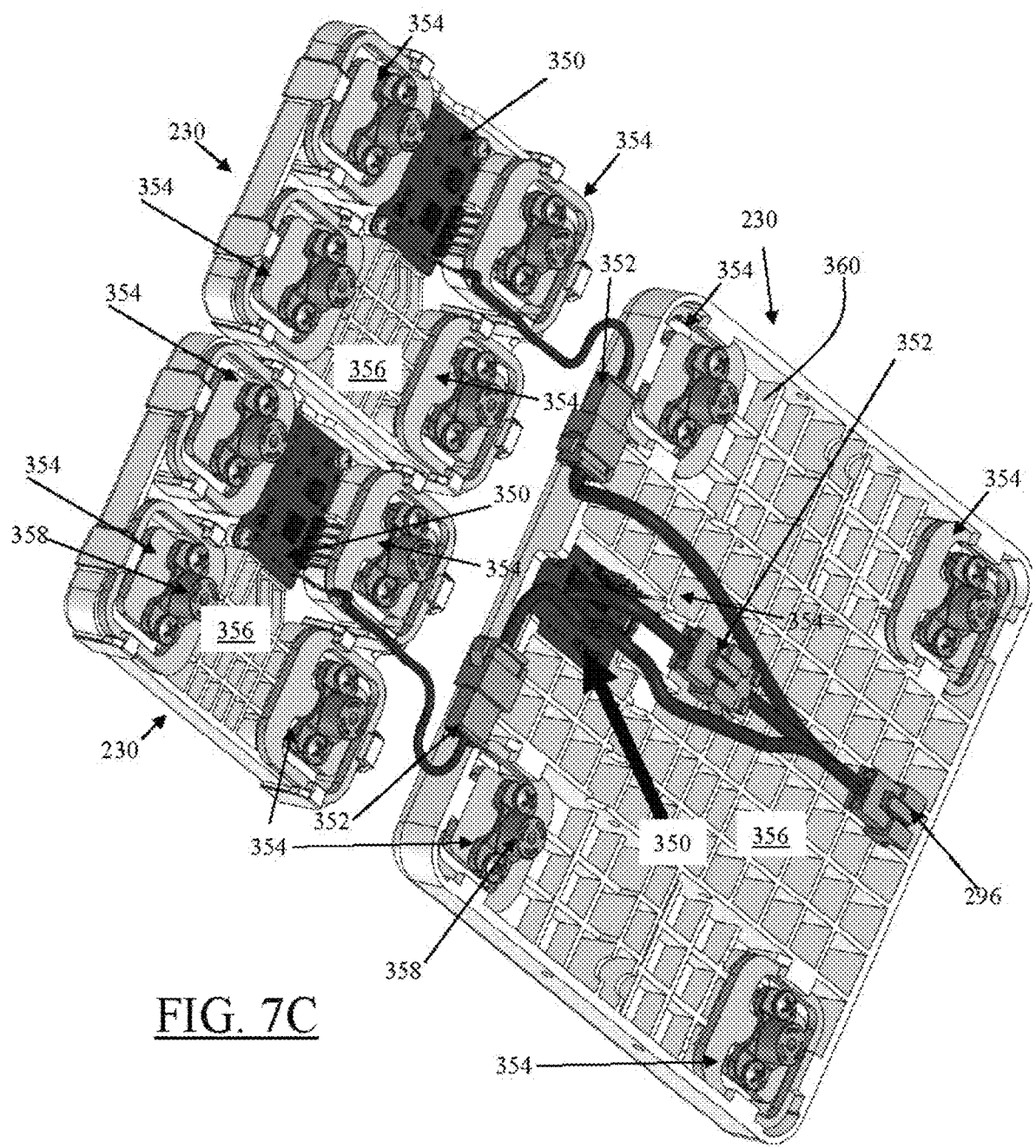
Figure 7D:
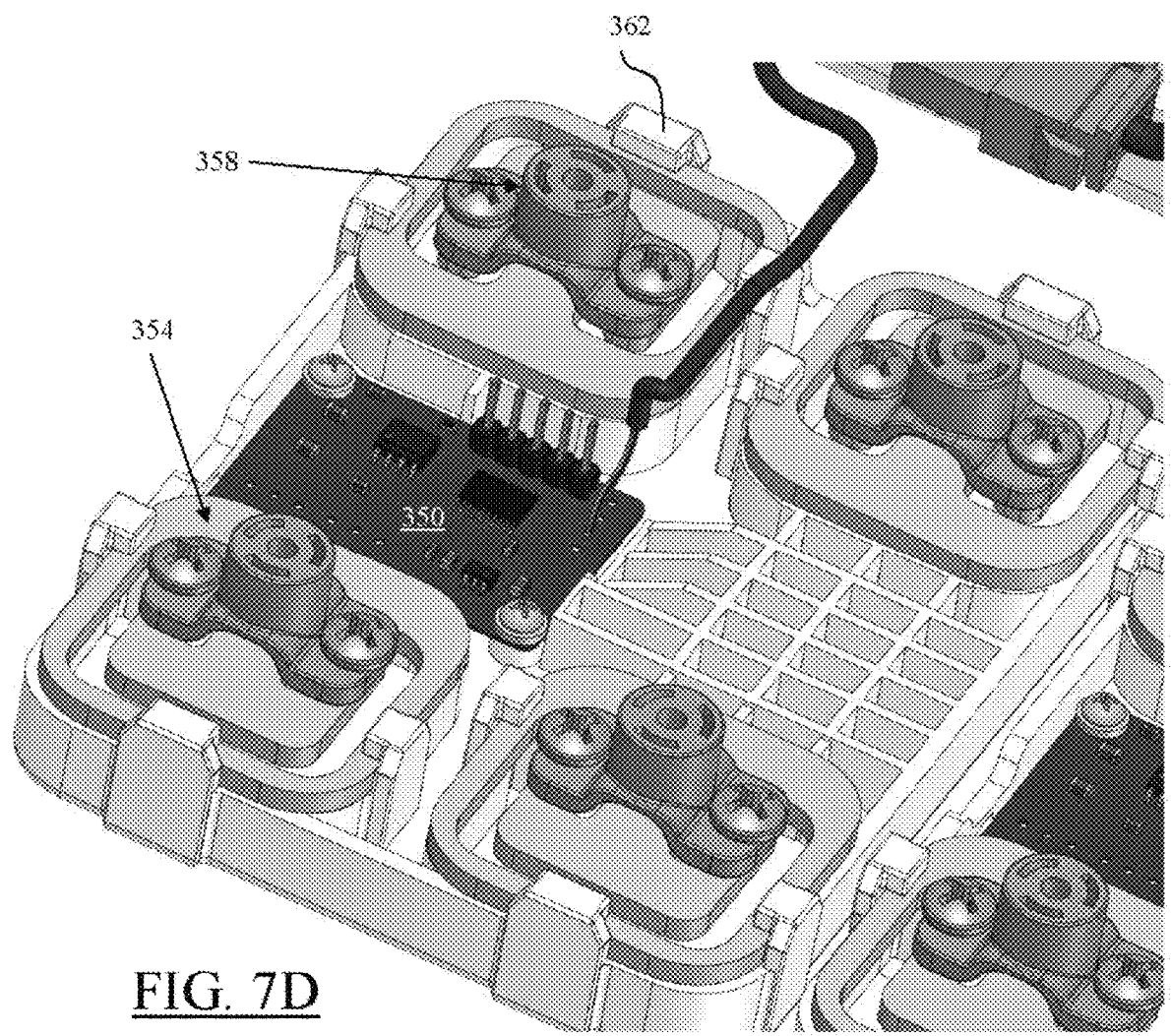
Figure 7E:
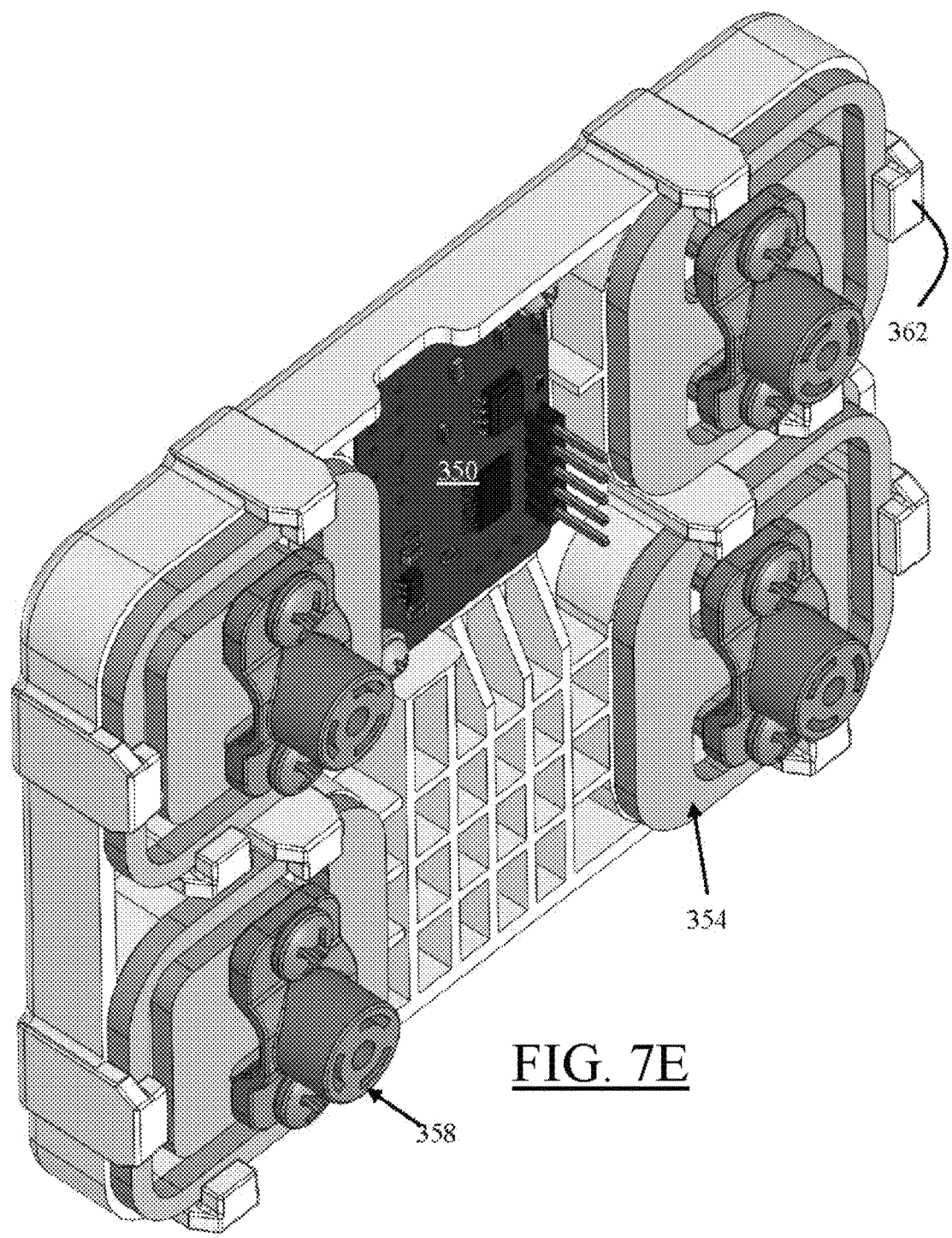
Figure 7F:
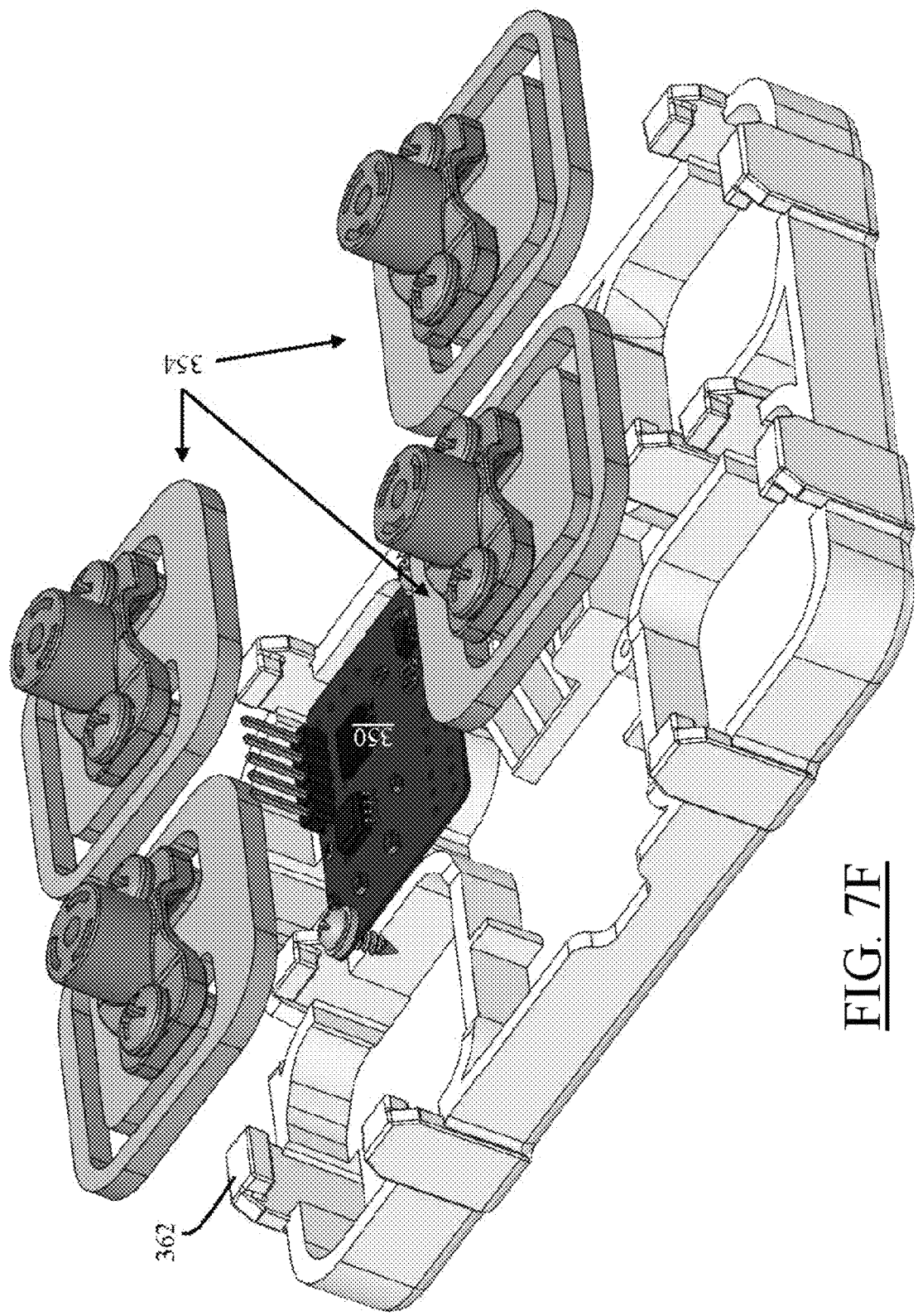
Figure 7G:
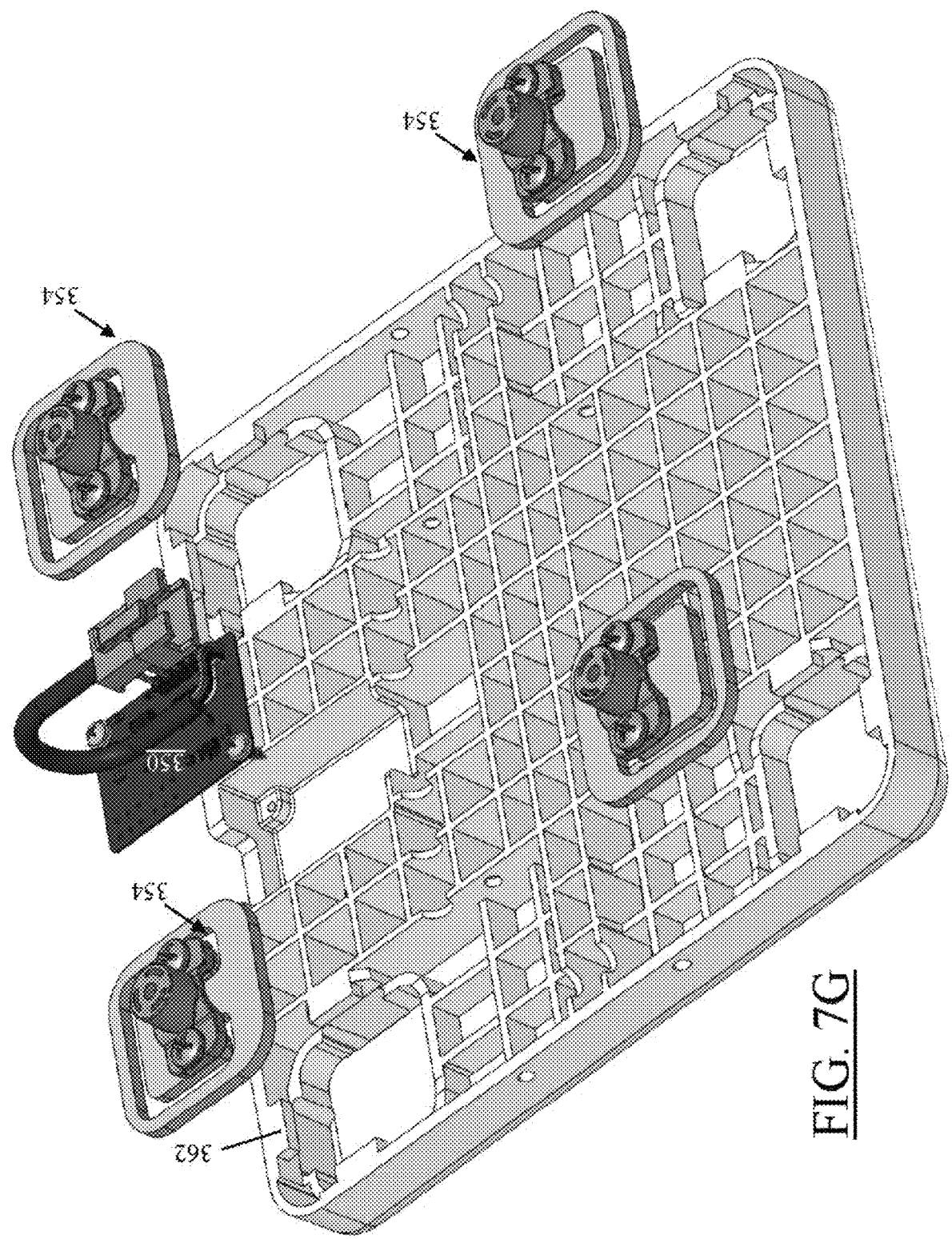

A weight sensor module grouping 232 is comprised of support-base 332 upon which one or more weight sensor modules 230 may be secured as shown in FIGS. 7A and 7B, including all Input/Output (I/O) wiring 286 for power and data communications with power and data communications hub 112 for each weight sensor module 230 via connector 296. Details of weight sensor modules 230 are provided below in relation to electronic discussions.

As further illustrated in FIGS. 7A and 7B, a weigh sensor module 230 is isolated from an adjacent weight sensor module 230 to prevent crossover sensing of detected weight by both. Since the protective cover 238 is a continuous flexible body that covers over housing 236, the weight (load force) of an item 106 positioned on protective cover 238 may diverge or spread in all directions and be sensed by both the weight sensor module and the adjacent weight sensor module if the weight sensor modules are positioned too close to each other. Accordingly, a weight sensor module is isolated from an adjacent weight sensor module due to separation distance of sufficient span between both wherein any crossover sensing of detected weight is negligible.

It should be noted that the size of each weight sensor module 230 is not selected at random, but is commensurately selected based on average sizes of typical food containers (for example, an average sized can of soup, vegetables, jar of pickles, etc. that are sold in the United States). The proper selection of a size of a weight sensor module 230 therefore, is to be commensurate with the typical average size of food containers. This enables efficient use of space available in a typically sized intelligent shelf 202 by maximizing the number of weight sensor modules 230 therein while maintaining isolation between the weight sensor modules 230 to prevent crossover weight detection. For example, smaller weight sensor modules 230 shown may have a width size of about 50 to 130 mm (preferably approximal about 80 mm) and a length size of about 50 mm to 150 mm, (preferably approximal about 100 mm). The larger square type weight sensors may have a width and a length size of about 76 to 200 mm, (preferably approximal about 150 mm in width span and 150 mm in length span).

As best shown in FIGS. 7C to 7G, a weight sensor module 230 may be comprised of weight sensor module electronics Printed Circuit Board (PCB) 350, IO connectors 352, and individual load cells 354, all of which are secured to a weight sensor module base 356. It should be noted that some wires leading from individual load cells 354 to PCB 350 are not shown to reduce clutter and to improve clarity. As illustrated, weight sensor module electronics 350 on a Printed Circuit Board (PCB) may be fastened to weight sensor module base 356. A securing mechanisms 362 (best shown in FIGS. 7F and 7G) may be used for securing (snap-hooks) each load cell 354 as shown.

On top of each load cell 354 itself is a connector-adapter 358 of cylindrical projection configuration to enable the combination of weight sensor module base 356 and load cells 354 to be attached to base-support 232. Connector adapter 358 is of sufficient height to accommodate weight sensor module harness 286. Grids 360 of weight sensor module base 356 are there to improve its structural integrity.

FIGS. 8A to 8F are non-limiting, exemplary illustrations of an intelligent shelf without a power and data communication module (e.g., a hub-less shelf) that may be used as an "extender" shelf for connection to an intelligent shelf with a power and data communication module in accordance with one or more embodiments of the present invention. The hub-less intelligent shelf illustrated in FIGS. 8A to 8F includes similar corresponding or equivalent components, interconnections, functional, operational, and or cooperative relationships as intelligent shelf 202 that is shown in FIGS. 1A to 7G, and described above. Therefore, for the sake of brevity, clarity, convenience, and to avoid duplication, the general description of FIGS. 8A to 8F will not repeat every corresponding or equivalent component, interconnections, functional, operational, and or cooperative relationships that have already been described above in relation to intelligent shelf 202 that is shown in FIGS. 1A to 7G but instead, are incorporated by reference herein.

Figure 8A:
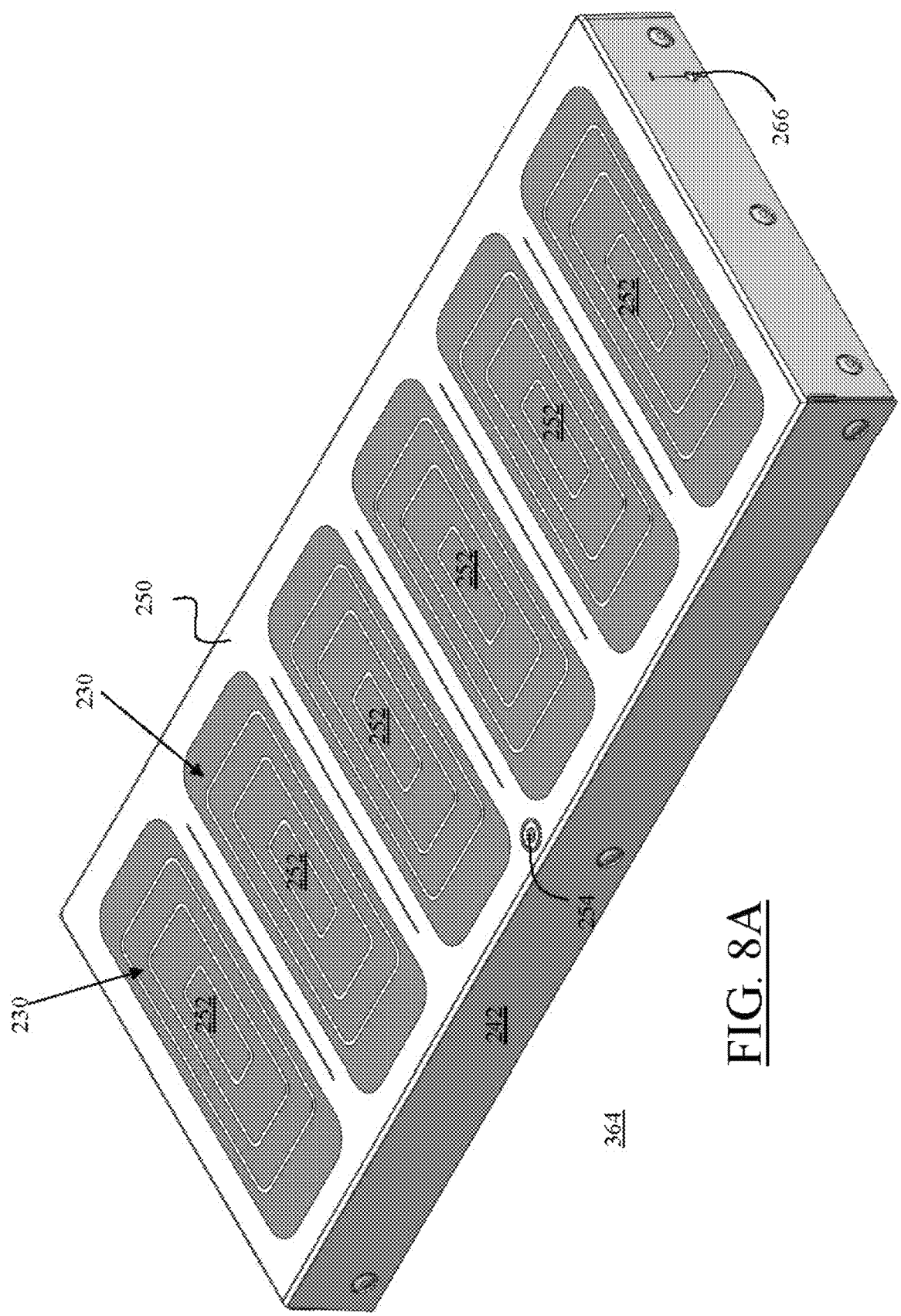
FIGS. 8A to 8F are non-limiting, exemplary illustrations of an intelligent shelf without a power and data communication module (e.g., a hub-less shelf) that may be used as an "extender" shelf for connection to an intelligent shelf with a power and data communication module in accordance with one or more embodiments of the present invention.
Figure 8B:
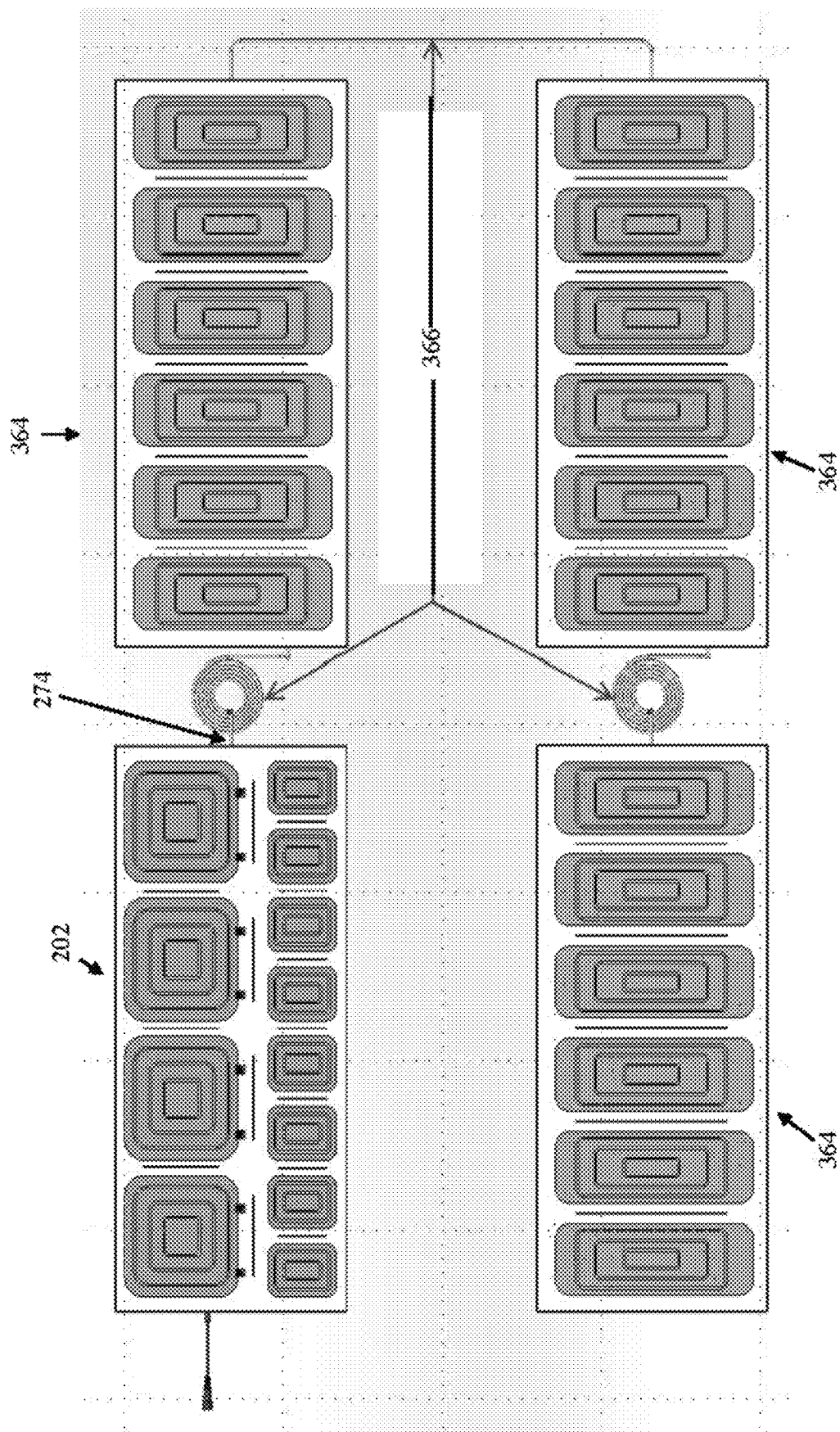
Figure 8C:
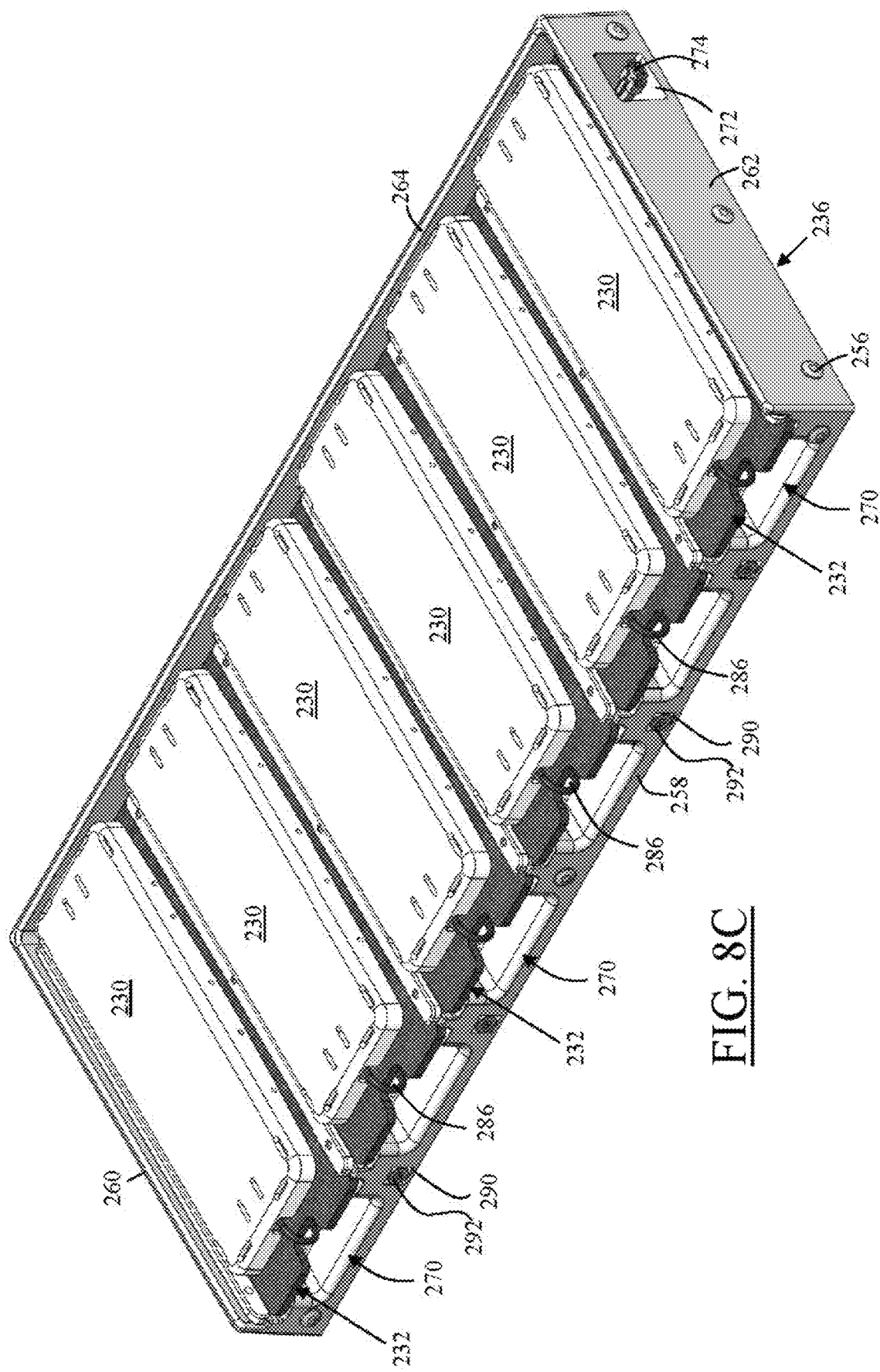
Figure 8D:
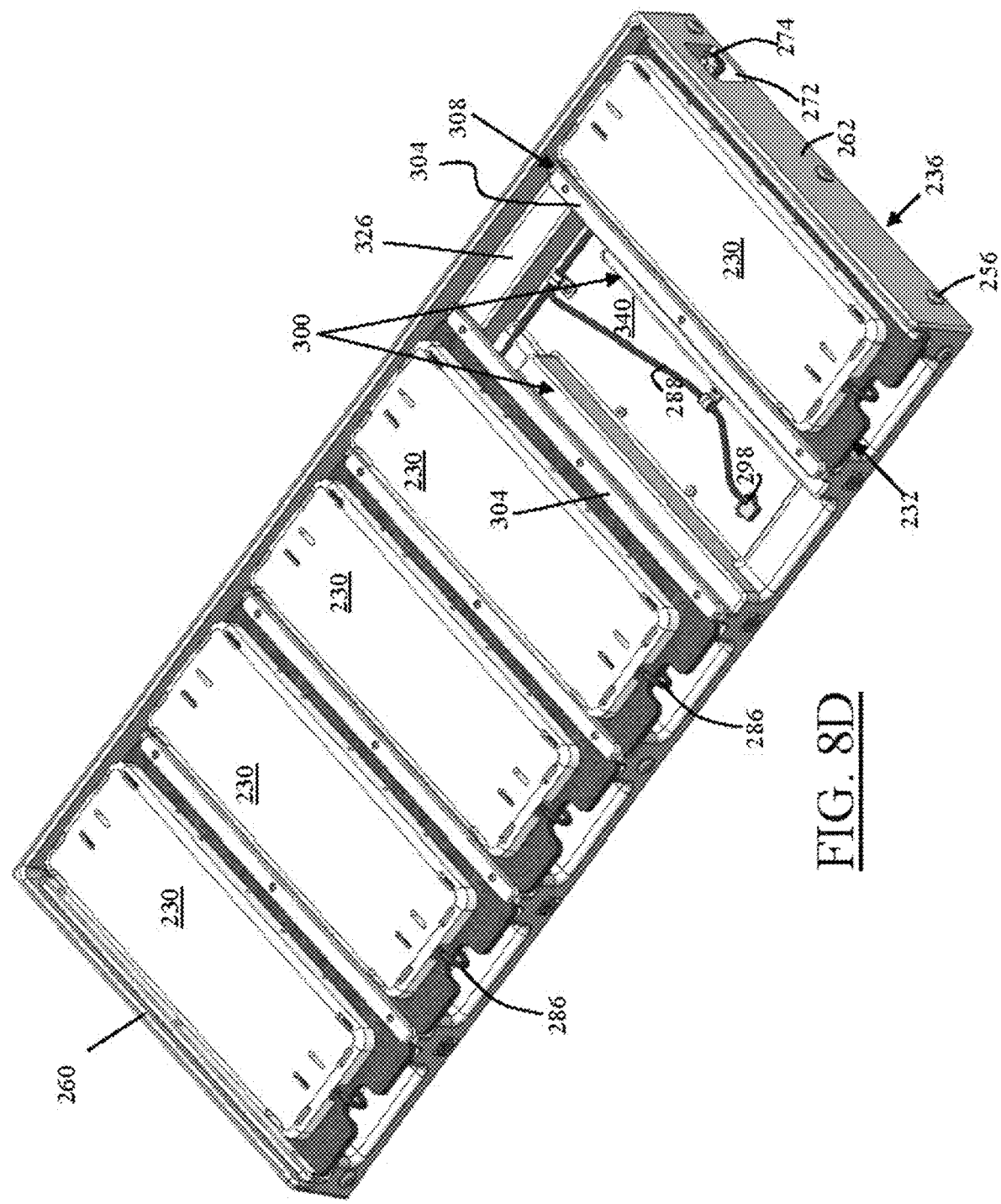
Figure 8E:
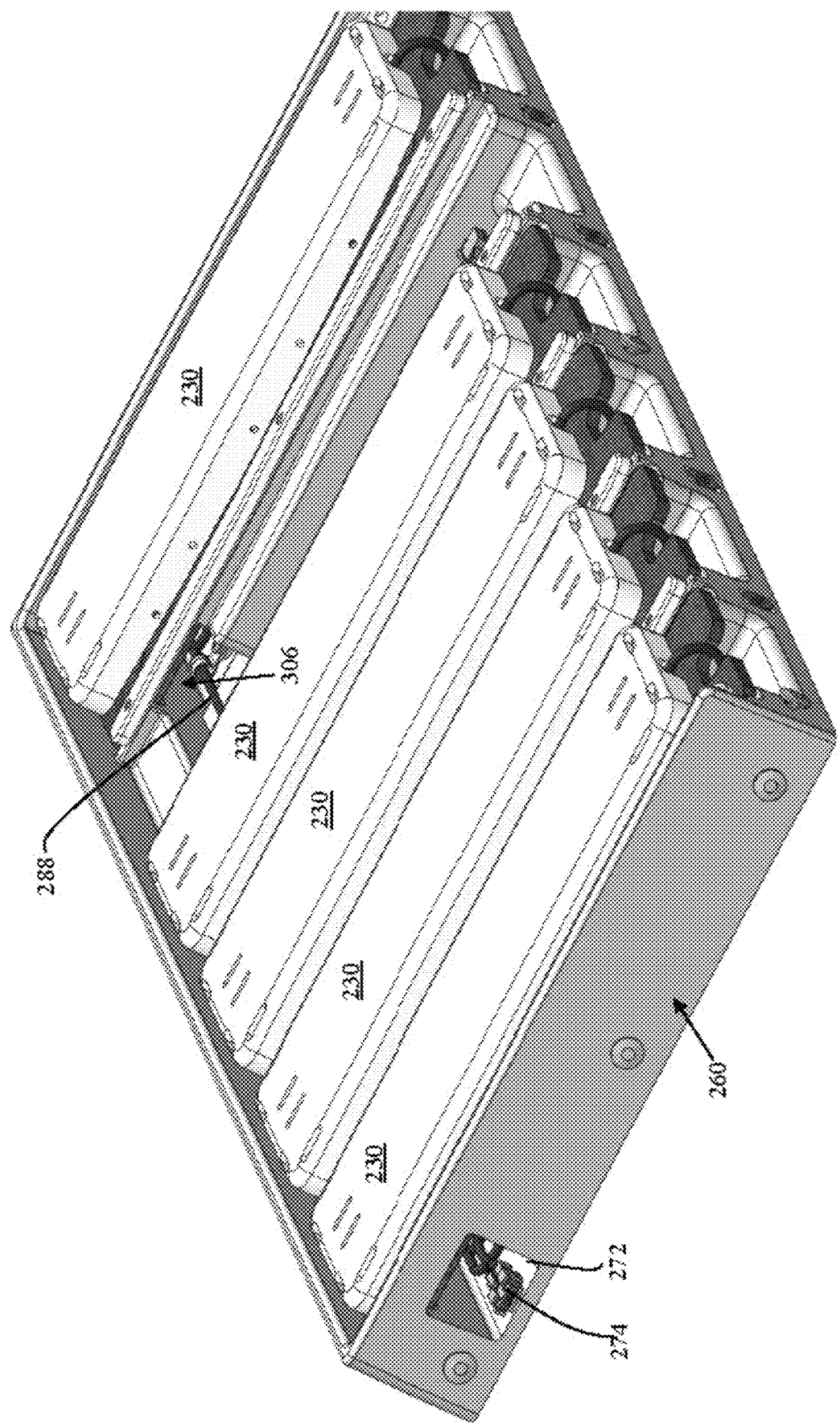
Figure 8F:
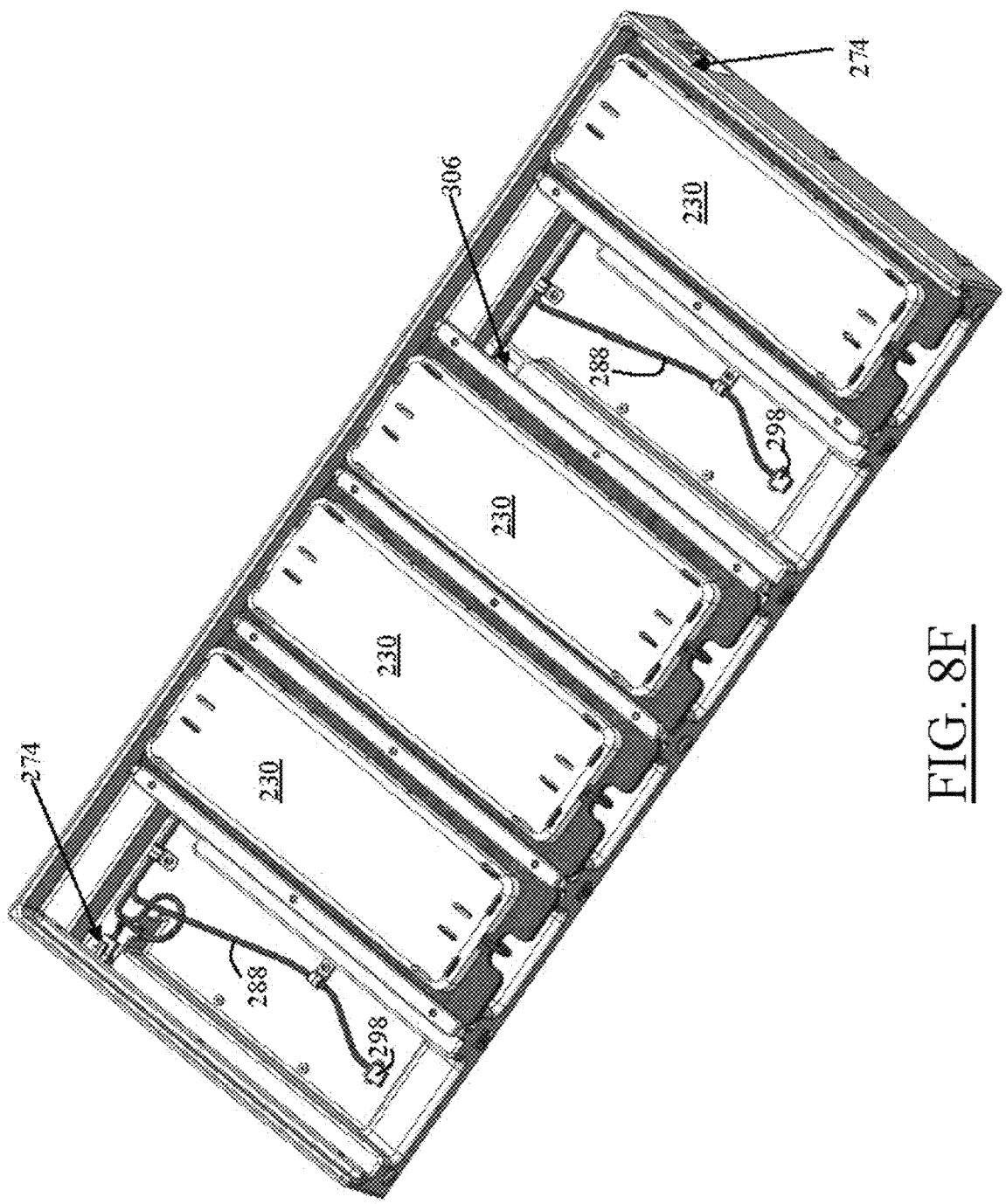

As illustrated in FIGS. 8A to 8F, hub-less (auxiliary) intelligent shelf 364 does not have a power and data communication hub 112, but is an "extender" shelf (see FIG. 8B). The shelf structure is modified to accommodate weight sensor module grouping 232 with each grouping 232 having only one weight sensor module 230. In the non-limiting, exemplary instance shown in FIG. 8A, housing 236 of hub-less intelligent shelf 364 accommodates and includes six-(6) weight sensor modules 230.

As best shown in FIG. 8B, extension connector 274 enables concatenation of multiple intelligent shelves. This feature extends the overall number of weight sensor modules 230 to thereby allow for monitoring of more items 106. For example, a user may purchase a first intelligent shelf 202 that includes a power and data communication hub 112, and second and subsequent shelves 364 without power and data communication hub 112, but with the hub harness 288 that may transmit and receive data from all weight sensor modules 230 of all connected shelves 202 and 364.

It should be noted that when intelligent shelf 202 is not connected to another shelf, extension connector 274 (which in this non-limiting, exemplary instance may be an RS485 connector) is terminated by a well-known, conventional terminal resistor; this maintains a closed-circuit condition of the hub harness 288.

As shown in FIGS. 8C to 8F, hub-less shelf 364 includes extension connectors 274 at both first lateral periphery wall 260 (FIG. 8E) and second lateral periphery wall 262 (FIGS. 8C and 8D), enabling hub-less shelf 364 to be connected at both ends to other shelves (202 or 364).

FIGS. 9A to 9O are non-limiting, exemplary illustrations of the detailed circuitry of the power and communications hub of the intelligent shelf shown in FIGS. 1A to 8F in accordance with one or more embodiments of the present invention. FIGS. 9P to 9T are non-limiting, exemplary illustrations of the details of the weight sensor module electronics 350 shown in FIGS. 1A to 9O in accordance with one or more embodiments of the present invention.

Figure 9T:
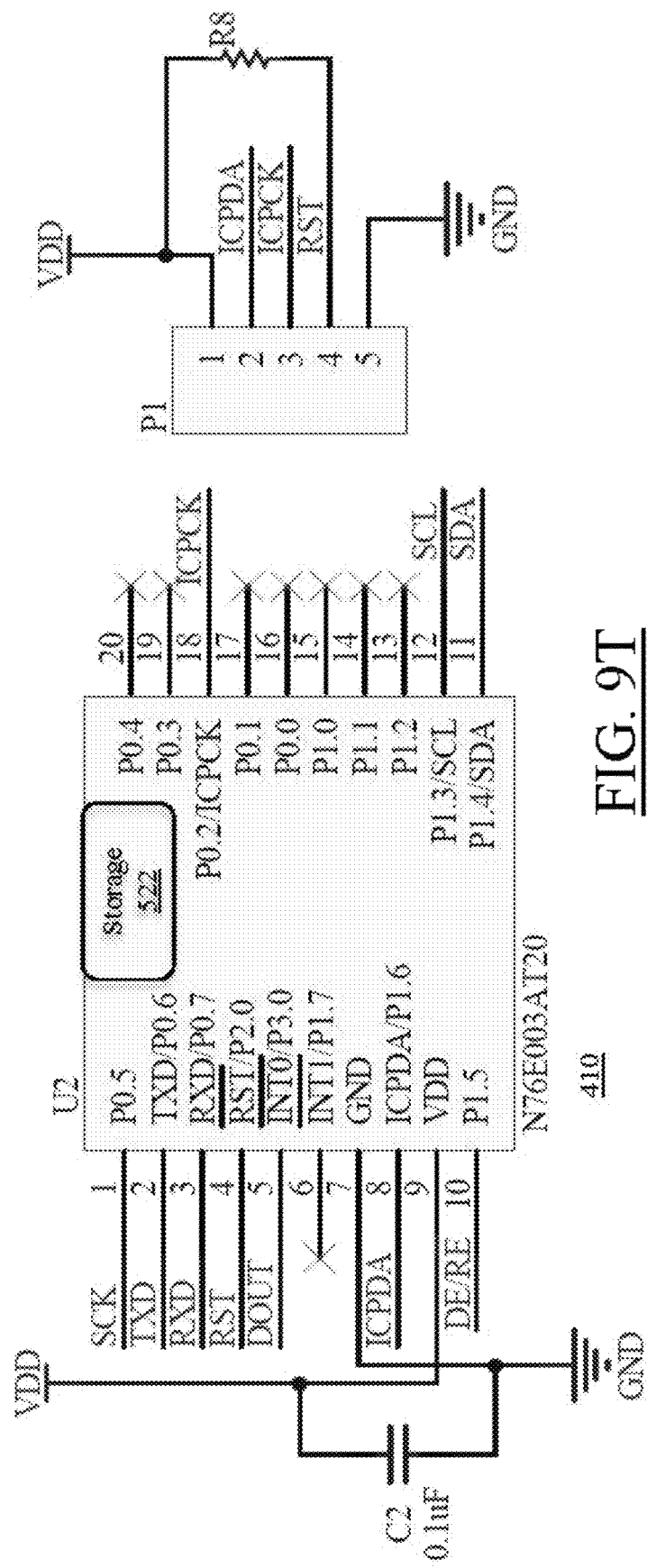

FIG. 9A is a non-limiting, exemplary overview illustration of power and data communications hub 112 while FIGS. 9B to 9O are detail schematic circuit diagrams thereof. As illustrated in FIGS. 9A to 9T, power and communications hub 112 includes a power supply and protection circuitry 368 (FIG. 9B) that receives external power via the power cord 280 (FIG. 9A) of a power adapter (not shown).

Further included is a battery charger unit 370 (FIG. 9C) with a charger integrated circuit (IC) 372 for charging a battery 344 (FIG. 9A) of power and communications bub 112. Battery 344 physically connects at connector P1 of battery charger 370. Supplied power from power supply and protection circuitry 368 is received via VBUS by the charger IC 372 to charge battery 344. Battery charger unit 370 further includes a charge indicator LED LD1.

Power and data communications hub 112 further includes a first Direct-Current to Direct-Current (DC to DC) converter 374 (FIG. 9D) for converting a higher DC incoming voltage (of about 5V) into a lower DC output voltage (of about 3.3V) for hub Microcontroller unit (MCU) 376 (FIG. 9N).

Father included within power and data communications hub 112 is a second DC to DC converter 378 for converting a higher DC incoming voltage (of about 5V) into a lower DC output voltage (of about 3.3V) for one or more data storage unit 384 (FLASH memory 386 and EEPROM 388) of power and data communication hub 112. Second DC to DC converter 378 also provides power (voltage) to one or more weight sensor modules 230 of intelligent shelf 202 or any other hub-less shelfs 364, with power supplied to one or more weight sensor modules 230 supplied via RS485 communications unit 380 (FIG. 9I) and RS485 weight sensor connector unit 382 via connector P3 (FIG. 9J).

Data storage unit 384 (FIG. 9F) of power and data communication hub 112 associated with MCU 376 (FIG. 9N) is comprised of FLASH memory 368 and EEPROM 388, with the EEPROM 388 including sensory logic of inventory application 110 and FLASH memory including historical data related to inventory items 106.

Power and data communication hub 112 may further include an onboard temperature sensor unit 390 and or temperature sensing port 392 (FIGS. 9G and 9H) with a temperature connector P6 for connection of an external temperature sensor (well known and hence, not shown).

Temperature sensors may be used for detecting a temperature of the one or more weight sensor modules 230, with the sensed temperature used by MCU 376 to offset variations in sensed weight due to variations in temperature. All conventional load cells 354 (connected with load cell connector S1, S2, S3, and S4 shown in FIG. 9R) use a strain gauge to measure weight. Strain gauge properties are general negatively impacted by a variety of factors, including hysteresis effect and creep effect for example, application of constant, continues load on the strain gauge for a duration and temperature fluctuations, and low power (or voltage) to load cells, etc., all of which may generate a detected weight value that may be incorrect. For example, rise or fall in temperatures will vary the properties of the strain gauge of the load cell 354 and hence, generate thermally induced sensed errors that would translate into incorrect detection of the amount of load (or weight) experienced by the load cell 354.

The strain gauge reading therefore may be impacted by variations in temperature and hence, resulting in incorrect measured weights. Accordingly, temperature sensors may be used to sense the temperature, and use the detected temperature data to compensate for variations in measured weight due to effects on the strain gauge of a load cell. For example, a table may be used to select a correct compensation or offset value for the detected weight based on abnormal variations in change in temperature (e.g., 5° change in temperature) and use that weight value (weight sensed and offset value) as the final weight sensed by load cell 354.

As indicated above, in the non-limiting exemplary instance shown, the intelligent shelf 202 (or hub-less shelf 364) may use RS485 communication unit 380 and RS485 weight sensor connector unit 382 to enables association of multiple weight sensor modules 230 with MCU 376 of power and communication hub 112. FIG. 9I is a non-limiting, exemplary schematic illustration of an RS485 communication unit 380 that supplies both data (represented by "A" and "B" lines) and power (of about 3.3V) for all electronics connected to hub harness 288, including weight sensor modules 230 via RS485 weight sensor connector unit 382.

Power and data communication hub 112 may further provide an auxiliary external power selection unit 394 (FIG. 9K) that provides the option of application of a higher voltage (E− and E+) to load cells 354 of weight sensor modules 230 for a more accurate read of the load force via RS485. Application of higher excitation voltage improves signal to noise ratio and hence, a more accurate detection of load sensed by load cell 354.

This option is available during manufacturing process of power and data communication hub 112, where a jumper TJ7 may be used during manufacture to switch excitation voltage values, from a 3.3V to a higher voltage, e.g., 5V to 12V. As indicated above, the greater the excitation voltage applied to the strain gauge of each load cell 354, the greater the accuracy of sensed weight due to improved signal to noise ratio. If the optional auxiliary external power selection 394 is not used, then internal power AVDD of about 3.3V will be the default excitation voltage for load cell voltages (E− and E+) with (accuracy detection within range of about +/−100 grams). In the non-limiting, exemplary instance, the illustrated VIN is 3.3V and hence, the shown VOUT (also shown on RS485 weight sensor connector unit 382) is also 3.3V applied to load cells 354 as excitation voltages E+ and E− (FIG. 9R).

It should be noted that there should be a balance between the amount of power (or excitation voltage) provided to a strain gauge to achieve greater accuracy of sensed load due to improved signal-to-noise ratio and the heat that will be generated as a result of the higher applied excitation voltage. As indicated above, higher temperature generated as a result of application of higher excitation voltage would introduce thermally induced errors and hence, negatively impact the accuracy of sensed weight.

Power and data communication hub 112 further includes a power reset unit 396 (FIG. 9L) with an integrated power reset switch SW3 that if actuated will reset MCU 376 of power and data communication hub 112. Integrated power reset switch SW3 is also shown in (FIG. 9A).

Power and data communication hub 112 further includes Access Point Mode unit 398 (FIG. 9M) that is also associated with actuator 348. When actuator 348 is pressed for a first duration, Access Point Mode unit 398 transmits a SCAN signal to MCU 376, enabling MCU 376 to rescan all weight sensor modules 230, save data, and reboot (as per above description). However, when actuated 348 is pressed for a second duration, which is longer than the first duration, it enables MCU 376 to be switched to Access Point Mode to operate as a Hot spot for configuration of the power and data communication hub 112.

FIGS. 9N and 9O are non-limiting, exemplary illustrations of a Microcontroller Unit (MCU) of power and data communication hub 112 that includes a WiFi unit 400, an auxiliary I/O 402 (not used), and a Real Time Clock (RTC) 404 (FIG. 9O).

An internal clock of MCU 376 is used for all internal operations of shelf (202 or 364), including all operations of power and data communications hub 112 and power and data communications via RS485 with one or more weight sensor modules 230. On the other hand, RTC 404 is used to obtain real time (offline) for all external communications with external computing devices, including one or more server computing devices 140 so that all data transmitted from intelligent shelf 202 has the real time timestamp. RTC 404 is used for external data communications because the internal clock of MCU 376 may have a drift (be off). Use of RTC 404 ensures all data being transmitted have the actual correct time.

Circuitry shown in FIGS. 9P to 9T detail the weight sensor module electronics 350. As illustrated, weight sensor modules 230 are comprised of a weight sensor 406 (FIG. 9R) that includes load cells 354 (and their strain gauge, etc.) connected to connectors S1, S2, S3, and S4 that detect a weight of item 106 and transmits an analog weight data (S−/S+) of item 106 to an analog to digital converter (ADC) 408 shown in FIG. 9S. The connection scheme shown in FIG. 9R for load cell 354 and load cell connects S1, S2, S3, and S4 to constitute a weight sensor 406 is a well-known half-bridge to full bridge connection.

As further illustrated, ADC 408 converts the received analog weight data (S+/S−) from weight sensor 406 into a digital weight data (DOUT) and transmits the digital weight data (DOUT) to a Weight Sensor Module MCU 410 (FIG. 9T). Weight Sensor Module MCU 410 transmits digital weight data (DOUT) to hub MCU 376 via weight sensor module RS485 power and data communications 412 (FIG. 9P). It should be noted that weight sensor module RS485 power and data communications 412 also provides the option of using well-known I²C communications mechanism 414 however, RS485 is preferred for longer distanced signal transmission. Use of RS485 is important if one or more hub-less shelf 364 are connected to power and data communication hub 112 of intelligent shelf 202, where MCU 376 must communicate with weight sensor modules at physically longer distances. Weight sensor module 230 also includes a DC-to-DC converter 416 (FIG. 9Q) for supply of power to weight sensor module MCU 410 and RS485 unit 412.

The working logic 212 (associated with one or more server computing devices 140), sensor logic 216 (associated with power and data communication hub 112 of intelligent shelf 202), and display logic 214 (associated with Internet enabled mobile computing device 108) a inventory application 110 of inventory monitoring system 200 are discussed in detail below.

Figure 10A:
FIGS. 10A to 10C are non-limiting and exemplary illustrations of the registration of Internet-enabled mobile computing device 108 with inventory monitoring system 204 in accordance with one or more embodiments of the present invention.
Figure 10B:
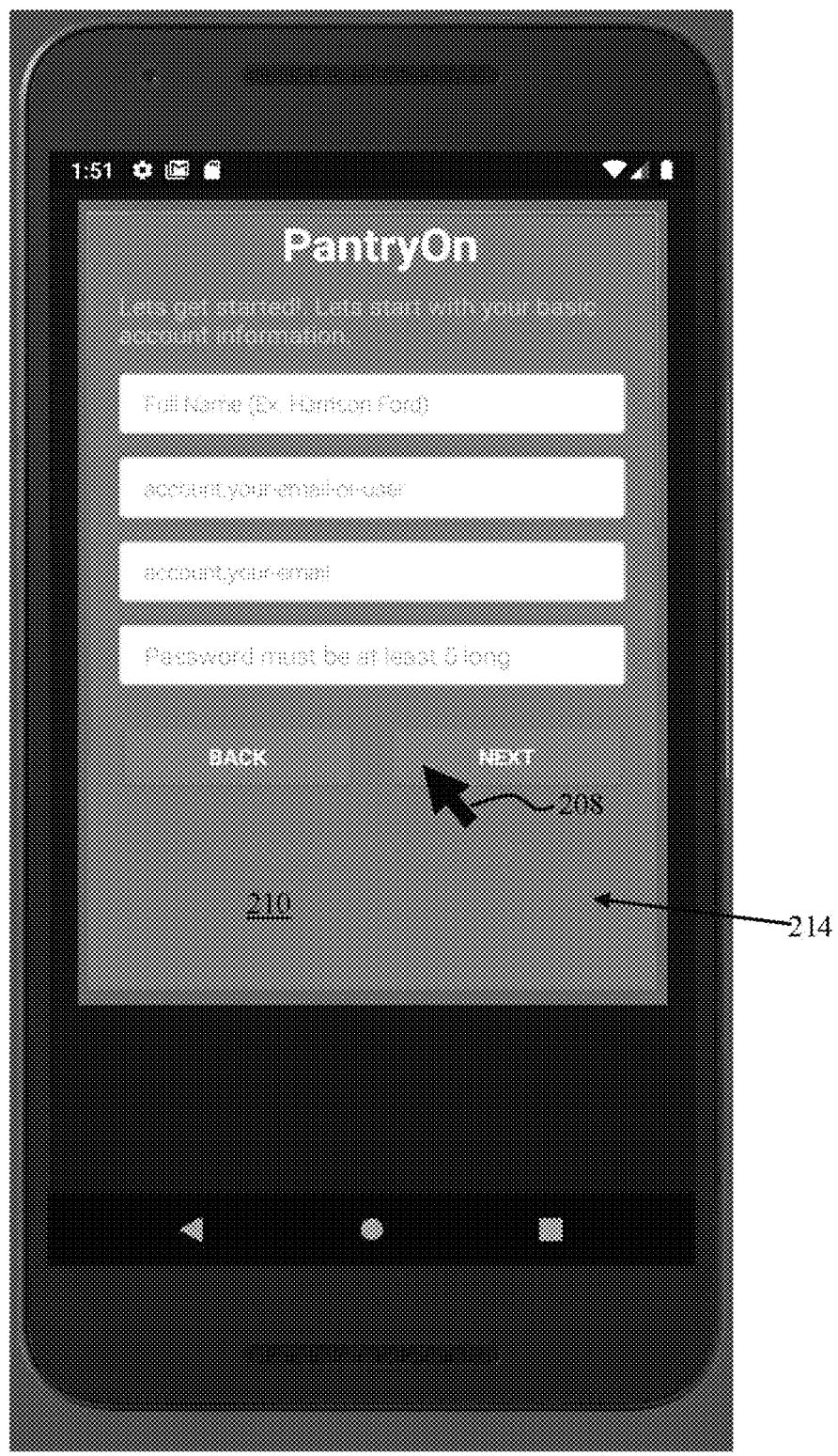
Figure 10C:

FIGS. 10A to 10C are non-limiting and exemplary illustrations of the registration of Internet-enabled mobile computing device 108 with inventory monitoring system 204 in accordance with one or more embodiments of the present invention.

It should be noted that the methods or processes for the download and installation of inventory application 110 (the interactive display logic 214 portion), registration, and login to create a new user account or to login onto an existing account of inventory monitoring system 204 of the present invention using an Internet-enabled mobile computing device 108 may be accomplished through well-known existing processes.

Further, upon creation or logging into an account, one or more server computing devices 140 of inventory monitoring system 204 of the present invention may cull existing user contacts from a variety of other social-media networks or email accounts, including allowing the registered user to simply add information directly, similar to well-known existing processes.

After download and installation of interactive display logic portion 214 of inventory application 110 through well-known processes, Internet-enabled mobile computing device 108 is instructed by working logic 212 of one or more server computing devices 140 to display login/registration GUI, as shown in FIG. 10A for registration and login to create a new user account or to login into an existing account of inventory monitoring system 204 of the present invention.

Selecting New Account GUI icon 206 (selection represented by arrow 208) on the login/registration GUI shown in FIG. 10A renders a profile GUI display 210 shown in FIG. 10B, wherein the requested data is entered to register a profile of a new user with server computing device 140.

Once completed, profile information is transmitted to server computing device 140 upon selection 208 of Next GUI icon on the profile GUI display 210 shown in FIG. 10B. Server computing device 140 using working logic 212 creates a record of data received from Internet-enabled mobile computing device 108, and determines within its Structured Query Language (SQL) relational database that there are no duplicates of such records.

Upon checking for duplicates after selection 208 of Next GUI icon on the profile GUI display 210 shown in FIG. 10B, server computing device 140 instructs Internet-enabled mobile computing device 108 to cause it to render a Group ID Profile GUI display ("Group Name") 220 for the recording of the grouping of one or more Internet-enabled mobile computing device 108 for a particular intelligent shelf 202 in server records 190 of storage 192 of server computing device 140 shown in FIG. 10C.

In general, the term "group" within the context of one or more embodiments of the present invention is actually a grouping of one or more Internet-enabled mobile computing device 108 that may share information displayed by the interactive display logic 214 of inventory application 110 related to server data or records 190 updated by power and data communication hub 112 of intelligent shelf 202 via server computing device 140. For example, a "group" or a family household may have purchased an intelligent shelf 202 for use by the entire "family". In this scenario, multiple Internet-enabled mobile computing devices 108 of the family members may be linked within inventory application 110, with all being linked to a specified account within server computing device 104 associated or linked with intelligent shelf 202 of the family. As a practical example, which is further detailed below, grouping scheme provided by inventory application 110 enables Internet-enabled mobile computing devices 108 of all group members to display for example, that a particular food item 106 (e.g., a jar of peanut butter) displayed on the family or group intelligent shelf 202 has not been depleted or needs to be replenished. It should be noted that a group or family may comprise of only one user ("family of one") with one Internet-enabled mobile computing device 108, and one or more intelligent shelf.

Once a Group ID profile 222 is entered, next, zip code address is provided to the inventory monitoring system 204. It should be noted that as part of the registration of Internet-enabled mobile computing device 108 and its association with a group, users may enter physical location (e.g., zip code address) on the Zip Code GUI 226, which would enable inventory monitoring system 204 to provide the grouped Internet-enabled mobile computing device 108 with the nearest merchants. In other words, physical location data enables inventory monitoring system 204 to provide a listing of merchants close to the physical location of the internet enabled mobile computing device (for example, using Google maps).

Upon completion of Group ID Profile 222 GUI display 220 shown in FIG. 10C, next a Register GUI icon 224 is selected 208, which causes Internet-enabled mobile computing device 108 to transmit Group ID profile data to server computing device 140 which, in turn, enables the working logic 212 of inventory application 110 to register the group ID profile data within server records 190 and stores within storage 192. This completes the registration (and grouping) of the Internet-enabled mobile computing device 108.

Upon completion of the registration (FIGS. 10A to 10C) of Internet-enabled mobile computing device 108, server computing device 140 via working logic 212 causes Internet-enabled mobile computing device 108 (via interactive display logic 214) to display a set of setup GUI displays, all of which are detailed below.

Figures 3, 11A:
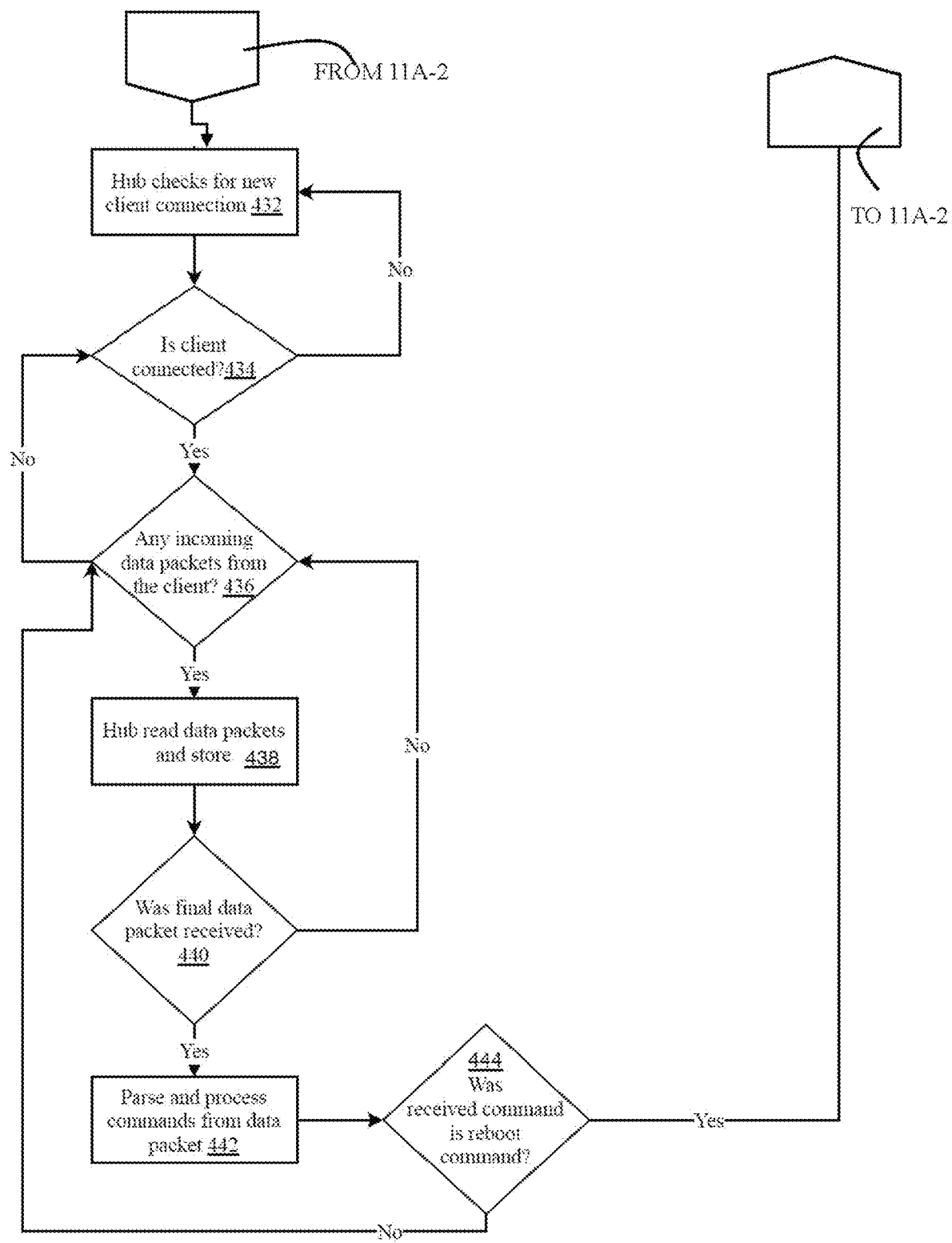
Figure 11B:
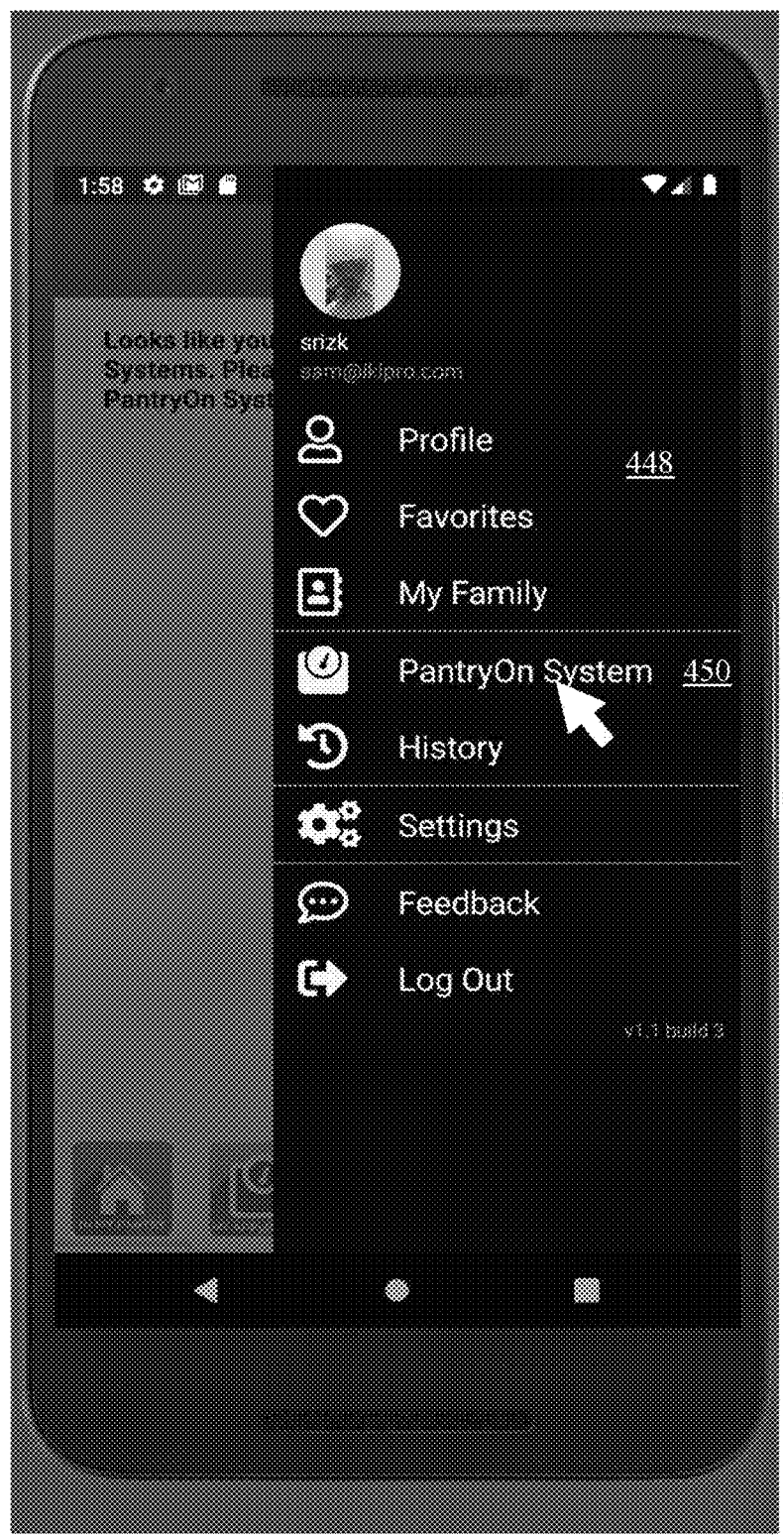
Figure 11C:
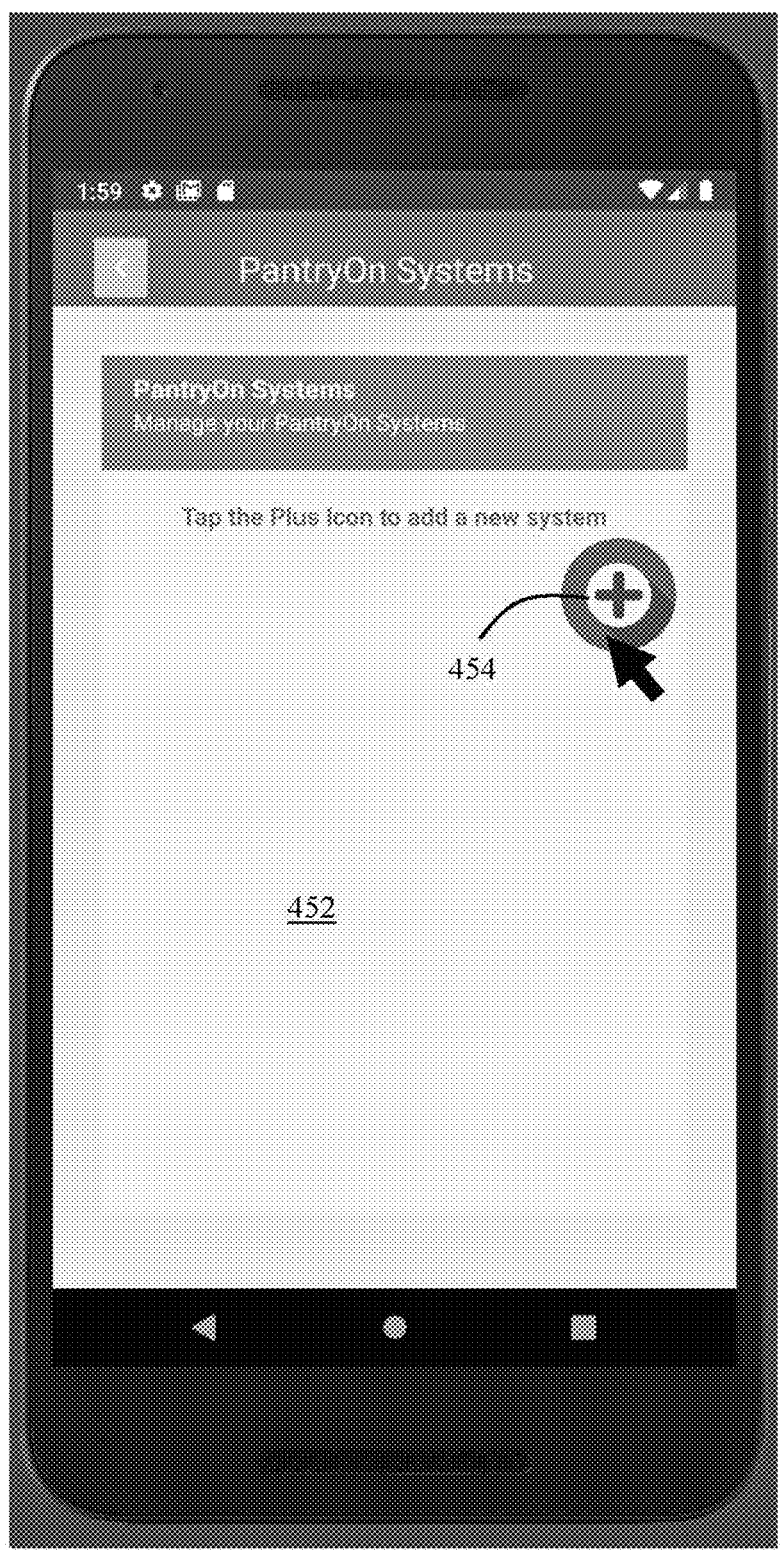
Figure 11D:
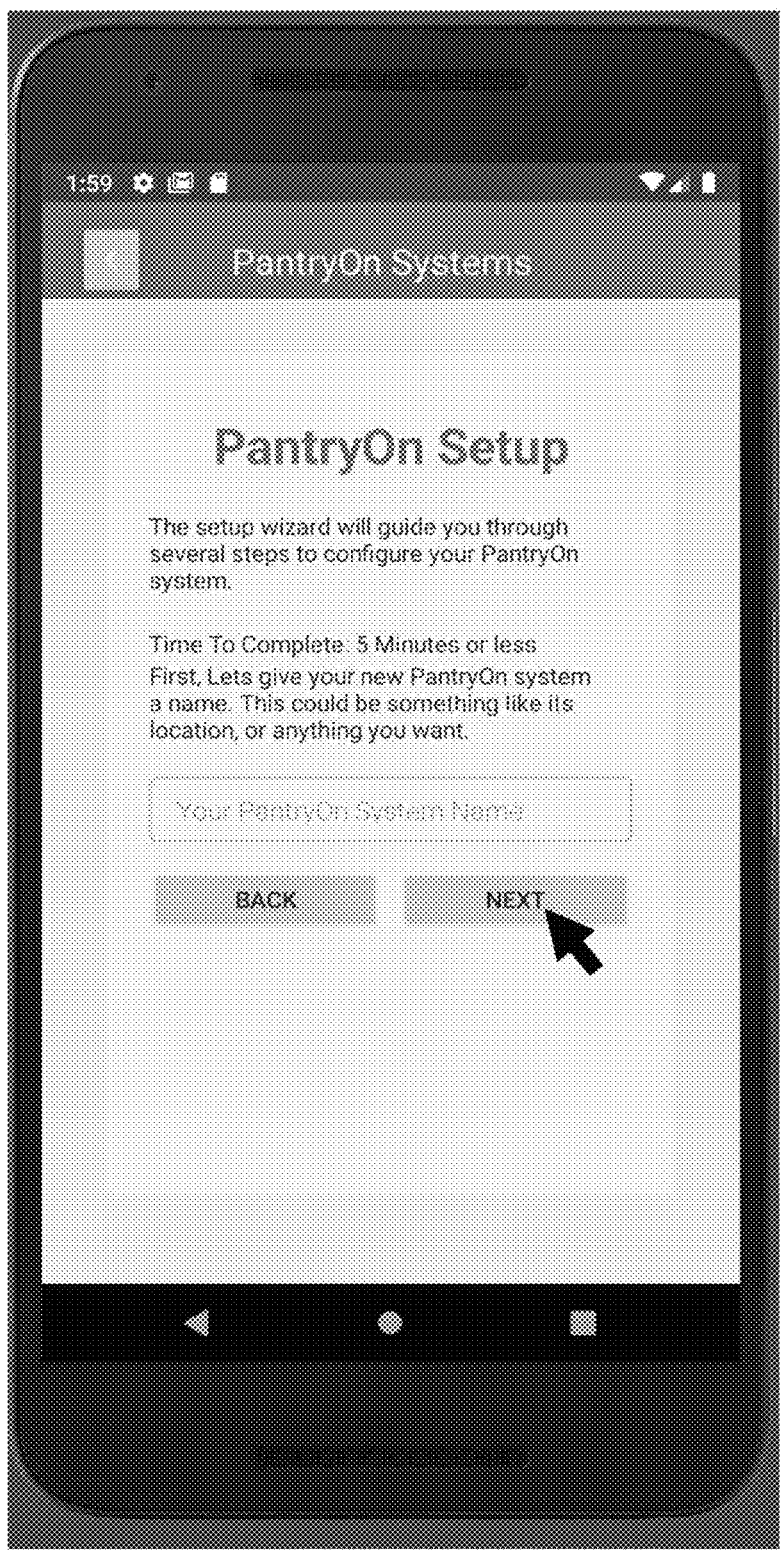
Figure 11E:
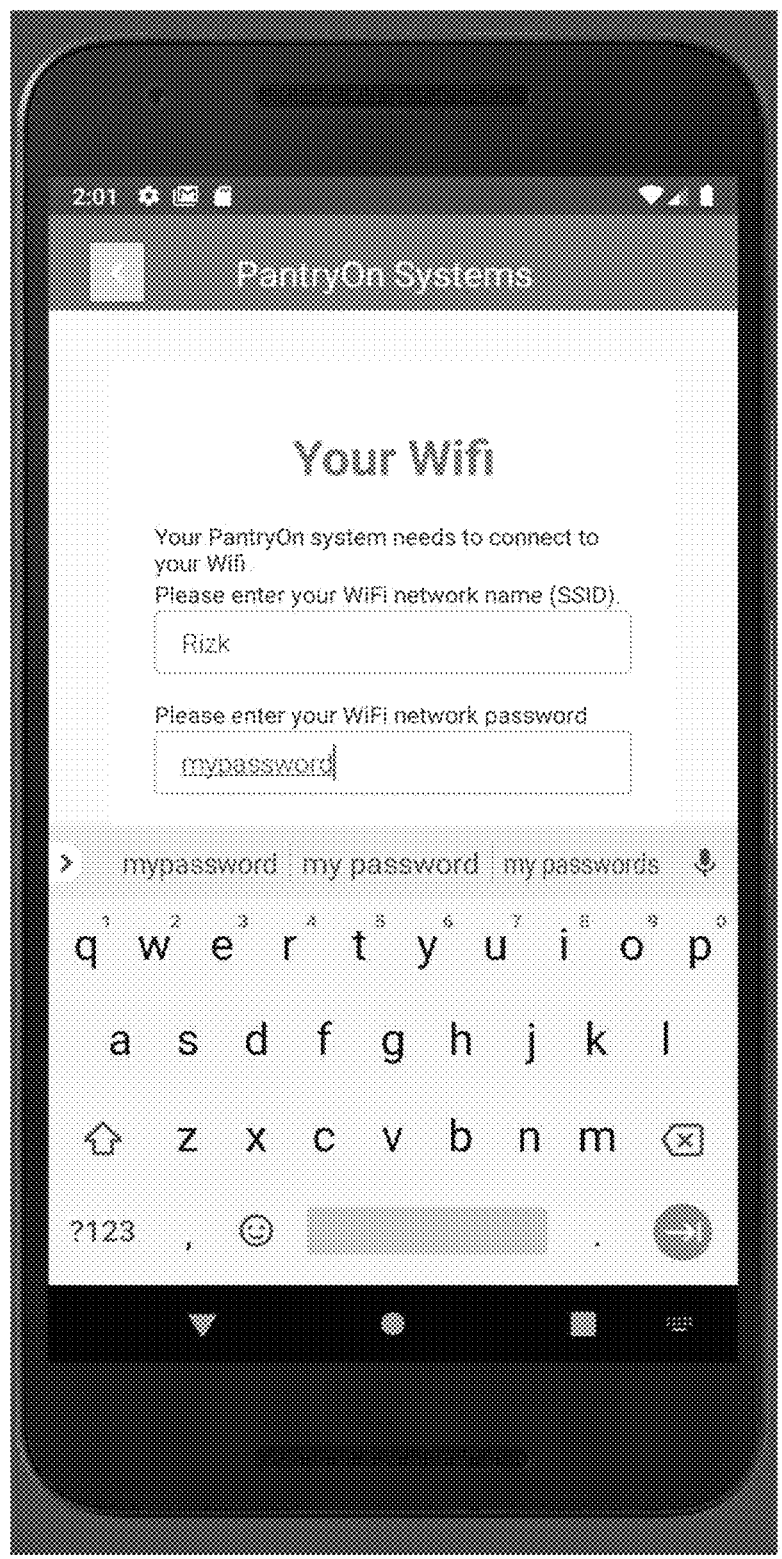
Figure 11F:
Figures 1, 11G:
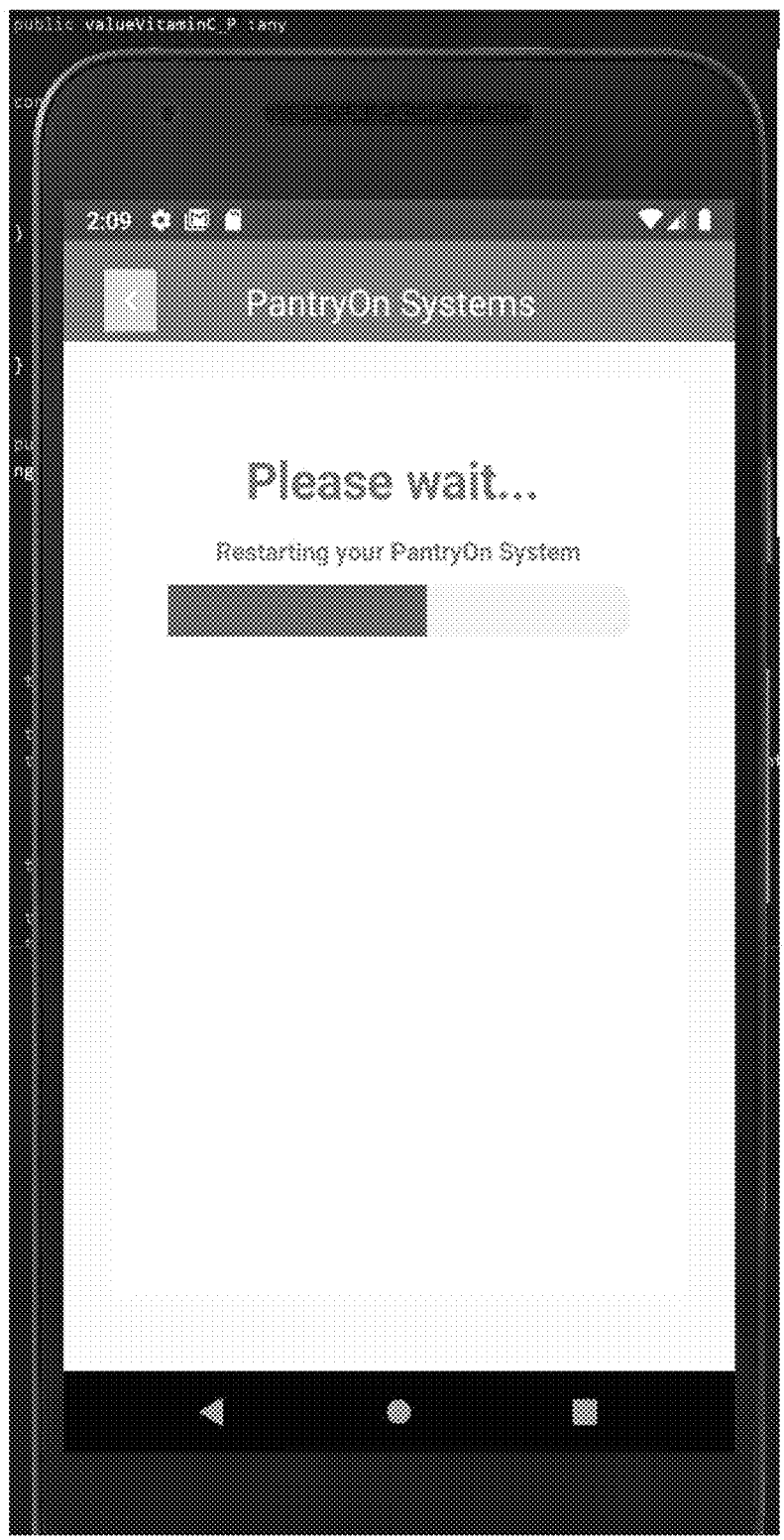
Figures 2, 11G:
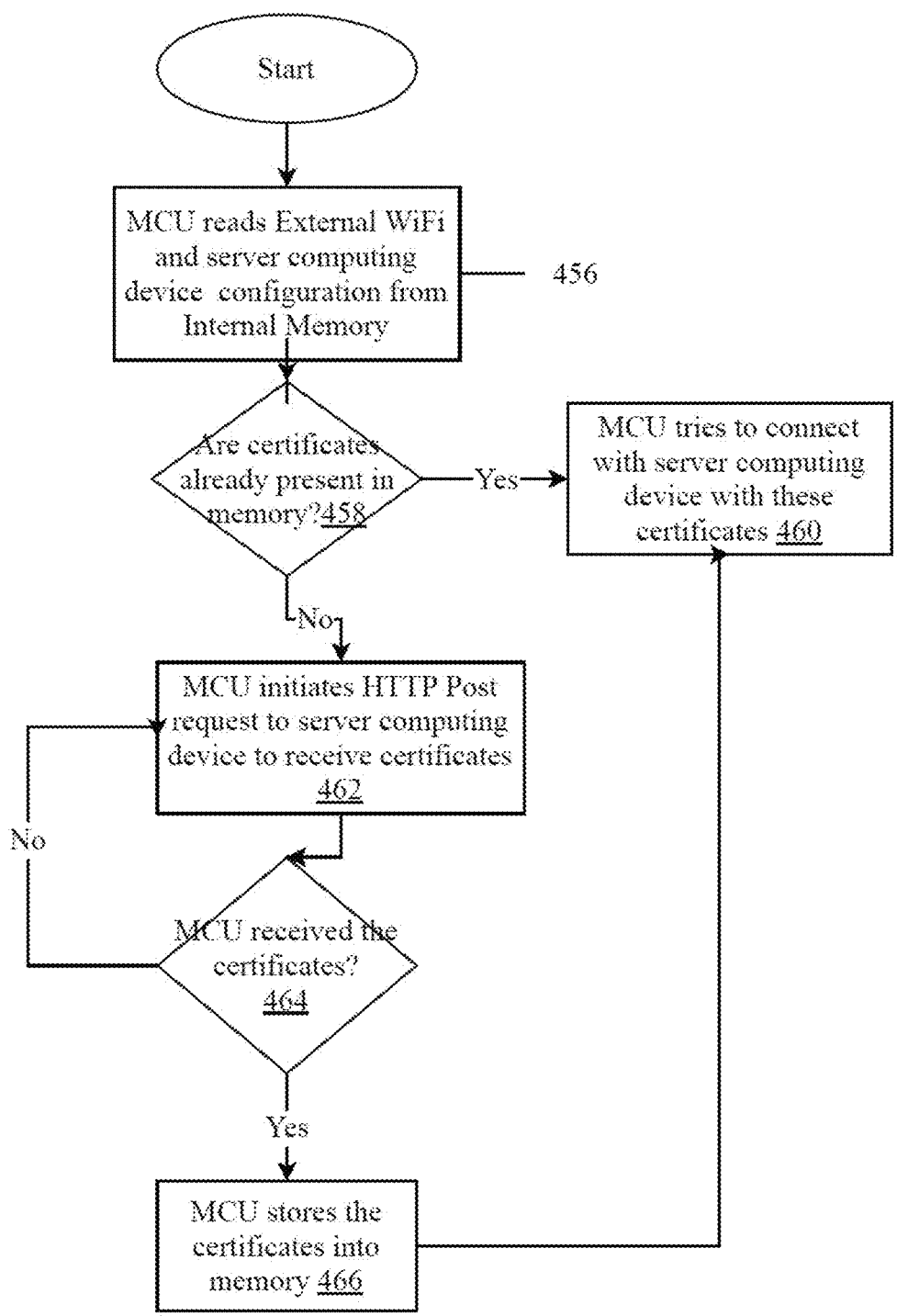
Figure 11H:
Figure 11I:

FIGS. 11A-1 to 11I are non-limiting, exemplary illustrations of a setup process of inventory monitoring system 204, ultimately enabling intelligent shelf 202 to communicate with server computing device 140 via Internet/Network 104 in accordance with one or more embodiments of the present invention.

FIG. 11A-1 is a non-limiting, exemplary illustrations of a display logic 214 of inventory application 110 for setup of intelligent shelf 202, while FIGS. 11A-2 and 11A-3 are a non-limiting, exemplary illustrations of sensory logic 216 of the inventory application 110 of a process for placing intelligent shelf 202 into Access Point mode to allow Internet-enabled mobile computing devices 108 to directly communicate with intelligent shelf 202 to enable shelf 202 to communicate with server computing device 140 via an external Wi-Fi (e.g., standard home or business router/WiFi).

At this stage, it is assumed that intelligent shelf 202 is plugged into power and that power and data communications hub 112 of intelligent shelf 202 is powered ON. Prior to taking any further actions on display logic 214, power and data communications hub 112 of intelligent shelf 202 must be placed into Access Point Mode of operation, which is detailed in FIGS. 11A-2 and 11A-3.

As illustrated in flowchart diagram of FIGS. 11A-2 and 11A-3, default operational mode of hub MCU 376 of power and data communication hub 112 of intelligent shelf 202 is Station Mode of operation (functioning as a "client device") 418. Pressing actuator button 348 for a predetermined duration (operation 420) would switch the operational mode of hub MCU 376 from Station Mode to Access Point Mode of operation.

At operation 422, hub MCU 376 determines if actuator 348 has been pressed for a first duration (e.g., 5 seconds or longer) and if so, at operation 424 hub MCU 376 switches from Station Mode to Access Point Mode of operation. If actuator 348 is pressed for a second duration (operation 426), power and data communications 112 reboots at operation 428.

Once switched to Access Point Mode of operation 424, power and data communications hub 112 functions or acts as a "HTTP server" and waits for data/connection from client device 430, which in this instance, is the Internet-enabled mobile computing device 108. At operation 432 hub MCU 376 checks for new client connection and if connected 434, checks for data packets from client device at operation 436, and reads data packets and store at operation 438 until the final data packet is received (operations 440 and 442). Thereafter, hub MCU 376 determines if the received command was a reboot command at operation 444.

As indicated, Access Point Mode operation 430 of power and data communications hub 112 enables intelligent shelf 202 to receive instructions (data packets) directly from Internet-enabled mobile computing device 108 using internal Wi-Fi 400 of intelligent shelf 202. In other words, at this stage, power and data communications hub 112 of intelligent shelf 202 acts as a "hot spot" for direct communication with Internet-enabled mobile computing device 108. Stated otherwise, Internet-enabled mobile computing device 108 is communicatively linked with the internal Wi-Fi 400 of hub MCU 376 of power and data communications hub 112 of intelligent shelf 202.

Referring back to FIG. 11A-1, Menu Bar GUI 446 in FIG. 11A-1 may be selected to display a menu GUI 448 shown in FIG. 11B, where PantryOn System selection GUI 450 may be selected to commence communication with intelligent shelf 202. Selecting the PantryOn System selection GUI 450 renders Add New System GUI displayed 452 in FIG. 11C. Selecting PLUS GUI icon 454 commences a setup wizard for associating a new intelligent shelf 202 with account on server computing device 140 that is associated with the Internet-enabled mobile computing device 108, and connecting the same to home WiFi (shown in FIGS. 11D to 11I).

In the non-limiting, exemplary instance, the setup wizard of display logic 214 inventory application 110 will request that the new intelligent shelf 202 be provided with an identification (a name such as "Sam's New Kitchen"). The remaining FIGS. 11D to 11I are well-known conventional processes that cause the new intelligent shelf 202 to connect to a home/business WiFi and hence, to server computing device 140 in well known, conventional processes.

As illustrated in FIGS. 11D to 11I, home or business based WiFi information such as a username and password are directly programmed into power and data communications hub 112 of the new intelligent shelf 202 (operation 438 shown in FIG. 11A-2). Next, as with other conventional systems, time zone or other information may also be programmed into power and data communications hub 112 (FIG. 11F). FIG. 11G-1 is a non-limiting, exemplary illustration that shows that actual programming in progress of power and data communications hub 112 (operation 442 shown in FIGS. 11A-2 and 11A-3).

FIG. 11G-2 is a non-limiting, exemplary flowchart of sensory logic 216 of process for connection of the power and data communications hub 112 with external WiFi and server computing device 140 (shown as only a "progress bar" in FIG. 11G-1 of display logic 214). As illustrated in FIG. 11G-2, at operation 456 hub MCU 376 retrieves external WiFi and server computing device 140 configurations (e.g., addresses, certification, etc.) received from Internet-enabled mobile computing device 108 (FIGS. 11A-2 and 11A-3).

At operation 458, MCU 376 determines if certificates for external WiFi and server computing device 140 are present in data storage 384, and if so, hub MCU commences connecting with server computing device 140 via an external WiFi at operation 460 using the existing certificates. If no certificates exist in the data storages 384, hub MCU 376 initiates HTTP Post request to server computing device 140 to receive certificates at operation 462, and upon receipt (operation 464), stores certificate in memory (operation 466).

As illustrated in FIG. 11H and indicated above, Internet-enabled mobile computing device 108 is communicatively linked with the internal WiFi 400 of power and data communications hub 112 of intelligent shelf 202 to program power and data commutations hub 112 to connect to a home/business WiFi and hence, server computing device 140. Since the programming is complete and power and data communications hub 112 of intelligent shelf 202 is connected to a selected external WiFi and server computing device 140 (as of FIG. 11H), Internet-enabled mobile computing device 108 itself must now be switched back from power and data communications hub 112 WiFi 400 to home or external WiFi. This may be accomplished automatically or by simply selecting complete setup GUI icon shown in FIG. 11H.

As shown in FIG. 11I, Internet-enabled mobile computing device 108 fully recognizes the new Intelligent shelf 202 (named "Sam's New Kitchen") where both Internet-enabled mobile computing device 108 and intelligent shelf 202 may now be communicatively linked through server computing device 140 via home WiFi. Accordingly, FIGS. 11A-1 to 11I are methods of reconfiguration of power and data communications hub 112 of intelligent shelf 202 to connect to an account of server computing device 140 through an external home/business Router/WiFi that is associated with Internet-enabled mobile computing device 108.

As shown in FIG. 11I, selecting Sam's New Kitchen intelligent shelf 202 GUI icon will enable Sam's New Kitchen intelligent shelf 202 to transmit all its data using power and data communications hub 112 to server computing device 140, including, for example, the total number of weight sensor modules 230 of one or more intelligent shelves 202 and or 364 associated with power and data communications hub 112 of Sam's New Kitchen intelligent shelf 202. In other words, selecting Sam's New Kitchen intelligent shelf 202 GUI icon 468 in FIG. 11I displayed on Internet-enabled mobile computing device 108 instructs server computing device 140 to request all relevant information about Sam's New Kitchen intelligent shelf 202 directly from Sam's New Kitchen intelligent shelf 202.

Figures 1, 12A:
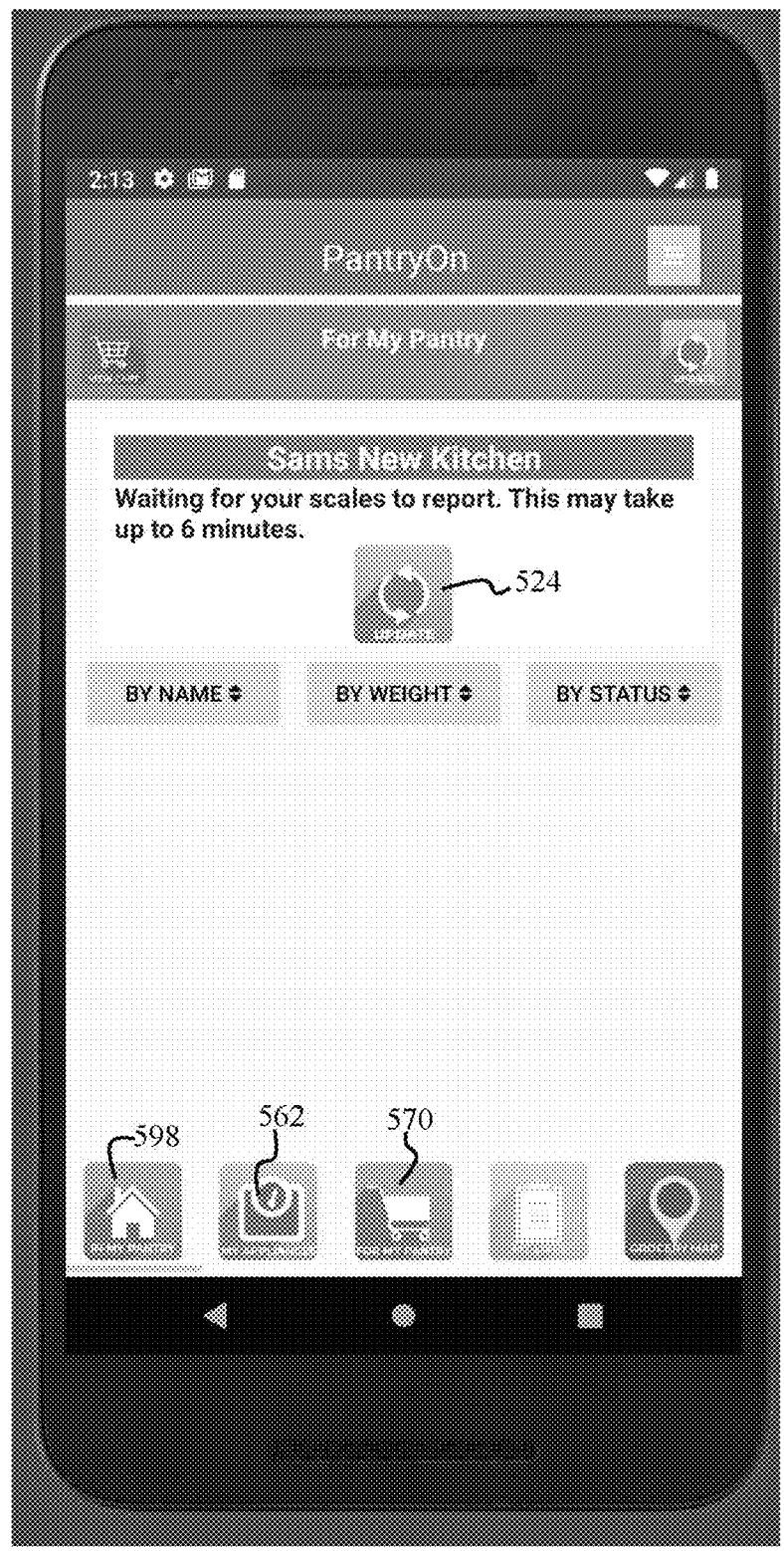
Figures 2, 12A:
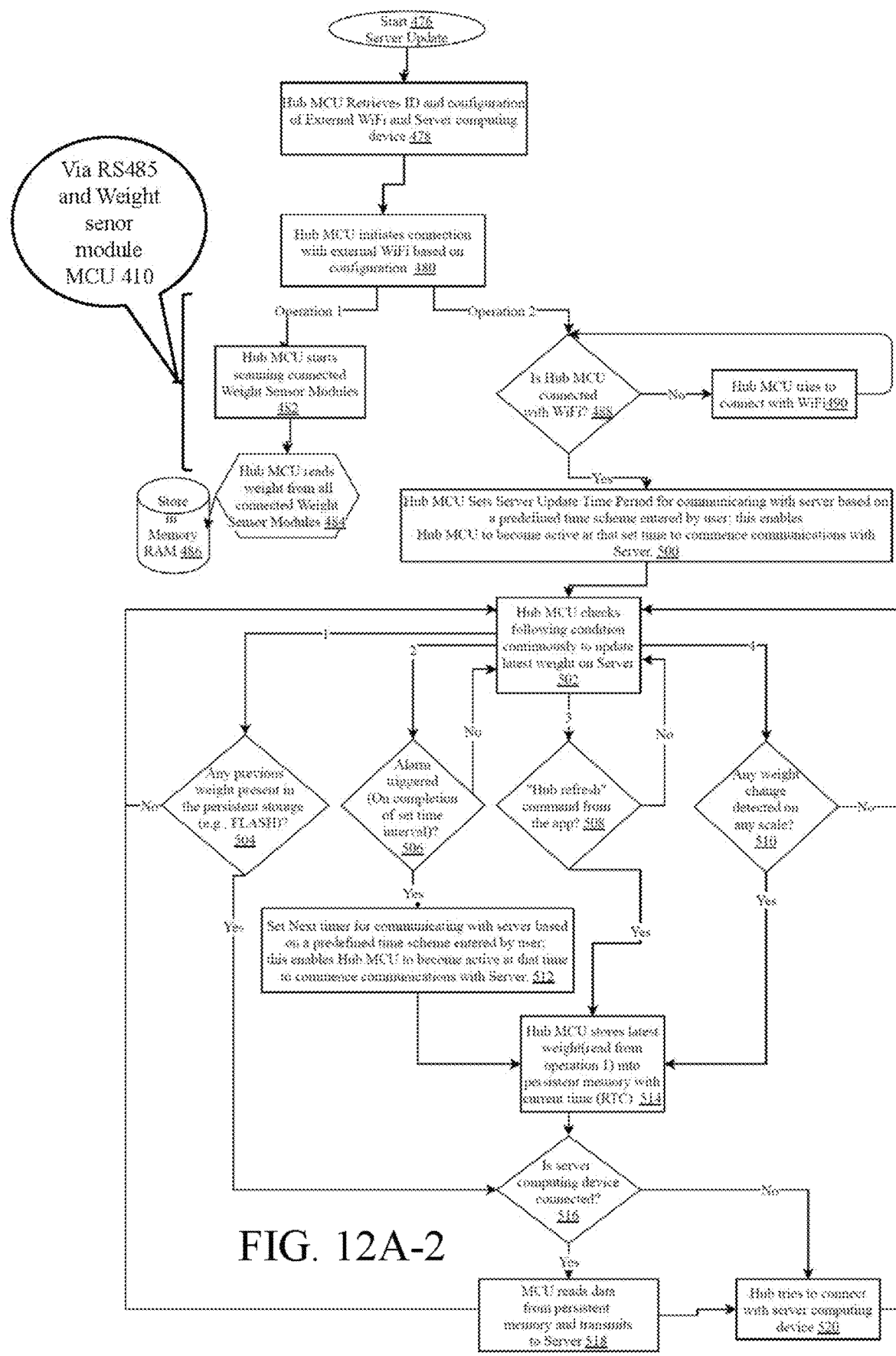
Figures 3, 12A:
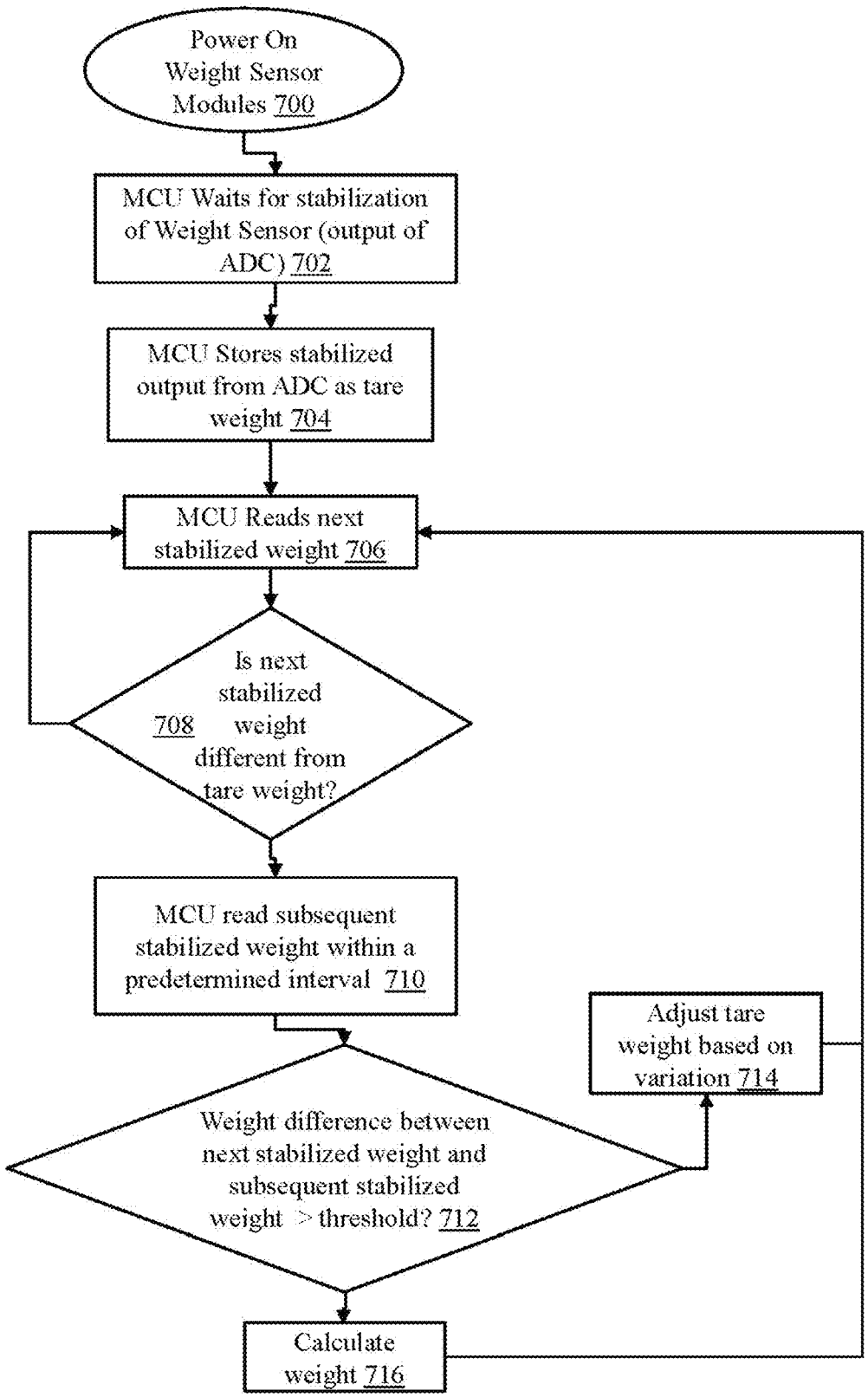

FIG. 12A-1 to 12A-3 are non-limiting exemplary illustrations of respective display logic 214 and sensory logic 216 for a process of updating server records 190 of server computing devices 140 by intelligent shelf 202 in accordance with one or more embodiments of the present invention.

As illustrated by the update GUI 524 display logic 214 shown FIG. 12A-1, it may take a short time for firmware (shown in FIGS. 12A-2 and 12A-3) residing within Sam's New Kitchen intelligent shelf 202 to first recognize the number of weight sensors associated with hub 112 and also, fully update server records 190 with any information related to weight sensor modules 230, including any weights measured. Non-limiting, non-exhaustive listing of data transmitted from Sam's New Kitchen intelligent shelf 202 (the power and data communications hub 112) to server computing device 140 for recording in server records 190 may include the number of weight sensor modules, the number of weight sensors, etc.

The server update function 476 of MCU 376 of hub 112 is shown in flow diagram of FIG. 12A-2, and the actual weight measurement process is shown in flow diagram 12A-3. FIG. 12A-2 is a non-limiting, exemplary flow diagram that details the method for updating of server records by power and data communications hub in accordance with one or more embodiments of the present invention.

As illustrated in FIG. 12A-2, to update server records 190 of server computing device 140, at operation 478 hub MCU 376 retrieves configuration of external WiFi and server computing device 140 from data storage unit 384. This may include, passcodes, certifications, etc. (best shown in FIG. 11G-2).

At operation 480, hub MCU 379 initiates connection with the external WiFi based on the configuration retrieved. Thereafter, hub MCU 376 commences scan operations (operation 1) of weight sensor modules 230 and also commences server communications operations (operation 2) based on certain criteria that are detailed below.

As illustrated, scan operation of hub MCU 376 (operation 1) is comprised of operation 482 that includes hub MCU 376 continuously scanning and identifying connected weight sensor modules 230 to determine the number of weight sensor modules 230 connected. In this non-limiting, exemplary instance, communication of data between weight sensor modules 230 and that of hub MCU 376 may be achieved by RS485 (FIGS. 9I, 9J, and 9P) at predetermined intervals (for example, every 5 seconds or a minute, etc.).

At operation 484 hub MCU 376 continuously reads weight measurements from connected weight sensor modules 230 at the predetermined intervals. Actual methods for measurements of weights by weight sensor modules 230 is provided in detail below with respect to FIG. 12A-3.

At operation 486 hub MCU 376 continuously stores weight sensor module 230 information and associated weight measurements into a data storage unit (Random Access Memory-474) at the predetermined intervals.

Server communications operation of hub MCU 376 (operation 2) is comprised of hub MCU 376 determining at operation 488 if it is connected with external WiFi. If hub MCU 376 determined that external WiFi connection is established, Hub MCU 376 at operation 500 sets server update time period for commencement of communications with server computing device 140 based on a predefined time scheme (or schedule) defined by user, which enables hub MCU 376 to switch to active mode (from sleep mode) at that set time to commence communications with server computing device 140.

At operation 502 hub MCU 376 continuously monitors conditions for updating server computing device 140 with latest weight measurements from weight sensor modules 230, with monitoring conditions comprising, operation 504 wherein hub MCU 376 monitors persistent storage (e.g., FLASH 368) and determines if any previous weight reading are present in persistent storage 368. If hub MCU 376 determines that persistent storage 368 includes information related to weight sensor module 230 (including latest weight measurements), hub MCU 376 transmits all such information to server computing device 140 (operations 516 and 518). This action ensures that the latest information saved in persistent storage 368 is communicated with server computing device 140 as the first action during established communication between hub 112 and server computing device 140.

At operation 506, hub MCU 376 monitors set server updated time period to determine if it is time to transmit updated data to server computing device 140, if so, hub MCU 376 at operation 512 sets next timer for communicating with server computing device based on a predefined time scheme (or schedule) entered by user. This updates operation 500 and enables hub MCU 376 to switch to active mode at that set time to commence communications with server computing device.

At operation 514 hub MCU 376 stores latest weight sensor module 230 and weight information (read from operation 1 and stored into a RAM 474) with RTC time 404 into persistent storage 368, and transmits the same to server computing device 140 (operations 516 and 518).

At operation 508 hub MCU 376 monitors hub refresh command entered by display logic 214 and communicated with hub 212 via server computing device 140. Hub refresh command is a user input via logic display 214 that forces hub 112 (via server computing device 140) to update server record 190 by the above discussed operations 514, 516 and 518.

At operation 510 hub MCU 376 monitors weight change detected on any weight sensor module 230, and if there is a change, hub MCU 376 executes operations 514, 516, and 518. Operation 520 is executed when connection with server computing device 140 by hub MCU 376 is not successful.

As indicated above, actual operations for measurements of weights by weight sensor modules 230 is shown in weight measurement flow diagram of FIG. 12A-3, which is executed by circuitry of weight sensor modules 230 (shown in detail in FIGS. 9P to 9T). Therefore, at operation 484 (FIG. 12A-2) hub MCU 376 receives the final weight measurement from weight sensor modules 230 in accordance with operations shown in flow diagram of FIG. 12A-3.

FIG. 12A-3 is a non-limiting, exemplary flow diagram related to actual weight measurement in accordance with one or more embodiments of the present invention. Referring to FIG. 12A-3, to measure a weight of an item 106 with accuracy in accordance with one or more embodiments of the present invention, tare weight of a weight sensor 406 must be determined and weight sensor 406 itself must be calibrated.

The determination of initial tare weight value of weight sensors 406 and calibration process of weight sensors 406 may be accomplished during manufacturing of weight sensor modules 230. It should be noted that as detailed below, subsequent tare weight values may be determined continuously throughout the use of the inventory monitoring system 204.

Weight sensor module MCU 410 (FIG. 9T) determines the initial tare weight of weight sensor 406 by receiving a stabilized digitized weight value from weight sensor module ADC 408 (FIG. 9Q) and stores the stabilized weight value as the tare weight within storage 522.

When the weight sensor modules 230 are first powered ON (operation 700, FIG. 12A-3), applied excitation voltages E+/E− to load cells 354 of weight sensor 406 and resulting potential thermally induced errors of strain gauge may provide unstable weight values (in analog) to weight sensor module ADC 408, resulting in unstable ADC weight value outputs (in digital) to the weight sensor module MCU 410.

Additionally, placing an item 106 onto a weight sensor 406 may also temporarily generate unstable mechanical strain on the strain gauge that may require a short time to stabilize. Accordingly, weight sensor module MCU 410 waits a predetermined interval until weight sensor 406 outputs and hence, weight sensor module ADC 408 outputs are stabilized. The finally received stabilized weight value from weight sensor module ADC 408 is stored by weight sensor module MCU 410 as the tare weight.

After determining the tare weight, weight sensors 406 must be calibrated. Weight sensors 406 may be calibrated during manufacturing process and may be achieved by placing a known weight on weight sensor 406, and reading the measurement. Calibration of weight sensors 406 are well known. Nonetheless, weight sensor module MCU 410 stores the received output of the calibration operations as calibration weight.

At this stage, weight sensor module MCU 410 has stored both the tare weight and the calibration weight in data storage unit 522 and hence, weight sensor modules 230 are ready for weight measurements.

As indicated above, tare weight values are determined continuously throughout the use of the inventory monitoring system 204 and hence, when weight sensor modules 230 are powered ON (operations 700), weight sensor module MCU 410 determines a tare weight of a weight sensor 406 by receiving a stabilized weight value (operation 702) from weight sensor module ADC 408 and stores the stabilized weight value as the tare weight (operation 704).

Thereafter operation 704, weight sensor module MCU 410 at operation 706 receives a next stabilized weight value from weight sensor module ADC 408, and determines if the next stabilized weight value is different from the tare weight at operation 708.

If at operation 708 weight sensor module MCU 410 determines that the next stabilized weight value is different from the tare weight, the weight sensor module MCU 410 at operation 710 receives a subsequent stabilized weight value within a predetermined interval (weight sensor module MCU 410 waiting for a stable subsequent weight value).

At operation 712 weight sensor module MCU 410 determines if a difference between the subsequent stabilized weight value and next stabilized weight value received is greater than a predetermined threshold. As a non-limiting example, the predetermined threshold may be determined by the difference between calibration weight and tare weight.

If at operation 712 the weight sensor module MCU 410 determines that the difference (next weight value−subsequent weigh value) is less than the predetermined threshold, weight sensor module MCU 410 at operation 714 adjusts the stored tare weight based on the determined variation. For example, the small difference may be due to thermally induced error or mechanical strain on the strain gauge. The adjustment may be accomplished by:

$$\text{Error} = \text{next stabilized weight value} - \text{subsequent stabilized weight value}$$

$$\text{New tare weight} = \text{tare weight} - \text{Error}$$

If weight sensor module MCU 410 at operation 712 determines that the difference is greater than the predetermined threshold, the weight sensor module MCU 410 at operation 716 determines a weight of an item 106. The weight of item may be determined by:

$$\text{Current Weight} = \text{subsequent stabilized weight value} - \text{tare weight}.$$

This current weight value is reported via RS485 412 (FIG. 9P) to hub RS485 (FIGS. 9J and 9I) to hub MCU 376 (operation 484 and 486 shown in FIG. 12A-2).

Figure 12B:
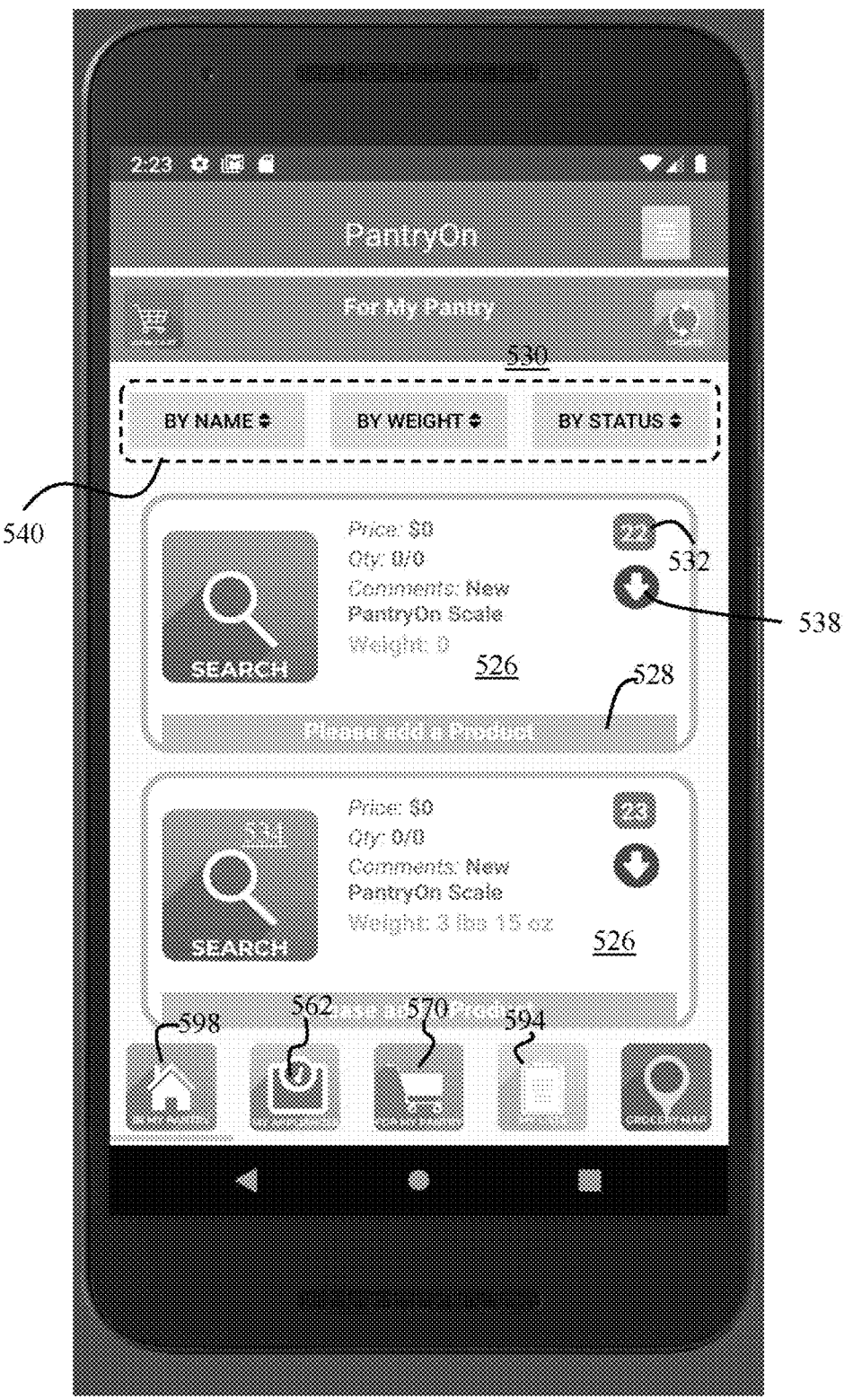

Referring next to FIG. 12B, once all server records 190 are updated, server computing device 140 renders details of Sam's New Kitchen intelligent shelf 202 profile GUI 530 as shown in FIG. 12B, with each weight sensor module 230 of intelligent shelf 202 rendered and displayed as a weight sensor module GUI icon 526 on Internet-enabled mobile computing device 108. Perimeter 528 color of all weight sensor module GUI icons 526 are grayed out with a message "Please Add A Product" at this stage since no item 106 is placed on Sam's New Kitchen intelligent shelf 202.

A weight sensor module GUI icon 526 may include an identification feature 532 (e.g., numbers 22, 23, etc.) that is associated with a specific ID of a particular weight sensor module 230 of intelligent shelf 202. A weight sensor module GUI icon 526 may further include a search GUI icon 534 that, when selected, would direct users to a search display GUI 536 (FIG. 12C) to search for a desired item 106 (e.g., peanut butter).

A weight sensor module GUI icon 526 may further include last weight reading GUI icon shown by arrow 538 of a particular weight sensor module 230, displaying whether the last weight reading increased or decreased. By default, initially, last weight reading GUI icon 538 may be represented by a red color background with a white, downward pointing arrow. For example, once new item 106 is placed on weight sensor number 22, weight sensor module GUI icon 526 numbered 22 will show a green color background with a white, upward pointing arrow. If there is no weight change detected and there is an updated rendering of the display logic 214 of inventory application 110, weight sensor module GUI icon 526 may show a last weight reading GUI 538 as an equal sign "=" with blue background.

As further illustrated, Sam's New Kitchen intelligent shelf 202 profile GUI 530 also provides filtering or sorting GUI icons 540 that may be used to sort items associated with weight sensor module GUI icon 526 by a variety of methods, including by product name, weight, and status.

The next set of GUI icons shown illustrate the methods for populating intelligent shelf 202. For example, as indicated above, selecting search GUI icon 534 of weight sensor module GUI icon 526 would direct users to a search display GUI 536 (FIG. 12C) to search for a desired item (e.g., peanut butter) in order to purchase that item 106.

Figure 12C:
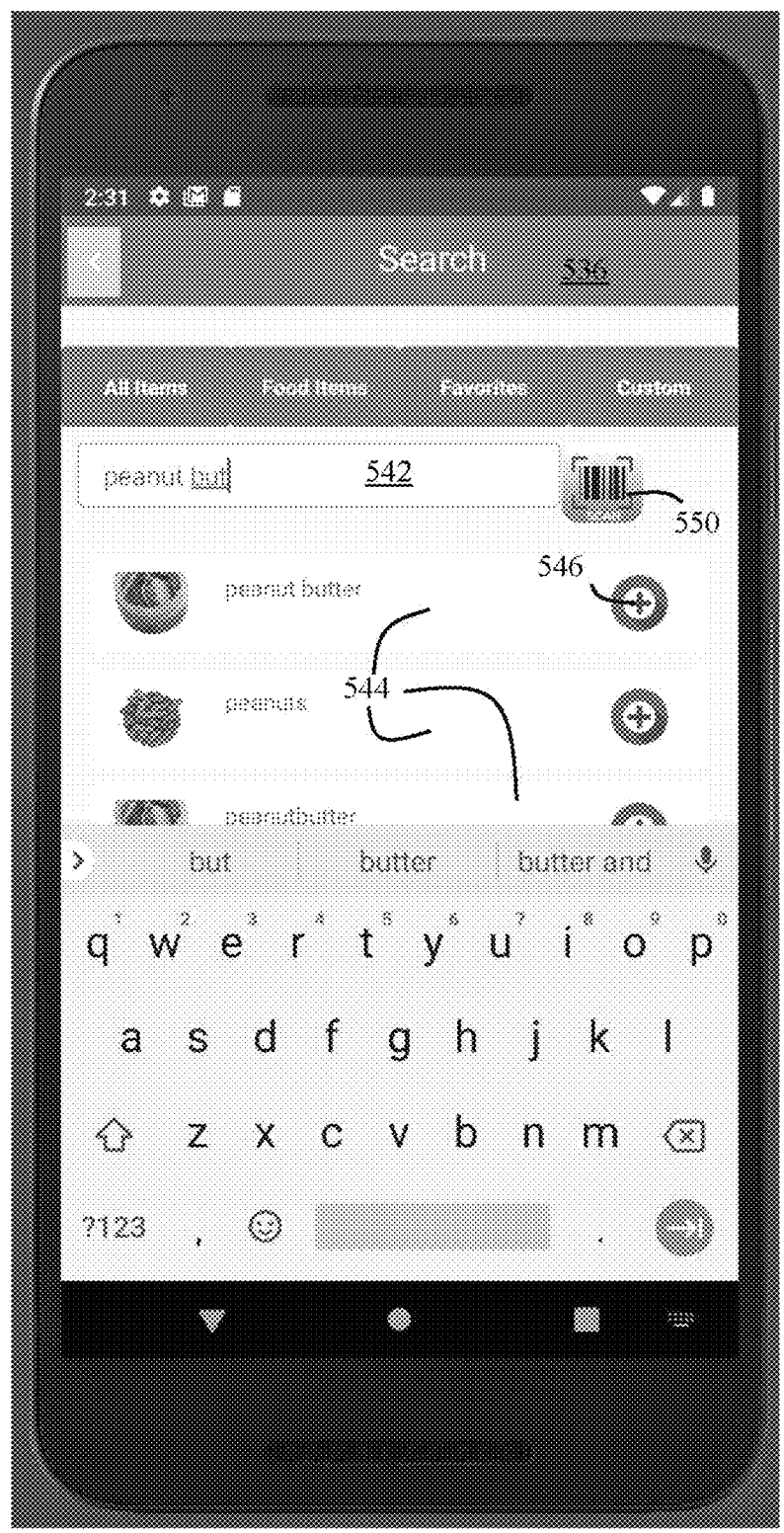
Figure 12D:
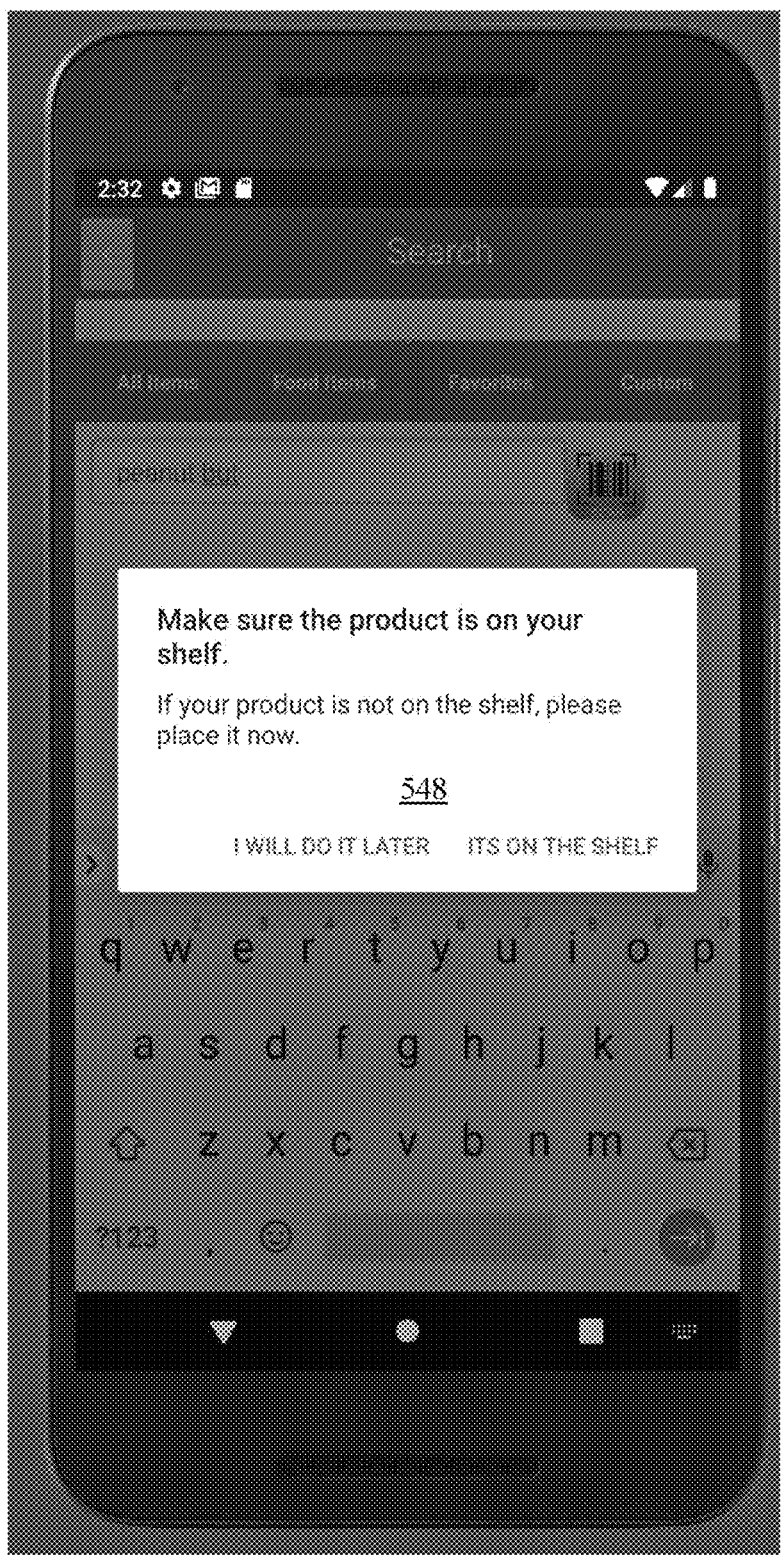

In the non-limiting, exemplary instance, search display GUI 536 of FIG. 12C enables input of a desired item (in this case, "peanut butter") with a search dialog box 542, which would generate search results display 544, any one of which may be selected by selecting an add GUI icon 546. As illustrated in FIG. 12D, once added, inventory application 110 must determine if the selected item 106 is placed on intelligent shelf 202 and hence, the reason for the dialog query GUI 548. For example, a user may purchase an item via display logic 214 of inventory application 110, but has not yet placed the purchased item 106 on a weight sensor module 230 (for example, the purchased item has not been delivered). Placement of selected or purchased item 106 on intelligent shelf 202 enables the initial weight reading of item 106.

As further illustrated in search display GUI 536 of FIG. 12C, instead of searching for an item 106 by text, a user may instead simply tap scan code GUI icon 550 when they are at a store to read a bar code or a QR code associated with item 106.

Figure 12E:
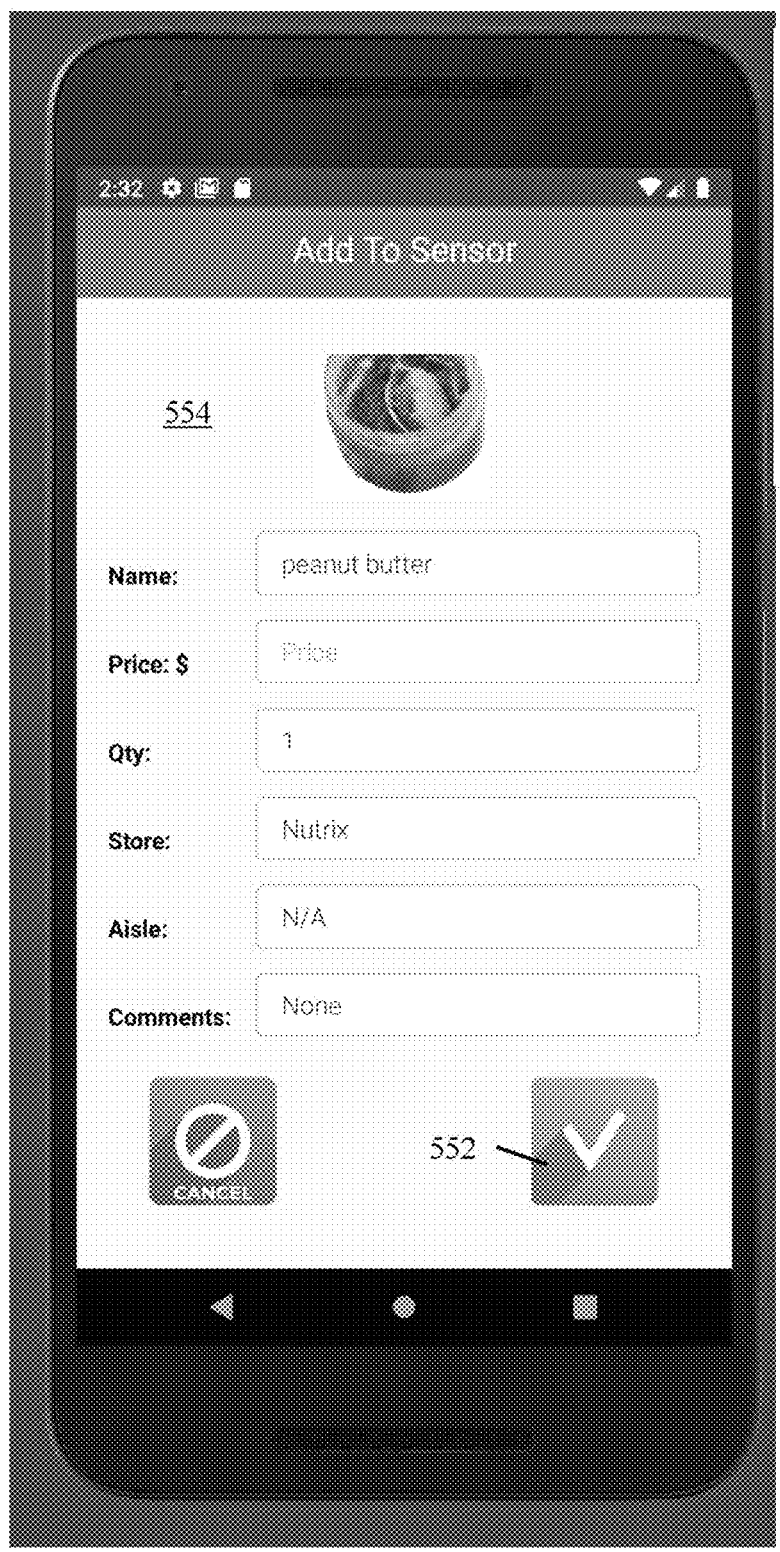

FIG. 12E is a non-limiting, exemplary illustration of an item profile GUI display 554 that provides detailed information about the purchased item 106 (whether by text search or scanning). Selection of a checkmark GUI icon 552 renders product detail display 556, which includes the purchased item associated with a specific weight sensor module GUI icon 526 (in this case one with ID 22) shown in FIGS. 12F-1 and 12F-2.

Figures 1, 12F:
Figures 2, 12F:
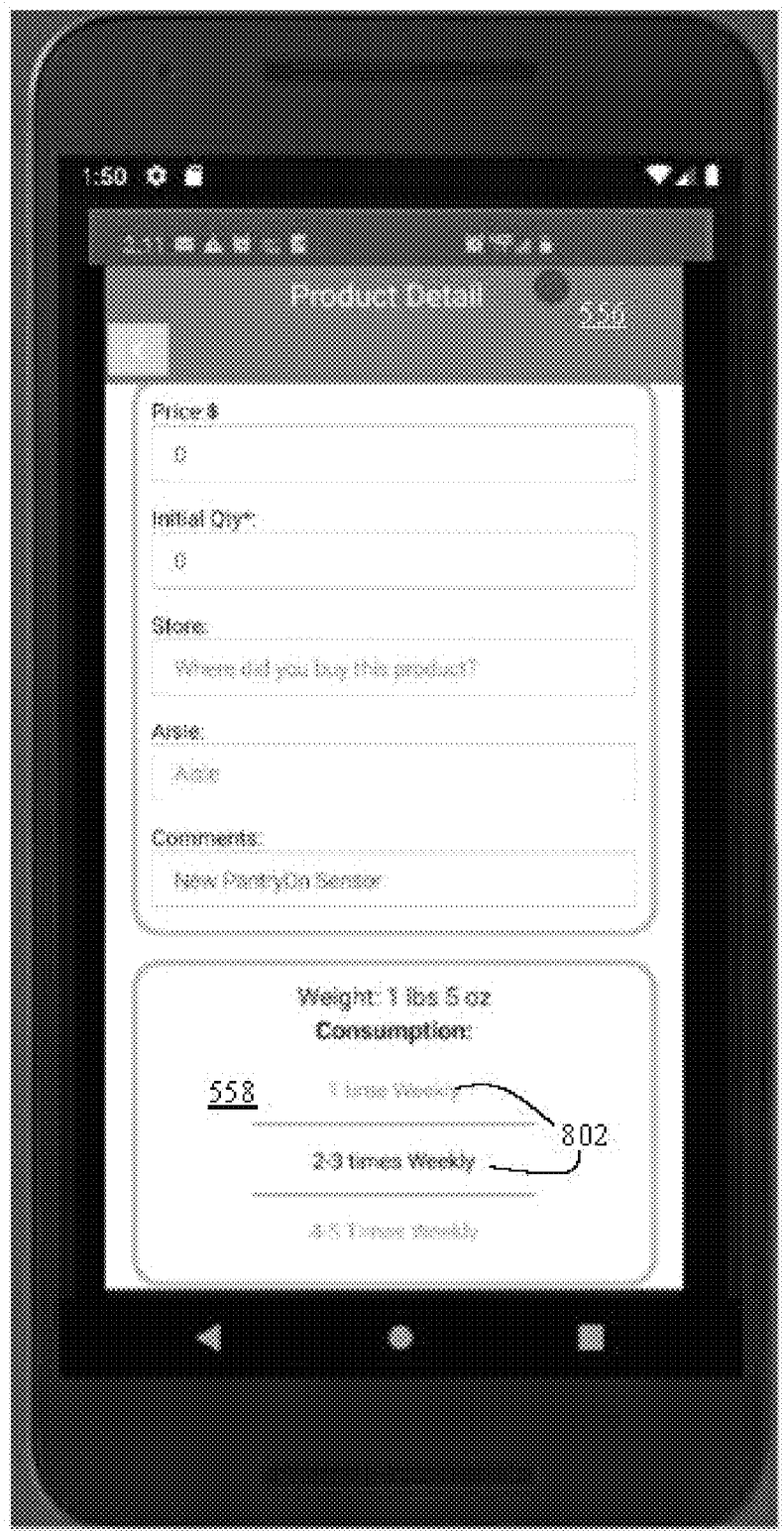

FIGS. 12F-1 and 12F-2 are non-limiting, exemplary illustrations that show that the purchased item is fully recognized and accounted for by server computing device 140 and intelligent shelf 202. FIG. 12F-2 is a non-limiting, exemplary illustration that provides a consumption rate GUI interface 558 that enables user to input the consumption rate of a particular item purchased.

As further detailed below in relation to FIG. 14, data entered into or selected within the consumption rate GUI interface 558 is used by inventory monitoring system 204 to determine the final consumption status of the purchased item (e.g., by display of different colors for weight sensor module GUI 526). Each consumption rate selection GUI 802 (e.g., 1 time a week, or 2-3 times weekly, etc.) is assigned a weighted index by the working logic 212 of inventory application 110, which may be used to determine the final consumption status of the item. End users may easily adjust the consumption rate selection GUI 802 to enable working logic 216 to provide a more accurate consumption status of the item.

Figure 13A:
FIGS. 13A to 13C are non-limiting, exemplary illustrations of variations in GUI indications of the interactive display logic as a purchased item is depleted in accordance with one or more embodiments of the present invention.
Figure 13B:
Figure 13C:
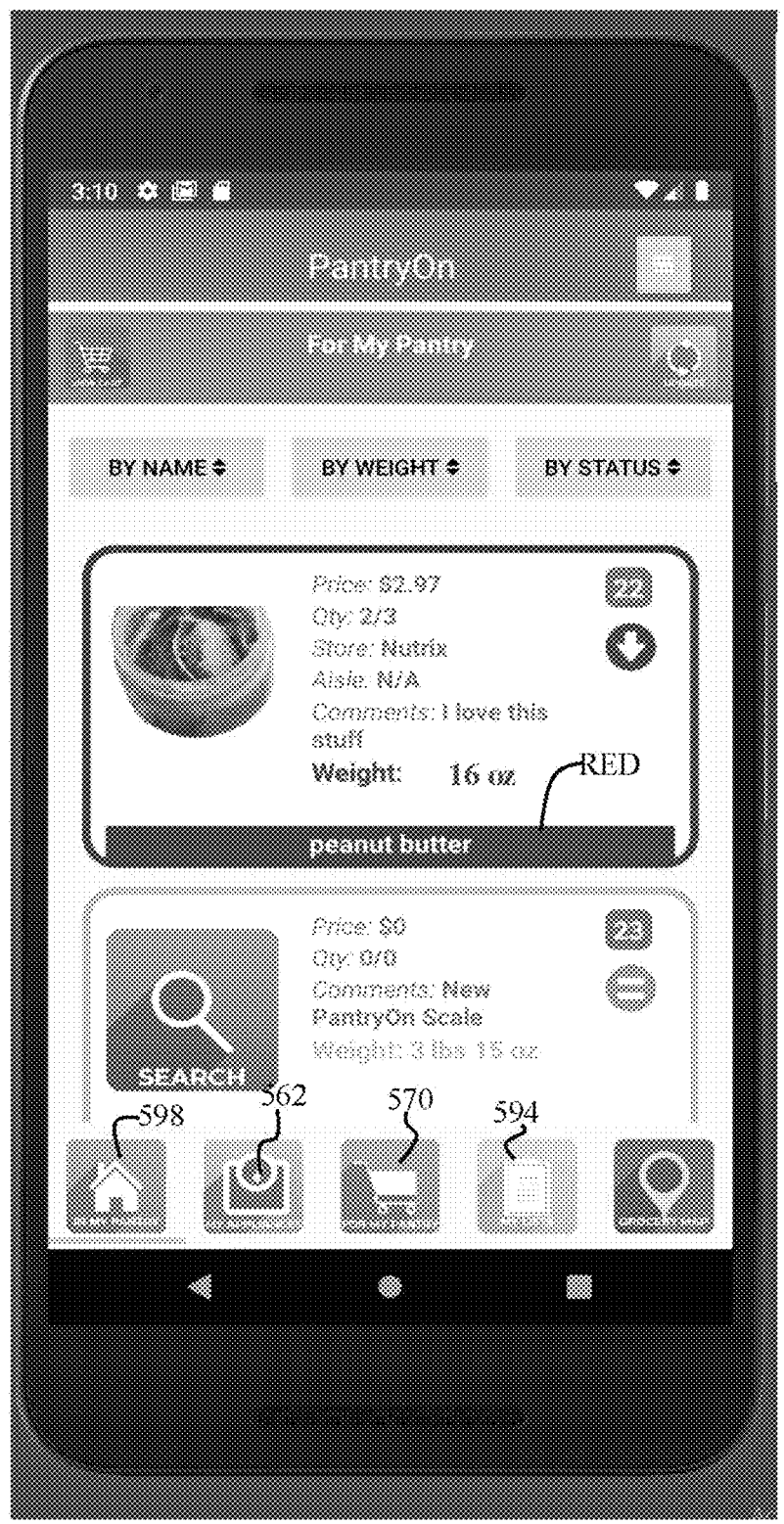

FIGS. 13A to 13C are non-limiting, exemplary illustrations of variations in GUI indications as a purchased item is depleted in accordance with one or more embodiments of the present invention.

In particular, FIG. 13A is a non-limiting, exemplary illustration of Sam's New Kitchen intelligent shelf 202 profile, but with weight sensor module GUI 526 with ID 22 turned green, for example, indicating a new item 106 (or that the item is replenished) with all of the information relevant to the purchased item.

FIG. 13B is a non-limiting, exemplary illustration of Sam's New Kitchen intelligent shelf 202 profile, but with weight sensor module GUI 526 with ID 22 turned orange, for example, indicating a used item 106.

FIG. 13C is a non-limiting, exemplary illustration of Sam's New Kitchen intelligent shelf 202 profile, but with weight sensor GUI 526 with ID 22 turned red, for example, indicating a depleted item 106.

It should be noted that changes to the consumption-status indication of a purchased item changing from new (full, or fully replenished), to used (or near depleted), to depleted may be based on weight, the consumption rate of the item, and/or a combination of both.

Figure 14:
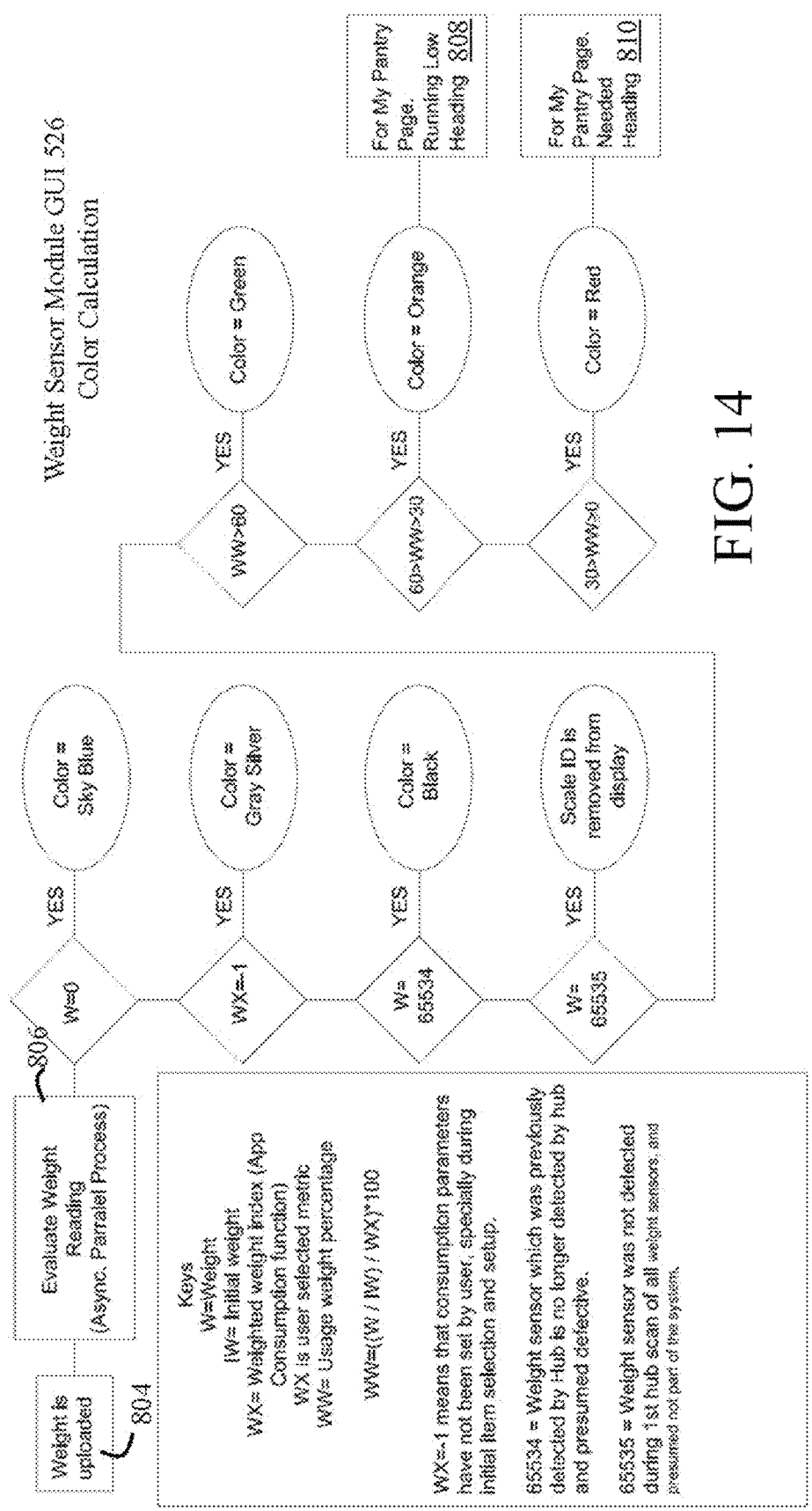
FIG. 14 is a non-limiting, exemplary flowchart illustration of using weighted-index in combination with actual weight to determine consumption-status of an inventoried item in accordance with one or more embodiments of the present invention.

FIG. 14 is a non-limiting, exemplary flowchart illustration of using weighted-index in combination with weight of an item to determine consumption status of an inventoried item in accordance with one or more embodiments of the present invention.

Consumption rate GUIs 802 (FIG. 12F-2) are assigned a weight index (WX), which may be used to determine the final consumption status of an item in view of the actual weight. The actual weight (or current weight) of an item may be provided on a daily basis by intelligent shelf 202 (FIGS. 12A-2 and 12A-3) and input into server records 190 and stored into storage 192. This final weight of the day is used with the weighted-index to determine consumption-status (e.g., full, nearly depleted, depleted).

As illustrated in FIG. 14, working logic 212 of server computing device 140 receives a current weight of an item from intelligent shelf 202 at operation 804, which is then evaluated by working logic 212 (combination of selected consumption rate, current weight, and initial weight) using at operation 806 to determine consumption status of the item.

As indicated above, consumption status of each item associated with a particular weight sensor module 230 is determined by working logic 212 of inventory application 110 as a particular color of a weight sensor module GUI 526 and displayed as shown above by interactive display logic 214.

If current weight W is zero, consumption status for weight sensor module 526 is displayed by interactive display logic 214 as a first color (e.g., Sky Blue), if weighted index (WX) is a negative value, then consumption status for the weight sensor module GUI 526 is displayed by interactive display logic 214 as a second color (e.g., Gray Silver). A negative WX value would mean that the users has not selected a consumption rate 558 (FIG. 12F-2).

If current weight W is equals to a first predetermined number assigned to mean that the weight sensor module 230 detected by power and data communication hub 112 is no longer detected (presuming a defective weight sensor module 230), then consumption status is displayed by interactive display logic 214 as a third color (e.g., Black) for that weight sensor module GUI 526.

On the other hand, if current weight W equal a second predetermined number assigned to mean weight sensor module 230 was not detected during initial hub scan of all weight sensor modules 230 (presuming the weight sensor module 230 was not part of the system), then weight sensor module 230 ID is removed from interactive display logic 214 by working logic 212.

As further illustrated in FIG. 14, if weight consumption percentage is above a first threshold level (e.g., 60%), then consumption status for weight sensor module GUI 526 is displayed by interactive display logic 214 as a "full" color (e.g., Green), shown in FIG. 13A. If weight consumption is above a second threshold level (e.g., 30%), but below first (e.g., 60%), then consumption status for weight sensor module GUI 526 is displayed by interactive display logic 214 as another color (e.g., Orange), shown in FIG. 13B. Weight consumption percentage below second threshold (e.g., 30%) but equal or above 0%) is assigned a depletion color (e.g., Red) for weight sensor module GUI 526 shown in FIG. 13C.

As further detailed below in relation to FIG. 18, as items 106 are used and nearly or fully depleted, the data related to the items are automatically copied to the pantry list GUI display 572 shown in FIG. 17, with a sample of items listed in FIG. 18 at operations 808 and 810 (FIG. 14).

Figure 15:
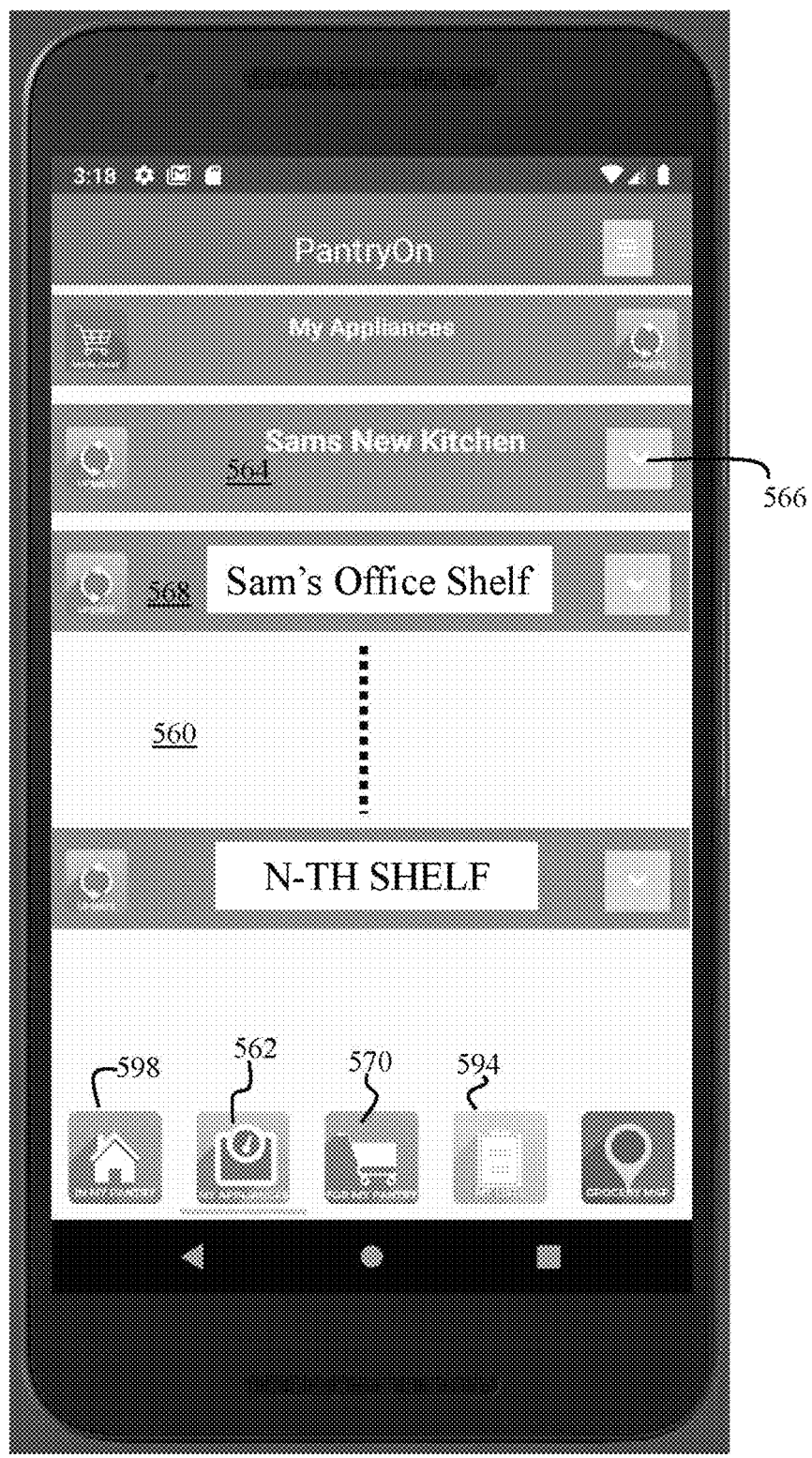
FIGS. 15 to 26 are non-limiting, exemplary illustrations of various functions and operations of interactive display logic of the inventory application in accordance with one or more embodiments of the present invention.

FIG. 15 is a non-limiting, exemplary illustration of appliance listing a number of intelligent shelves associated with an account of a server computing device and displayed by display logic 214 of inventory application 110. Listing of intelligent shelves GUI display 560 of FIG. 15 may be rendered by selection of My Appliances GUI icon 562. It should be noted that the listing is comprised of those intelligent shelves that include a power and communications hub 112. In other words, the listing groups all intelligent shelves 202 based on their respective hubs 112. In this instance shown, Sam's New Kitchen (the intelligent shelf)

Figure 16:

564 may have several concatenated shelves 364 (FIGS. 8A to 8F), all of which may be associated with the main intelligent shelf 202 that has power and data communication hub 112. In this non-limiting, exemplary instance intelligent shelf ("Sam's New Kitchen") 564, Sam's Office Shelf 568, and others "N-th shelf" are the listed appliances. Selection of a pull-down GUI icon 566 associated with any listed intelligent shelf renders all items associated with that shelf a non-limiting, exemplary instance of which is rendered in FIG. 16.

The benefit of such listing is that a first group of shelves with their associated hub may be placed in the office and a second group of shelves with their hub used at home with the same inventory application 110 on the same Internet-enabled mobile computing device 108 keeping track of both. For example, the first group (Sam's New Office shelf 568) may show that it contains office supplies such as paper clips, staples, pens, etc., whereas the second group (Sam's New Kitchen 564) at home may be used to showing that it contains peanut butter, a jar of oil, etc. Accordingly, users need not download the same inventory application 110 when they purchase a new intelligent shelf with its hub.

Figure 17:
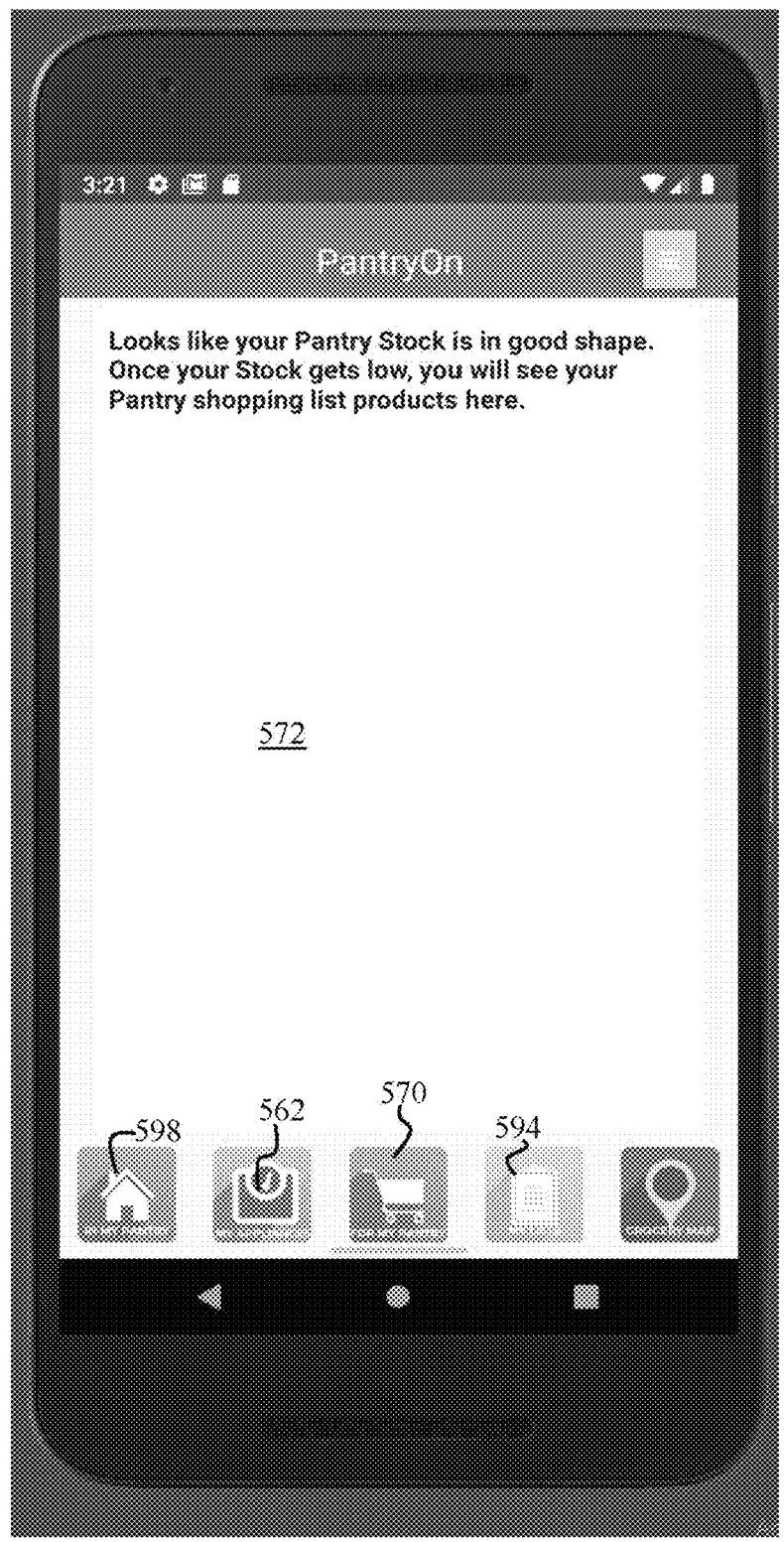

FIG. 17 is a non-limiting, exemplary GUI illustration of a pantry shopping list for populating intelligent shelf (also known as "For My Pantry") in accordance with one or more embodiments of the present invention. As illustrated, selection of the pantry list GUI icon 570 will render the pantry shopping list display 572 as shown in FIG. 17. In this non-limiting, exemplary instance, all items are fully replenished.

Figure 18:

As items 106 are used and near being depleted (FIG. 18), the data related to the items are automatically copied to the pantry list GUI display 572 shown in FIG. 17, with a sample of items listed in FIG. 18. Determination of when an item 106 receives a final status of depleted or near depleted and to be listed on For My Pantry list display 572 is based on final reading of items 106 on intelligent shelf 202, which may be done based on some desired frequency (for example, once a day at 3:00 AM), details of which are provided in relation to FIGS. 12A-2, operations 500 and 512 related to sensory logic 216 of power and data communications hub 112.

Power and data communication hub 112 reads weight sensor modules 230 and provides server computing device 140 with information related to sensed items 106, the statuses (depleted, low, full, etc.) of which are determined by server computing device 140 (FIG. 14A). Thereafter, server computing device 140 provides the list of needed items 106 on pantry list GUI 572 of FIG. 17.

FIG. 18 is a non-limiting, exemplary GUI illustration of a pantry shopping list of items that are depleted for populating intelligent shelf (also known as "For My Pantry") in accordance with one or more embodiments of the present invention. The GUI "Running Low" grouping 574 is a listing of the items that are about to be depleted.

Figure 19A:
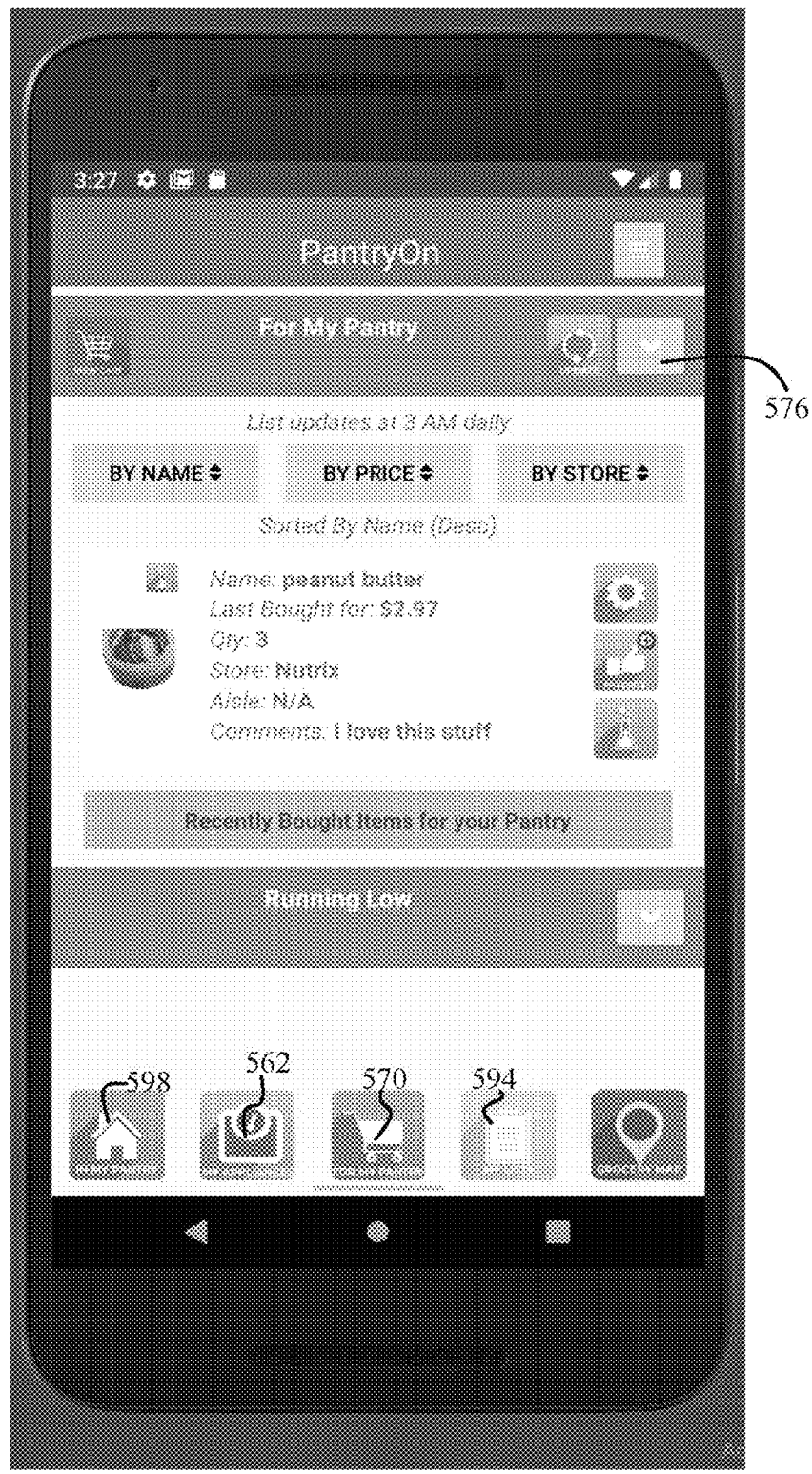
Figure 19B:
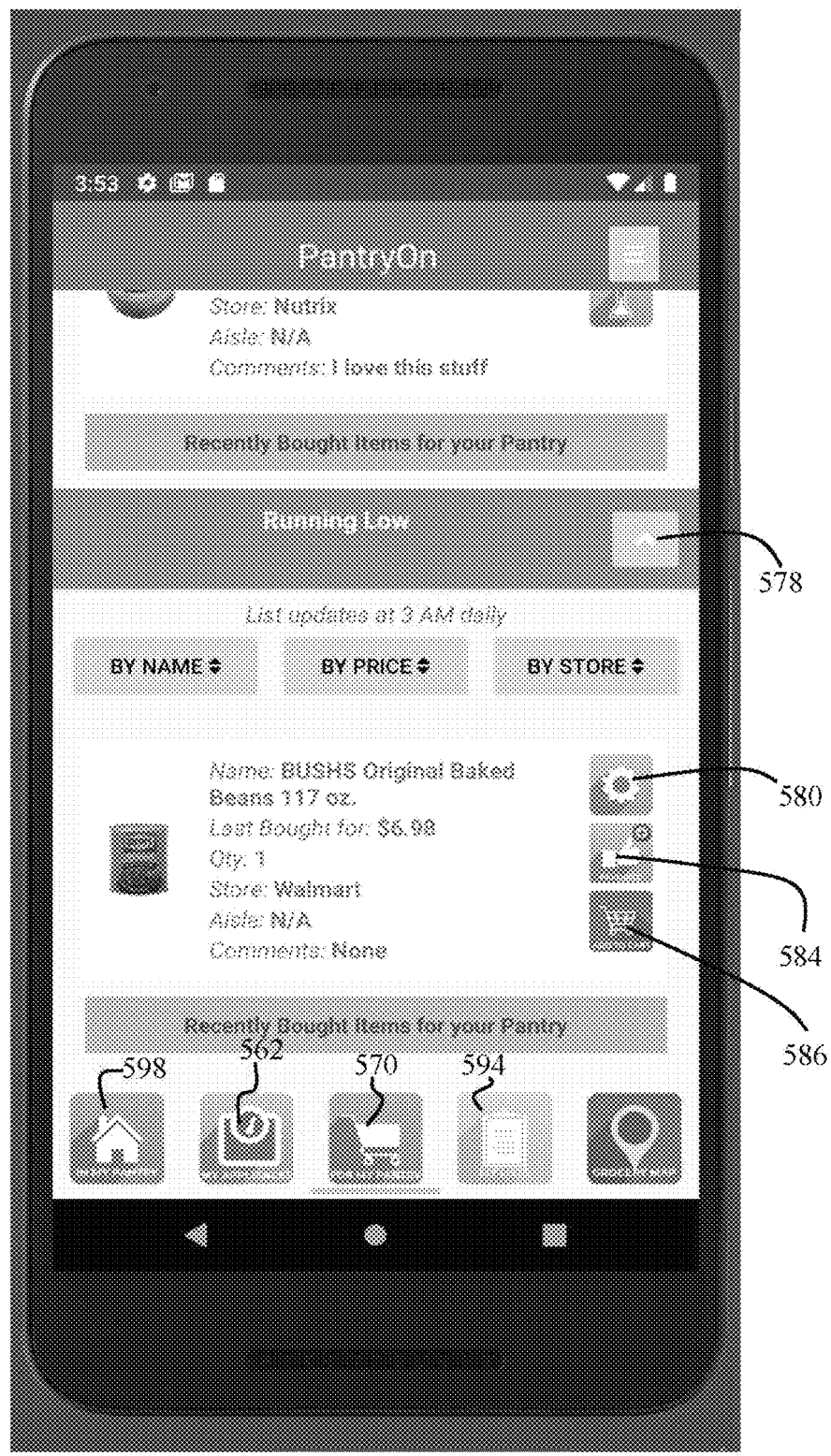

As best shown in FIG. 19A, selecting a pull-down menu GUI 576 of "For My Pantry" GUI will list the items that are depleted. As shown in FIG. 19B, selecting a pull-down menu GUI 578 of GUI "Running Low" will list the items that are about to be depleted.

Figure 19C:
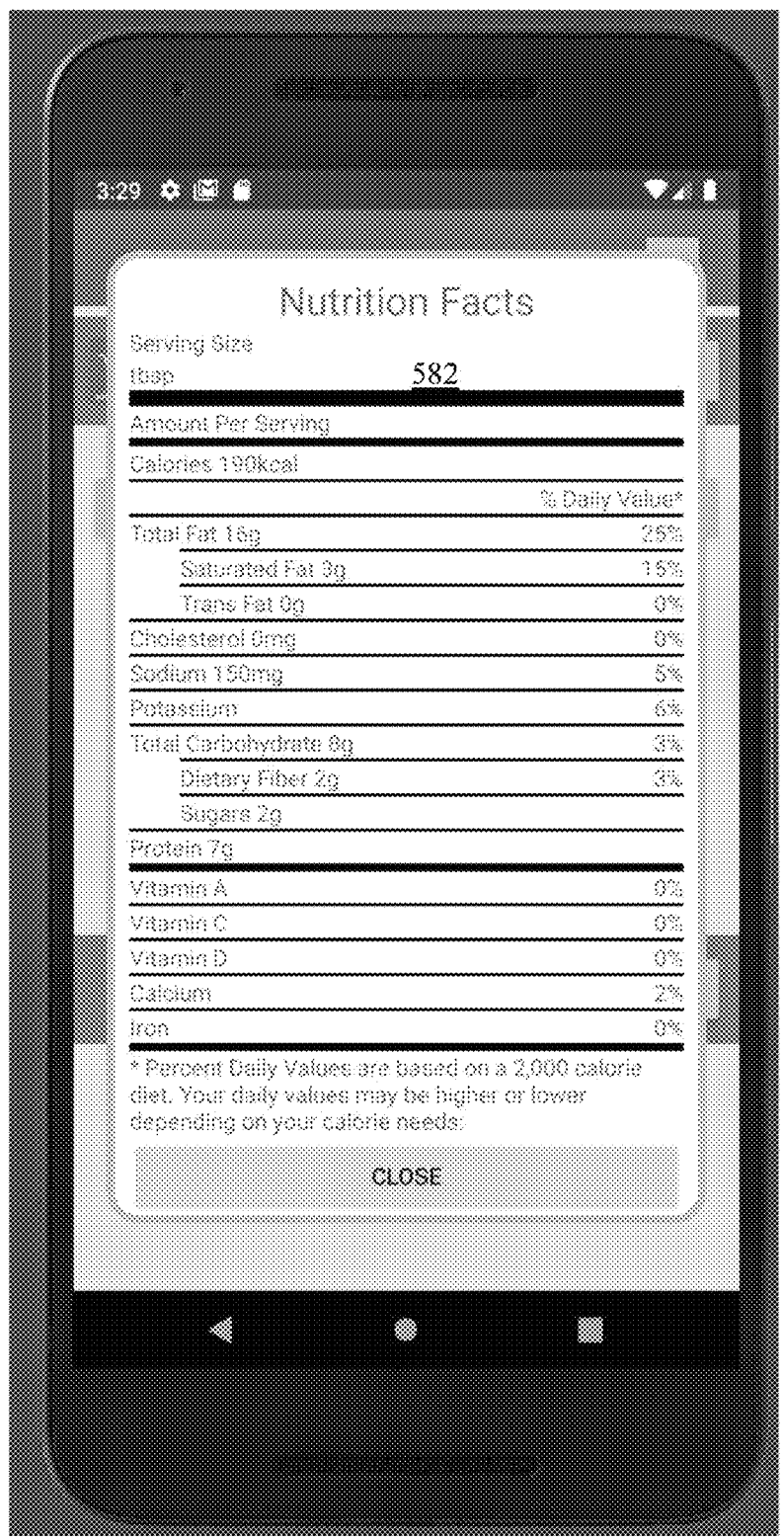

Depleted product GUI icon in the For My Pantry list shown in FIG. 19A includes a nutrition profile GUI icon 580 that, when selected, enable users to see the nutrition profile display 582 of a food item (FIG. 19C). Further included is a favorite GUI icon 584 (FIG. 19B) that tags the product as a favorite, and inserting the item in the favorite list (Depleted product GUI icon is refreshed with favorite GUI icon now removed, FIG. 19D). Further included is a manage product GUI icon 586 (FIG. 19B) that enables online purchase of the product, which when selected renders editable information related to the product illustrated in FIG. 19E.

Figure 19D:
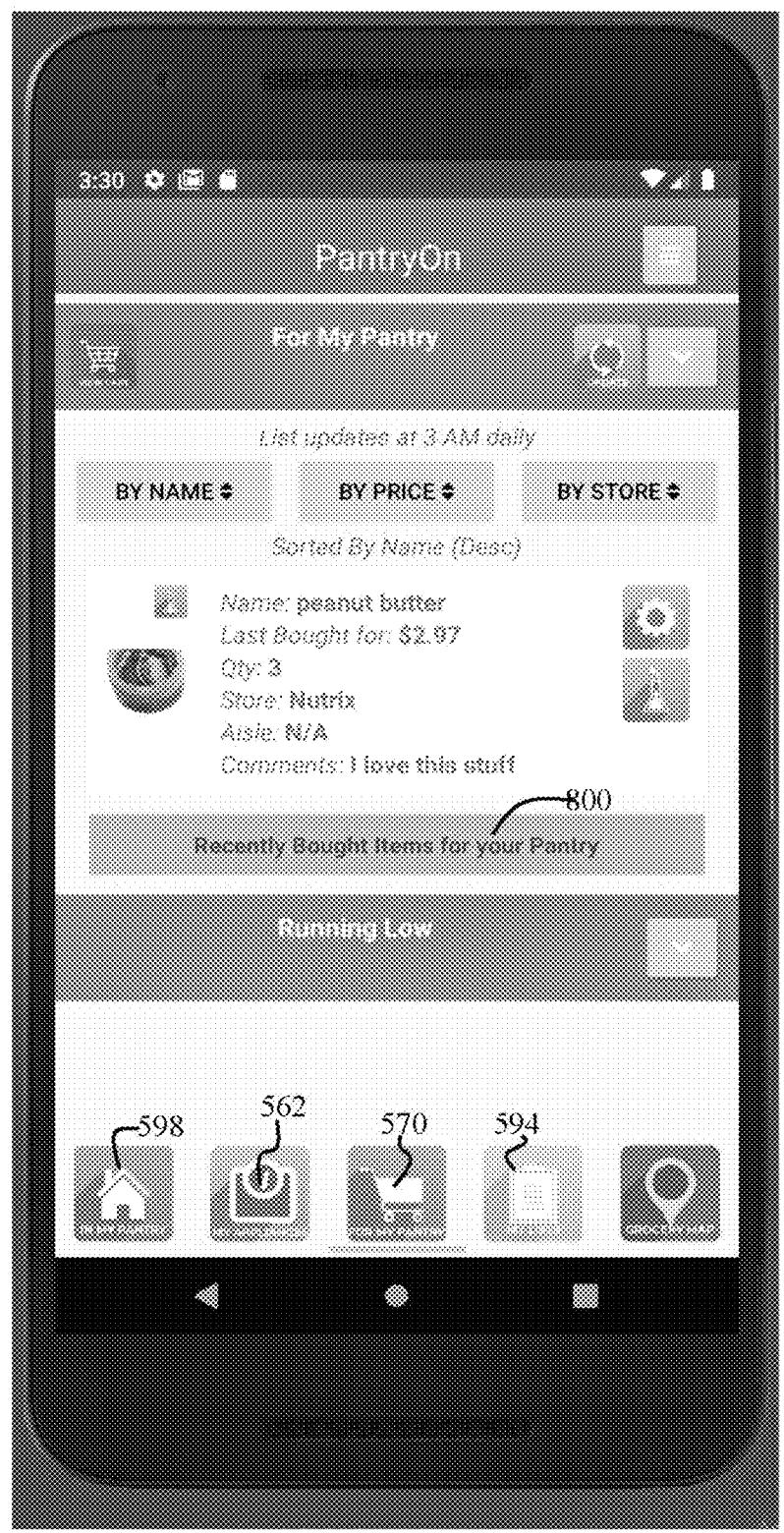
Figure 19E:
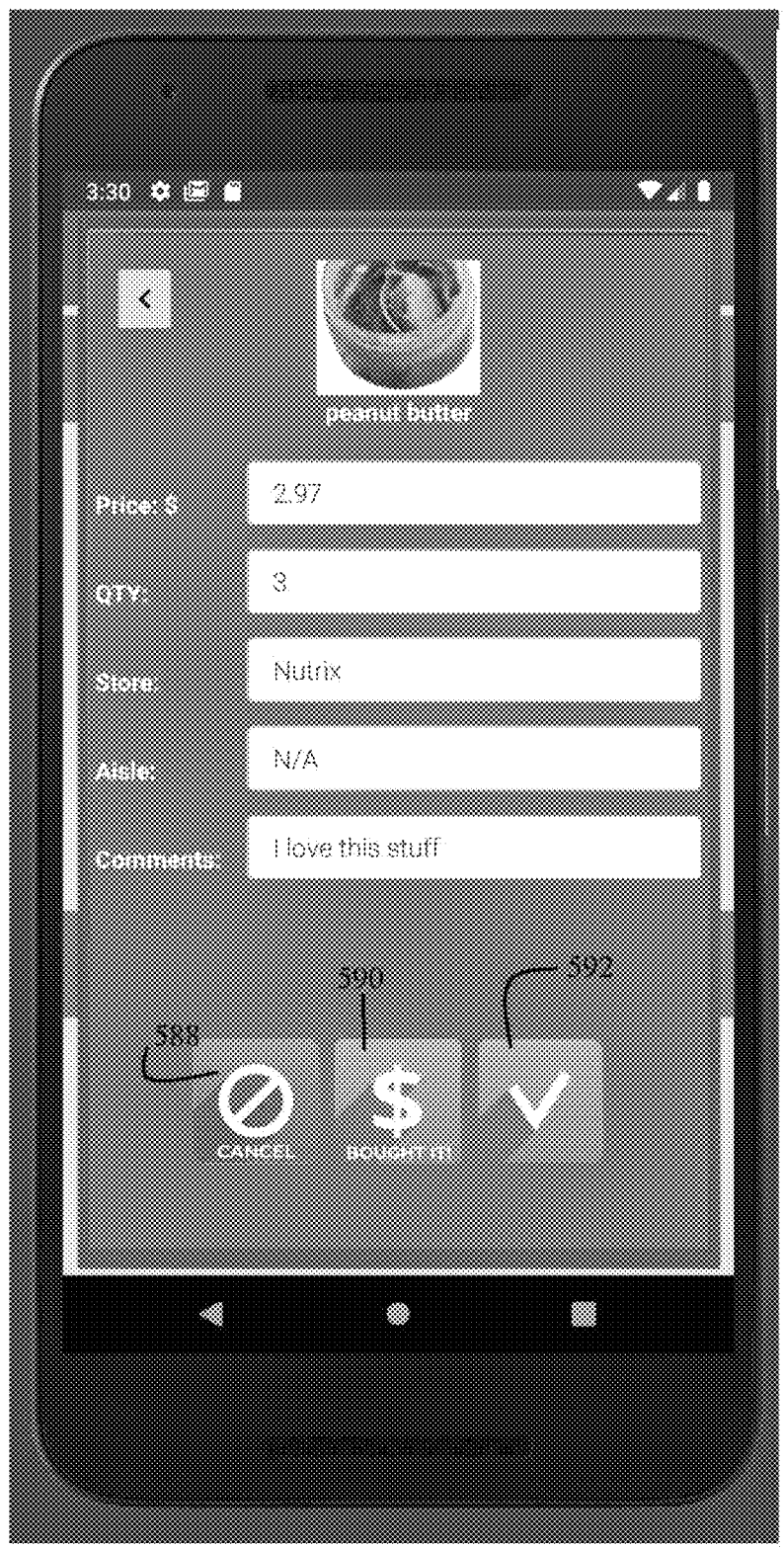

As illustrated in FIG. 19E, after editing product information, selection of cancel GUI icon 588 will simply render display shown in FIG. 19D. Selecting a bought it GUI icon 590 will render display FIG. 19F, indicating "Recently Bought Items for Your Pantry."

Figure 19F:
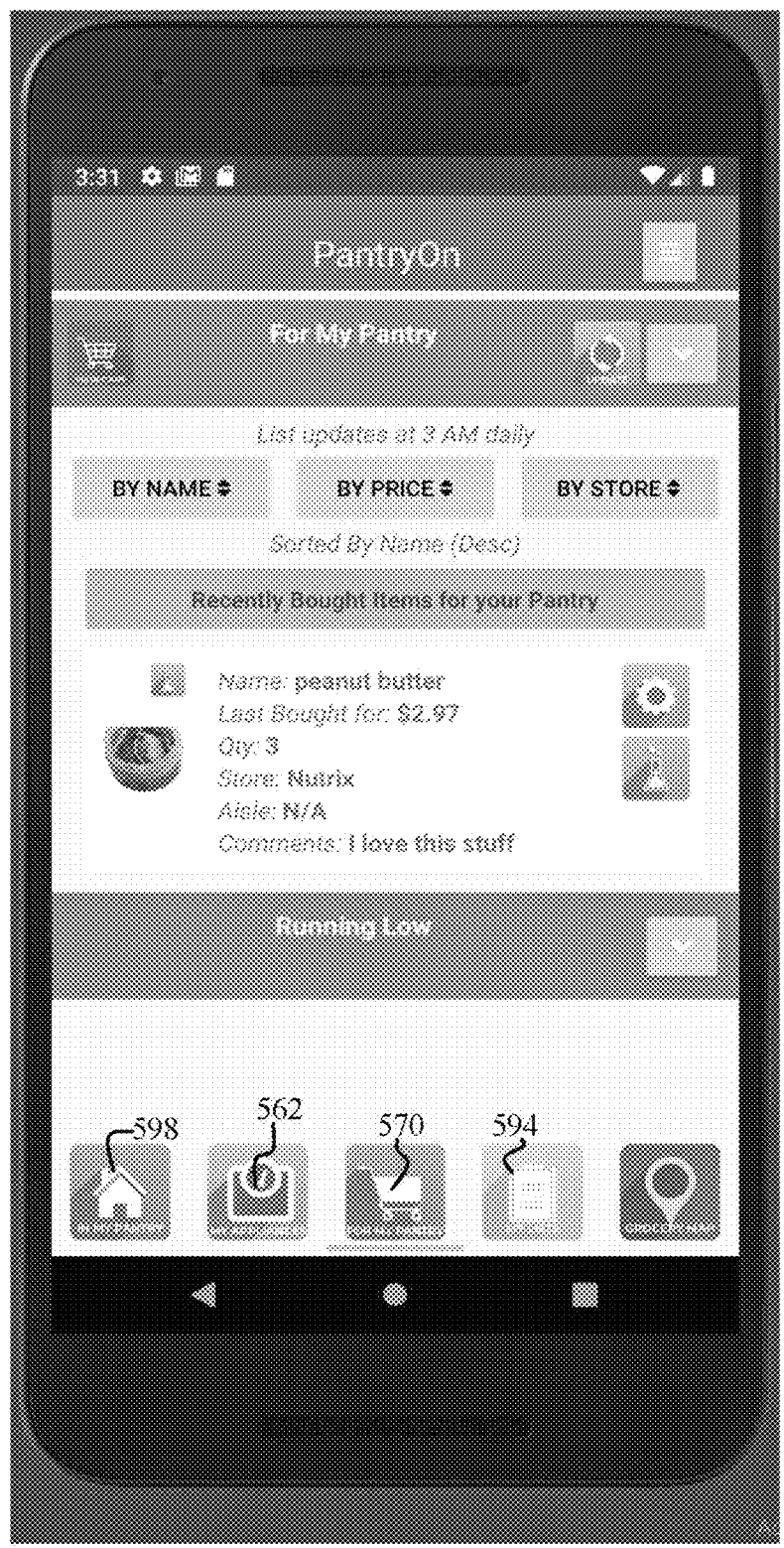

It should be noted that all display logic 214 of inventory application 110 residing in all Internet-enabled mobile computing devices 108 associated with a particular intelligent shelf 202 will indicate that the item shown in FIG. 19F was recently bought. In other words, all inventory applications 110 are synced by server records 190 with the same information simultaneously in real time for the same account. This way, the same product will not be purchased twice by two family members for example.

Figure 19G:
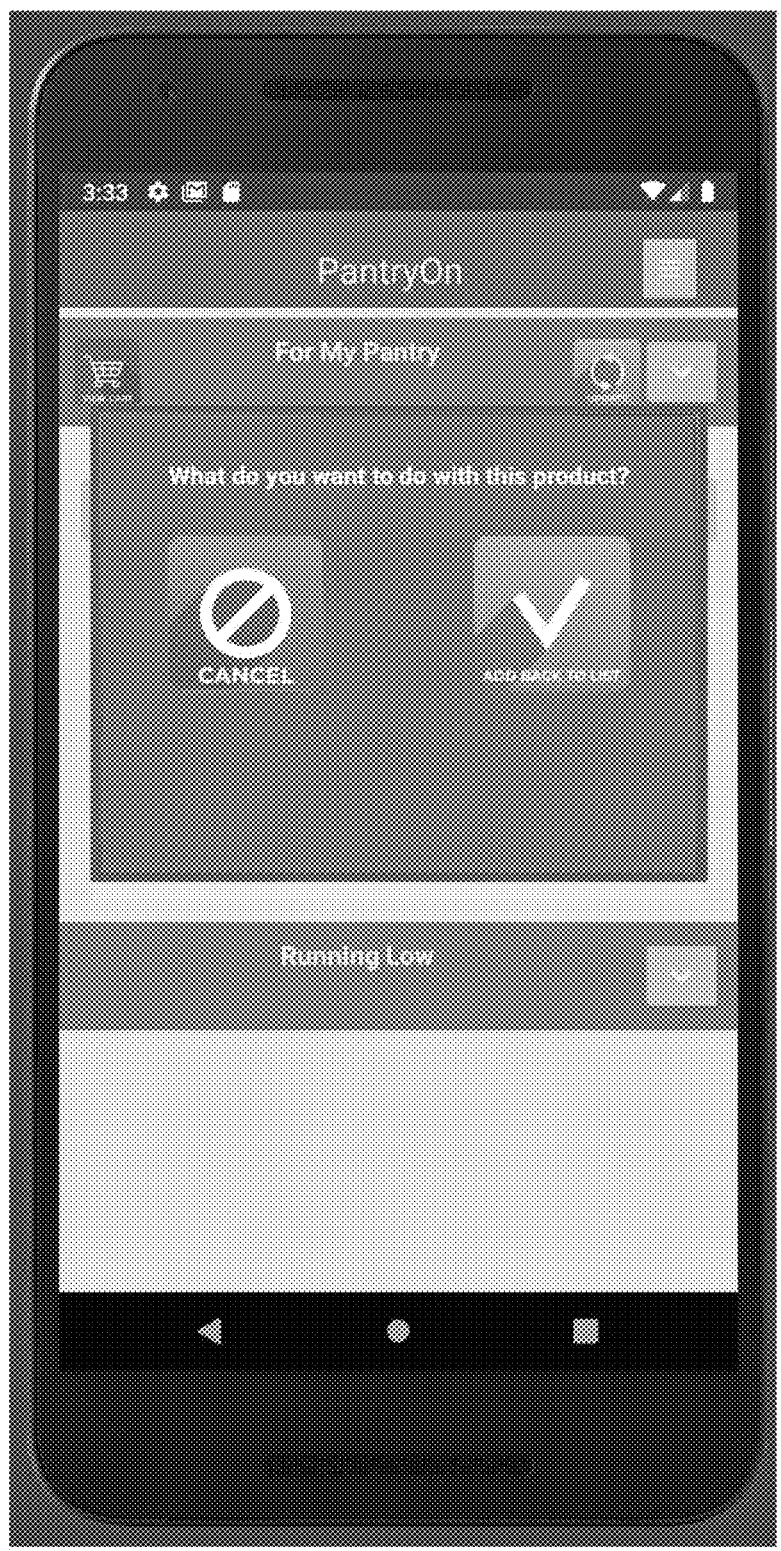

As further illustrated in FIG. 19E, selecting a check-mark GUI icon 592 will render GUI display for adding the recently purchased item back to the list or cancel (FIG. 19G). This feature enables recording of additional purchases of the same item, if need be. Once purchased, the product is removed from the For My Pantry list. However, weight sensor module GUI 526 is updated only when the product is actually placed on a weight sensor module 230. In other words, purchasing the product and selecting icon 590 "bought it" will not remove item from "for my pantry" list 570. The item will remain on "for my pantry" list 570 but under the heading "recently bought items" 800 shown in several figures (e.g., FIG. 19D). Only the act of placing the newly purchased items on weight sensor modules 230, and in sufficient weight (after power and data communication hub 112 had a chance to transmit an update to server computing device 140 will the items be removed from the "for my pantry" list 570.

Figure 20A:
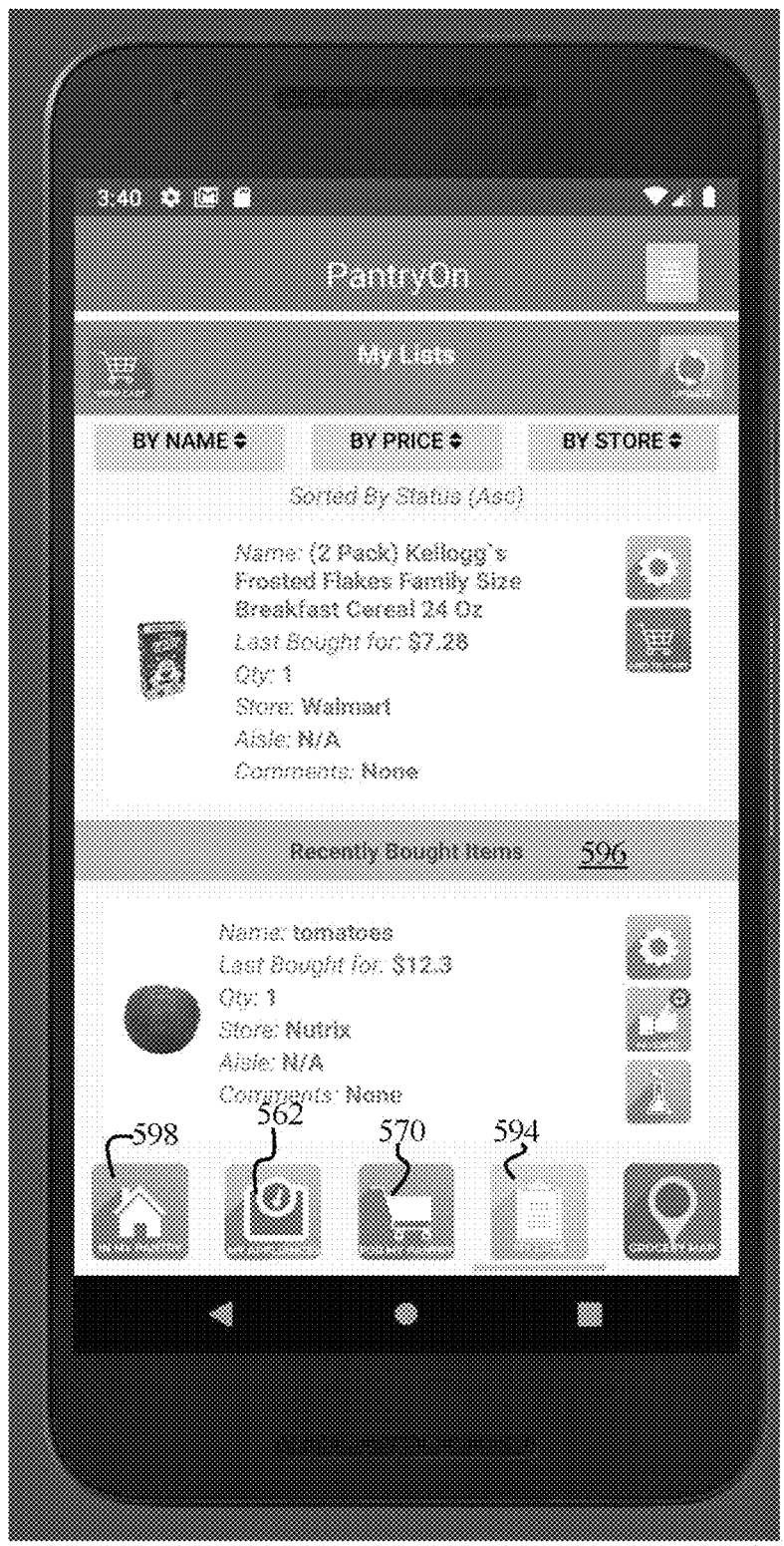

FIG. 20A is a non-limiting, exemplary illustration of a "My List" shopping list in accordance with one or more embodiments of the present invention. It should be noted that My List GUI icon 594 and its content may operate independent of intelligent shelf 202. In other words, My List GUI display 596 shown in FIG. 20A as a result of selection of My List GUI icon 594 is a mere shopping list, with similar GUI as that of For My Pantry, My Appliances, and main home GUI (In My Pantry) 598. In other words, My List shopping display is simply a shopping list. However, as detailed below, shopping list may be used to purchase items and associate them with inventory monitoring system 204.

Figure 20B:
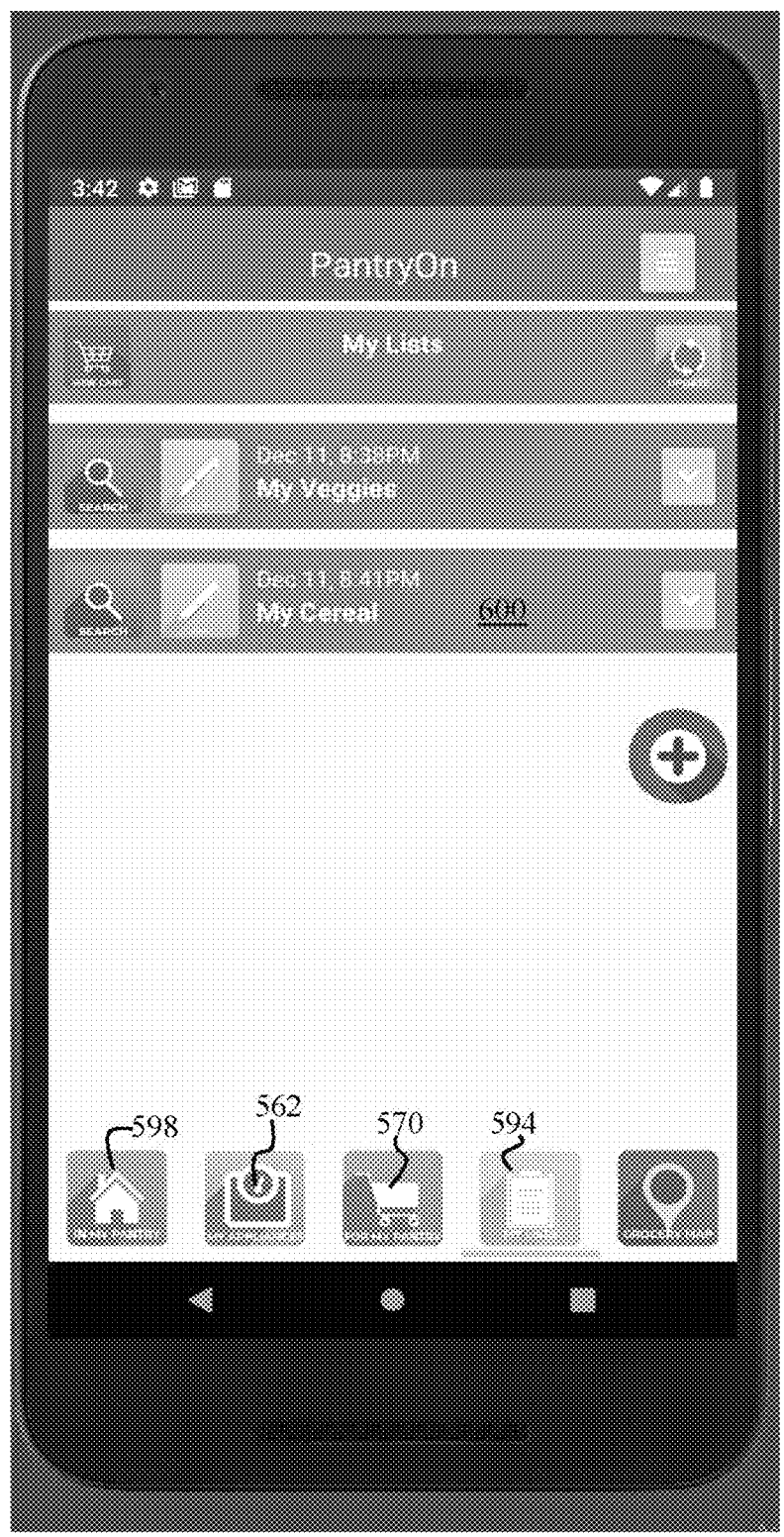
Figure 20C:

As illustrated in FIG. 20B, list of items in shopping list may be grouped such as My Veggies or My Cereal, etc. For example, selection of My Cereal GUI icon 600 as shown in FIG. 20C will provide a list of cereals in the shopping list, with the same GUI as detailed above. Shopping List GUI is also synced across all Internet-enabled mobile computing devices registered with the same account server records 190 of server computing device 140.

Figure 20D:
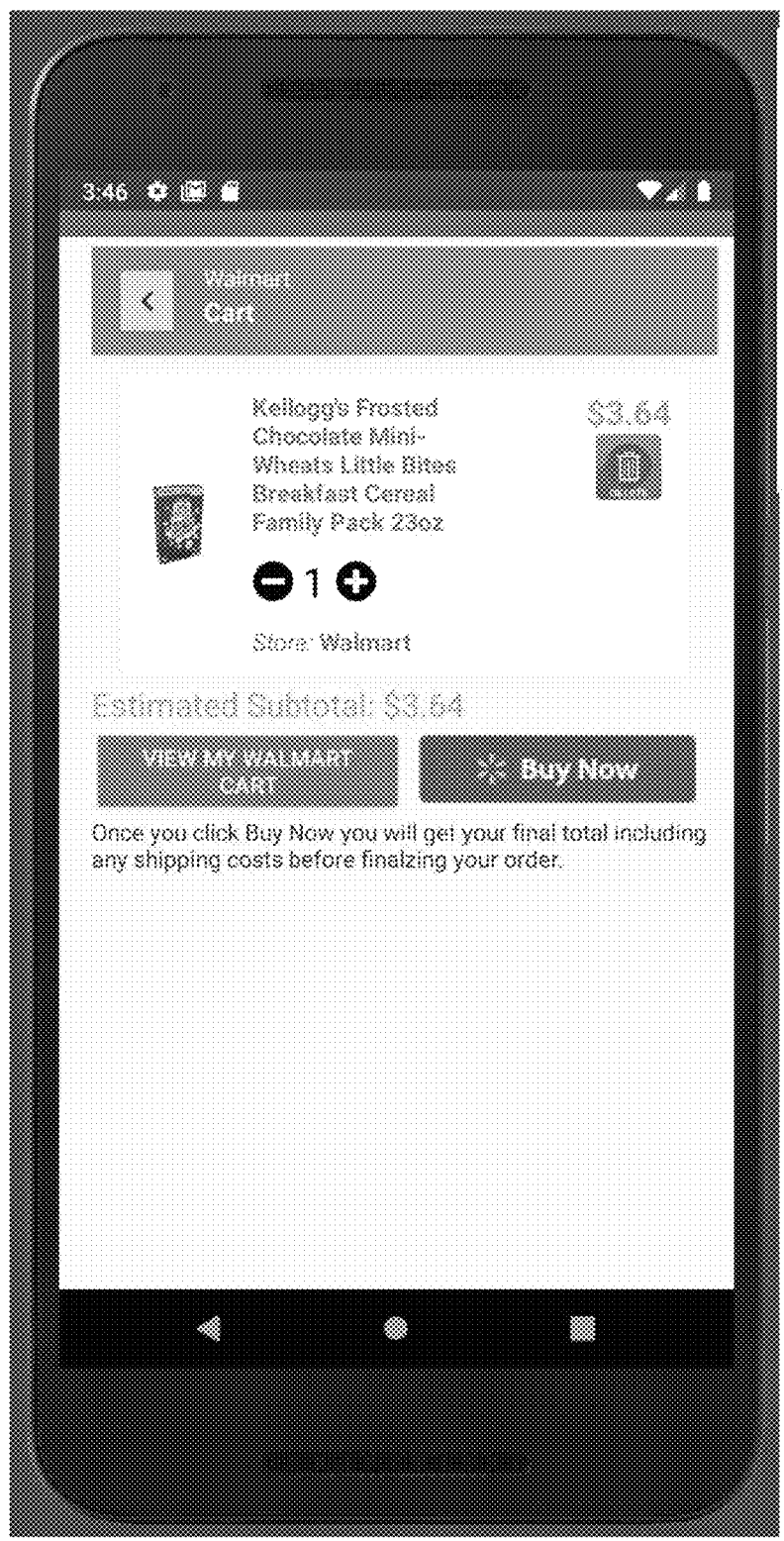
Figure 20E:
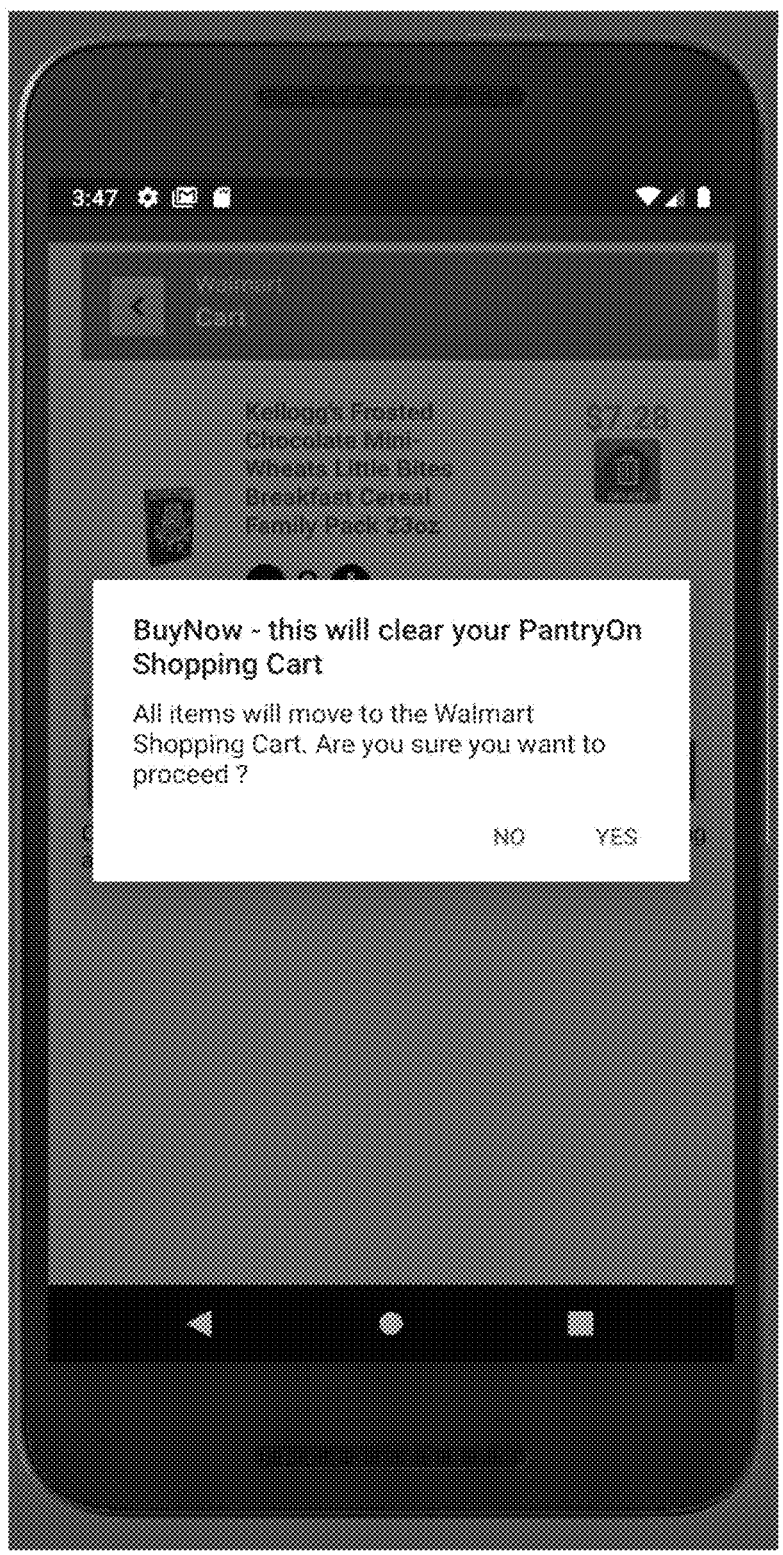
Figure 20F:
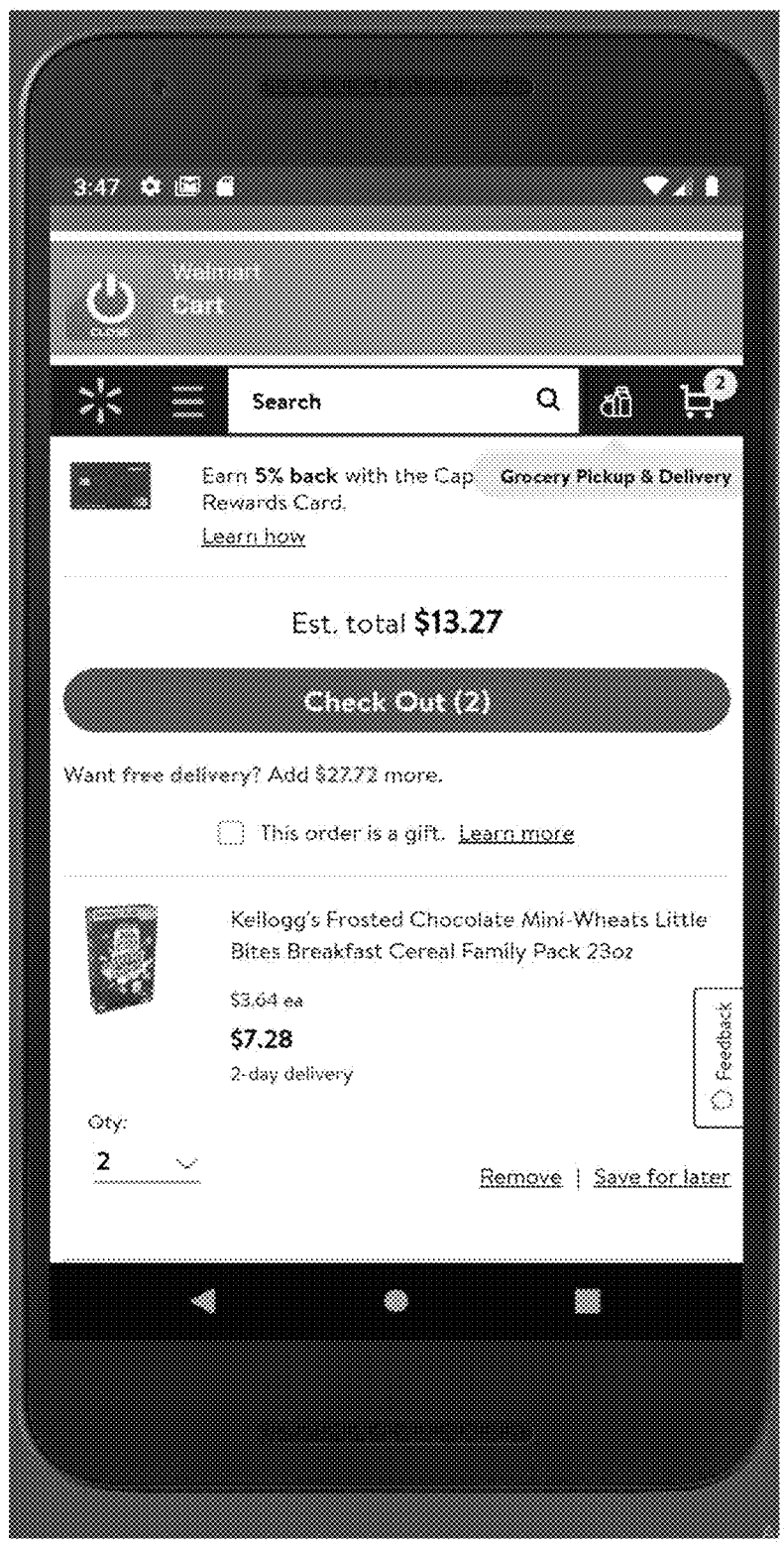

As illustrated in FIG. 20C, a product from the shopping list may easily be purchased by selection of Shopping Cart GUI icon 586 associated with the item, directing users to a selected merchant FIG. 20D, where all selected items move to the selected merchant shopping cart (FIGS. 20E and 20F). Thereafter, selected merchant e-commerce servers (third party servers) provide users with well-known methods of purchasing a product. This means that inventory monitoring system 204 is easily integrated with any third-party vendors.

Figure 21:
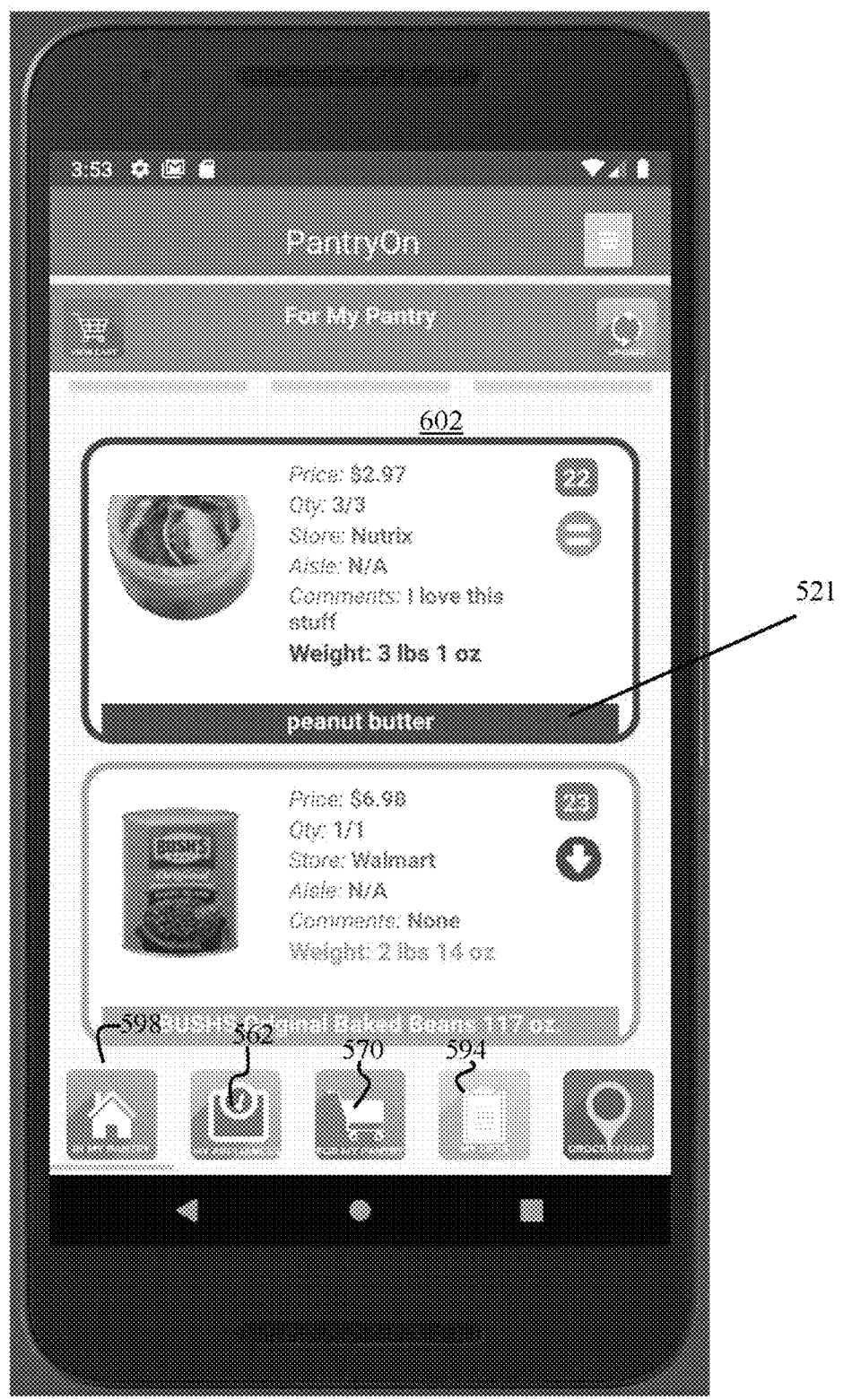

FIG. 21 illustrates the purchased product in the In My Pantry GUI display 602. It should be noted that weight sensor module GUI 526 shown on Internet-enabled mobile computing device 108 will show changes only if the actual product is physically placed on intelligent shelf. Placing the actual product on shelf will enable hub 112 to update server records 190 which, in turn, enables server computing device 140 to update weight sensor module GUI 526 status in real-time.

Figure 22:
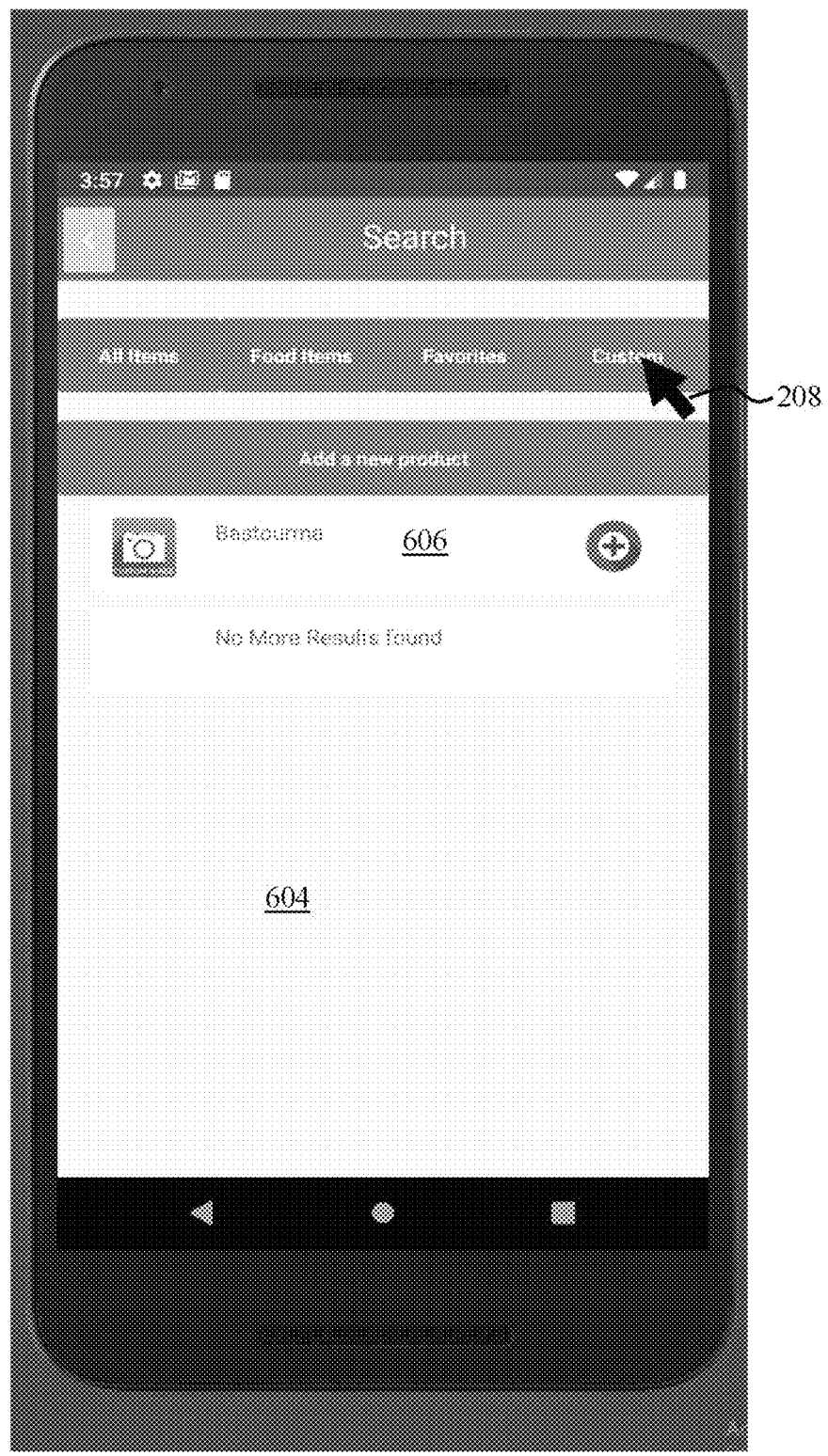
Figure 23:
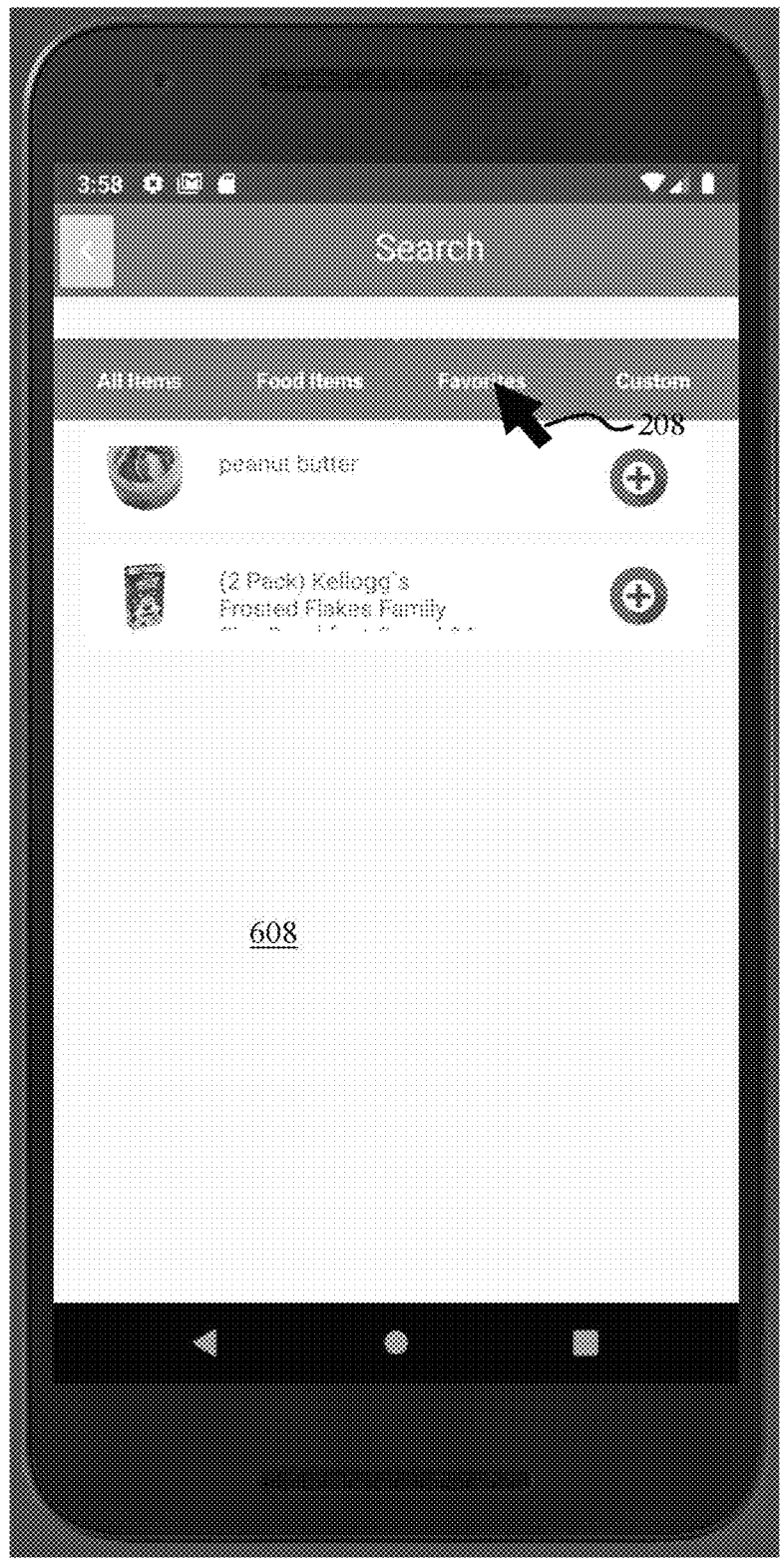

FIG. 22 is a non-limiting, exemplary illustration of a Custom GUI display 604 that lists custom products, such as some quantity of a particular meat product 606 with no brand recognition, which may be purchased in methods described by selection of PLUS GUI icon. FIG. 23 is a non-limiting, exemplary illustration of a Favorites GUI display 608 that lists favorite items populated by favorite GUI icon as detailed above.

Figure 24:
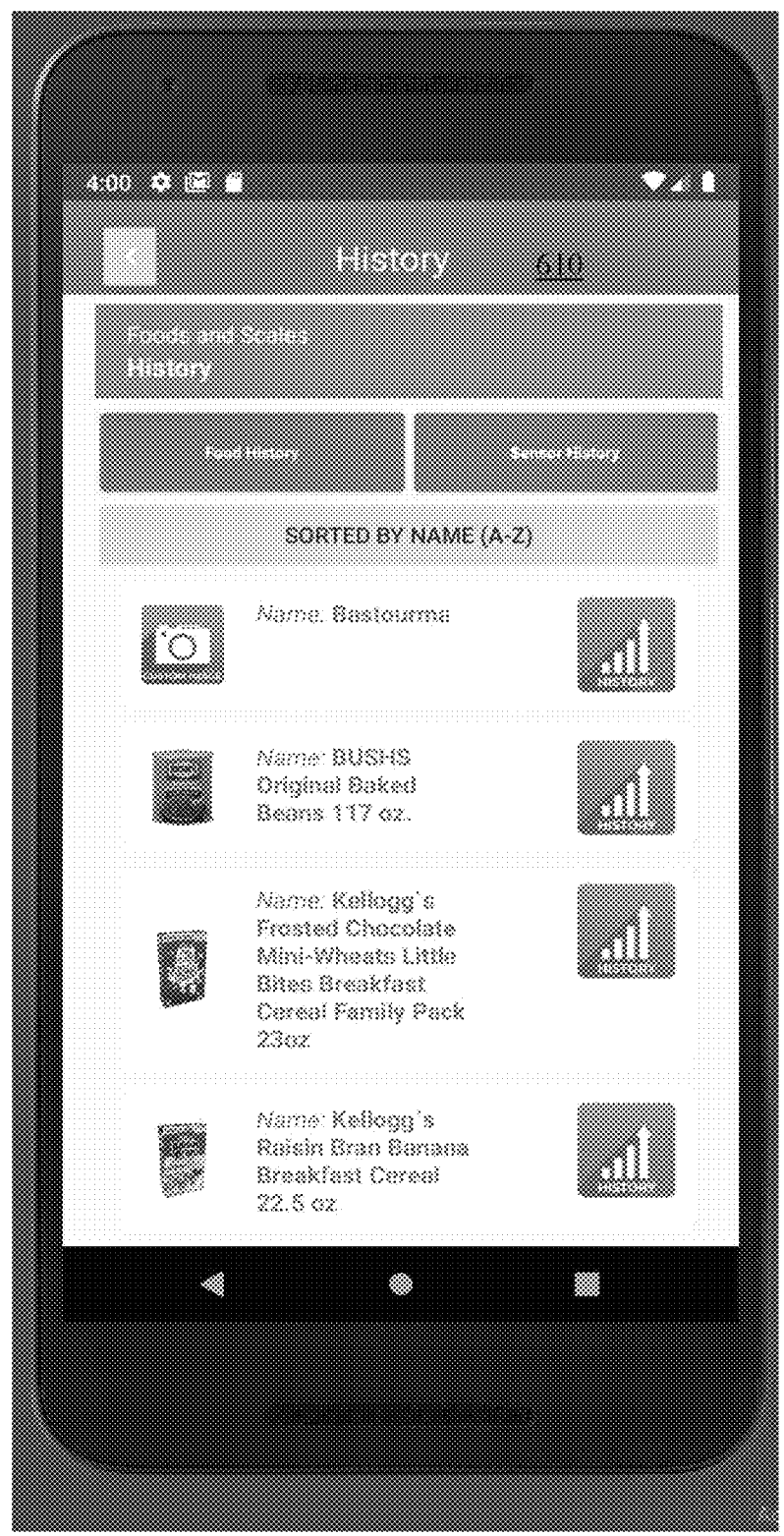
Figure 25:
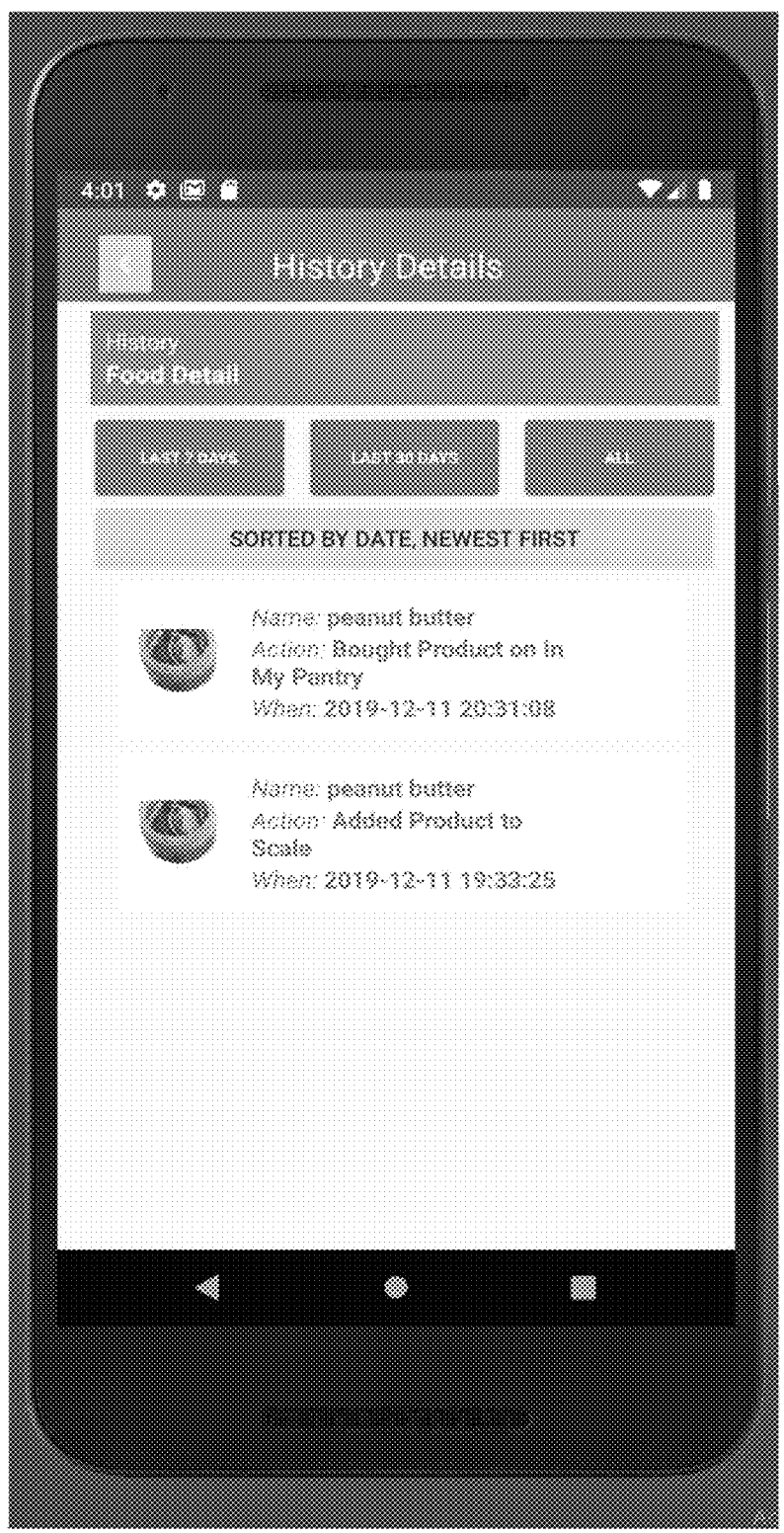
Figure 26:

FIGS. 24 and 25 are non-limiting, exemplary illustrations of a History GUI display 610 that lists history of items purchased. FIG. 26 is a non-limiting, exemplary illustration of a home screen where Settings GUI (shown in FIG. 11B) was used to modify weight units 612 to show both imperial units and metric system (or International System of units). Settings GUI may be used to modify many other features of the entire inventory application 110.

Figure 27:
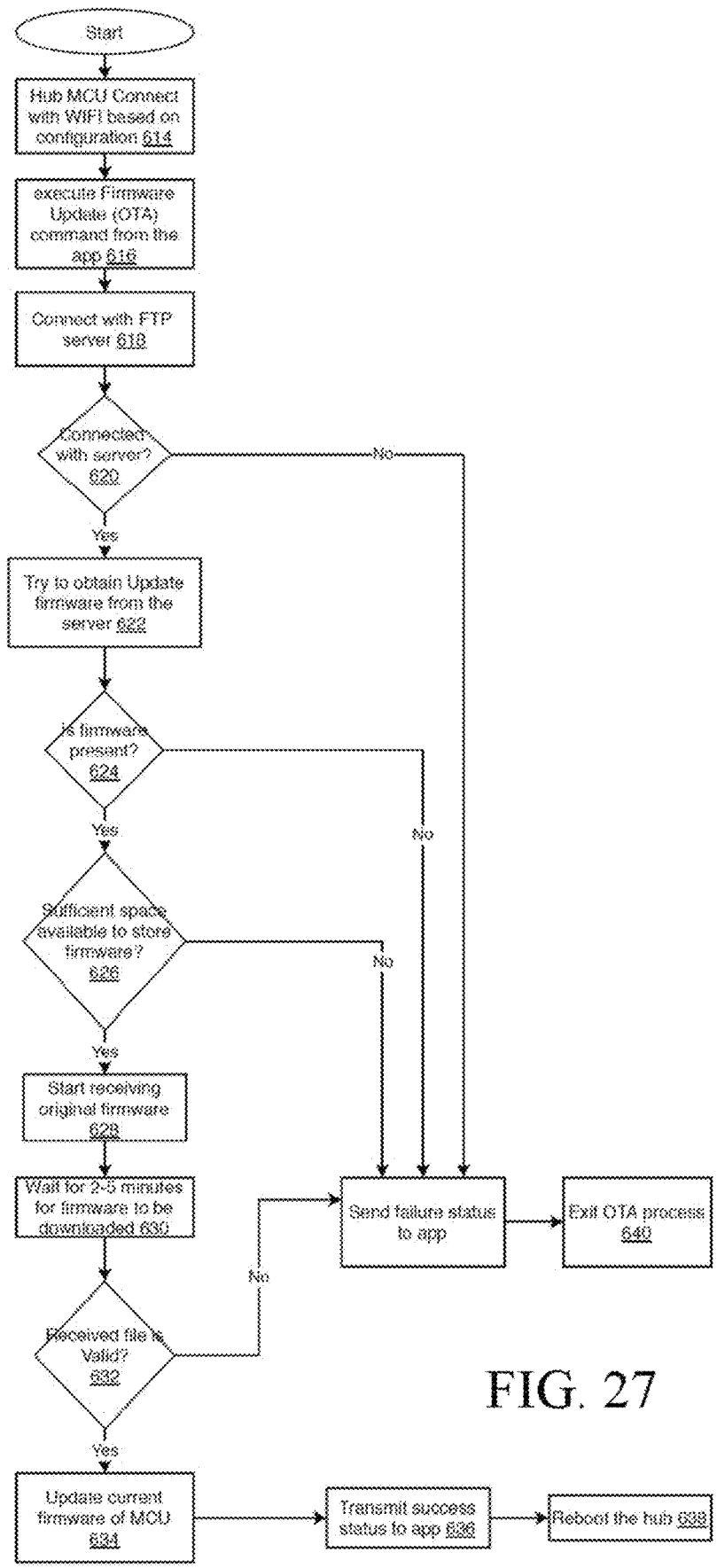
FIG. 27 is a non-limiting, exemplary flow diagram illustration for a process of updating sensory logic of the intelligent shelf (firmware update) shown in FIGS. 1A to 26 in accordance with one or more embodiments of the present invention.

FIG. 27 is a non-limiting, exemplary flow diagram illustration for a process of updating sensory logic of the intelligent shelf shown in FIGS. 1A to 26 in accordance with one or more embodiments of the present invention. As illustrated, all sensory logic 216 of power and data communications hub 112, including weight sensor modules 230 may be easily updated Over-The-Air (OTA) method. At operation 614 hub MCU 376 connects with server computing device 140, and executes firmware update (OTA) command from the app at operation 616.

Thereafter, hub MCU 376 may connect with FTP server at operation 618 to obtain updated firmware (sensory logic 216) at operations 620 and 622. If firmware is present (operation 624) and there is sufficient memory to store the updated firmware (operation 626), firmware or sensory logic 216 is updated (operations 628 to 638) otherwise, the process exists at operation 640.

FIGS. 28A to 31 are non-limiting, exemplary illustrations of an inventory monitoring system in accordance with another embodiment of the present invention. The inventory monitoring system illustrated in FIGS. 28A to 31 includes similar corresponding or equivalent components, interconnections, functional, operational, and or cooperative relationships as inventory monitoring system 204 that is shown in FIGS. 1A to 27, and described above. Therefore, for the sake of brevity, clarity, convenience, and to avoid duplication, the general description of FIGS. 28A to 31 will not repeat every corresponding or equivalent component, interconnections, functional, operational, and or cooperative relationships that has already been described above in relation to inventory monitoring system 204 that is shown in FIGS. 1A to 27 but instead, are incorporated by reference herein.

As illustrated, 28A to 28C, intelligent shelf 650 in this non-limiting, exemplary instance has a slim form factor of about less than ⅞ inches in total height, which enables the use of intelligent shelf 650 on narrower pantry shelves, including inside of a refrigerator.

Intelligent shelf 650 includes a first and a second power connections 652 and 654 at the opposite sides for convenience of users to allow them to orient intelligent shelf 650 in a desired position. Further included is reset/program switch 348, and as further detailed below, and an optional expansion port 272 for accessing an extension connector 274.

Figure 28A:
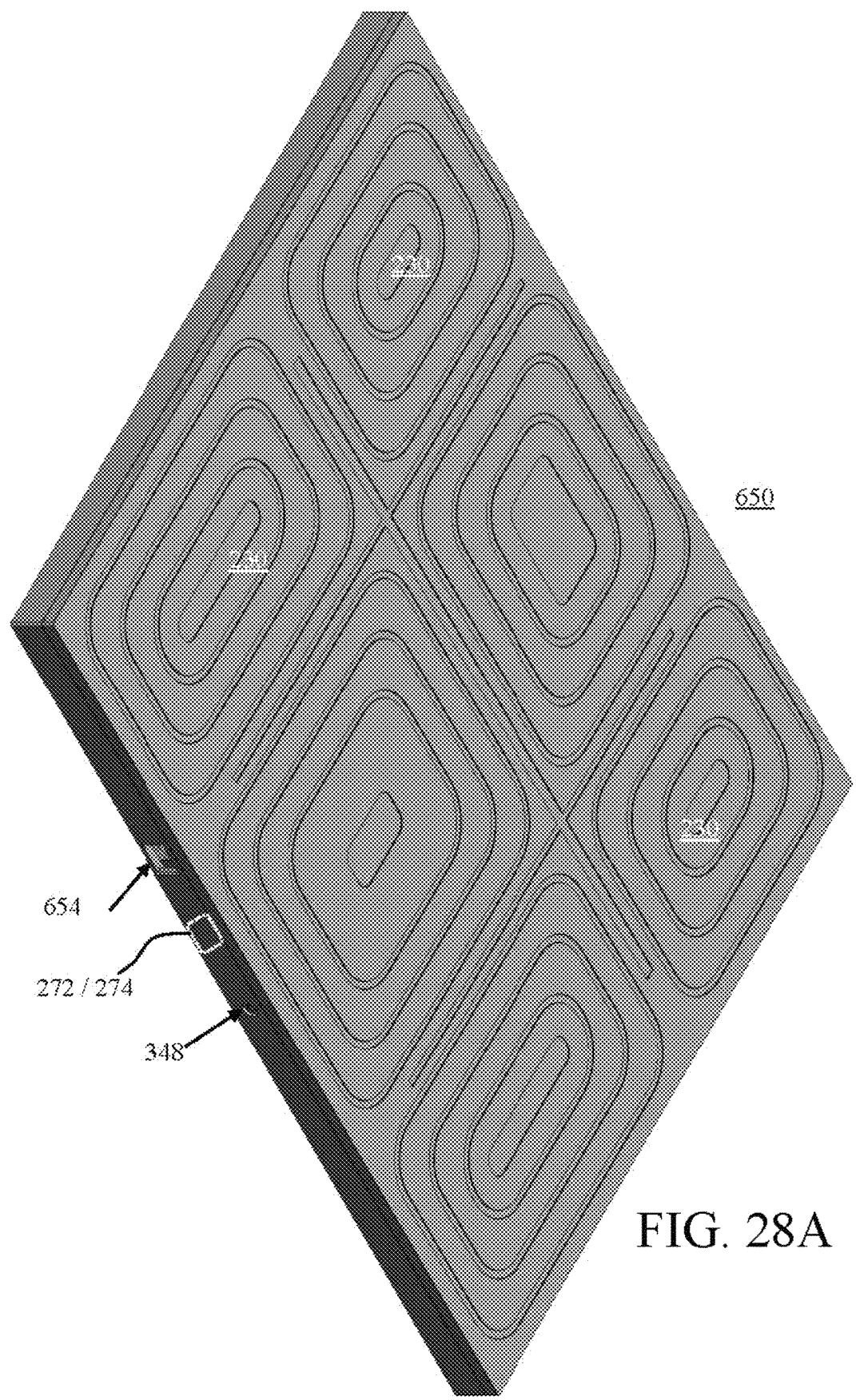
FIGS. 28A to 31 are non-limiting, exemplary illustrations of an inventory monitoring system in accordance with another embodiment of the present invention.
Figure 28B:
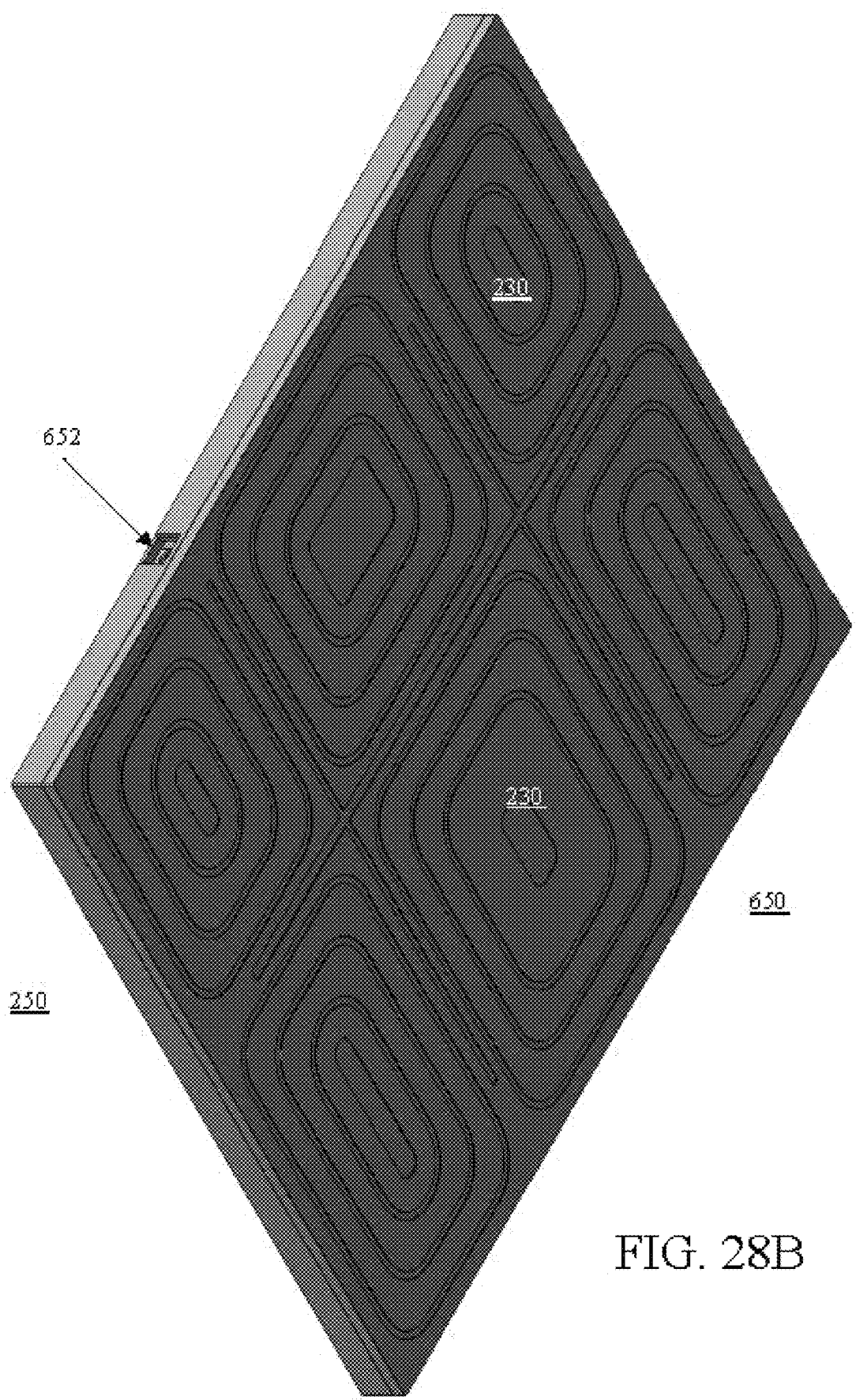
Figure 28C:
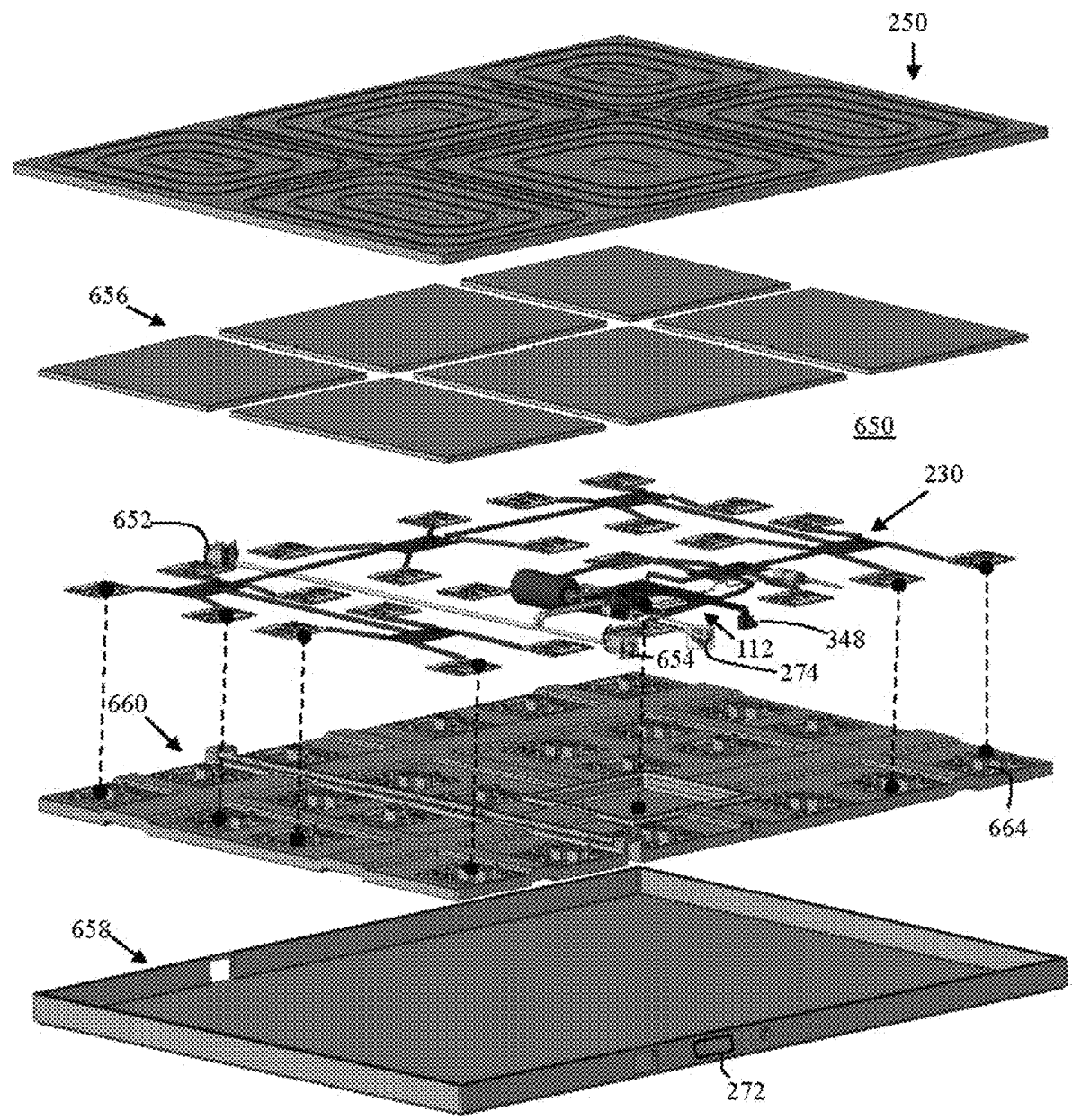

FIG. 28C is a non-limiting exemplary exploded view illustration of the major components of the intelligent shelf shown in FIGS. 28A and 28B in accordance with one or more embodiments of the present invention. The exploded view shown in FIG. 28C illustrates disassembled, separated components that show the cooperative working relationship, orientation, positioning, and exemplary manner of assembly of the various components of intelligent shelf 650 in accordance with one or more embodiments of the present invention, with each component detailed below.

As illustrated in FIG. 28C, intelligent shelf 650 is comprised of an indexed liner 250, one or more load support plates 656, a corresponding number of weight sensor modules 230 and a power and data communications hub 112, a securing platform 660 that secures weight sensor modules 230 and power and data communication 112, and housing 658. As illustrated, weight sensor modules 230 and a power and data communications hub 112 secured onto the securing platform 660 and hence, are no longer removable, which improvers ease of manufacturing and assembly, and provides a lower vertical profile of intelligent shelf 650.

Figure 29A:
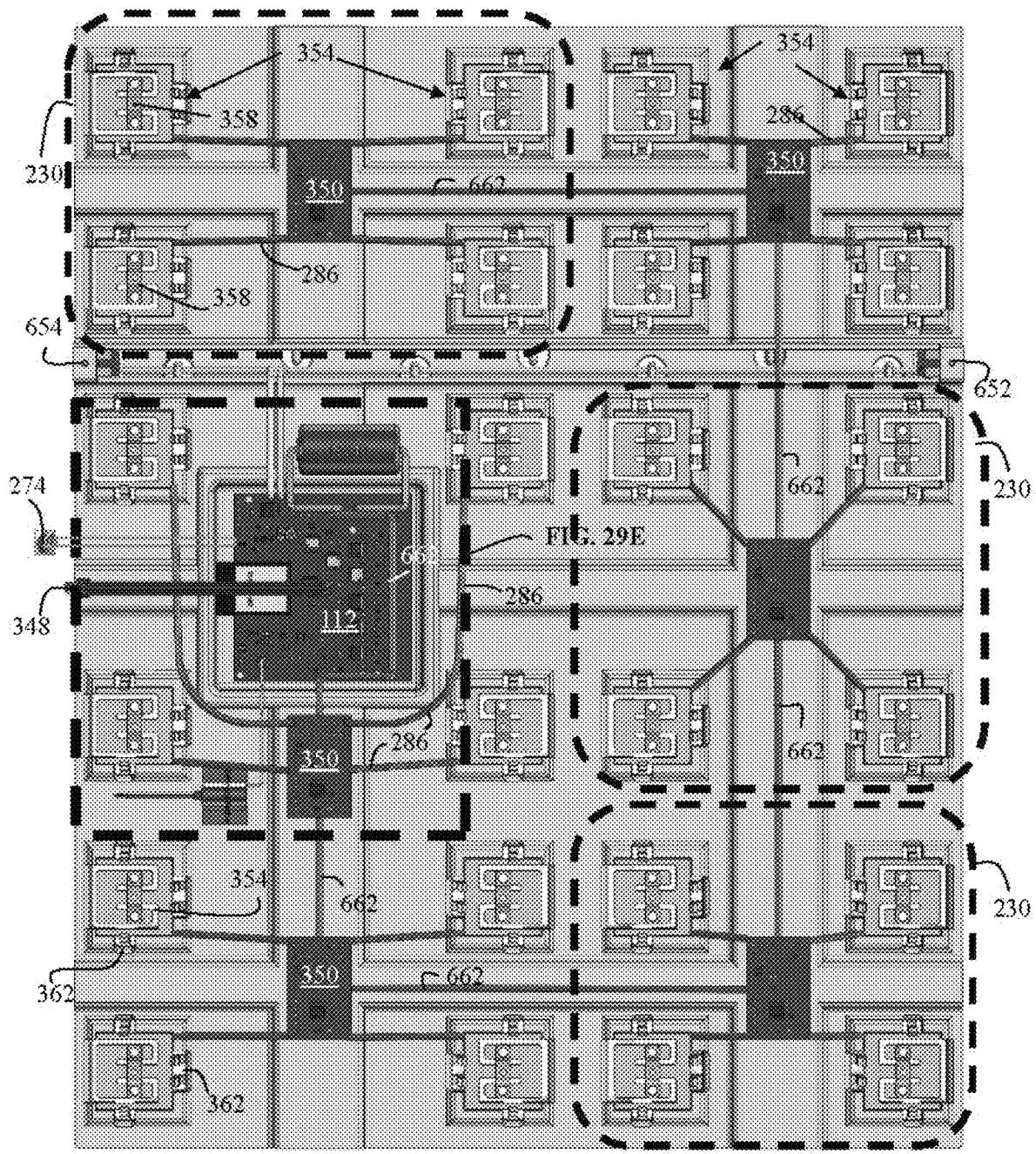
Figure 29B:
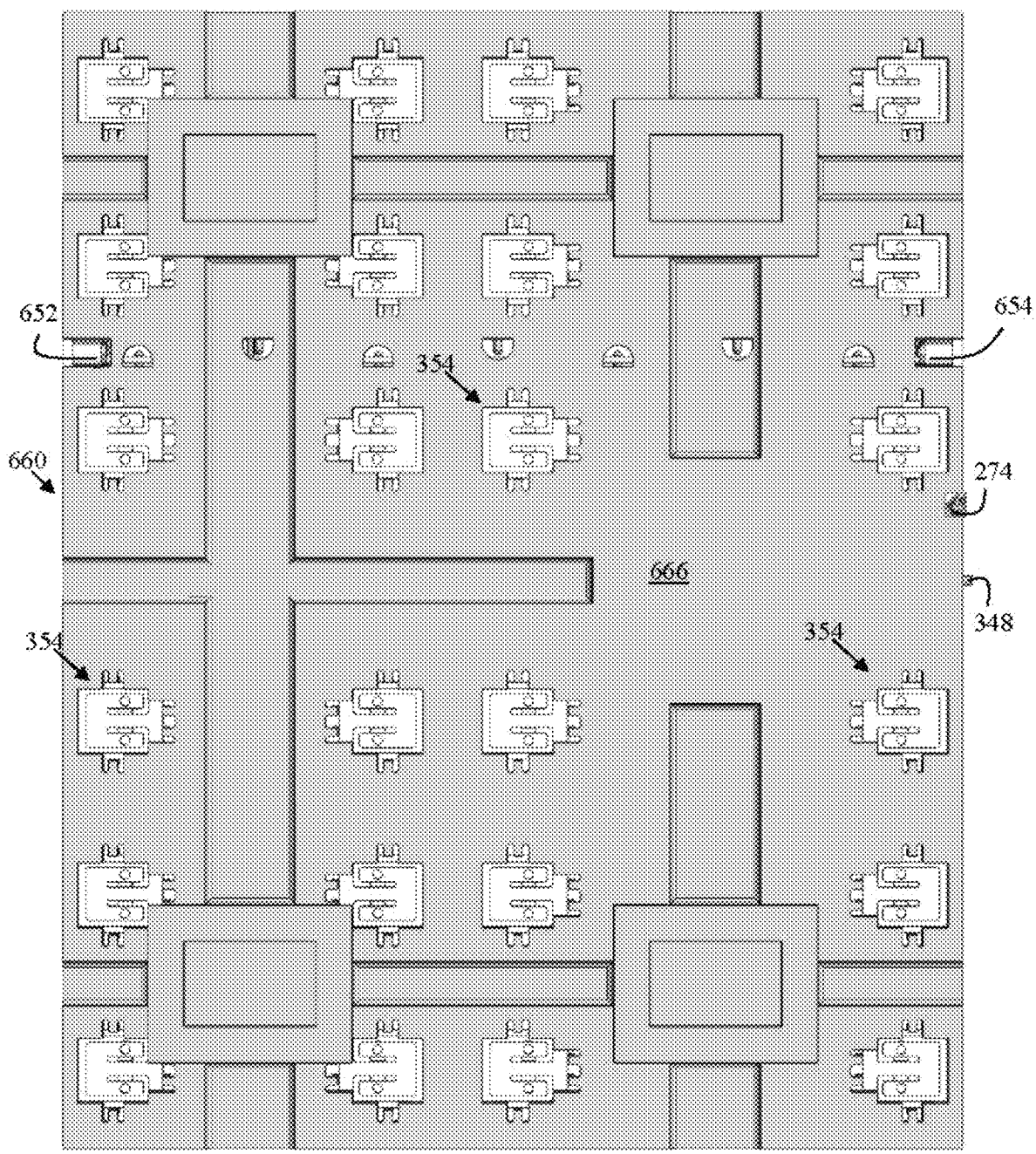
Figure 29C:
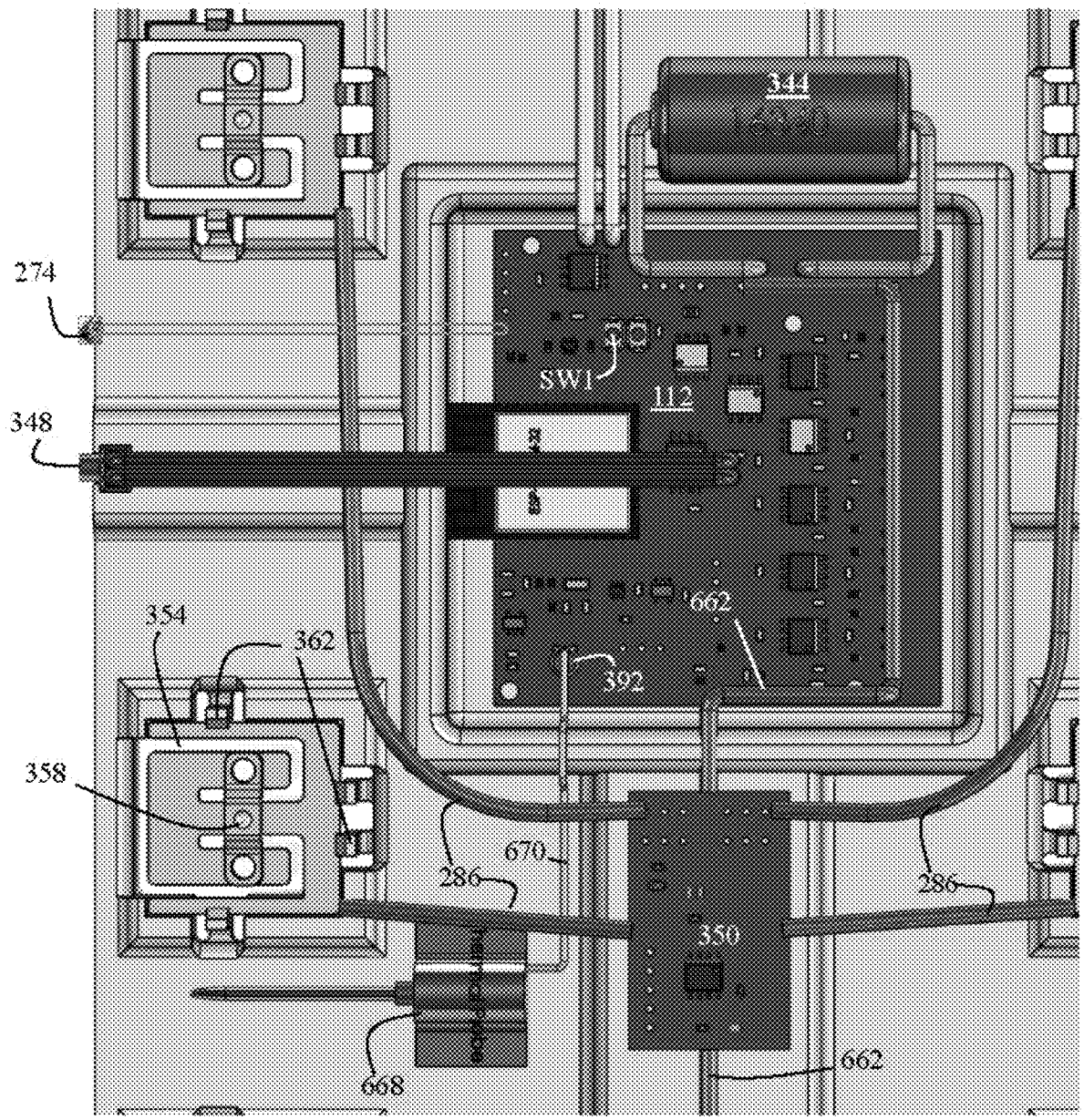

FIGS. 29A to 29C are non-limiting, exemplary illustrations of securing platform 660 and fully assembled weight sensor modules 230 and power and data communication 112. In this non-limiting, exemplary instance, intelligent shelf 650 is comprised of six-(6) weight sensor modules 230 and a single power and data communications hub 112.

Power and data communications with weight sensor module PCB 350 is done through a wires conduit 662 that includes both power lines and data links. Data links is directly connected to each weight sensor module PCB 350 from power and data communications hub 112, but the power may be connected in parallel. Accordingly, the serial connectivity representation of wires conduit 662 should not be interpreted as a daisy chain serial connection.

FIG. 29B is a non-limiting, exemplary illustrations of rear or back side 666 of securing platform 660 shown in FIG. 29A, and as illustrated, load cells 354 are secured within their respective open-bottom compartments 664 (FIG. 28C). FIG. 29C is an enlarged view of power and data communications hub 112, including a temperature sensor probe 668 connected to temperature sensor port 392 (shown in FIG. 29C) of power and data communications hub 112 via temp sensor wire 670.

Figure 30A:
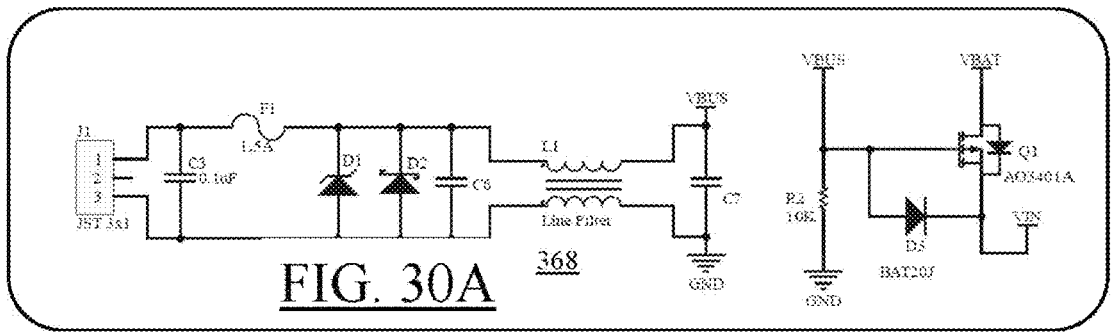
Figure 30B:
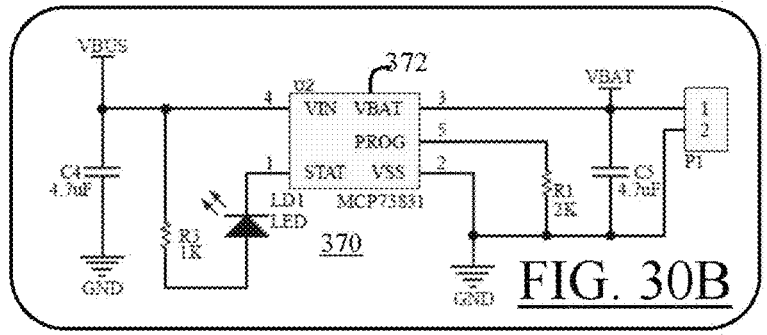
Figure 30C:
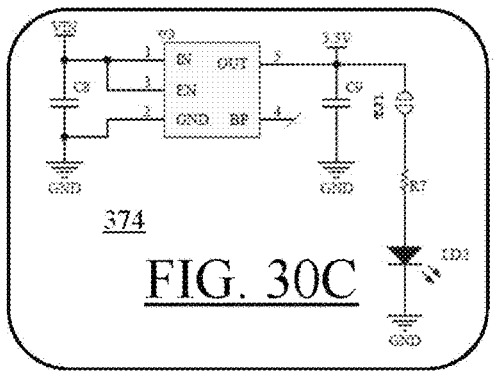
Figure 30D:
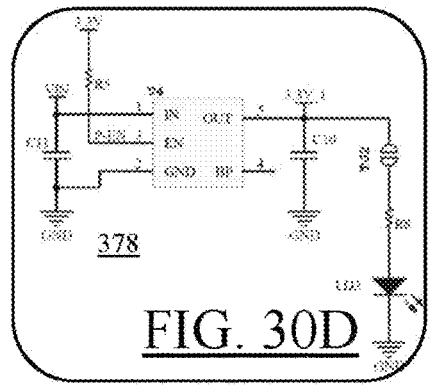
Figure 30E:
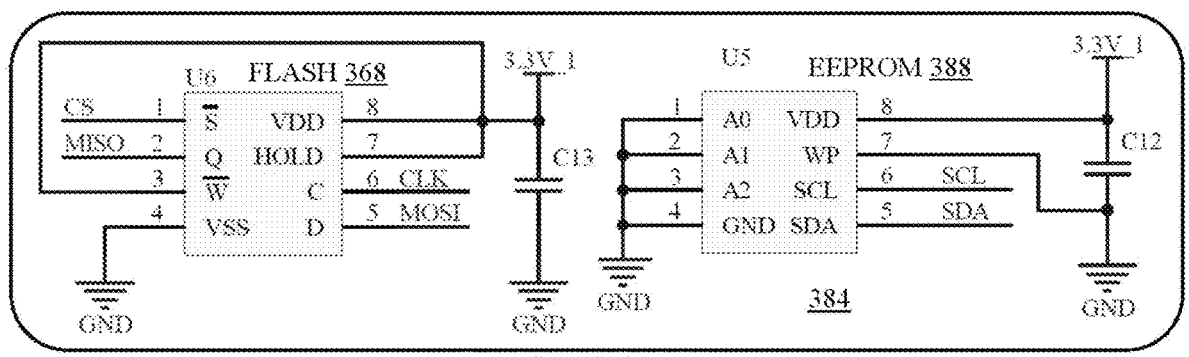
Figure 30F:
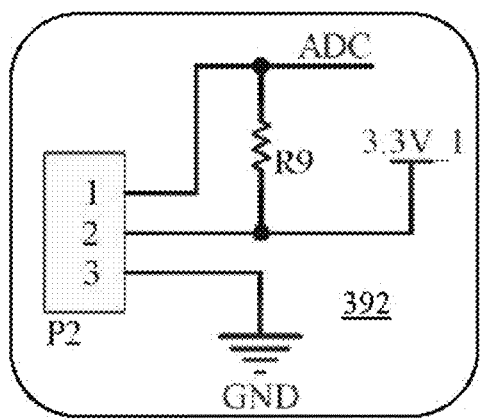
Figure 30G:
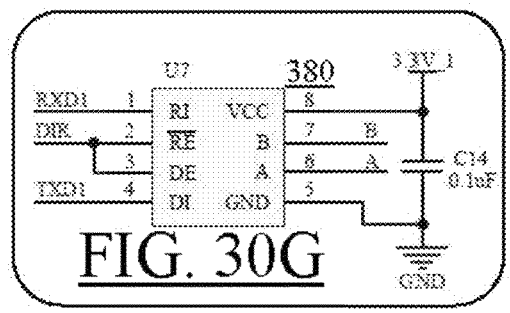
Figure 30H:
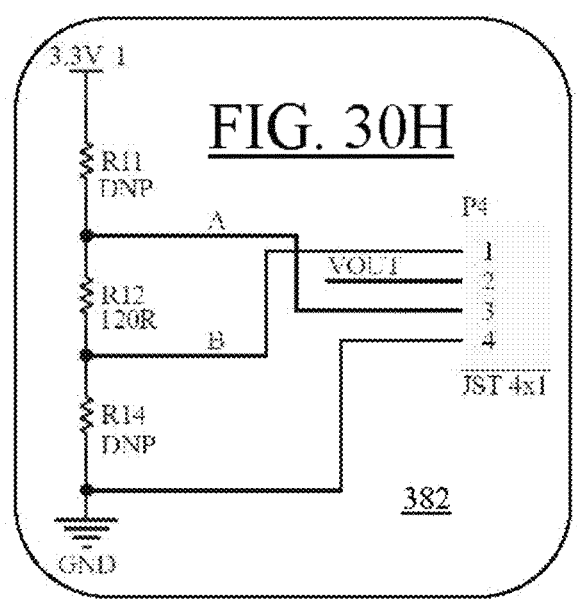
Figure 30I:
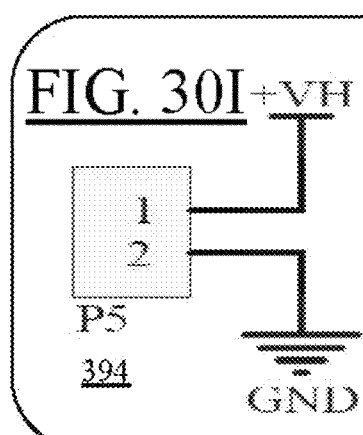
Figure 30J:
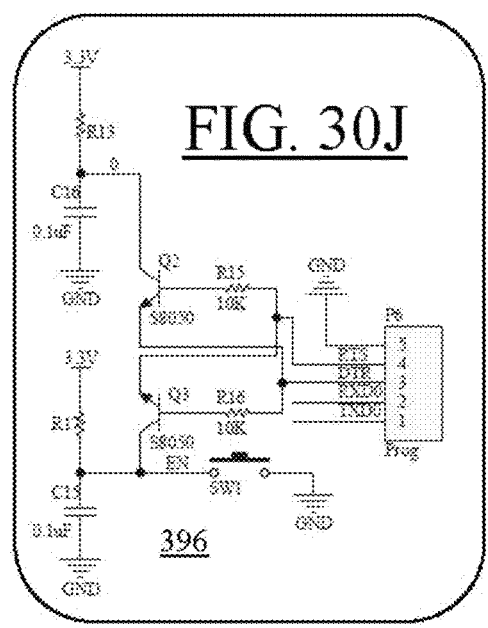
Figure 30K:
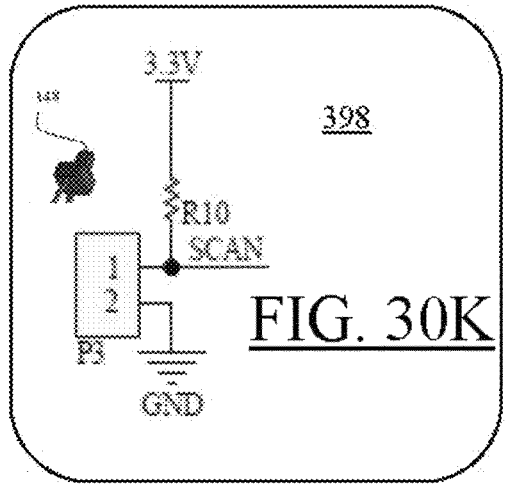
Figure 30L:
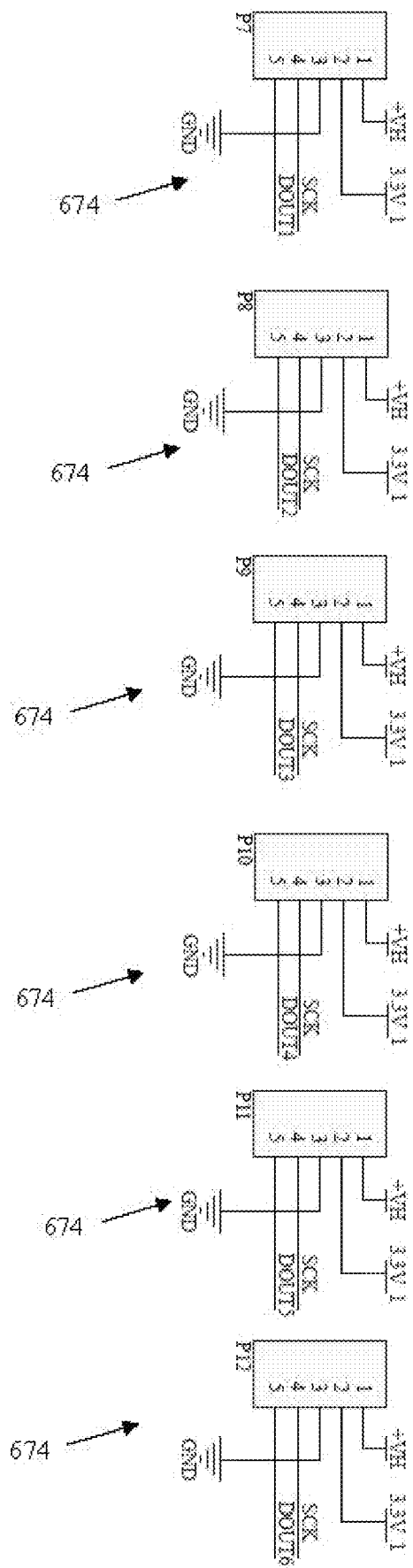
Figure 30M:
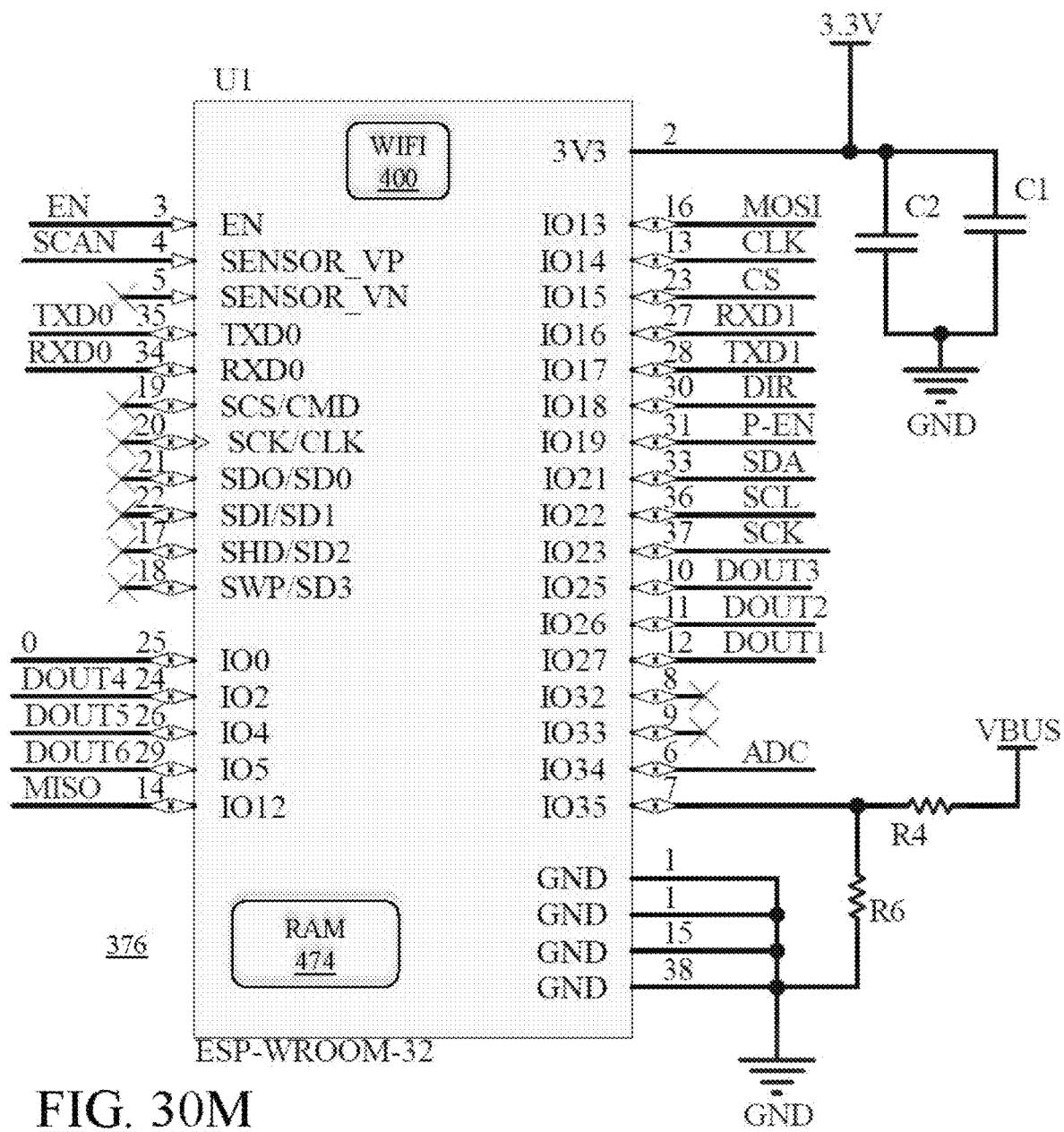
Figure 30N:
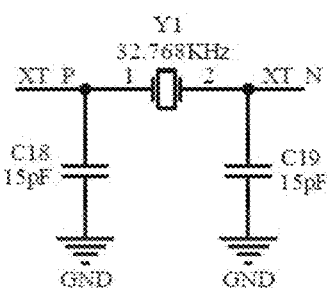
Figure 30O:
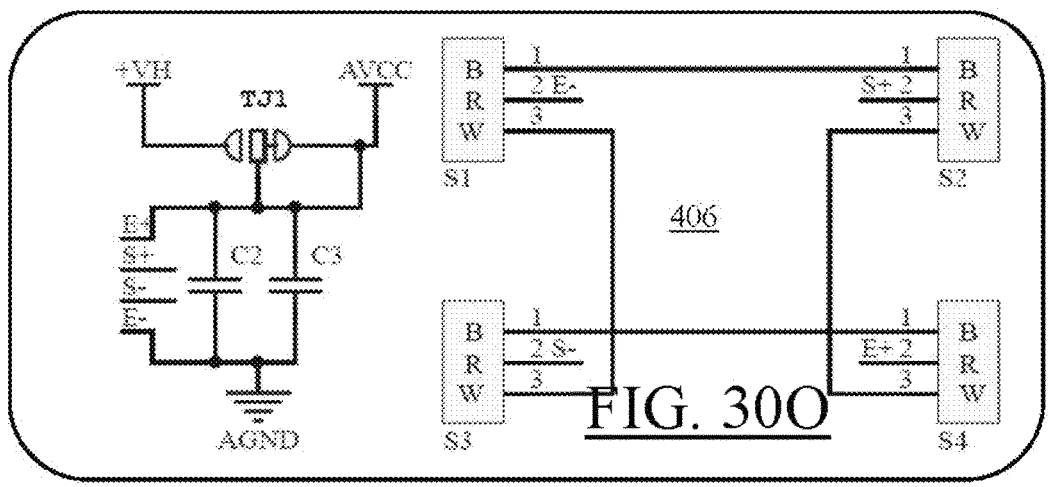
Figure 30P:
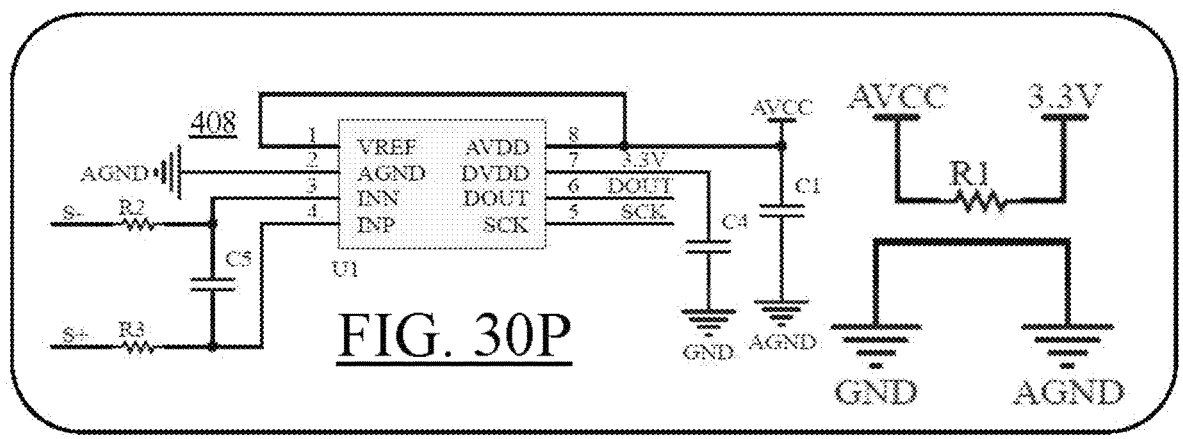
Figure 30Q:
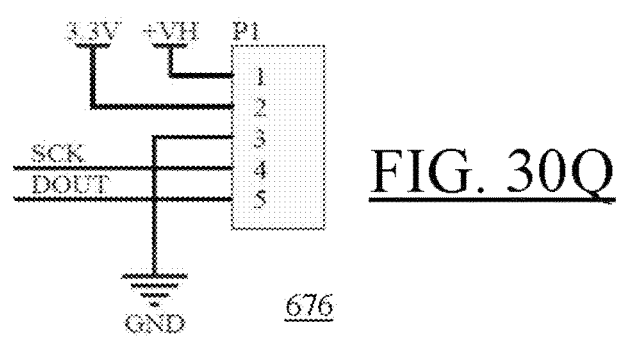

FIGS. 30A to 30N are non-limiting, exemplary illustrations of the detailed circuitry of the power and communications hub of the intelligent shelf 650, and FIGS. 30O to 30Q are non-limiting, exemplary illustrations of the detailed of the weight sensor module electronics 350 shown in FIGS. 28A to 29C in accordance with one or more embodiments of the present invention.

As illustrated, in this non-limiting, exemplary instance, there is no RS485 module for communications between six-(6) weight sensor modules 230 (their connectors shown in FIG. 30L) and hub MCU 376 (also shown in FIG. 30M). Further, none of the weight sensor modules 230 on intelligent shelf 650 have an MCU. That is, intelligent shelf 650 has only the hub MCU 376.

As illustrated, weight sensor modules 230 outputs DOUT1, DOUT2, DOUT3, DOUT4, DOUT5, and DOUT6 (FIG. 30L) are directly connected to respective IO pins IO 27, IO 11, IO 10, IO 2, IO 4, IO 5 of hub MCU 376.

As illustrated in FIGS. 30G and 30H, intelligent shelf 650 does provide an RS485 communications 380 and 382 that may be used to connect additional hub-less (auxiliary) intelligent shelf 364 to intelligent shelf 650. All weight sensor modules 230 of hub-less (auxiliary) intelligent shelf 364 would be simply connected to RS 485 connector 382 shown FIG. 30H (via an optional expansion port 272 for accessing an extension connector 274).

Power for all weight sensor modules 230 of hub-less (auxiliary) intelligent shelf 364 may be supplied through RS485 380 and RS485 connector 382. Further, data may be passed from All weight sensor modules 230 of hub-less (auxiliary) intelligent shelf 364 to hub MCU 376 via RS485 connector 382 and RS485 380 (FIG. 30G) to pin receiver RXD0 of hub MCU 376. Additionally, hub MCU 376 may communicate with weight sensor modules 230 of hub-less (auxiliary) intelligent shelf 364 via its transmit pin TXD0 via RS485 380 and RS485 connector 382.

As indicated above, weight sensor module PCB 350 is shown in detail in FIGS. 30O to 30Q. In this non-limiting, exemplary instance, weight sensor modules 230 of intelligent shelf 650 do not have their own independent microcontroller unit and hence, weight sensor module ADC 408 simply converts weight measurements (as descried above) and transmits them to hub weight sensor module connectors 674 shown in FIG. 30L via weight sensor PCB 350 connector 676 shown in FIG. 30Q.

Hub weight sensor module connects 674 shown in FIG. 30L are actually physically located on power and data communications hub 112 of intelligent shelf 650. The corresponding weight sensor module connector 676 on the weight sensor PCB 350 is shown in FIG. 30Q. Accordingly, there are six-(6) hub weight sensor module connectors 674 (shown in FIG. 30L), one for every weight sensor module PCB 350 with its own weight sensor module connector 676 (FIG. 30Q).

Figure 31:
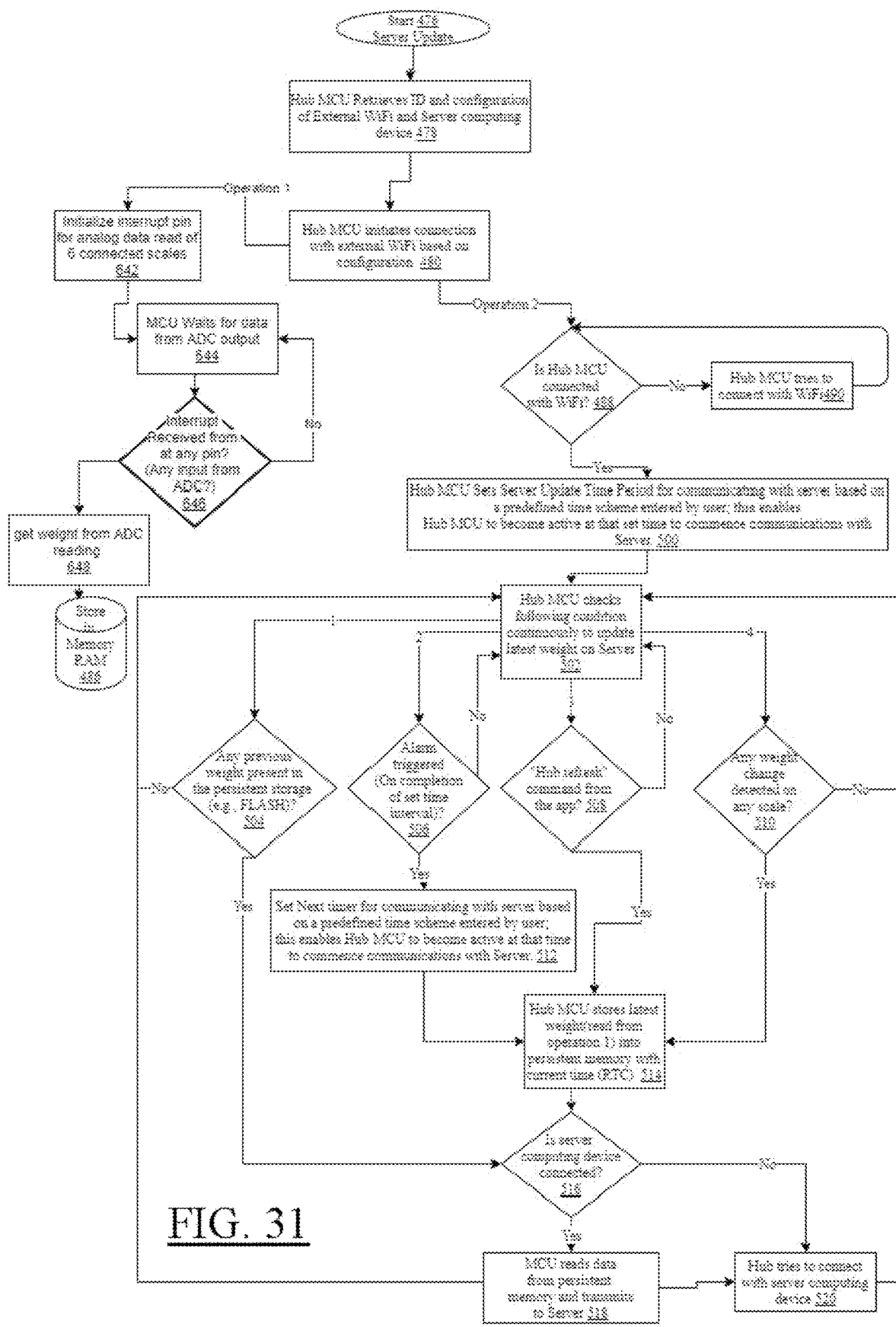

FIG. 31 is a non-limiting, exemplary flow diagram that details the method for updating of server records by power and data communications hub 112 of intelligent shelf 650 in accordance with one or more embodiments of the present invention. As illustrated, in this non-limiting exemplary instance, to update server records 190 of server computing device 140, scan operations (operation 1) of hub MCU 376 at operation 642 initializes all input pins (IO 27, IO 11, IO 10, IO 2, IO 4, IO 5). For example, they all may be set to High or Low values and ready to receive data.

At operation 644 MCU 376 waits for data from weight sensor module ADC 408, and at operation 646 MCU 376 determines if data (DOUT1, DOUT2, DOUT3, DOUT4, DOUT5, and or DOUT6) has been received on any one or more of its input pins (IO 27, IO 11, IO 10, IO 2, IO 4, IO 5). If MCU 376 determines that data is received, then MCU 376 obtains the measured weight from weight sensor module ADC 408 at operation 648, and stores it in memory (RAM 474) at operation 486.

It should be noted that the same methods of operations for accurate weight measurements (determining tare weight, calibration weight, error calculations, etc.) disclosed in relation to FIG. 12A-3 above also apply to operation 648 shown in FIG. 31. In the current embodiment, the indicated MCU shown operations of FIG. 12A-3 represents hub MCU 376 instead of weight sensor module MCU 410 since in the current embodiment, there is no weight sensor module MCU.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology, terminology, specific values or parameters employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, employing a shelf with only a single weight sensor module, with multiple single weight sensor module shelves connected together to form a larger shelf. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An inventory monitoring system, comprising:
a server computing device;
a self-contained intelligent shelf;
the self-contained intelligent shelf is comprised of a housing;
the housing of the self-contained intelligent shelf includes a plurality of compartments;
the plurality of compartments of the housing of the self-contained intelligent shelf removably house and securely encase a plurality of replaceable weight measuring sensor module groupings and a power and data communications hub;
a weight measuring sensor module grouping of the plurality of the weight measuring sensor module groupings is comprised of a plurality weight measuring sensor modules;
a weight measuring sensor module of the plurality weight measuring sensor modules includes a plurality of weight measuring sensors that are linked with the power and data communications hub of the intelligent shelf; and an Internet enabled mobile computing device that stores a display logic of an inventory application;

the Internet enabled mobile computing device is communicatively associated with the intelligent shelf via the server computing device using the inventory application, providing consumption-status of items, including full, used, and depleted.

2. The inventory monitoring system as set forth in claim 1, wherein:

the intelligent shelf has a protective cover that covers over and securely encases the plurality of compartments, and includes markers for placement and positioning of items.

3. The inventory monitoring system as set forth in claim 2, further comprising:

removable indexed liner placed on top of the protective cover, with the indexed liner having guide markers for facilitating proper placement and positioning of items.

4. The inventory monitoring system as set forth in claim 2, wherein:

the protective cover includes one or more lateral portions that are mechanically fixed with one or more periphery walls of the housing, with a lateral portion of the one or more lateral portions detachably coupled with a periphery wall of the one or more walls of the housing to thereby provide access to the plurality of weight measuring sensor modules that are housed within the plurality of compartments to enable removal thereof.

5. The inventory monitoring system as set forth in claim 4, wherein:

the lateral portions of the protective cover include openings that are generally commensurate with lateral openings of the housing.

6. The inventory monitoring system as set forth in claim 1, wherein:

the power and data communications hub is comprised of electronics module that is housed in a removable hub housing.

7. The inventory monitoring system as set forth in claim 1, wherein:

the weight measuring sensor module of the plurality of the weight measuring sensor modules is isolated from an adjacent weight measuring sensor module of the plurality of the weight measuring sensor modules to prevent crossover sensing of detected weight measure by both the weight measuring sensor module and the adjacent weight measuring sensor module.

8. The inventory monitoring system as set forth in claim 1, wherein:

the weigh measuring sensor module is isolated from an adjacent weight measuring sensor module due to separation distance of sufficient span between the weigh measuring sensor module and the adjacent weight measuring sensor module wherein any crossover sensing of detected weight measure is negligible.

9. An inventory monitoring system, comprising:

a server computing device that includes a working logic of an inventory application;

a self-contained intelligent shelf;

the self-contained intelligent shelf is comprised of a housing;

the housing of the self-contained intelligent shelf includes a plurality of load support plates that house and securely contain and fully encase a plurality of weight measuring sensor modules and a power and data communications hub;

the plurality of weight measuring sensor modules include a plurality of weight measuring sensors that are communicatively linked with the power and data communication hub;

the power and data communications hub of the self-contained intelligent shelf further includes a sensory logic of the inventory application; and an Internet enabled mobile computing device that includes an interactive display logic of the inventory application;

the Internet enabled mobile computing device is communicatively associated with the self-contained intelligent shelf via the server computing device using the inventory application;

a display of the Internet enabled mobile computing device displays server records updated by the working logic, providing consumption-status of items, including full, used, and depleted;

the server records are displayed by the interactive display logic of the Internet enabled mobile computing device; and the working logic updates server records by sensory logic data from the power and data communications hub of the self-contained intelligent shelf;

the sensory logic data of the self-contained intelligent shelf is updated by data from the plurality of the weight sensor modules.

10. An inventory monitoring system, comprising:

a self-contained intelligent shelf;

the self-contained intelligent shelf is comprised of a housing;

the housing of the self-contained intelligent shelf securely contains and fully encases a plurality of weight measuring sensor modules, with the plurality of weight measuring sensor modules having a plurality of weight measuring sensors;

the housing of the self-contained intelligent shelf further houses and fully and securely encases a power and data communications hub linked with the plurality of weight measuring sensors, and a sensory logic of an inventory application;

a server computing device that includes a working logic of the inventory application, which updates server records using sensory logic data received from intelligent shelf;

an Internet enabled mobile computing device having an interactive display logic of the inventory application, displays updated server records and consumption-status of items, including full, used, and depleted.

11. An inventory monitoring system, comprising:

a self-contained intelligent shelf;

the self-contained intelligent shelf is comprised of a housing;

the housing of the self-contained intelligent shelf securely contains and fully encases a plurality of weight measuring sensor modules, with the plurality of weight measuring sensor modules having a plurality of weight measuring sensors;

the housing of the self-contained intelligent shelf further houses and securely and fully encases a power and data communications hub linked with the plurality of weight measuring sensors;

the self-contained intelligent shelf further includes a sensory logic of an inventory application, which updates sensory logic data from the plurality of weight measuring sensors;
a server computing device that includes a working logic of the inventory application, which updates server records using updated sensory logic data received from intelligent shelf;
an Internet enabled mobile computing device having an interactive display logic of the inventory application, displays updated server records and consumption-status of items, including full, used, and depleted.

12. An inventory monitoring system, comprising:
a self-contained intelligent shelf;
the self-contained intelligent shelf is comprised of a housing;
the housing of the self-contained intelligent shelf securely contains and fully encases a plurality of weight measuring sensor modules and a power and data communications hub;
the plurality of weight measuring sensor modules are comprised of a plurality of weight measuring sensors that measure a weight of an item;
the power and data communications hub has a sensory logic of an inventory application, which generates sensory logic data related to inventory items monitored;
a server computing device that includes a working logic of the inventory application, which updates server records using the sensory logic data received from the intelligent shelf;
an Internet enabled mobile computing device having an interactive display logic of the inventory application, which displays updated server records received from the server computing device and consumption-status of items, including full, used, and depleted.

13. The inventory monitoring system as set forth in claim 12, wherein:
the inventory items are monitored using the weight measuring sensor module, which communicate sensed data to the power and data communications hub using sensory logic of the inventory application to generate sensory logic data, with the sensory logic data transmitted to the server computing device by the power and data communication hub.

14. The inventory monitoring system as set forth in claim 12, wherein:
the Internet enabled mobile computing device is comprised of a plurality of Internet enabled mobile computing devices associated with a group account on the server computing device, with the group account associated with the intelligent shelf.

15. The inventory monitoring system as set forth in claim 14, wherein:
the server computing device enables access to data associated with the group account to the plurality of Internet enabled mobile computing devices.

16. The inventory monitoring system as set forth in claim 14, wherein:
the plurality of Internet enabled mobile computing devices share data associated with the group account.

17. The inventory monitoring system as set forth in claim 12, wherein:
the power and data communications hub includes:
a Microcontroller Unit (MCU); and
a real time clock (RTC) unit;
wherein: an internal clock of the MCU is used for all internal operations of the intelligent shelf, and RTC is used for all external communications with external computing devices, including one or more server computing devices so that all data transmitted from the intelligent shelf has a real time timestamp.

18. The inventory monitoring system as set forth in claim 12, wherein:
the weight measuring sensors are comprised of load cells that measure a weight of an item and transmit an analog weight data measurement of the item to an analog to digital converter (ADC);
the ADC converts the analog weight data into a digital weight data and transmits the digital weight data to a hub MCU.

19. The inventory monitoring system as set forth in claim 12, wherein:
the power and data communications hub further includes:
one or more temperature sensor unit for sensing a temperature of the plurality of weight measuring sensor modules, with the sensed temperature used by a microcontroller unit (MCU) of the power and data communications hub to compensate offset variations in sensed weight due to variations in temperature.

20. The inventory monitoring system as set forth in claim 12, wherein:
a Microcontroller unit (MCU) determines a tare weight of the weight measuring sensor by receiving a stabilized weight value from a weight measuring sensor module ADC and stores the stabilized weight value as the tare weight;
the MCU receives a next stabilized weight value from weight measuring sensor module ADC, and determines if the next stabilized weight value is different from the tare weight;
if the MCU determines that the next stabilized weight value is different from the tare weight, the MCU receives a subsequent stabilized weight value within a predetermined interval;
the MCU determines if a difference between the subsequent stabilized weight value received is greater than a predetermined threshold;
if the MCU determines that the difference is less than the predetermined threshold, the MCU adjusts the stored tare weight based on the determined variation;
if the MCU determines that the difference is greater than the predetermined threshold, the MCU determines weight of an item.

21. The inventory monitoring system as set forth in claim 20, wherein:
a weight value output from the weight measuring sensor module ADC stabilizes after a predetermined time.

* * * * *